US012740618B2

(12) United States Patent
Campos, II et al.

(10) Patent No.: US 12,740,618 B2
(45) Date of Patent: Sep. 22, 2026

(54) ARTICLE OF FOOTWEAR INCLUDING A SOLE STRUCTURE

(71) Applicant: Nike, Inc., Beaverton, OR (US)

(72) Inventors: Fidencio Campos, II, Dallas, OR (US); Roger Paul Murphy, Portland, OR (US); Thomas J. Rushbrook, Portland, OR (US); Jessica Small, Portland, OR (US); Matthew W. Thornton, Beaverton, OR (US)

(73) Assignee: NIKE, INC., Beaverton, OR (US)

(*) Notice: Subject to any disclaimer, the term of this patent is extended or adjusted under 35 U.S.C. 154(b) by 0 days.

(21) Appl. No.: 18/490,271

(22) Filed: Oct. 19, 2023

(65) Prior Publication Data

US 2024/0130471 A1 Apr. 25, 2024
US 2024/0225186 A9 Jul. 11, 2024

Related U.S. Application Data

(60) Provisional application No. 63/506,508, filed on Jun. 6, 2023, provisional application No. 63/506,515, filed (Continued)

(51) Int. Cl.
*A43B 13/20* (2006.01)
*A43B 7/144* (2022.01)

(Continued)

(52) U.S. Cl.
CPC ............ *A43B 13/206* (2013.01); *A43B 7/144* (2013.01); *A43B 13/186* (2013.01);

(Continued)

(58) Field of Classification Search
CPC ....... A43B 7/144; A43B 13/206; A43B 13/20; A43B 13/189; A43B 13/125;

(Continued)

(56) References Cited

U.S. PATENT DOCUMENTS 1,400,146 A 12/1921 Eggers et al.
1,610,319 A 12/1926 Ray (Continued)

FOREIGN PATENT DOCUMENTS

CN 1981662 A 6/2007
CN 108606407 A 10/2018

(Continued)

OTHER PUBLICATIONS

International Search Report and Written Opinion, PCT/US2023/077318, mailed Feb. 6, 2024. (15 pages).

(Continued)

*Primary Examiner* — F Griffin Hall
(74) *Attorney, Agent, or Firm* — Bookoff McAndrews, PLLC

(57) ABSTRACT

An article of footwear having a heel region with a posterior end of the article of footwear, a mid-foot region, and a forefoot region with an anterior end of the article of footwear; a lateral side, and a medial side opposite the lateral side; an upper; a sole structure, the sole structure coupled to the upper, and wherein the sole structure has; a cushioning element disposed in the heel region, the cushioning element having a first tube and a second tube, wherein each of the first tube and the second tube extend from the lateral side of the article of footwear to the medial side of the article of footwear, wherein the first tube includes a contained fluid volume at a first pressure, and the second tube includes a contained fluid volume at a second pressure, wherein the first pressure and the second pressure are equal to one another.

13 Claims, 74 Drawing Sheets

Related U.S. Application Data on Jun. 6, 2023, provisional application No. 63/380,172, filed on Oct. 19, 2022, provisional application No. 63/380,202, filed on Oct. 19, 2022, provisional application No. 63/380,177, filed on Oct. 19, 2022.

(51) Int. Cl.

| | |
|---|---|
| ***A43B 13/18*** | (2006.01) |
| ***B29C 51/08*** | (2006.01) |
| ***B29C 51/10*** | (2006.01) |
| ***B29C 51/20*** | (2006.01) |
| ***B32B 37/10*** | (2006.01) |

(52) U.S. Cl.

CPC ............ *A43B 13/187* (2013.01); *A43B 13/20* (2013.01); *B29C 51/08* (2013.01); *B29C 51/10* (2013.01); *B29C 51/105* (2013.01); *B29C 51/20* (2013.01); *B32B 37/1009* (2013.01); *B29C 2791/006* (2013.01)

(58) Field of Classification Search

CPC ....... A43B 13/127; A43B 13/12; A43B 13/18; A43B 21/265; A43B 21/28

See application file for complete search history.

(56) References Cited

U.S. PATENT DOCUMENTS

| | | | | | |
|---|---|---|---|---|---|
| 2,100,492 | A * | 11/1937 | Sindler | A43B 13/206 525/349 |
| 2,627,676 | A | 2/1953 | Hack | |
| 4,183,156 | A * | 1/1980 | Rudy | A43B 13/40 36/44 |
| 4,217,705 | A * | 8/1980 | Donzis | A43B 13/206 36/153 |
| 4,593,482 | A | 6/1986 | Mayer | |
| 4,782,603 | A * | 11/1988 | Brown | A43B 13/181 36/28 |
| 4,852,274 | A * | 8/1989 | Wilson | A43B 17/026 36/28 |
| 4,864,738 | A * | 9/1989 | Horovitz | A43B 13/20 2/413 |
| 5,005,300 | A | 4/1991 | Diaz et al. | |
| 5,042,176 | A * | 8/1991 | Rudy | F16F 1/3615 36/153 |
| 5,112,560 | A | 5/1992 | Moumdjian | |
| 5,117,566 | A * | 6/1992 | Lloyd | A43B 13/206 36/28 |
| 5,224,277 | A | 7/1993 | Sang | |
| 5,686,167 | A | 11/1997 | Rudy | |
| 5,794,359 | A | 8/1998 | Jenkins et al. | |
| 5,907,911 | A | 6/1999 | Huang | |
| 6,038,790 | A | 3/2000 | Pyle et al. | |
| 6,061,928 | A | 5/2000 | Nichols | |
| 6,122,785 | A | 9/2000 | Bondie et al. | |
| 6,158,149 | A | 12/2000 | Rudy | |
| 6,192,606 | B1 | 2/2001 | Pavone | |
| 6,294,114 | B1 | 9/2001 | Muirhead | |
| 6,298,581 | B1 | 10/2001 | Chern | |
| 6,321,465 | B1 | 11/2001 | Bonk et al. | |
| 6,397,498 | B1 | 6/2002 | Yoo | |
| 6,582,786 | B1 * | 6/2003 | Bonk | B32B 3/20 428/476.3 |
| 6,807,753 | B2 | 10/2004 | Steszyn et al. | |
| 6,976,321 | B1 * | 12/2005 | Lakic | A43B 17/006 36/28 |
| 6,983,553 | B2 | 1/2006 | Lussier et al. | |
| 7,565,754 | B1 | 7/2009 | Acheson et al. | |
| 7,588,654 | B2 | 9/2009 | Schindler et al. | |
| 7,591,919 | B2 | 9/2009 | Schindler et al. | |
| 8,257,532 | B2 | 9/2012 | Grange et al. | |
| 8,650,775 | B2 | 2/2014 | Peyton | |
| 9,119,439 | B2 | 9/2015 | Brandt et al. | |
| 9,125,453 | B2 | 9/2015 | Keating et al. | |
| 9,510,646 | B2 * | 12/2016 | Holt | B29C 33/42 |
| 9,609,912 | B2 * | 4/2017 | Holt | A43B 13/141 |
| 10,016,017 | B2 * | 7/2018 | Christensen | A43B 13/184 |
| 10,548,370 | B2 | 2/2020 | Walsh et al. | |
| 10,709,199 | B2 | 7/2020 | Conway et al. | |
| 10,856,607 | B2 | 12/2020 | Hatfield et al. | |
| 2003/0144071 | A1 | 7/2003 | Dodge et al. | |
| 2003/0226283 | A1 | 12/2003 | Braunschweiler et al. | |
| 2004/0154189 | A1 | 8/2004 | Wang | |
| 2004/0237346 | A1 | 12/2004 | Rudy | |
| 2005/0132617 | A1 | 6/2005 | Potter et al. | |
| 2006/0277791 | A1 | 12/2006 | Schoenborn et al. | |
| 2006/0277792 | A1 | 12/2006 | Schoenborn | |
| 2007/0113425 | A1 * | 5/2007 | Wakley | A43B 13/20 36/28 |
| 2008/0163512 | A1 | 7/2008 | Hazenberg | |
| 2009/0019730 | A1 | 1/2009 | Salminen et al. | |
| 2009/0117301 | A1 | 5/2009 | Lin | |
| 2010/0005684 | A1 | 1/2010 | Nishiwaki et al. | |
| 2014/0020264 | A1 | 1/2014 | Holt | |
| 2014/0250720 | A1 | 9/2014 | Miner et al. | |
| 2014/0305008 | A1 | 10/2014 | Wang et al. | |
| 2015/0272271 | A1 | 10/2015 | Campos, II et al. | |
| 2016/0051009 | A1 | 2/2016 | Kormann et al. | |
| 2016/0075113 | A1 | 3/2016 | Chang et al. | |
| 2016/0081428 | A1 | 3/2016 | Swigart et al. | |
| 2016/0128424 | A1 | 5/2016 | Connell et al. | |
| 2016/0361837 | A1 | 12/2016 | Hayes et al. | |
| 2017/0295886 | A1 | 10/2017 | Davis et al. | |
| 2018/0035751 | A1 | 2/2018 | Rehagen | |
| 2018/0303201 | A1 | 10/2018 | Greene | |
| 2019/0231027 | A1 | 8/2019 | Eldem et al. | |
| 2020/0022455 | A1 | 1/2020 | Eldem et al. | |
| 2020/0305551 | A1 | 10/2020 | Campos et al. | |
| 2020/0375308 | A1 | 12/2020 | Langvin et al. | |
| 2021/0022440 | A1 | 1/2021 | Hurd et al. | |
| 2021/0085023 | A1 | 3/2021 | Bandyopadhyay et al. | |
| 2021/0145118 | A1 | 5/2021 | Campos, II et al. | |
| 2021/0345729 | A1 * | 11/2021 | Chan | A43B 13/127 |
| 2021/0361027 | A1 | 11/2021 | Durflinger et al. | |
| 2021/0368918 | A1 | 12/2021 | Lyke | |
| 2022/0047040 | A1 | 2/2022 | Durflinger et al. | |
| 2022/0061464 | A1 | 3/2022 | Chang et al. | |
| 2022/0202136 | A1 | 6/2022 | Campos, II et al. | |
| 2022/0248800 | A1 | 8/2022 | Lambertz | |
| 2022/0312891 | A1 | 10/2022 | Yoshida | |
| 2023/0301397 | A1 | 9/2023 | Campos, II et al. | |
| 2024/0130473 | A1 | 4/2024 | Campos, II et al. | |
| 2024/0225188 | A9 | 7/2024 | Campos, II et al. | |
| 2025/0000207 | A1 | 1/2025 | Anceresi et al. | |

FOREIGN PATENT DOCUMENTS

| | | | |
|---|---|---|---|
| DE | 3245182 | A1 | 5/1983 |
| EP | 0298449 | A1 | 1/1989 |
| EP | 0298449 | A2 * | 1/1989 |
| EP | 0456434 | A2 * | 11/1991 |
| GB | 2235150 | A | 2/1991 |
| KR | 100962004 | B1 | 6/2010 |
| KR | 20110023173 | A | 3/2011 |

OTHER PUBLICATIONS

International Search Report and Written Opinion, PCT/US2023/077321, mailed Feb. 15, 2024. (12 pages).

Taiwanese Office Action and Search Report, ROC (Taiwan) Pat. Appln. No. 112140020, issues Jul. 11, 2024.

* cited by examiner

AML
6-6
13B-13B
1114

300
302
304
306
308
300W
302W
304W
306W
308W
300L
302L
304L
306L
308L
301a
301b
301d
301C
301c
301a(L)
301b(L)
301c(L)
301d(L)
301a(W)
301b(W)
301c(W)
301d(W)
321
323
325
327
330J
330K
331a
331B
331c
331d
331e
332J
332K
333a
333B
333c
333d
333e
334J
334K
336J
336K
338J
338K
383
385

ARTICLE OF FOOTWEAR INCLUDING A SOLE STRUCTURE

CROSS-REFERENCE TO RELATED APPLICATION(S)

This application claims priority to U.S. Provisional Application No. 63/380,172, filed Oct. 19, 2022, U.S. Provisional Application No. 63/380,177, filed Oct. 19, 2022, U.S. Provisional Application No. 63/380,202, filed Oct. 19, 2022, U.S. Provisional Application No. 63/506,515, filed Jun. 6, 2023, U.S. Provisional Application No. 63/506,508, filed Jun. 6, 2023, the entireties of which are incorporated herein by reference.

FIELD

The present disclosure relates generally to articles of footwear including sole structures and more particularly to sole structures incorporating a fluid-filled bladder.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outer sole that provides abrasion-resistance and traction with the ground surface. The outsole may be formed from rubber or other materials that impart durability and wear-resistance, as well as enhance traction with the ground surface. Another layer of the sole structure includes a midsole disposed between the outsole and the upper. The midsole provides cushioning for the foot and may be partially formed from a polymeric foam material that compresses resiliently under an applied load to cushion the foot by attenuating ground-reaction forces. The midsole may additionally be coupled to or alternatively incorporate a fluid-filled bladder to increase the durability of the sole structure, as well as to provide cushioning to the foot by compressing resiliently under an applied load to attenuate ground-reaction forces. Sole structures may also include a comfort-enhancing insole or a sockliner located within a void proximate to the bottom portion of the upper and a strobel attached to the upper and disposed between the midsole and the insole or sockliner.

Midsoles coupled to fluid-filled bladders typically include a bladder formed from two barrier layers of polymer material that are sealed or bonded together. The fluid-filled bladders are pressurized with a fluid such as air, and may incorporate tensile members within the bladder to retain the shape of the bladder when compressed resiliently under applied loads, such as during athletic movements. Generally, bladders are designed with an emphasis on balancing support for the foot and cushioning characteristics that relate to responsiveness as the bladder resiliently compresses under an applied load.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
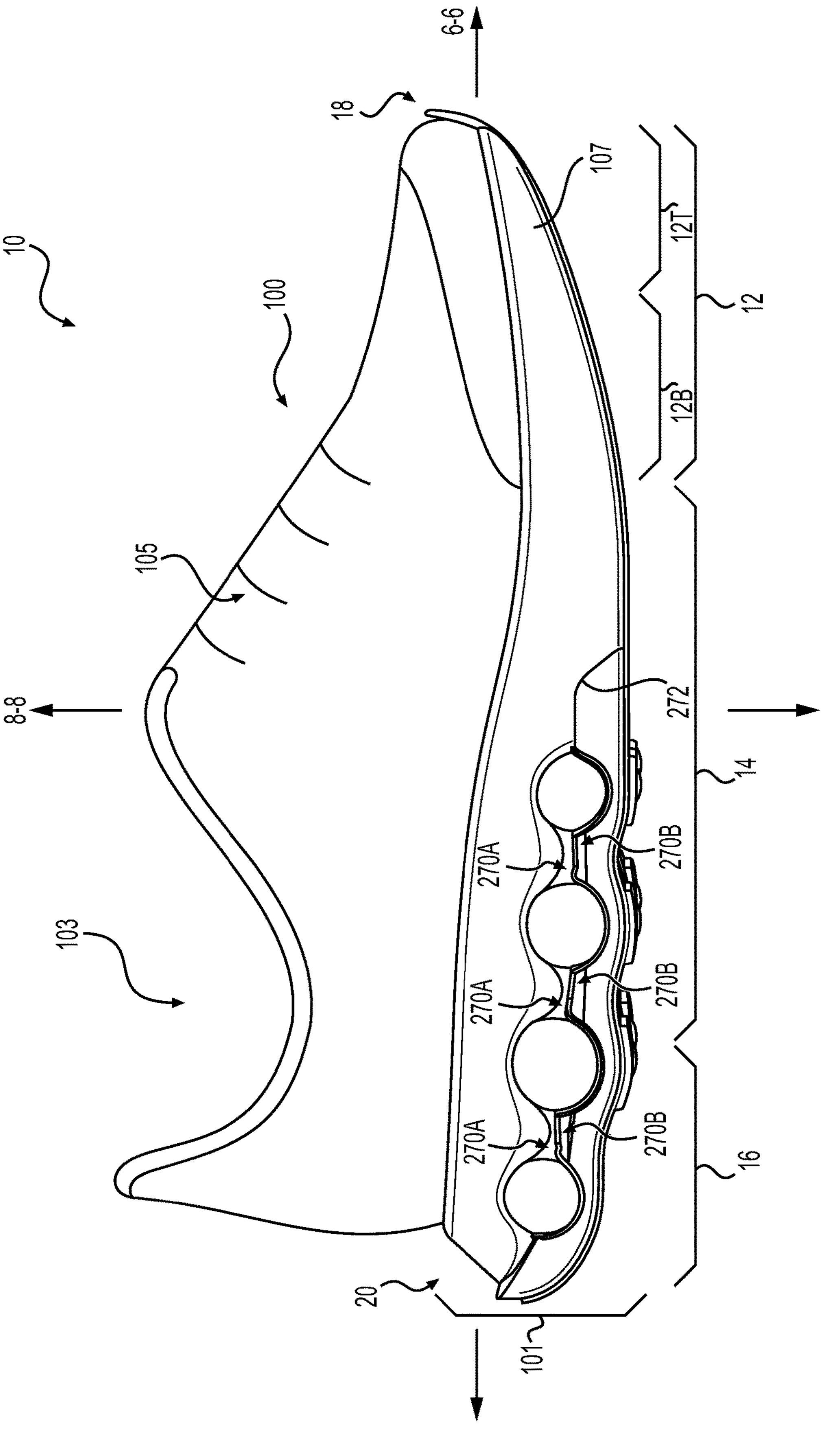
FIG. 1 is a side view of an article of footwear.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., “between” versus “directly between,” “adjacent” versus “directly adjacent,” etc.). As used herein, the term “and/or” includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as “first,” “second,” and other numerical terms do not imply a sequence or order unless clearly indicated by the context. Thus, a first element, component, region, layer or section discussed below could be termed a second element, component, region, layer or section without departing from the teachings of the example configurations.

In the discussion that follows, terms “about,” “approximately,” “substantially,” and the like, when used in describing a numerical value, denote a variation of +/−10% of that value, unless specified otherwise.

The present disclosure is directed to an article of footwear, such as an article of footwear 10 shown in FIG. 1, that provides unique underfoot cushioning and responsiveness during use. FIG. 1 depicts an article of footwear 10 that further provides a unique balance of comfort and stability.

As shown in FIG. 1, footwear 10 includes a sole structure 101 and an upper 100 attached to the sole structure 101. The article of footwear 10 is divided into a forefoot region 12, a mid-foot region 14, and a heel region 16. The forefoot region 12 includes a toe portion 12T corresponding to the phalanges of the foot, and a ball portion 12B corresponding to a metatarsophalangeal (MTP) joint. The mid-foot region 14 corresponds with an arch area of the foot, and the heel region 16 corresponds with rear portions of the foot, including a calcaneus bone. The footwear 10 further includes an anterior end 18 including a forward-most point of the forefoot region 12, and a posterior end 20 including a rearward-most point of the heel region 16. For ease of discussion, the footwear 10 is discussed with reference to a longitudinal axis 6-6, a medial-lateral axis AML (shown in FIG. 3A), and a vertical axis 8-8, where the longitudinal axis 6-6, the medial-lateral axis AML, and the vertical axis 8-8 are perpendicular to each other. The longitudinal axis 6-6 of the footwear 10 extends along a length of the footwear 10 from the anterior end 18 to the posterior end 20, and generally divides the footwear 10 into a medial side 22 and a lateral side 24 (shown in FIG. 8). The medial-lateral axis AML extends from medial side 22 to lateral side 24. Accordingly, the medial side 22 and the lateral side 24 respectively correspond with opposite sides of the footwear 10 and extend from the anterior end 18 to the posterior end 20. The vertical axis 8-8 extends from a bottom (i.e., ground-contacting portion) of the footwear 10 to a top of the footwear 10.

Still referring to FIG. 1, the upper 100 includes interior surfaces that define an interior void configured to receive and secure a foot for support on sole structure 101. The upper 100 may be formed from one or more materials that are stitched or adhesively bonded together to form the interior void. Suitable materials of the upper include, but are not limited to, mesh, textiles, foam, leather, and synthetic leather. The materials are configured and located to impart properties of durability, air-permeability, wear-resistance, flexibility, and/or comfort.

In some examples, the upper 100 includes a strobel (not shown) having a bottom surface opposing the sole structure 101 and an opposing top surface defining a footbed of the interior void. Stitching or adhesives secure the strobel to the upper 100. The footbed is contoured to conform to a profile of the bottom surface (e.g., plantar) of the foot. Optionally, the upper 100 incorporates additional layers such as an insole or sockliner (not shown) that are disposed upon the strobel and reside within the interior void of the upper 100 to receive a plantar surface of the foot to enhance the comfort of the article of footwear 10. An ankle opening 103 in the heel region 16 provides access to the interior void. For example, the ankle opening 103 receives a foot to secure the foot within the void and facilitate entry and removal of the foot from and to the interior void.

In some examples, one or more fasteners 105 extend along the upper 100 to adjust a fit of the interior void around the foot and to accommodate entry and removal of the foot therefrom. The fasteners 105 may include laces, straps, cords, hook-and-loop, or any other suitable type of fastener. The upper 100 can include a tongue portion (not shown) that extends between the interior void and the fasteners.

Figure 2:
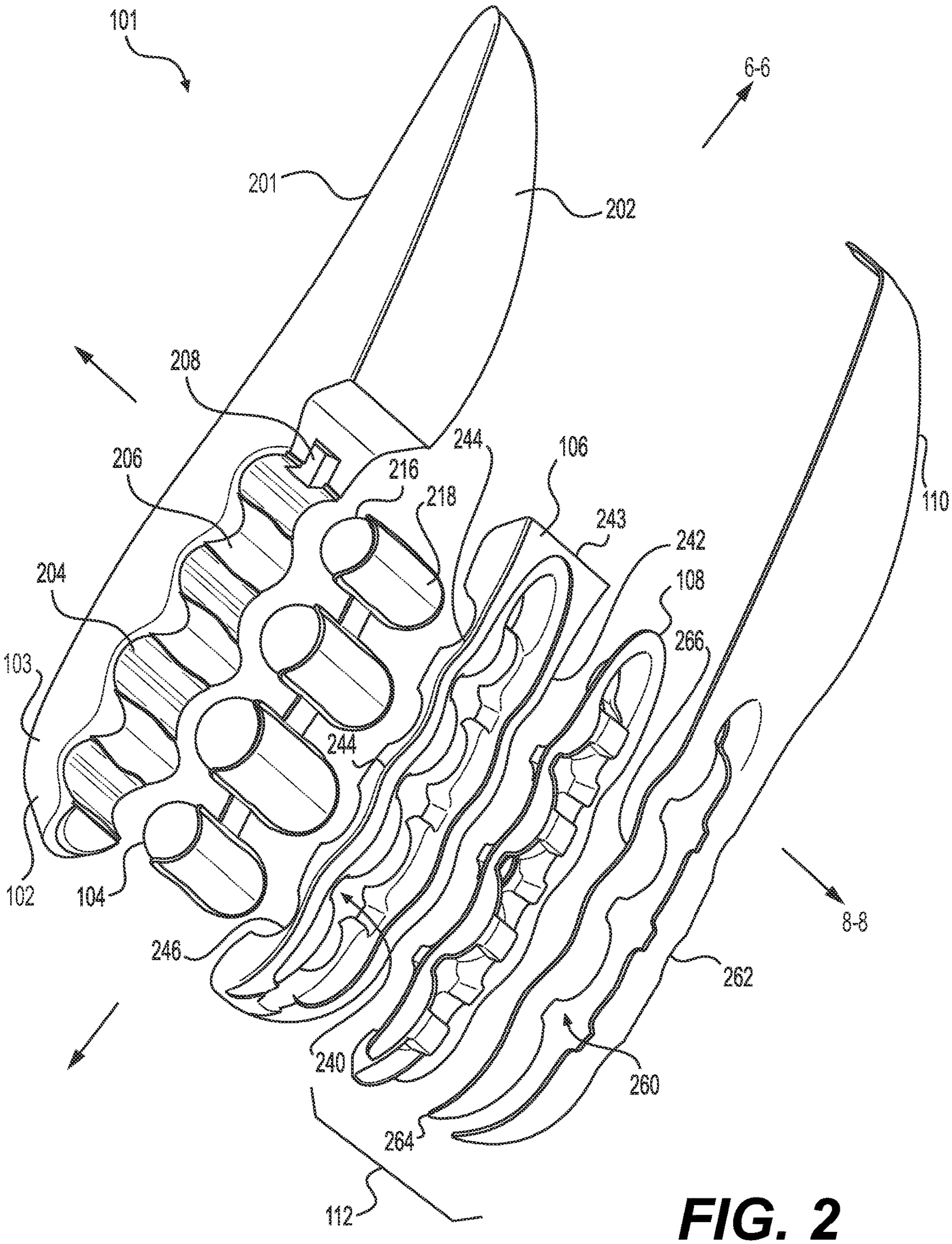
FIG. 2 is an exploded perspective view of a sole structure of the article of footwear of FIG. 1.

With reference to FIG. 2, the sole structure 101 includes a midsole 102, which includes a first support element 107 and a second support element 106. In some examples, the midsole 102 is of a unitary construction. The sole structure 101 further includes a heel cushioning element 104, and an outsole 112. The outsole 112 includes a coupling portion 108 and an outsole layer 110. In some examples, the outsole 112 may be formed without the coupling portion 108. Portions of the outsole 112 are configured to provide a ground-engaging surface of the article of footwear 10 that directly contacts the ground. The sole structure 101 is configured to provide cushioning characteristics to the article of footwear 10.

Still referring to FIG. 2, first support element 107 includes a top surface 201 and a bottom surface 202. Bottom surface 202 includes a plurality of recesses 204, a plurality of mounds 206, and a receiving portion 208. The plurality of recesses 204 and the plurality of mounds 206 alternate with one another along the longitudinal axis 6-6 to form an undulating path along the bottom surface 202 of the first support element 107. The undulating path exhibits a plurality of peaks and valleys when viewed from an exterior of the article of footwear 10. The plurality of recesses 204 correspond to the peaks of the undulating path and the plurality of mounds 206 correspond to the valleys of the undulating path. As shown, each of the plurality of mounds 206 has a rounded shape, but may include any other shape (e.g., rectangular, triangular, irregular, jagged or the like). Some of the plurality of recesses 204 and the plurality of mounds 206 are present in the heel region 16, while some of the plurality of recesses 204, and the plurality of mounds 206 are present in the mid-foot region 14. As shown, the plurality of recesses 204 and the plurality of mounds 206 span the entirety (or substantial entirety) of the length of the heel region 16, and only a portion of the mid-foot region 14. However, recesses 204 and mounds 206 could span the entirety of mid-foot region 14 and some or all of the forefoot region 12.

The receiving portion 208 is a cavity in within the bottom surface 202 positioned in the mid-foot region 14. The receiving portion 208 has a substantially rectangular shape, but could have another shape (e.g., square, triangular, ovular, or etc.). Receiving portion 208 provides access for removal of the cushioning element 104. Additionally, receiving portion 208 receives any excess portion of the cushioning element 104, such as, e.g., an inflation tube of cushioning element 104. The anterior of the bottom surface 202 extending from the mid-foot region 14 to the forefoot region 16 is free of and excludes the plurality of recesses 204, the plurality of mounds 206, and the receiving portion 208. In other words, the portion of the bottom surface 202 extending from the portion of the mid-foot region 14 to the forefoot region 16 is a substantially smooth surface.

First support element 107 includes a support material suitable for providing a desired cushioning characteristic to the article of footwear 10. For example, first support element 107 may consist of or comprise a polymeric support material. The polymeric support material may be a foamed polymeric support material, as described in greater detail below.

Figure 3A:
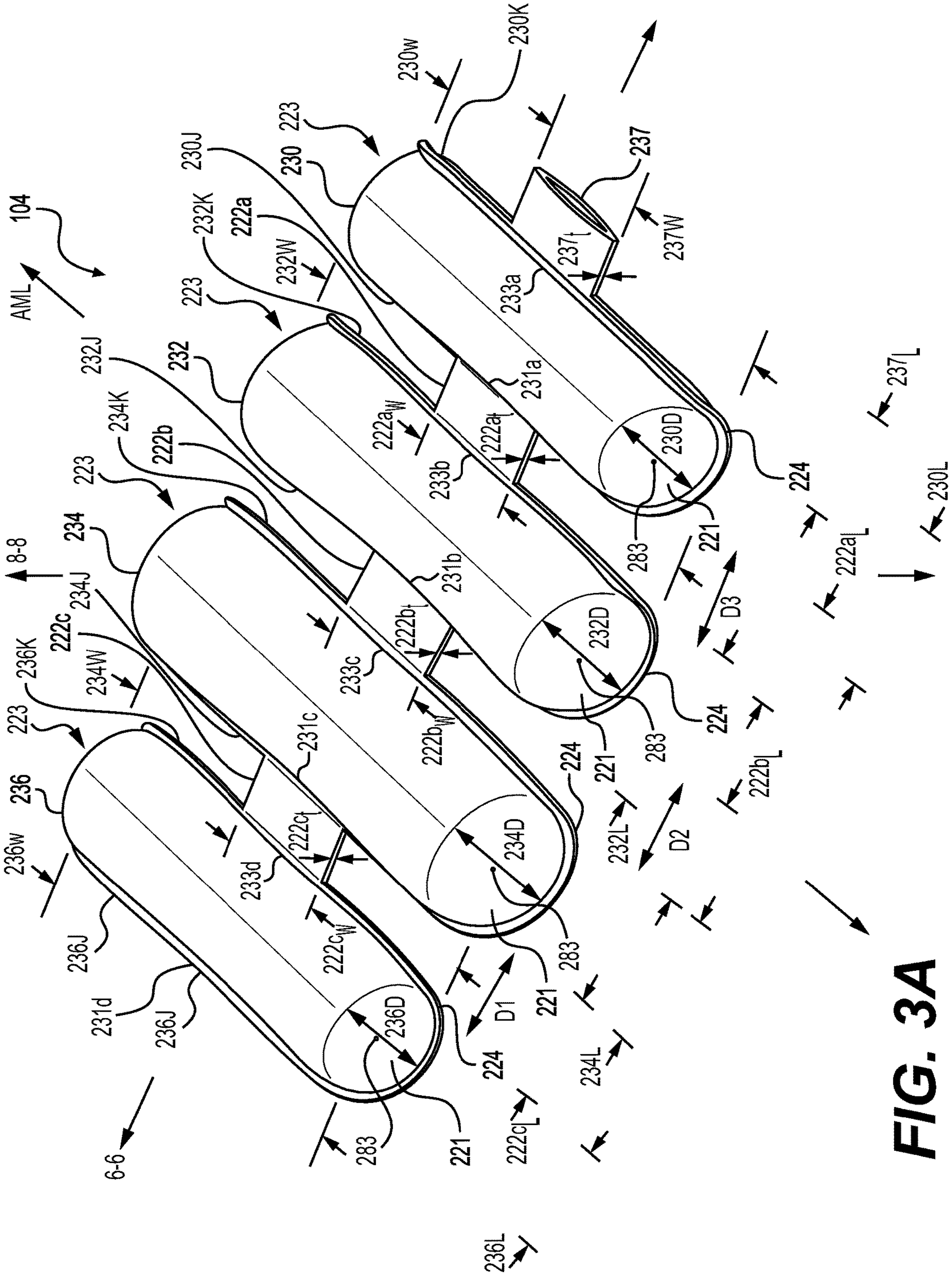
FIG. 3A is a perspective view of a cushioning element of the article of footwear of FIG. 1.

With reference to FIG. 2, the cushioning element 104 is a fluid-filled cushioning element, such as an airbag or bladder. The cushioning element 104 may comprise a barrier material. As illustrated in FIG. 2, the cushioning element 104 includes an opposing pair of films 216, 218. One or both of the opposing pair of films 216, 218 may comprise a barrier material. For example, one or both of the opposing pair of films 216, 218 comprises a multi-layer film. As shown in FIG. 3A, the barriers films 216 and 218 are joined to each other at discrete locations to define tubes 230, 232, 234, and 236, distinct web areas 222*a*, 222*b*, and 222*c*, and a peripheral seam 224. The peripheral seam 224 is disposed nearest film 218 such that the peripheral seam 224 is disposed on the bottom surface of the cushioning element 104. It is contemplated that tubes 230, 232, 234, and 236 are cylindrical, triangular, pentagonal, cubed, or the like.

Referring to FIG. 3A, each of web areas 222*a*, 222*b*, and 222*c* include a dimension along each of the longitudinal axis 6-6, the medial-lateral axis AML, and the vertical axis 8-8. Each web area 222*a*, 222*b*, and 222*c* includes a length, a width, and a thickness. Web area 222*a* includes a length 222*a*(L) along the longitudinal axis 6-6, a width 222*a*(W) along the medial-lateral axis AML, and a thickness 222*a*(*t*) along the vertical axis 8-8. Web area 222*b* includes a length 222*b*(L) along the longitudinal axis 6-6, a width 222*b*(W) along the medial-lateral axis AML, and a thickness 222*b*(*t*) along the vertical axis 8-8. Web area 222*c* includes a length 222*c*(L) along the longitudinal axis 6-6, a width 222*c*(W) along the medial-lateral axis AML, and a thickness 222*c*(*t*) along the vertical axis 8-8. Any one of web areas 222*a*, 222*b*, and/or 222*c* may have the same or different dimensions as another web area 222*a*, 222*b*, and/or 222*c*.

In one example, length 222*a*(L), length 222*b*(L), and length 222*c*(L) are all the same. In another example, each of length 222*a*(L), length 222*b*(L), and length 222*c*(L) are different from one another.

In another example some of the lengths are the same while others are different. For example, length 222*a*(L) and length 222*b*(L) have a first length, and length 222*c*(L) has a second length different than the first length. Or, length 222*a*(L) and length 222*c*(L) have a third length, and length 222*b*(L) has a fourth length different than the third length. As another example, length 222*b*(L) and length 222*c*(L) have a fifth length, and length 222*a*(L) has a sixth length different than the fifth length. The lengths 222*a*(L), 222*b*(L), and 222*c*(L) may range from about 0.1 cm to about 3 cm. The lengths 222*a*(L), 222*b*(L), and 222*c*(L) may range from about 0.5 cm to about 2 cm. The lengths 222*a*(L), 222*b*(L), and 222*c*(L) may range from about 0.75 cm to about 1 cm. In an example, the length 222*a*(L) is 0.9 cm, the length 222*b*(L) is 0.9 cm, and the length 222*c*(L) is 0.9 cm. In another example, the length 222*a*(L) is 0.9 cm, the length 222*b*(L) is 1 cm, and the length 222*c*(L) is 0.9 cm. In another example, the length 222*a*(L) is 0.9 cm, the length 222*b*(L) is 0.95 cm, and the length 222*c*(L) is 1 cm. In another embodiment, the length 222*a*(L) is 0.9 cm, the length 222*b*(L) is 1 cm, and the length 222*c*(L) is 1 cm. In another example, the length 222*a*(L) is 0.9 cm, the length 222*b*(L) is 0.9 cm, and the length 222*c*(L) is 1 cm.

In one example, the dimensions of web areas 222*a*, 222*b*, and 222*c* are formed as ratios of one another. The ratios may all be the same, all different, or a combination of the same and/or different ratios. For example, one length could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another length. As an example, length 222*a*(L) is 1 cm, length 222*b*(L) is 0.5 cm, and length 222*c*(L) is 0.9 cm making length 222*b*(L) 0.5 times the length of 222*a*(L) and length 222*c*(L) is 0.9 times the length of 222*b*(L).

In one example, width 222*a*(W), width 222*b*(W), and length 222*c*(W) are all the same. In another example, each of width 222*a*(W), width 222*b*(W), and width 222*c*(W) are different from one another.

In another example some of the widths are the same while others are different. For example, width 222*a*(W) and width 222*b*(W) have a first width, and width 222*c*(W) has a second width different than the first width. Or, width 222*a*(W) and width 222*c*(W) have a third width, and width 222*b*(W) has a fourth width different than the third width. As another example, width 222*b*(W) and width 222*c*(W) have a fifth width, and width 222*a*(W) has a sixth width different than the fifth width. The widths 222*a*(W), 222*b*(W), and 222*c*(W) may range from about 0.1 cm to about 4 cm. The lengths 222*a*(L), 222*b*(L), and 222*c*(L) may range from about 0.5 cm to about 3 cm. The lengths 222*a*(L), 222*b*(L), and 222*c*(L) may range from about 0.75 cm to about 2 cm. In an example, the width 222*a*(W) is 1 cm, the width 222*b*(W) is 1 cm, and the width 222*c*(W) is 1 cm. In another example, the width 222*a*(W) is 1 cm, the width 222*b*(W) is 2 cm, and the width 222*c*(W) is 1 cm. In another example, the width 222*a*(W) is 1 cm, the width 222*b*(W) is 1.5 cm, and the width 222*c*(W) is 2 cm. In another example, the width 222*a*(W) is 1 cm, the width 222*b*(W) is 2 cm, and the widths 222*c*(W) is 2 cm. In another example, the width 222*a*(W) is 1 cm, the width 222*b*(W) is 1 cm, and the widths 222*c*(W) is 2 cm.

In one example, the dimensions of web areas 222*a*, 222*b*, and 222*c* are formed as ratios of one another. The ratios may all be the same, all different, or a combination of the same and/or different ratios. For example, one width could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another width. As an example, width 222*a*(W) is 2 cm, length 222*b*(W) is 1 cm, and length 222*c*(W) is 0.9 cm making length 222*b*(W) 0.5 times the length of 222*a*(W) and length 222*c*(W) is 0.9 times the length of 222*b*(W).

In one example, thickness 222*a*(*t*), thickness 222*b*(*t*), and thickness 222*c*(*t*) are all the same. In another example, each of thickness 222*a*(*t*), thickness 222*b*(*t*), and thickness 222*c*(*t*) are different from one another.

In another example some of the thicknesses are the same while others are different. For example, thickness 222*a*(*t*) and thickness 222*b*(*t*) have a first thickness, and thickness 222*c*(*t*) has a second thickness different than the first thickness. Or, thickness 222*a*(*t*) and thickness 222*c*(*t*) have a third thickness, and thickness 222*b*(*t*) has a fourth thickness different than the third thickness. As another example, thickness 222*b*(*t*) and thickness 222*c*(*t*) have a fifth thickness, and thickness 222*a*(*t*) has a sixth thickness different than the fifth thickness. The thicknesses 222*a*(*t*), 222*b*(*t*), and 222*c*(*t*) may range from about 0.01 mm to about 7 mm. The lengths 222*a*(L), 222*b*(L), and 222*c*(L) may range from about 0.1 mm to about 3 mm. The lengths 222*a*(L), 222*b*(L), and 222*c*(L) may range from about 0.5 mm to about 2 mm. In an example, the thickness 222*a*(*t*) is 1 mm, the thickness 222*b*(*t*) is 1 mm, and the thickness 222*c*(*t*) is 1 mm. In another example, the thickness 222*a*(*t*) is 1 mm, the thickness 222*b*(*t*) is 2 mm, and the thickness 222*c*(*t*) is 1 mm. In another example, the thickness 222*a*(*t*) is 1 cm, the thickness 222*b*(*t*) is 1.5 mm, and the thickness 222*c*(*t*) is 2 mm. In another example, the thickness 222*a*(*t*) is 1 mm, the thickness 222*b*(*t*) is 2 mm, and the thickness 222*c*(*t*) is 2 mm. In another example, the thickness 222*a*(*t*) is 1 mm, the thickness 222*b*(*t*) is 1 mm, and the thickness 222*c*(*t*) is 2 mm.

In one example, the dimensions of web areas 222*a*, 222*b*, and 222*c* are formed as ratios of one another. The ratios may all be the same, all different, or a combination of the same and/or different ratios. For example, one thickness could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another thickness. As an example, thickness 222*a*(*t*) is 2 mm, thickness 222*b*(*t*) is 1 mm, and thickness 222*c*(*t*) is 0.9 mm making thickness 222*b*(*t*) 0.5 times the thickness of 222*a*(*t*) and thickness 222*c*(*t*) is 0.9 times the thickness of 222*b*(*t*).

In the illustrated example, the films 216, 218 include a first, upper film 216 and a second, lower film 218. The second film 218 includes a thickness that is greater than the thickness of the first film 216. The second film 218 being thicker than the first film 216 constrains the shape of the respective hollow tubes 230, 232, 234, and 236. In other examples, the first film 216 may have a thickness greater than the thickness of second film 218. In some other examples, the thickness of the first film 216 and the thickness of the second film 218 may be equal. For example, the thickness of the first film may be 1.5×, 2×, 3×, 5×, 10×, 15×, 20×, 50×, 100×, or another magnitude greater than the thickness of the second film. Alternatively, the thickness of the second film may be 1.5×, 2×, 3×, 5×, 10×, 15×, 20×, 50×, 100×, or another magnitude greater than the thickness of the first film. It is also contemplated that some portions of the first film may be thicker than certain portions of the second film, while some portions of the first film are thinner than certain other portions of the second film.

Alternatively, the tubes 230, 232, 234, and 236 may be produced from any suitable combination of one or more barrier films. Web areas 222*a*, 222*b*, and 222*c* are an area where opposing films 216 and 218 are bonded directly to one another without an intervening gap between the films.

The tubes 230, 232, 234, and 236 are shown in a fluid-filled (e.g., FIG. 3A) or in an unfilled state. The tubes 230, 232, 234, and 236 are filled to include any suitable fluid, such as a gas or liquid. In an aspect, the gas includes air, nitrogen gas ($N_2$), inert gasses, or any other suitable gas. In other examples, the tubes 230, 232, 234, and 236 include other media, such as pellets, beads, ground recycled material, and the like (e.g., foamed beads and/or rubber beads). The fluid provided to the tubes 230, 232, 234, and 236 results in the tubes 230, 232, 234, and 236 being pressurized. The tubes 230, 232, 234, and 236 are pressurized to a value ranging between about 3 pounds per square inch (PSI) to about 40 PSI (about 20 kilopascals (kPA) to about 276 kPA). Alternatively, the fluid provided to the tubes 230, 232, 234, and 236 may be at atmospheric pressure such that the tubes 230, 232, 234, and 236 are not pressurized but, rather, each contains a volume of fluid at atmospheric pressure.

The tubes 230, 232, 234, and 236 are configured to retain a fluid, particularly a gas such as air, oxygen or nitrogen. The tubes 230, 232, 234, and 236 may have a gas transmission rate for nitrogen gas that is at least about ten (10) times lower than a nitrogen gas transmission rate for a butyl rubber layer of substantially the same dimensions. In one embodiment, the tubes 230, 232, 234, and 236 may have a nitrogen gas transmission rate of 15 cubic-centimeter/square-meter-atmosphere-day ($cm^3/m^2 \cdot atm \cdot day$) or less for an average film thickness of 500 micrometers (based on thicknesses of barrier films 216, 218). In further aspects, the transmission rate is 10 $cm^3/m^2 \cdot atm \cdot day$ or less, 5 $cm^3/m^2 \cdot atm \cdot day$ or less, or 1 $cm^3/m^2 \cdot atm \cdot day$ or less.

In some examples, the upper barrier film 216 and the lower barrier film 218 cooperate to define a geometry (e.g., thicknesses, width, and lengths) of the tubes 230, 232, 234, and 236. For example, the web areas 222*a*, 222*b*, and 222*c*, and the peripheral seam 224 cooperate to bound and extend around the tubes 230, 232, 234, and 236 to seal the fluid (e.g., air) within an interior void 226 of each tube 230, 232, 234, and 236 (shown in FIG. 3B). Thus, the tubes 230, 232, 234, and 236 are associated with an area of the cushioning element 104 where interior surfaces of the upper and lower barrier films 216, 218 are not joined together and, thus, are separated from one another.

Each of the tubes 230, 232, 234, and 236 has a medial face 221 and a lateral face 223. The medial face 221 is a substantially rounded surface of each of the tubes 230, 232, 234, and 236 on the medial side 22 of the article of footwear 10. In an example, the medial face 221 is a substantially flush surface.

The medial face 221 of each of the tubes 230, 232, 234, and 236 corresponds to a circumference formed by the films 216, 218 and the peripheral seam 224. The lateral face 223 also is a substantially rounded surface of each of the tubes 230, 232, 234, and 236 on the lateral side 24 of the article of footwear 10. The lateral face 223 is substantially similar to the medial face 221. In other embodiments, the lateral face 223 is different from the medial face 221.

The web areas 222*a*, 222*b*, and 222*c* are disposed at a vertical midpoint of adjacent tubes 230, 232, 234, and 236. In one example, the web areas 222*a*, 222*b*, and 222*c* are disposed vertically and/or horizontally offset from the vertical midpoint of adjacent tubes 230, 232, 234, and 236. In an exemplary embodiment, the web areas 222*a*, 222*b*, and 222*c* are co-planar with one another. It is contemplated that the web areas 222*a*, 222*b*, and 222*c* are not co-planar, but rather rest in offset planes from one another. In other embodiments, some of the web areas 222*a*, 222*b*, and 222*c* are co-planar with one another while other of web areas 222*a*, 222*b*, and 222*c* are not co-planar with one another.

The peripheral seam 224 is disposed on the bottom half of the cushioning element 104 such that the peripheral seam 224 lies substantially in planes that are offset from a plane of the web areas 222*a*, 222*b*, and 222*c*. In one embodiment, the peripheral seam 224 is disposed on the top half of the cushioning element 104. It is contemplated that the peripheral seam 224 is disposed in any area containing planes that are offset from the plane of the web areas 222*a*, 222*b*, and 222*c*. The peripheral seam 224 can also lie within the same plane as web areas 222*a*, 222*b*, and 222*c*, and as such the peripheral seam 224 would form a substantially straight line through the cushioning element 104.

In an example, the total number of tubes of the one or more tubes 230, 232, 234, and 236 is four. It is contemplated that the number of tubes may be one, two, three, four, or more to provide a desired cushioning characteristic. In the example, the tubes 230, 232, 234, and 236 may be arranged such that there is a first, front most tube 230, one or more central tubes (e.g. second and third tubes) 232, 234, and a fourth, rear most tube 236. The first tube 230 and the fourth tube 236 may be shorter in height than the two central tubes 232, 234. The first tube 230 and the fourth tube 236 may have substantially similar heights. The two central tubes 232, 234 may have substantially similar heights. It is contemplated that any one of tubes 230, 232, 234, or 236 may have a height that varies from one another. It is also contemplated that all of tubes 230, 232, 234, or 236 may have substantially similar heights. Having tubes 230, 232, 234, and 236 as shown in the example in FIG. 3 aids in transition during walking of a user as well as providing a desired form of underfoot cushioning.

Tubes 230, 232, 234, and 236 of the cushioning element 104 extend from the medial side 22 to the lateral side 24 corresponding to a width (e.g., a medial-lateral diameter) of the one or more tubes 230, 232, 234, and 236. The widths of each of tubes 230, 232, 234, and 236 extends parallel to the medial-lateral axis AML. The width of a given tube is measured from a medial center point 283 on its medial face 221 to a lateral center point 285 on its lateral face 223. Center point 283 is disposed centrally on medial face 221 at an intersection between the medial-lateral axis AML, the vertical axis 8-8, and the longitudinal axis 6-6. Center point 283 is disposed halfway along longitudinal axis 6-6 and halfway along vertical axis 8-8. Center point 285 is disposed centrally on lateral face 223 at an intersection between the medial-lateral axis AML, the vertical axis 8-8, and the longitudinal axis 6-6. Center point 285 is disposed halfway along longitudinal axis 6-6 and halfway along vertical axis 8-8. Between the medial center point 283 and the lateral center point 285 exists a centerline 13 (described in greater detail below) extending along the medial-lateral axis AML. The width of a given tube is measured using the centerline. In addition to or in place of using the centerline, the width can be measured using any line extending between the medial face 221 and the lateral face 223 and parallel to the medial-lateral axis AML. The lines extending between the medial face 221 and the lateral face 223 and parallel to the medial-lateral axis AML of a given tube include a value that can be represented as an average width. The average width is the average of the values attained via the lines taken between the medial face 221 and the lateral face 223 and parallel to the medial-lateral axis AML. Tube 230 has a width 230W. Tube 232 has a width 232W. Tube 234 has a width 234W. Tube 236 has a width 236W. The widths 230W, 232W, 234W, 236W may range from about 0.5 to about 18 cm. The widths 230W, 232W, 234W, 236W may range from about 0.75 cm to about 15 cm. The widths 230W, 232W, 234W, 236W may range from about 1 cm to about 8 cm. The widths 230W, 232W, 234W, 236W may range from about 1.5 cm to about 7 cm. In an example, width 230W is about 2 cm. In an example, width 232W is about 2.5 cm. In an exemplary embodiment, width 234W is about 2.5 cm. In an example, width 236W is about 2 cm.

In one example, the widths 230W, 232W, 234W, and 236W of each of the tubes 230, 232, 234, and 236 are substantially similar or the same. In one example, the widths 230W, 232W, 234W, and 236W of each of the tubes 230, 232, 234, and 236 may vary from one width to another. For example, when moving from the heel region 16 to mid-foot region 14, the widths may decrease. In such an example, width 230W is less than 232W, width 232W is less than 234W, and width 234W is less than 236W.

As another example, when moving from the heel region 16 to mid-foot region 14, the widths may increase. In this example, width 230W is greater than 232W, width 232W is greater than 234W, and width 234W is greater than 236W.

In another example, some of the widths are the same while others are different. In one embodiment, some of the widths are greater than other widths. In this example, the tubes 230, 232, 234, and 236 form an hourglass figure when viewed along the vertical axis 8-8. For example, width 230W and width 232W have a first width, and width 234W and width 236W have a second width greater than the first width.

In one other example, the tubes 230, 232, 234, and 236 form a reverse hourglass figure when viewed along the vertical axis 8-8. For example, width 230W and width 236W have a first width, and width 232W and width 234W have a second width greater than the first width.

Tubes 230, 232, 234, and 236 of the cushioning element 104 extend in a longitudinal direction corresponding to a length of the one or more tubes 230, 232, 234, and 236. The length of each of tubes 230, 232, 234, and 236 extends along or parallel to the longitudinal axis 6-6. The length is measured using a line extending from a first end inclusive of a first center point to a second end inclusive of a second center point in the longitudinal direction. Any line taken between the first end and the second end and parallel to the longitudinal axis 6-6 is a length of the respective tube.

Each tube 230, 232, 234, and 236 has a respective first end (230J, 232J, 234J, and 236J) and a respective second end (230K, 232K, 234K, and 236K). The respective first end (230J, 232J, 234J, and 236J) is a rearmost surface of the respective tube, inclusive of the peripheral seam 224, when traveling in the longitudinal direction from the posterior end 20 toward the anterior end 18. Each of the respective first ends (230J, 232J, 234J, and 236J) include a first center point (231*a*, 231*b*, 231*c*, and 231*d*). The center points 231*a*, 231*b*, 231*c*, and 231*d* are disposed centrally along each of the respective first ends 230J, 232J, 234J, and 236J at an intersection between the medial-lateral axis AML, the vertical axis 8-8, and the longitudinal axis 6-6. Center points 231*a*, 231*b*, 231*c*, and 231*d* are disposed halfway along longitudinal axis 6-6 and halfway along vertical axis 8-8. The respective second end (230K, 232K, 234K, and 236K) is a forward-most surface of the respective tube, inclusive of the peripheral seam 224, when traveling in the longitudinal direction from the posterior end 20 to the anterior end 18. Each of the respective second ends (230K, 232K, 234K, and 236K) include a second center point (233*a*, 233*b*, 233*c*, and 233*d*). The center points 233*a*, 233*b*, 233*c*, and 233*d* are disposed centrally along each of the respective second ends 230K, 232K, 234K, and 236K at an intersection between the medial-lateral axis AML, the vertical axis 8-8, and the longitudinal axis 6-6. Center points 233*a*, 233*b*, 233*c*, and 233*d* are disposed halfway along longitudinal axis 6-6 and halfway along vertical axis 8-8.

Tube 230 has a length 230L. Tube 232 has a length 232L. Tube 234 has a length 234L. Tube 236 has a length 236L. The lengths 230L, 232L, 234L, 236L is between about 0.5-about 4 cm. In an example, length 230L is about 1 cm. In an example, length 232L is about 1.5 cm. In an exemplary embodiment, length 234L is about 1.5 cm. In an example, length 236L is about 1 cm.

In one example, the length 230L, 232L, 234L, and 236L of each of the tubes 230, 232, 234, and 236 are substantially similar or the same. In one example, the lengths 230L, 232L, 234L, and 236L of each of the tubes 230, 232, 234, and 236 may vary from one length to another. For example, when moving from the heel region 16 to mid-foot region 14, the lengths may decrease. In such an example, length 230L is less than 232L, length 232L is less than 234L, and length 234L is less than 236L.

As another example, when moving from the heel region 16 to mid-foot region 14, the lengths may increase. In this example, length 230L is greater than 232L, length 232L is greater than 234L, and length 234L is greater than 236L.

For example, length 230L is about 5% greater than length 232L, length 232L is about 5% greater than length 234L, and length 234L is about 5% greater than length 236L.

In one example, a first (inner) set of lengths have a first value while a second (outer) set of the lengths have a second value. For example, the first set of lengths comprises 232L and 234L and the second set of lengths comprises 236L and 230L. The first set of lengths can have a first value that is less than a second value of the second set of lengths. As another example, the first set of lengths can have a first value that is greater than a second value of the second set of lengths.

The first tube 230 is connected to second tube 232 via the web area 222*a*. The first tube 230 is spaced apart from the second tube 232 by a first distance D1 corresponding to the length 222*a*(L) of the web area 222*a*. First tube 230 is connected to the second tube 232 at a posterior facing side of first tube 230. Second tube 232 is connected to first tube 230 at an anterior facing side of second tube 232. The second tube 232 is connected to third tube 234 via the web area 222*b*. The second tube 232 is spaced apart from the third tube 234 by a second distance D2 corresponding to the length 222*b*(L) of the web area 222*b*. Second tube 232 is connected to third tube 234 at a posterior facing side of second tube 232. Third tube 234 is connected to second tube 232 at an anterior facing side of third tube 234. The third tube 234 is connected to the fourth tube 236 via the web area 222*c*. The third tube 234 is spaced apart from the fourth tube 236 by a third distance D3 corresponding to the length 222*c*(L) of the web area 222*c*. Fourth tube 236 is connected to third tube 234 at an anterior facing side of fourth 236. Third tube 234 is connected to fourth tube 236 at a posterior facing side of third tube 234. In other words, each of the web areas 222*a*, 222*b*, and 222*c* interconnect two of the tubes 230, 232, 234, and 236. In an example, each of the first distance D1, the second distance D2, and the third distance D3 are the same. In alternate examples, each of the first distance D1, the second distance D2, and the third distance D3 vary from one another. In an example, the first distance D1, the second distance D2, and the third distance D3 are about 9 mm. Alternatively, the first distance D1, the second distance D2, and the third distance D3 are about 12 mm. In a further alternative example, the first distance and the third distance is about 12 mm and the second distance is about 9 mm.

In one example, the distances D1, D2, and D3 are substantially similar or the same. In one example, the distances D1, D2, and D3 vary from one distance to another. For example, when moving from the heel region 16 to mid-foot region 14, the distances may decrease. In such an example, distance D3 is less than distance D2 and distance D2 is less than distance D1. As another example, when moving from the heel region 16 to mid-foot region 14, the distances may increase. In this example, distance D3 is greater than distance D2 and distance D2 is greater than distance D1.

In one example, distance D1, distance D2, and distance D3 are all the same. In another example, each of distance D1, distance D2, and distance D3 are different from one another.

In another example some of the distances are the same while others are different. For example, distance D1 and distance D2 are a first distance, and distance D3 is a second distance different than the first distance. Alternatively, distance D1 and distance D3 are a third distance, and distance D2 is a fourth distance different than the third distance. As another example, distance D2 and distance D3 are a fifth distance, and distance D1 is a sixth distance different than the fifth distance.

Figure 3B:
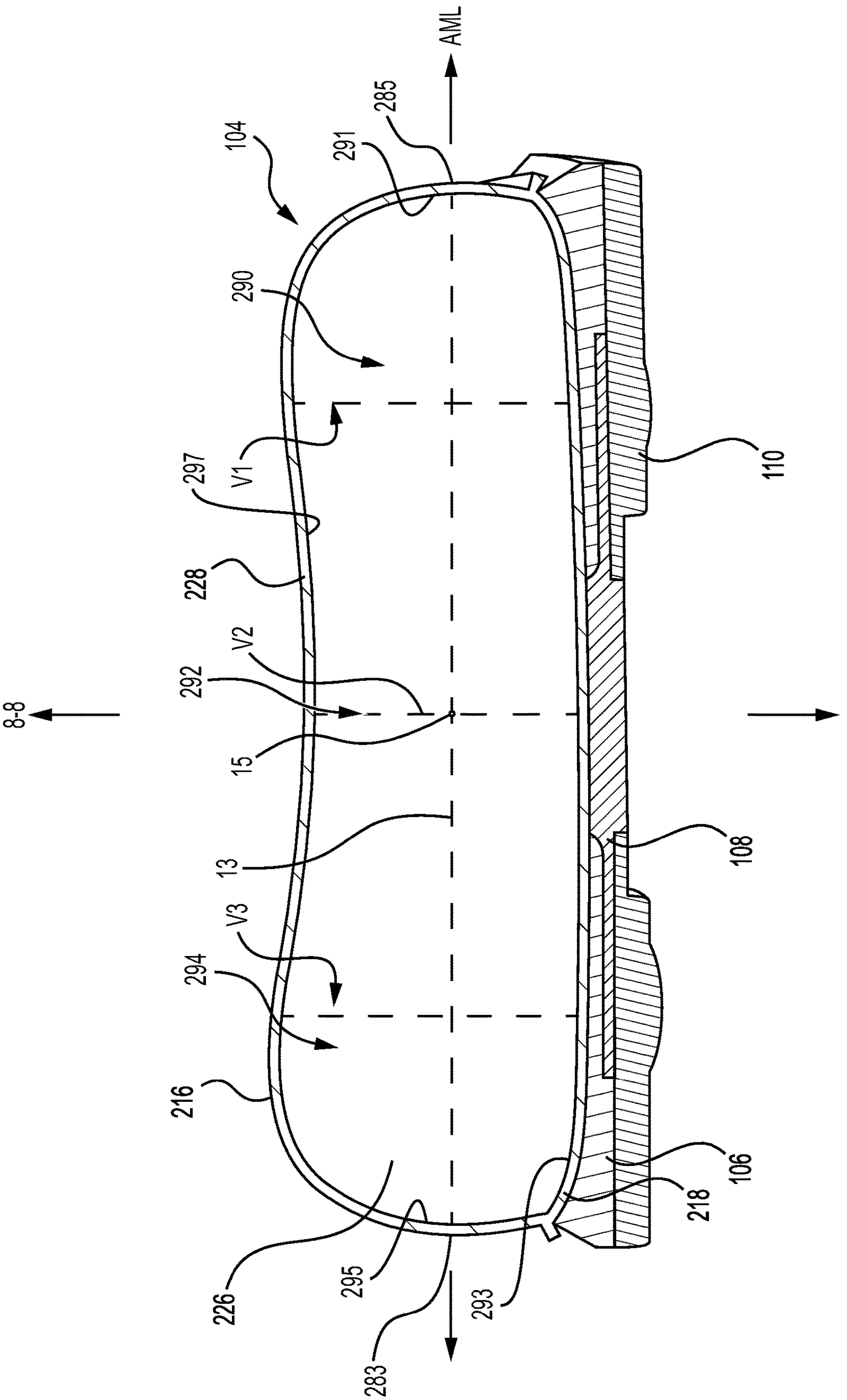
FIG. 3B is a cross-sectional view of the cushioning element of FIG. 3A.

With reference to FIG. 3B, a space formed between opposing interior surfaces of the upper and lower films 216, 218 define the interior void 226 of the tubes 230, 232, 234, and 236. The interior surfaces of the upper film 216 include medial (first) interior surface 291, lateral (second) interior surface 295, and upper (third) interior surface 297. The interior surface of the lower film 218 includes interior (fourth) surface 293. Similarly, exterior surfaces of the upper and lower films 216, 218 define an exterior profile of the tubes 230, 232, 234, and 236. Accordingly, the upper and lower films 216 and 218 define respective upper and lower surfaces of the cushioning element 104.

Tubes 230, 232, 234, and 236 of the cushioning element 104 include an average cross-sectional dimension (e.g., an average diameter). The average diameter can be the average of all diameters of a given longitudinal-vertical plane. The longitudinal-vertical plane is taken at a midpoint along the medial-lateral axis AML. The tubes 230, 232, 234, and 236 can be sliced and viewed along a line extending parallel to the vertical plane 8-8, the line representing a diameter. As an example, a vertical line V1 extends between upper interior surface 297 and interior surface 293 of the respective films 216, 218 and intersects the centerline 13. A vertical line V2 extends between upper interior surface 297 and interior surface 293 of the respective films 216, 218 and intersects the centerline 13. A vertical line V3 extends between upper interior surface 297 and interior surface 293 of the respective films 216, 218 and intersects the midpoint 15. When traveling along centerline 13, any given vertical line (e.g., vertical lines V1, V2, and V3) that extends from the interior surface upper film 216 to the lower film 218 and intersects the centerline 13, is considered a diameter. The collection of the vertical lines within a respective tube are averaged to give the average diameter (230D, 232D, 234D, and 236D).

Therefore, the term "average diameter" as used throughout this detailed description and in the claims should be understood to mean an average of the diameter of tubes 230, 232, 234, and 236 over different portions and does not necessarily refer to the diameter of tubes 230, 232, 234, and 236 at a particular portion.

The average diameter of each of tubes 230, 232, 234, and 236 extends parallel to a plane containing the vertical axis 8-8 and the longitudinal axis 6-6. Tube 230 has an average diameter 230D. Tube 232 has an average diameter 232D. Tube 234 has an average diameter 234D. Tube 236 has an average diameter 236D. The average diameters 230D, 232D, 234D, and 236D are between about 0.5-about 25 mm. In an example, average diameter 230D is about 7 mm. In an example, average diameter 232D is about 9 mm. In an example, average diameter 234D is about 9 mm. In an example, average diameter 236L is about 7 mm. The average diameter of each of tubes 230, 232, 234, and 236 may also be expressed as a ratio of one another. In an embodiment, average diameter 230D is ½ the average diameter of average diameter 232D, and average diameter 236D is ½ the diameter of average diameter 234D.

Each of the tubes 230, 232, 234, and 236 include a centerline 13 and a midpoint 15. Centerline 13 is centered along the medial-lateral axis AML. Centerline 13 extends from medial interior surface 291 to lateral interior surface 295 for a given tube. Midpoint 15 is a longitudinal center of centerline 13.

In one example, the average diameter of each of the tubes 230, 232, 234, and 236 is the same when viewed in the plane extending parallel to the longitudinal axis 6-6 and/or the vertical axis 8-8. The average diameter is 5 cm in this embodiment. In one example, the average diameter varies when viewed in the plane extending parallel to the longitudinal axis 6-6 and/or the vertical axis 8-8. For example, when moving from the medial side 22 to the lateral side 24, the average diameter may decrease. As another example, when moving from the medial side 22 to the lateral side 24, the average diameter may increase. As another example when moving from the medial side 22 to the lateral side 24, the average diameter is wider at outer areas 290 and 294 and narrower at an inner area 292. The outer areas 290 and 294 are located at the respective ends of each of tubes 230, 232, 234, and 236. The respective ends are the medial face 221 and the lateral face 223. Outer area 290 disposed at the lateral face 223. Outer area 294 disposed at the medial face 221. The inner area 292 is located nearest a respective web area 222 at a depression 228 (described in greater detail below in FIG. 3B).

In one example, the diameters 230D, 232D, 234D, and 236D of each of the tubes 230, 232, 234, and 236 are substantially similar or the same. In one example, the diameters 230D, 232D, 234D, and 236D of each of the tubes 230, 232, 234, and 236 vary from one another. For example, when moving from the heel region 16 to mid-foot region 14, the diameters decrease. In such an example, diameter 230D is less than diameter 232D, diameter 232D is less than diameter 234D, and diameter 234D is less than diameter 236D.

As another example, when moving from the heel region 16 to mid-foot region 14, the diameters may increase. In this example, diameter 230D is greater than diameter 232D, diameter 232D is greater than diameter 234D, and diameter 234D is greater than diameter 236D.

In one example, the diameters 230D, 232D, 234D, and 236D are substantially similar or the same. In one example, the diameters 230D, 232D, 234D, and 236D vary from one diameter to another. For example, when moving from the heel region 16 to mid-foot region 14, the diameters may decrease. For example, diameter 230D and diameter 236D have a first diameter, and diameter 232D and diameter 234D have a second diameter greater than the first diameter.

In one other example, diameter 232D and diameter 234D have a first diameter, and diameter 230D and diameter 236D have a second diameter greater than the first diameter.

The tubes 230, 232, 234, and 236 each includes a depression 228 on its top surface between its lateral and medial ends to provide, for example, a desired form of cushioning to the cushioning element 104. Depression 228 is formed on the barrier film 216. Additionally, depression 228 reduces the overall height of the article of footwear 10. Each of the one or more tubes 230, 232, 234, and 236 includes a depression 228. Depression 228 is concave when viewed from the anterior or posterior of the respective tube while outsole 112 is in direct contact with the ground. In other examples, only one, only some, or none of tubes 230, 232, 234, and 236 includes depression 228. It is contemplated that any number of tubes 230, 232, 234, and 236 may include depression 228.

In an example, each of tubes 230, 232, 234, and 236 are fluidly isolated from one another. For example, some or all of tubes 230, 232, 234, and 236 may be pressurized to different values. One or more of the tubes 230, 232, 234, and 236 may have a first pressure. One or more of the tubes 230, 232, 234, and 236 may have a second pressure different from the first pressure. One or more of tubes 230, 232, 234, and 236 may have a third pressure different from the first pressure and the second pressure. One or more of the tubes 230, 232, 234, and 236 may have a fourth pressure different from the first pressure, the second pressure, and the third pressure.

In one example, one or more groups of the one or more tubes 230, 232, 234, and 236 may have the same first pressure. Other groups of the one or more tubes 230, 232, 234, and 236 may have the same second pressure. For example, the tubes 230 and 232 may have the same first pressure. The first pressure may be 15 PSI (103 kPA). The tubes 234 and 236 may have the same second pressure. The second pressure may be 5 PSI (34 kPA). In another example, the first pressure may be 5 PSI (34 kPA) and the second pressure may be 15 PSI (103 kPA).

In one example, the pressure values of each of the tubes 230, 232, 234, and 236 are substantially similar or the same. In one example, the pressure values of each of the tubes 230, 232, 234, and 236 vary from one tube to another. For example, when moving from the heel region 16 to mid-foot region 14, the pressure values decrease. In such an example, the pressure value of tube 230 is less than the pressure value of tube 232, the pressure value of tube 232 is less than the pressure value of tube 234, and pressure value of tube 234 is less than the pressure value of tube 236.

As another example, when moving from the heel region 16 to mid-foot region 14, the pressure values may increase. In this example, the pressure value of tube 230 is less than the pressure value of tube 232, the pressure value of tube 232 is less than the pressure value of tube 234, and pressure value of tube 234 is less than the pressure value of tube 236.

In one example, a first (inner) set of tubes has a first pressure value while a second (outer) set of tubes have a second pressure value. For example, the first set of tubes comprises tubes 232 and 234 and the second set of tubes comprises tubes 230 and 236. The first set of tubes 232 and 234 have a first pressure value that is less than a second pressure value of the second set of tubes 230 and 236. As another example, the first set of tubes can have a first pressure value that is greater than a second pressure value of the second set of tubes.

For example, the pressure value ranges from about atmospheric pressure to about 40 PSI (276 kPA). In an example, the first pressure of the first tube 230 and the fourth pressure of the fourth tube 236 are about 15 PSI (103 kPA) and the second pressure of tube 232 and the third pressure of the third tube 234 are about 5 PSI (34 kPA). In other examples, tube 230 has a pressure value of about 15 PSI (103 kPA), tube 232 has a pressure value of about 12 PSI (83 kPA), tube 234 has a pressure value of about 8 PSI (55 kPA), and tube 236 has a pressure value of about 5 PSI (34 kPA). Alternatively, each of tubes 230, 232, 234, and 236 could have the same pressure value. In an example, each of tubes 230, 232, 234, and 236 has a pressure value of about 15 PSI (103 kPA). It is contemplated that in alternate examples, web areas 222*a*, 222*b*, and 222*c* may be configured so as to allow fluid communication between each of tubes 230, 232, 234, and 236. For example, web areas 222*a*, 222*b*, and 222*c*, may include a fluid channel (not shown) connecting each of the tubes 232, 232, 234, and 236 to allow fluid flow.

Referring back to FIG. 2, the outsole 112 includes the coupling portion 108 and the outsole layer 110. The coupling portion 108 extends from the heel region 16 to the mid-foot region 14. The outsole layer 110 extends from the heel region 16 to the forefoot region 12.

Outsole layer 110 includes a medial segment 262 and a lateral segment 264 extending from the mid-foot region 14 through the heel region 16. Outsole layer 110 also includes a cavity 260 extending from the mid-foot region 14 through the heel region 16. Cavity 260 is bound on its medial side by medial segment 262. Cavity 260 is bound on its lateral side by lateral segment 264. Cavity 260 has an irregular shape. It is contemplated that cavity 260 could have the shape of a rectangle, square, oval, circle, or the like. Cavity 260 has a shape that is suitable for receiving coupling portion 108 therein. The cavity 260 is open at its posterior such that a gap is disposed between posterior ends of the medial segment 262 and the lateral segment 264 of the outsole layer 110. The medial segment 262 and the lateral segment 264 are unconnected at their respective posterior ends. In other words, cavity 260 is bound on its medial side, lateral side, and anterior most end, but is not enclosed at its posterior most end where it is open and disconnected. Therefore, cavity 260 is considered an open cavity.

The posterior most end of the outsole layer 110 curves upward toward the upper 100. The medial segment 262 and the lateral segment 264 of the outsole layer 110 includes one or more pairs of recesses 266 on its top surface. The one or more pairs of recesses 266 include one, two, three, four, or more pairs of recesses 266. In an example, recesses 266 may include four pairs of recesses. Recesses 266 have a substantially curved shape. Each of the one or more pairs of recesses 266 are configured to receive recesses 246 of the second support element 106 (described in greater detail below). It is contemplated that recesses 266 may be any shape suitable for receiving the second support element 106. When viewing the outsole layer 110 from the exterior, the portion of the outsole layer 110 extending from the heel region 16 toward the portion of the mid-foot region 14 may undulate between valleys corresponding to the recesses 266 and peaks corresponding to a portion between adjacent pairs of recesses 266.

Figure 4:
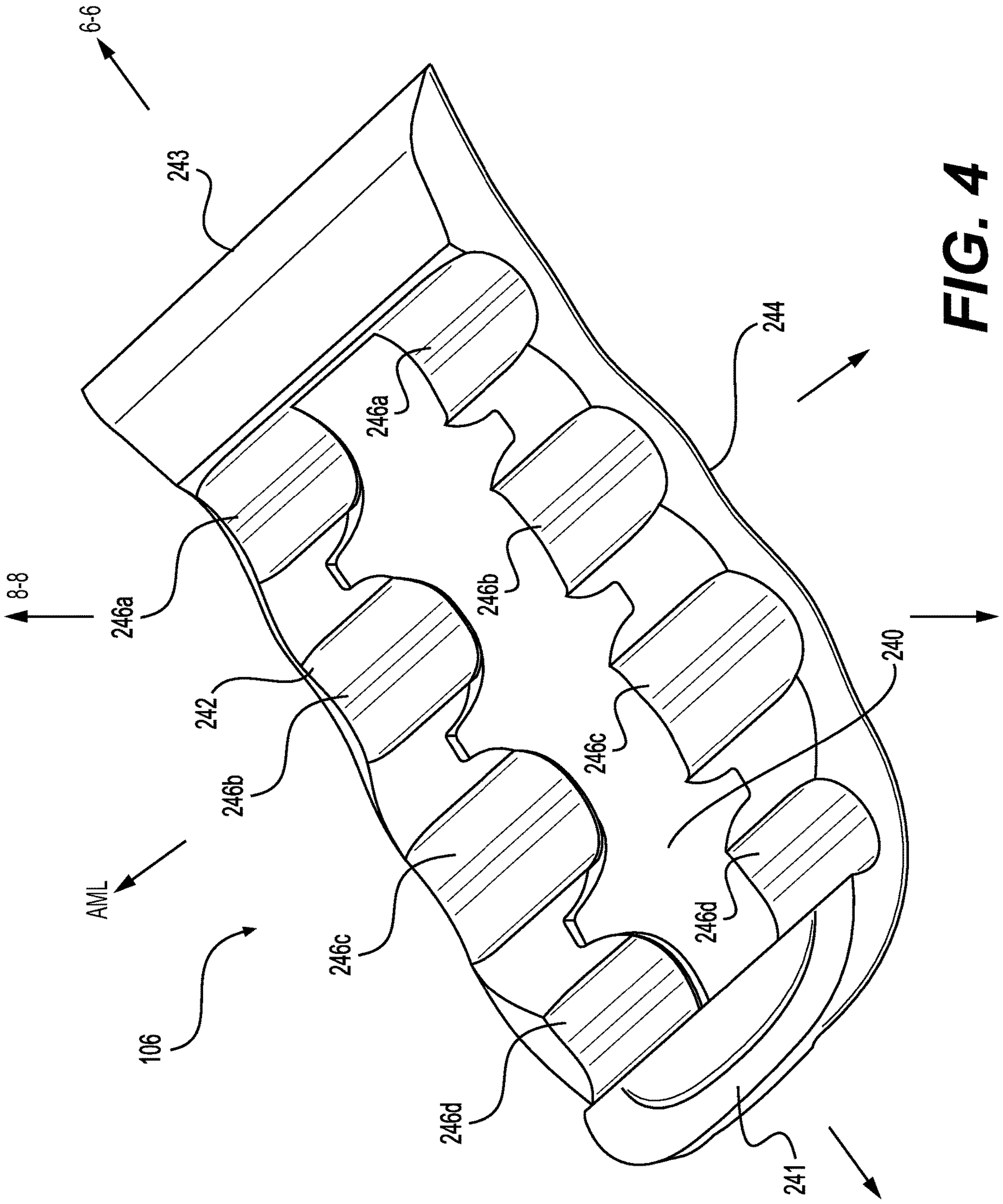
FIG. 4 is a perspective view of a foam element of the article of footwear of FIG. 1.

Referring to FIG. 4, second support element 106 includes a medial segment 242 and a lateral segment 244. Segment 242 is disposed on the medial side 22 and segment 244 is disposed on the lateral side 24. Second support element 106 includes a heel portion 241 and a mid-foot portion 243. Second support element 106 extends from the heel region 16 to the mid-foot region 14. In other examples, the second support element 106 may extend from the heel region to the forefoot region. In other examples, the support element 106 may only extend in the heel region.

The second support element 106 further includes a cavity or opening 240 bounded by segment 242, segment 244, heel portion 241, and mid-foot portion 243. In other words, cavity 240 extends through and is enclosed by the second support element 106. Cavity 240 may have an irregular shape. Cavity 240 extends linearly between the heel portion 241 and the mid-foot portion 243. It is contemplated that cavity 240 can be shaped as a diamond, square, oval, circle, or the like. In other words, cavity 240 separates the second support element 106 in its center thereby dividing the second support element 106 into the heel portion 241, the medial segment 242, the mid-foot portion 243, and the lateral segment 244. In one embodiment, the cavity 240 is fully enclosed by the heel portion 241, the medial segment 242, the mid-foot portion 243, and the lateral segment 244 forming a closed cavity.

The medial segment 242 and the lateral segment 244 of second support element 106 includes one or more pairs of recesses 246. The one or more pairs of recesses 246 are formed on a top surface of medial segment 242 and lateral segment 244. The one or more pairs of recesses 246 may include one, two, three, four, or more pairs of recesses 246. In an example, recesses 246 include four pairs of recesses 246*a*, 246*b*, 246*c*, 246*d*. Recesses 246 have a substantially curved shape. Each individual recess of the one or more pairs of recesses 246*a*, 246*b*, 246*c*, and 246*d* are configured to receive a portion of the tubes 230, 232, 234, and 236. It is contemplated that recesses 246 include any shape suitable for receiving the tubes 230, 232, 234, and 236 of the cushioning element 104. When viewing the second support element 106 from the exterior, the second support element 106 undulates between peaks and valleys or has an otherwise serpentine curve. The valleys corresponding with the recesses 246. The peaks corresponding with the portions of the respective medial segment 242 and lateral segment 244 separating adjacent recesses 246.

Figure 5:
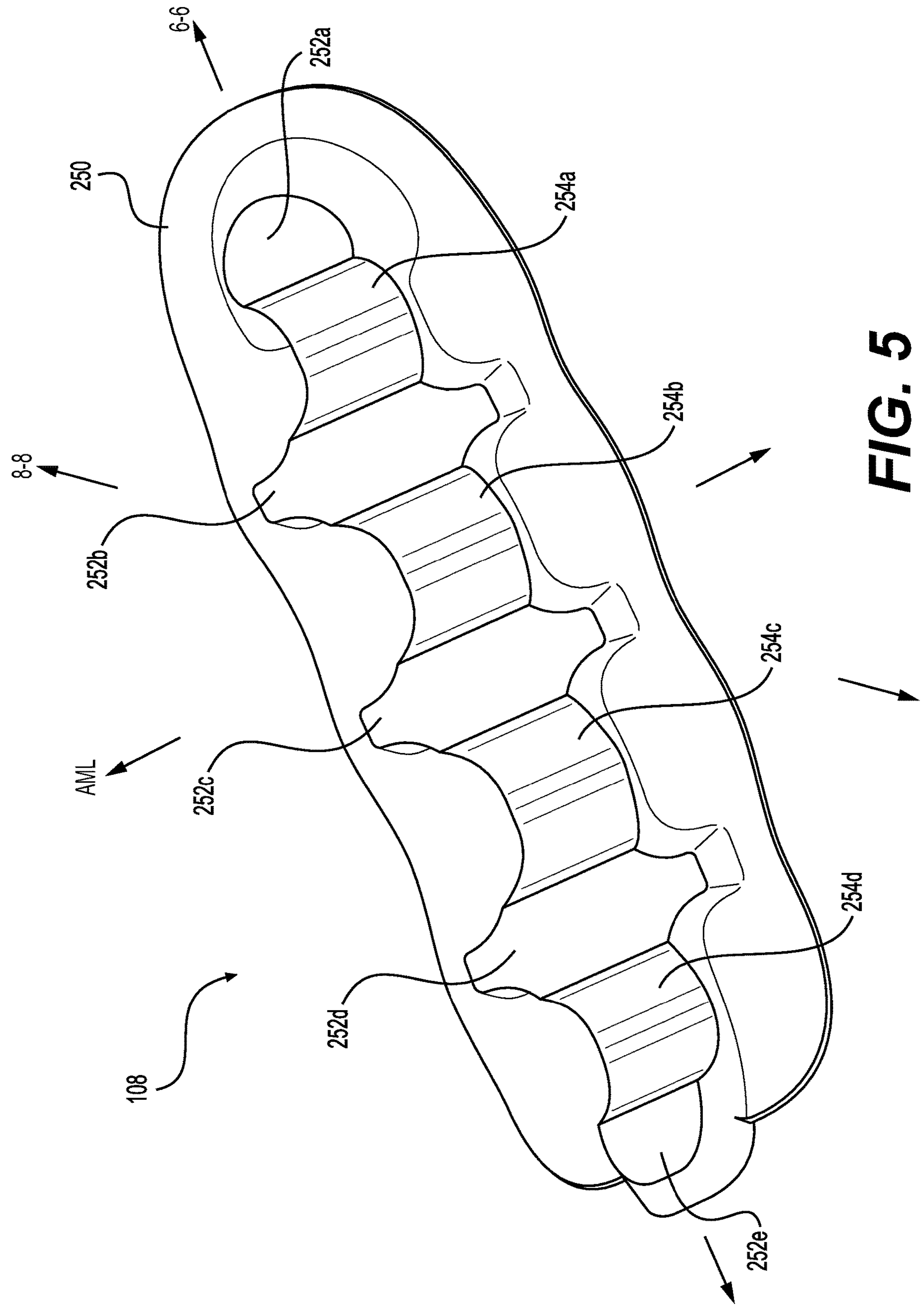
FIG. 5 is a perspective view of a coupling portion of the article of footwear of FIG. 1.

Referring to FIG. 5, coupling portion 108 has a top surface 250. The top surface 250 has disposed thereon one or more protrusions 252. In an example, there are five protrusions 252*a*, 252*b*, 252*c*, 252*d*, and 252*e*. It is contemplated that there may be one, two, three, four, five, or more protrusions as necessary for securing tubes 230, 232, 234, and 236. The one or more protrusions 252 include one or more recesses 254 disposed between adjacent protrusions 252. In an example, there are four recesses 254*a*, 254*b*, 254*c*, and 254*d*. It is contemplated that there may be one, two, three, four, or more recesses as necessary for receiving tubes 230, 232, 234, and 236. Coupling portion 108 may include a clear rubber, polymer, or other material to allow visualization of the cushioning element 104 when looking at the outsole layer 110.

Figure 6:
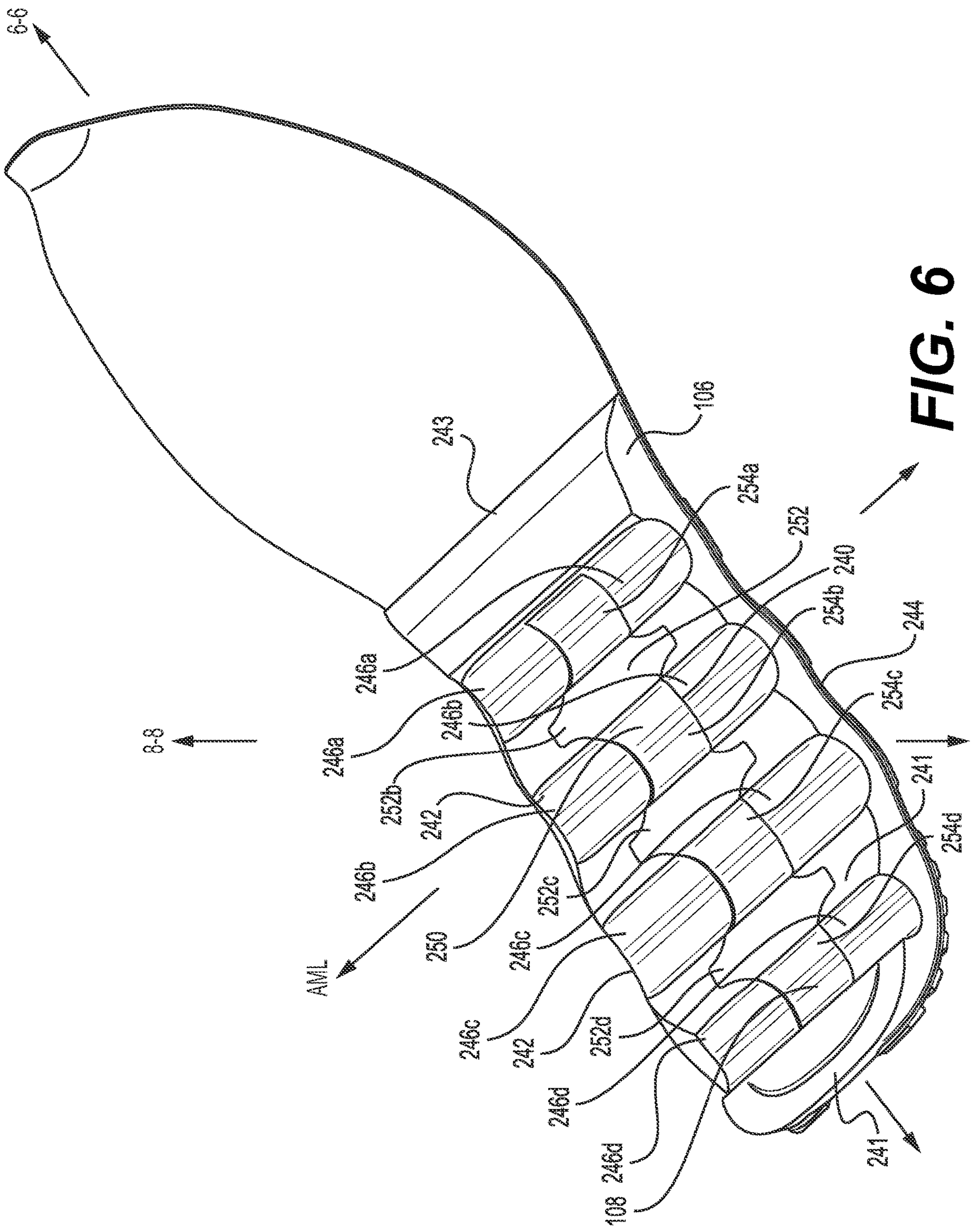
FIG. 6 is a top perspective view of an outsole of the sole structure of FIG. 2.

With reference to FIG. 6, the one or more recesses 254 have a lowest point that sits level with the lowest point of the recesses 246. In other words, the recesses 254 and the recesses 246 are flush with one another and thereby form a flush receiving surface. The protrusions 252 extend through the cavity 240 and are aligned with the portions of the respective medial segment 242 and lateral segment 244 separating adjacent recesses 246 forming a smooth and flush surface. Thus, the second support element 106 receives the coupling portion 108.

In one embodiment, the lowest point of the recesses 246 are disposed on a plane that is different than recesses 254. In one embodiment, the protrusions 252 are disposed on a plane that is different from the portions of the respective medial segment 242 and lateral segment 244 separating adjacent recesses 246.

Figure 7A:
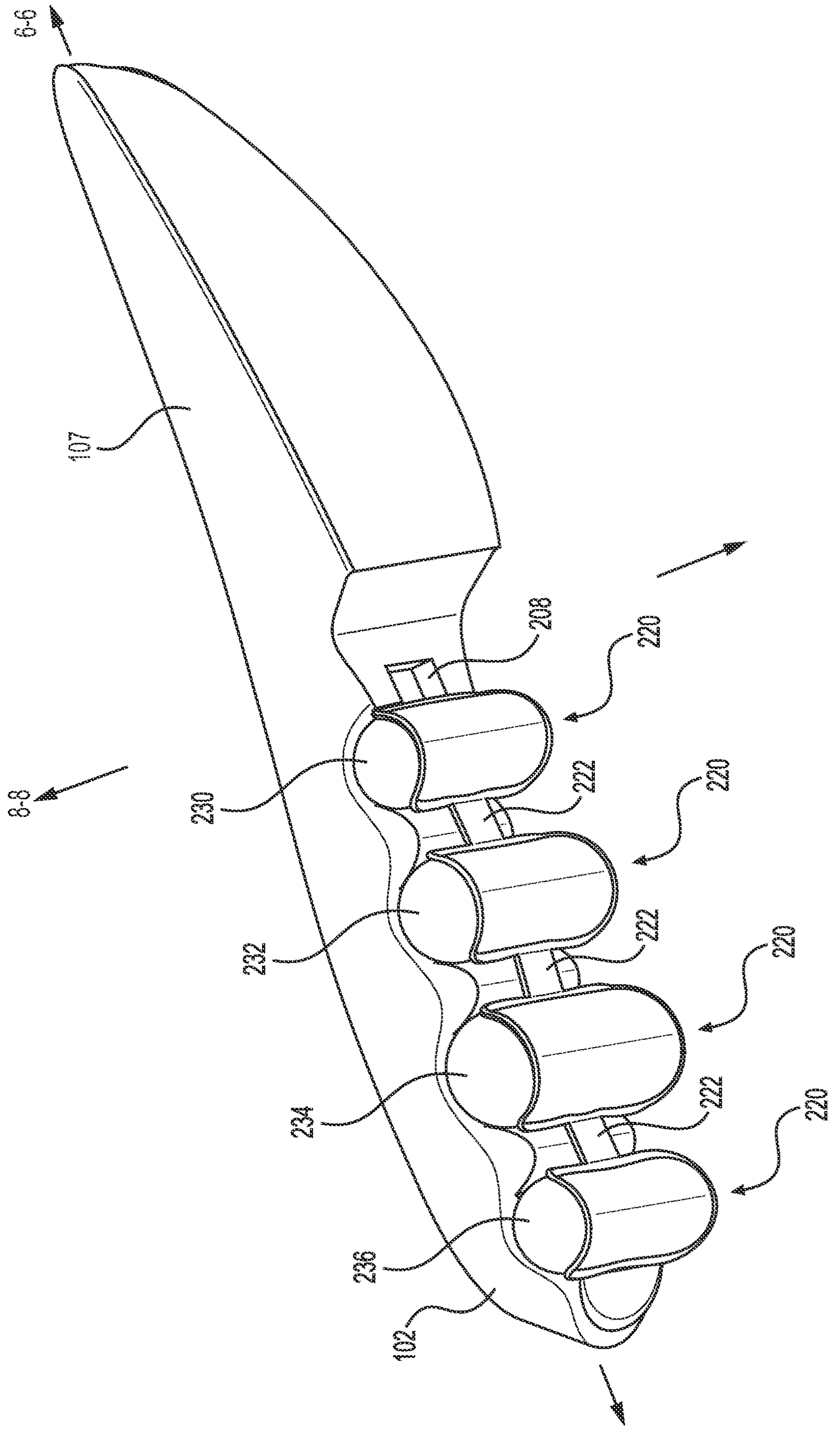
FIG. 7A is a bottom perspective view of a midsole and a cushioning element of the sole structure of FIG. 2.
Figure 7B:
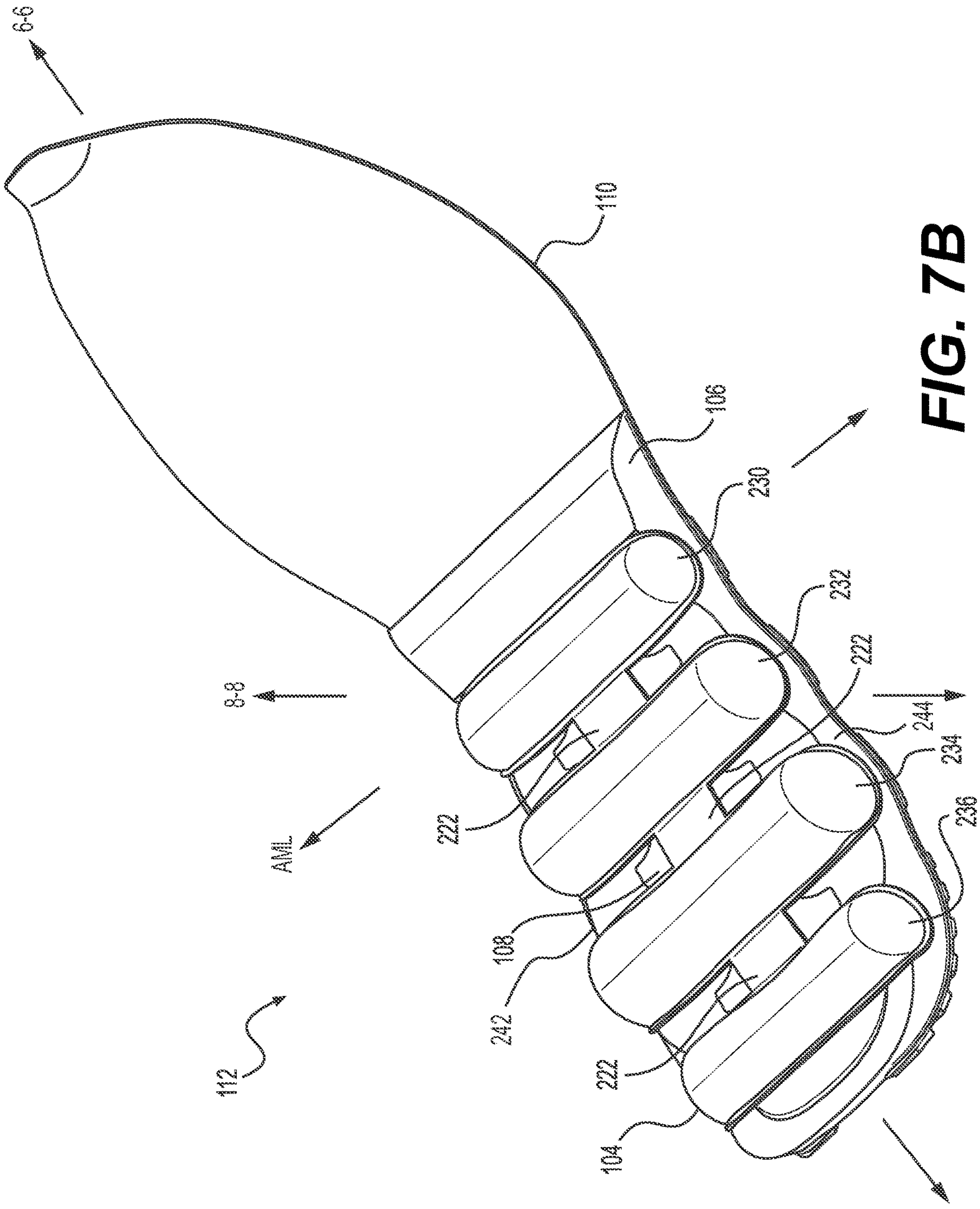
FIG. 7B is a top perspective view of an outsole and a cushioning element of the sole structure of FIG. 2.

Referring to FIGS. 7A and 7B, the cushioning element 104 is coupled to the first support element 107 and the second support element 106. The one or more tubes 230, 232, 234, and 236 of the cushioning element 104 fit within the confines of recesses 204 of first support element 107 (shown in FIG. 2) and recesses 246 and 254 of second support element 106 (shown in FIG. 6). When assembled, the recesses 246 and 254 form a continuous receiving area for the one or more tubes 230, 232, 234, and 236. In an example, the recesses 204 of the first support element 107 rest on a top surface of the tubes 230, 232, 234, and 236 and the mounds 206 extend down toward the web areas 222*a*, 222*b*, and 222*c*, but do not contact any of the web areas 222*a*, 222*b*, or 222*c* while the shoe is at rest without a foot of a user inserted therein. It is contemplated that in alternative examples, the recesses 204 of first support element 107 do not contact the top surface of the tubes 230, 232, 234, and 236. In further alternative examples, the recesses 204 contact outer peripheries of the tubes 230, 232, 234, and 236, but do not contact a central portion of the tubes 230, 232, 234, and 236.

The gaps 270 allow a fluid (e.g. air) to flow through from the medial side 22 to the lateral side 24 through the article of footwear 10. The gaps 270 leave exposed the web areas 222 of the cushioning element 104. In other words, the assembled sole structure forms gaps 270 in the heel region 16 and the mid-foot region 14 between the first support element 107 and the second support element 106 such that a viewer would see through this portion of the sole structure with an unobstructed view. In other words, when viewed from a vantage point that is exterior of the sole structure, the web areas 222 are open to the environment. The one or more gaps 270*a* and 270*b*, the mounds 206, the peaks corresponding with the portions of the respective medial segment 242 and lateral segment 244 separating adjacent recesses 246, and the web areas 222 are exposed to or otherwise in fluid communication with the external environment/atmosphere exterior of the article of footwear 10. Alternatively, it is contemplated that the mounds 206 may be in contact with web areas 222 such that there is no gap and the sole structure 101 is sealed from fluid flow between the first support element 107 and the cushioning element 104.

The second support element 106 receives a bottom surface of the tubes 230, 232, 234, and 236 and the web areas 222, as shown in FIG. 7B. In alternative examples, the second support element 106 may not be in contact with the web area 222 such that a gap remains between the web area 222 and the second support element 106.

A bottom surface of the medial segment 242 and the lateral segment 244 of the second support element 106 rest within the recesses 266 (shown in FIG. 2) of the medial segment 262 and the lateral segment 264 of the outsole layer 110. In other words, the second support element 106 is in direct physical contact with the outsole layer 110. With reference to FIG. 7B, the coupling portion 108 are disposed within the cavity 240 of the second support element 106. The coupling portion 108 and the cavity 240 have corresponding geometries.

Figure 8:
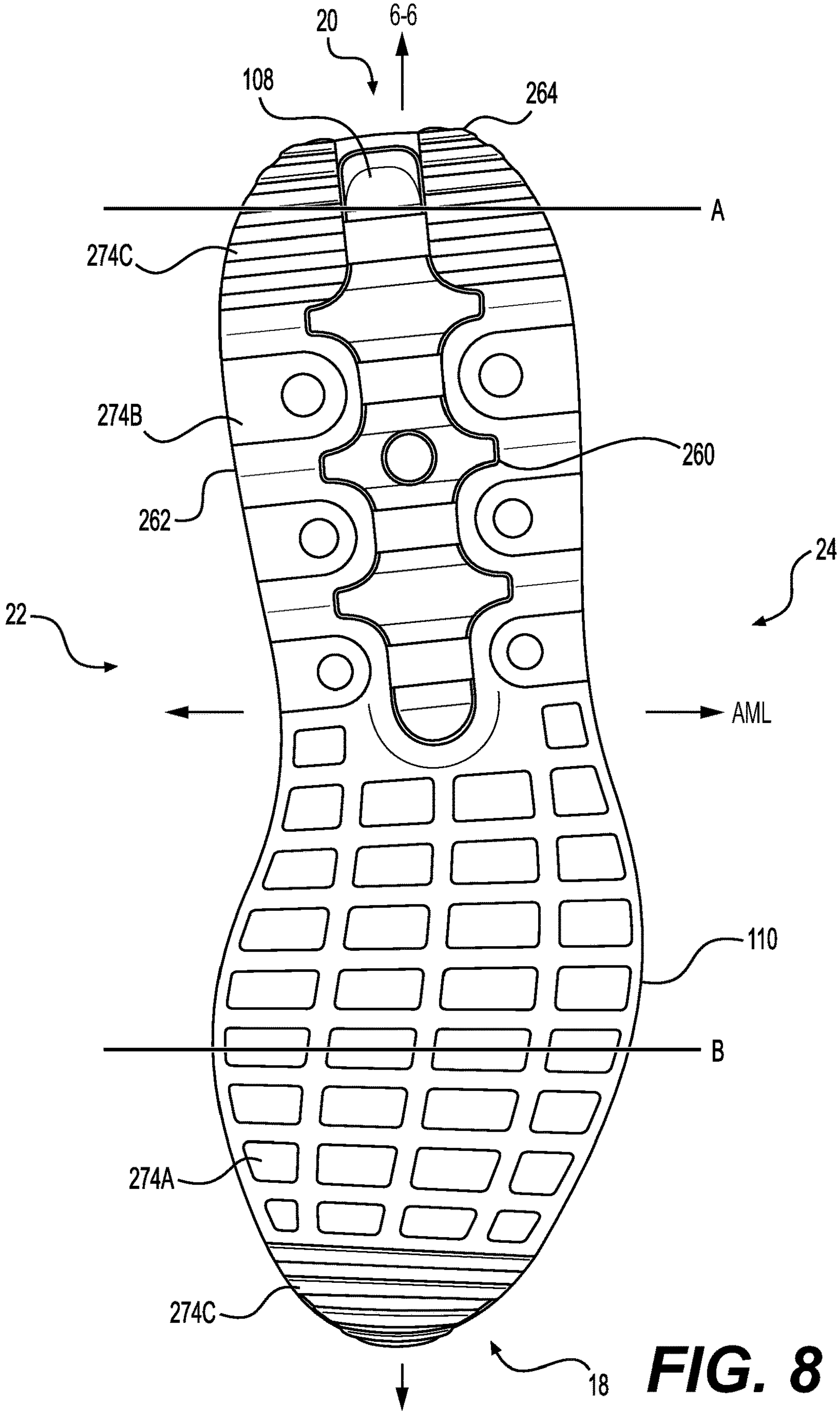
FIG. 8 is a bottom view of the article of footwear of FIG. 1.

Referring to FIG. 8, outsole layer 110 includes a plurality of traction elements 274 disposed on a bottom surface thereof. In an example, the plurality of traction elements 274 include one of traction element shapes 274*a*, 274*b*, and 274*c*. The plurality of traction elements 274 having traction element shape 274*a* extend from a mid-foot region 14 to the forefoot region 12. Traction elements 274*a* does not extend all the way through forefoot region 12 to the anterior end 18. The plurality of traction elements 274 having traction element shape 274*b* extends between a portion of the heel region 16 through the mid-foot region 14. Traction elements 274*b* are adjacent to the traction elements 274*a* and the traction elements 274*c*. The plurality of traction elements 274 having traction element shape 274*c* are present in the heel region 16 and the forefoot region 12. Traction elements 274*c* are adjacent to the traction elements 274*a* and 274*b*. Traction elements 274*a* and 274*b* are disposed between the traction elements 274*c*, thereby dividing the traction elements 274*c* into separate groupings of traction elements 274*c*. The plurality of traction elements 274*a*-274*c* have a substantially square shape. It is contemplated that the plurality of traction elements 274 may be rectangular, ovular, triangular, irregular, linear, or any shape that provides a desired form of grip to the article of footwear 10.

With reference to FIG. 8, when viewing the bottom of the sole structure along the exterior path of line A, the bottom of the sole structure may include the medial segment 242 and the lateral segment 244, and cavity 260 of the outsole layer 110. Still viewing along the exterior path of line A, coupling portion 108 may be disposed between the medial segment 242 and the lateral segment 244, with coupling portion 108 resting within cavity 260. When viewing the bottom of the sole structure along the exterior path of line B, the stacked sole structure may include solely the outsole layer 110. When viewed from a bottom of the article of footwear 10, the coupling portion 108 is visible through the cavity 260 of the outsole layer 110.

Figure 9A:
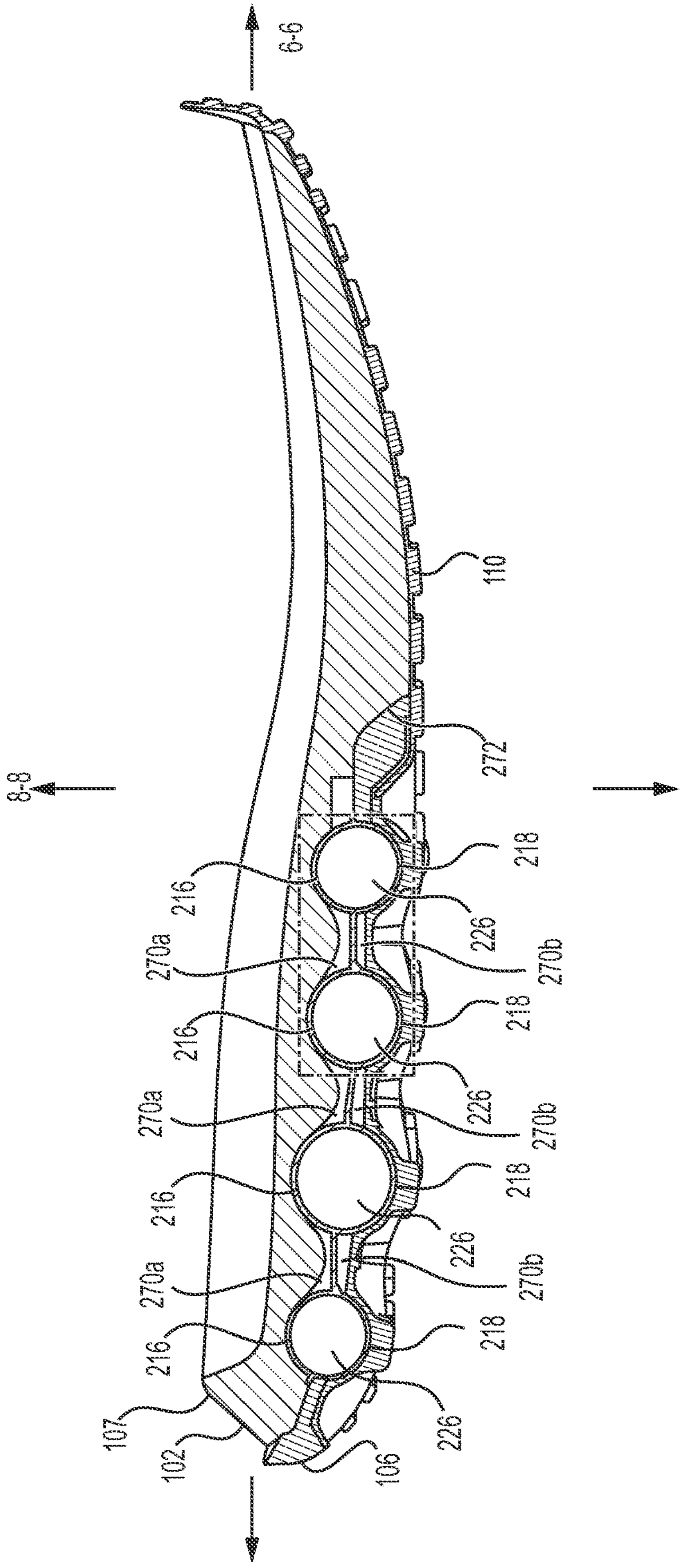
FIG. 9A is a cross-sectional view of the sole structure of article of footwear of FIG. 1A.

Referring to FIG. 9A, the outer surfaces of the cushioning element 104 are enclosed (i.e. not exposed or open) at regions anterior to front most tube 230 and at regions posterior to rear most tube 236. The anterior facing sides and the posterior facing sides of the central tubes 232, 234 of the cushioning element 104 are exposed. In other words, the first tube 230 is surrounded at its forefoot facing side by the first support element 107 and the second support element 106, and the fourth tube 236 is surrounded at its heel facing side by the first support element 107 and the second support element 106. The central tubes 232, 234 have their respective forefoot facing sides and heel facing sides free of the first support element 107 and the second support element 106.

The first support element 107 and the outsole layer 110 directly contact one another at contact area 272 and may continue to do so as the contact area 272 extends along the mid-foot region 14. Contact area 272 is located in a central portion of the mid-foot region 14 corresponding to a center of the article of footwear 10 when viewed from the exterior. Contact area 272 extends along a downward curved path from the forefoot facing face of the first tube 230 until contact is made with the outsole layer 110. In other words, contact area 272 follows a curved path present in the mid-foot region 14 extending from a forefoot most tube of the cushioning element 104 to the outsole layer 110.

The space between the web area 222 and the mounds 206 form one or more exposed gaps 270, including a first gap 270*a* and a second gap 270*b* (shown in FIG. 1A). In other words, the first support element 107 covers a top surface of the tubes 230, 232, 234, and 236 such that the one or more exposed gaps 270*a* and 270*b* remain between the mounds 206 and the web area 222.

Gaps 270 extend from the medial side 22 to the lateral side 24 corresponding to a width of the article of footwear. Gap 270*a* extends from the first support element 107 to web area 222. Gap 270*b* extends from the second support element 106 to web area 222. The gaps 270*a* and 270*b* are a respective distance between the web areas 222*a*, 222*b*, and 222*c*, first support element 107, and second support element 106. The width of the gaps 270 extends parallel to the medial-lateral axis AML. The height of the gaps 270 extends parallel to the vertical axis 8-8.

Figure 9B:
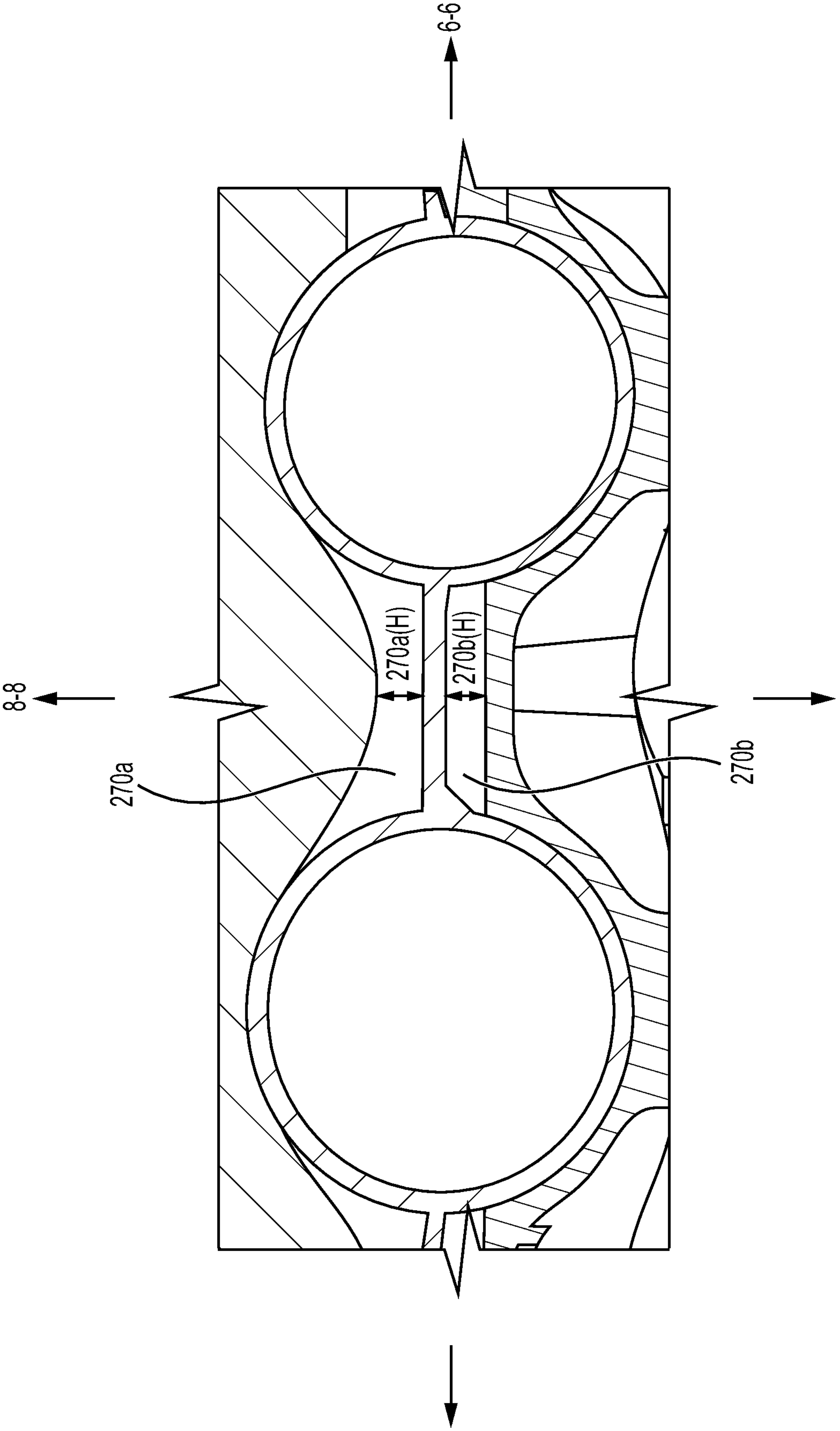
FIG. 9B is a zoomed-in view of the sole structure of FIG. 9A.

With reference to FIG. 9B, the height of gap 270*a* between first support element 107 and web area 222 is a first distance 270*a*(H). The height of gap 270*b* between second support element 106 and web areas 222*a*, 222*b*, and 222*c* is a second distance 270*b*(H) different than the first distance 270*a*(H). The distances 270*a*(H) and 270*b*(H) are between about 0.5 cm-about 10 cm. In an example, distance 270*a*(H) is about 1 cm. In an example, distance 270*b*(H) is about 0.7 cm.

In one example, the distances 270*a*(H) and 270*b*(H) are substantially similar. In another example, the distances 270*a* (H) and 270*b*(H) are different from another. For example, when moving from the heel region 16 to mid-foot region 14, the distances 270*a*(H) between each of the first support element 107 and the web areas 222*a*, 222*b*, and 222*c* decreases. In such an example, the distance 270*a*(H) between the web area 222*a* and the first support element 107 is less than the distance 270*a*(H) between the web area 222*b* and the first support element 107, distance 270*a*(H) between the web area 222*b* and the first support element 107 is less than the distance 270*a*(H) between the web area 222*c* and the first support element 107. Similarly, for example, the distances 270*b*(H) between each of the first support element 107 and the web areas 222*a*, 222*b*, and 222*c* decreases. In such an example, the distance 270*b*(H) between the web area 222*a* and the second support element 106 is less than the distance 270*b*(H) between the web area 222*b* and the second support element 106, distance 270*b*(H) between the web area 222*b* and the second support element 106 is less than the distance 270*b*(H) between the web area 222*c* and the second support element 106.

As another example, when moving from the heel region 16 to mid-foot region 14, the pressure values may increase. In such an example, the distance 270*a*(H) between the web area 222*a* and the first support element 107 is greater than the distance 270*a*(H) between the web area 222*b* and the first support element 107, distance 270*a*(H) between the web area 222*b* and the first support element 107 is greater than the distance 270*a*(H) between the web area 222*c* and the first support element 107. Similarly, for example, the distances 270*b*(H) between each of the first support element 107 and the web areas 222*a*, 222*b*, and 222*c* increases. In such an example, the distance 270*b*(H) between the web area 222*a* and the second support element 106 is greater than the distance 270*b*(H) between the web area 222*b* and the second support element 106, distance 270*b*(H) between the web area 222*b* and the second support element 106 is greater than the distance 270*b*(H) between the web area 222*c* and the second support element 106.

In one example, the gaps 270*a* on the medial side 22 are larger than the gaps 270*a* on the lateral side 24. In one example, the gaps 270*b* on the medial side 22 are larger than the gaps 270*b* on the lateral side 24.

In one example, the gaps 270*a* on the medial side 22 are smaller than the gaps 270*a* on the lateral side 24. In one example, the gaps 270*b* on the medial side 22 are smaller than the gaps 270*b* on the lateral side 24.

Figure 10:
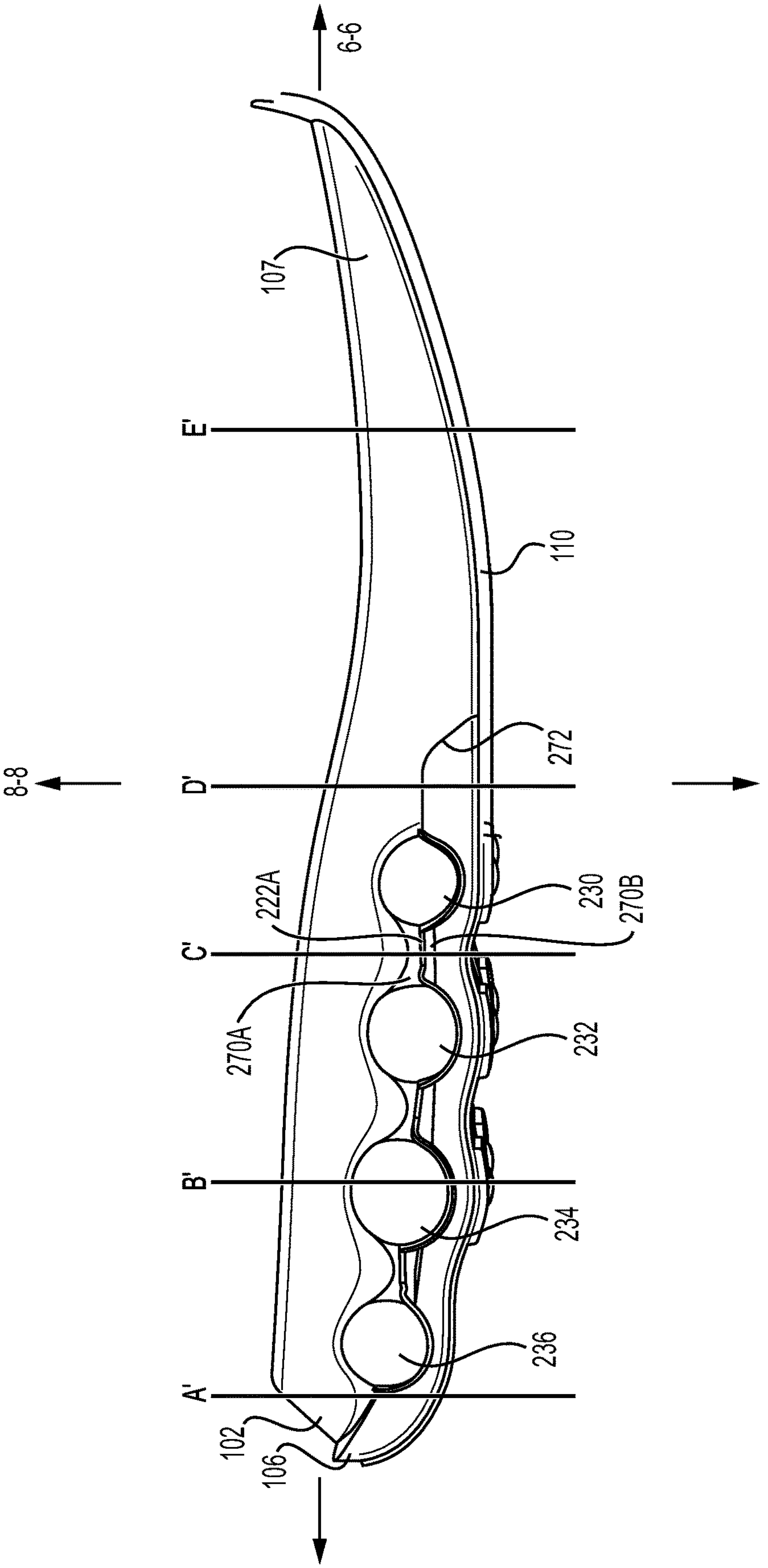
FIG. 10 is a side view of the sole structure of the article of footwear of FIG. 1.

Referring to FIG. 10, when viewing the exterior of the footwear 10 from the ground up, the sole structure includes the outsole layer 110, the coupling portion 108, the second support element 106, the cushioning element 104, and the first support element 107.

When viewing the stacked sole structure from the ground up along the exterior path of line A', the stacked sole structure may include the outsole layer 110 and the first support element 107. When viewed along the exterior path of line B', the stacked sole structure may include the outsole layer 110, the second support element 106, one of tubes 230, 232, 234, and 236 of the cushioning element 104, and the first support element 107. When viewed along the exterior path of line C', the stacked sole structure may include the outsole layer 110, the exposed gap 270B, the web area 222, the exposed gap 270A, and the first support element 107. When viewed along the exterior path of line D', the stacked sole structure may include the outsole layer 110, the second support element 106, and the first support element 107. When viewed along the exterior path of line E', the stacked sole structure may include the outsole layer 110 and the first support element 107.

The combination of the first support element 107, the second support element 106, and the cushioning element 104 disposed between the first support element 107 and the second support element 106 provides improved sensation and performance during use of the article of footwear 10. In an exemplary embodiment, when the cushioning element 104 is the fluid-filled bladder, the first support element 107 is an elastomeric material, and the second support element 106 is an elastomeric material, the sole structure 101 provides a uniquely durable and comfortable sensation to the article of footwear 10. Additionally, when the article of footwear 10 is configured with the gaps 270, the cushioning element 104 is given room to move around within the article of footwear 10. In other words, the cushioning element 104 is allowed to flex, expand, contract, and/or slide within the article of footwear 10. In this example, the responsiveness of the cushioning element 104 is improved. Additionally, peripheral seam 224 is disposed such that when the article of footwear 10 is assembled, the peripheral seam 224 is hidden by the second support element 106.

Figure 11A:
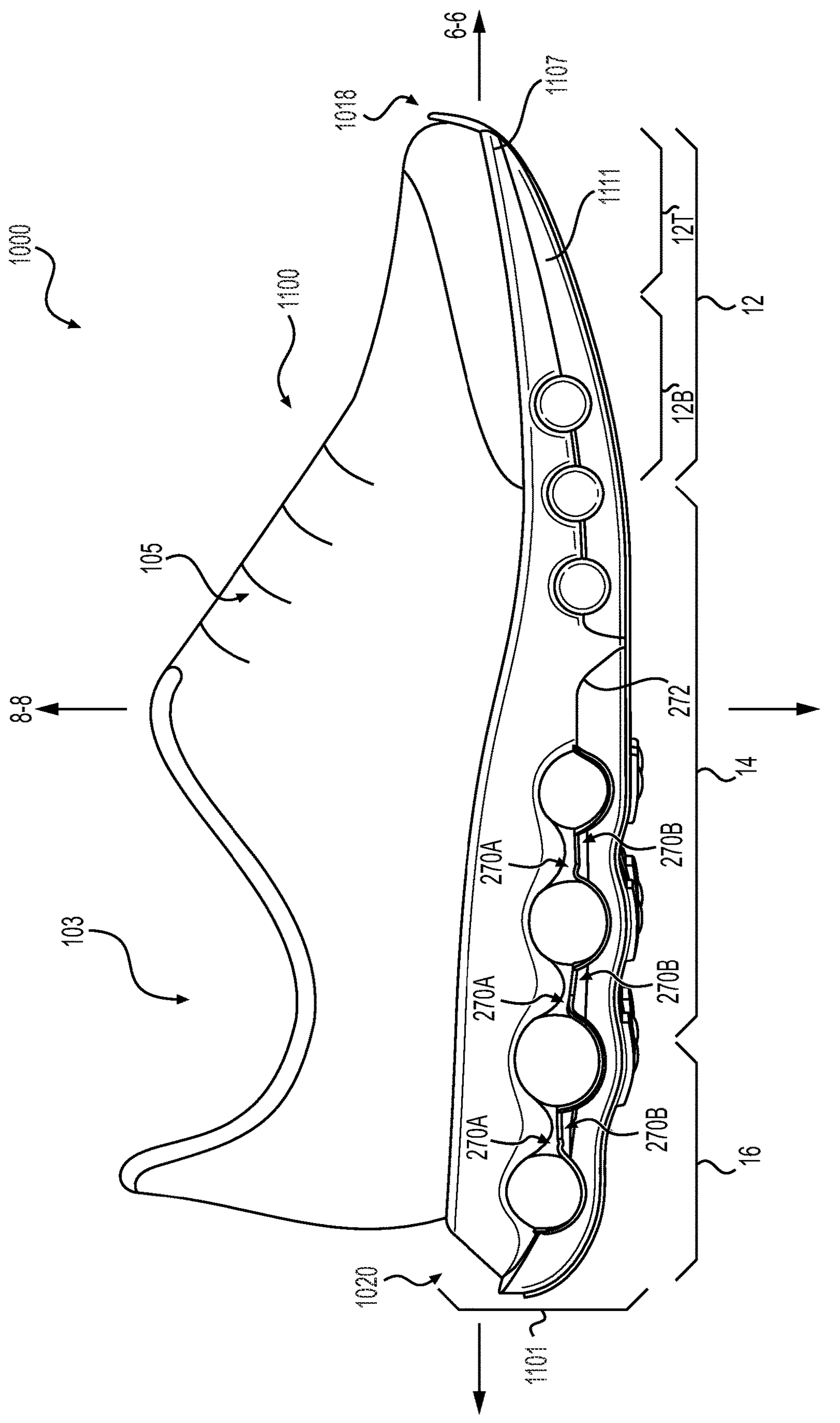
FIG. 11A is a side view of an alternative embodiment of an article of footwear.

As shown in FIG. 11A, footwear 1000 includes a sole structure 1101 and an upper 1100 attached to the sole structure 1101. The article of footwear 1000 is similarly divided as article of footwear 10 including the forefoot region 12, the mid-foot region 14, and the heel region 16. The footwear 1000 further includes an anterior end 1018 including a forward-most point of the forefoot region 12, and a posterior end 1020 including a rearward-most point of the heel region 16. For ease of discussion, the footwear 1000 is discussed with reference to the longitudinal axis 6-6, the medial-lateral axis AML (shown in FIG. 13A), and the vertical axis 8-8, where the longitudinal axis 6-6, the medial-lateral axis AML, and the vertical axis 8-8 are perpendicular to each other. The longitudinal axis 6-6 of the footwear 1000 extends along a length of the footwear 1000 from the anterior end 1018 to the posterior end 1020, and generally divides the footwear 1000 into a medial side 1022 and a lateral side 1024 (shown in FIG. 20). The medial-lateral axis AML extends from medial side 1022 to lateral side 1024. Accordingly, the medial side 1022 and the lateral side 1024 respectively correspond with opposite sides of the footwear 1000 and extend from the anterior end 1018 to the posterior end 1020. The vertical axis 8-8 extends from a bottom (i.e., ground-contacting portion) of the footwear 1000 to a top of the footwear 1000.

Figure 11B:
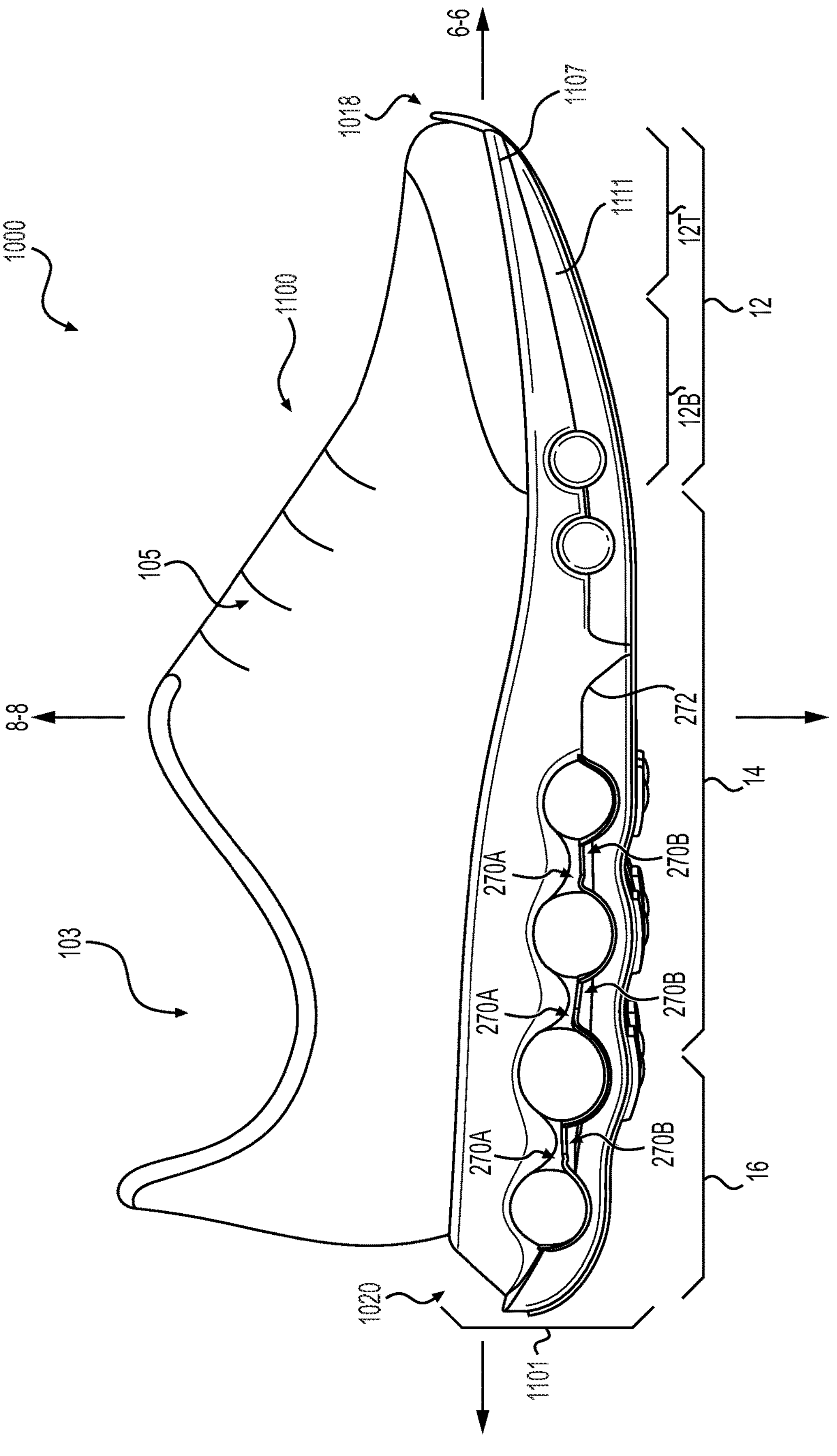
FIG. 11B is a side view of an alternative embodiment of an article of footwear.

Still referring to FIG. 11A, the upper 1100 includes interior surfaces that define an interior void configured to receive and secure a foot for support on sole structure 1101. The upper 1100 may be s similar to upper 100. A lateral view of the article of footwear 1000. A medial view of the footwear 1000 is shown in FIG. 11B.

Figure 12:
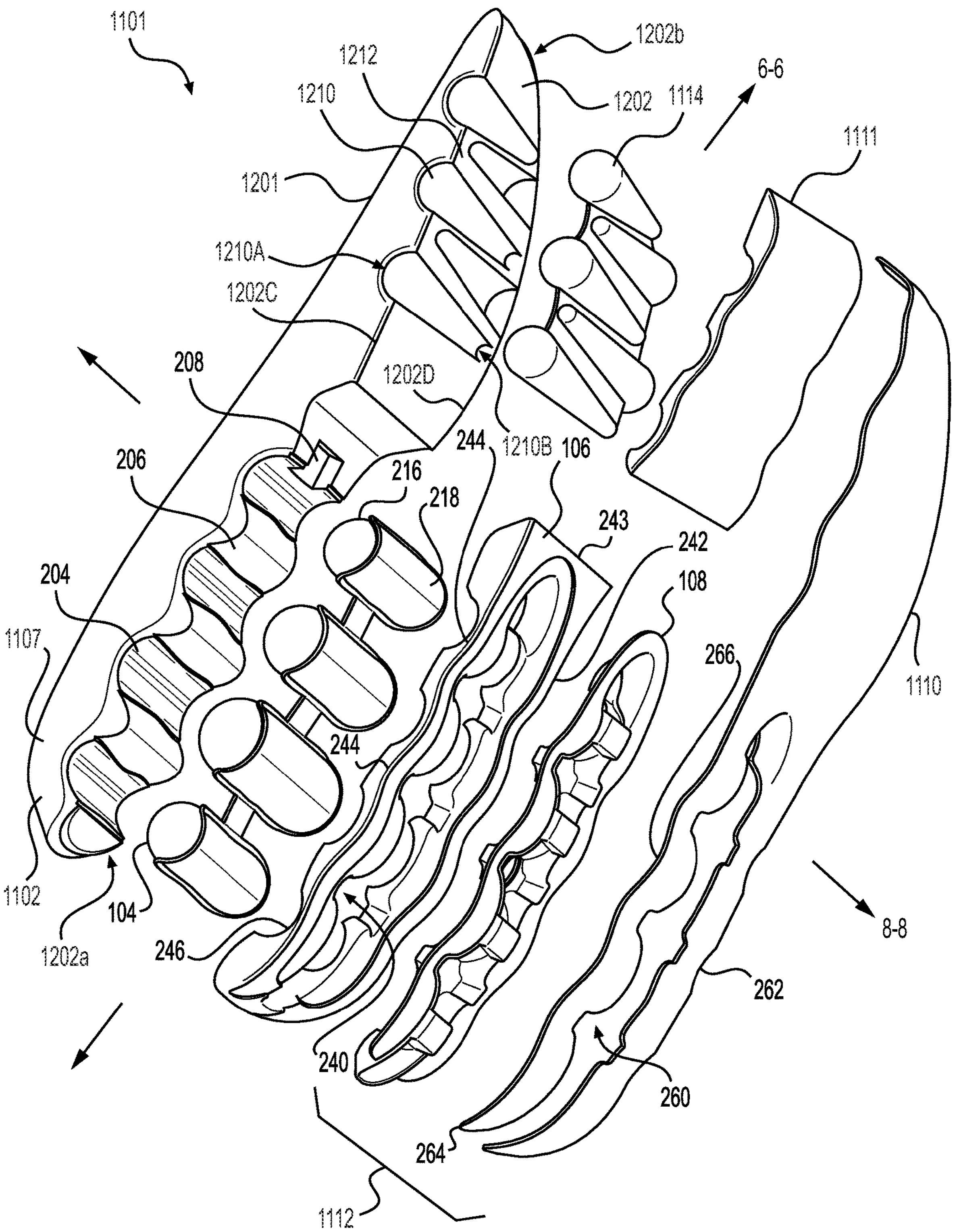
FIG. 12 is an exploded perspective view of a sole structure of the article of footwear of FIG. 11A.

With reference to FIG. 12, the sole structure 1101 includes a midsole 1102, which includes a first support element 1107, the second support element 106, and a third support element 1111. In some examples, the midsole 1102 is of a unitary construction. The sole structure 1101 further includes the heel cushioning element 104, a forefoot cushioning element 1114, and an outsole 1112. The forefoot cushioning element 1114 is a fluid-filled cushioning element. The outsole 1112 includes the coupling portion 108 and an outsole layer 1110. In some examples, the outsole 1112 may be formed without the coupling portion 108. Portions of the outsole 1112 are configured to provide a ground-engaging surface of the article of footwear 1000 that directly contacts the ground. The sole structure 1101 is configured to provide cushioning characteristics to the article of footwear 1000.

The first support element 1107 includes a top surface 1201 and a bottom surface 1202. The bottom surface 1202 includes a posterior portion 1202*a*, an anterior portion 1202*b*, a lateral edge 1202*c*, and a medial edge 1202*d*. The posterior portion 1202*a* of the bottom surface 1202 extending from the mid-foot region 14 to the heel region 16. The anterior portion 1202*b* of the bottom surface 1202 extending from the mid-foot region 14 to the forefoot region 12. The lateral edge 1202*c* extending along the lateral side 1024. The medial edge 1202*d* extending along the medial side 1022. The posterior portion 1202*a* of the bottom surface 1202 is similarly formed as described as the bottom surface 202.

The anterior portion 1202*b* of the bottom surface 1202 includes a plurality of recesses 1210, and a plurality of flat surfaces 1212. The plurality of recesses 1210 taper inward. The plurality of recesses 1210 include an outermost portion 1210A disposed on either the medial side 1022 or the lateral side 1024. The outermost portion 1210*a* of the plurality of recesses 1210 being a portion open to the exterior environment on either the medial side or the lateral side. The plurality of recesses 1210 include an innermost portion 1210*b* disposed opposite the outermost portion 1210*a*. The innermost portion 1210*b* of the plurality of recesses 1210 is disposed such that the face of the innermost portion 1210*b* stops at a middle portion of the bottom surface 1202. The plurality of recesses 1210 do not extend entirely from the medial side 1022 to the lateral side 1024 or from the lateral side 1024 to the medial side 1022. The plurality of recesses 1210 include a largest width at the outermost portion 1210*a* on either the lateral side or the medial side. The recesses 1210 include a smallest width at the innermost portion 1210*b*. The width of the plurality of recesses 1210 progressively decreases from the largest width at the outermost portion 1210*a* to the smallest width at the innermost portion 1210*b*. In other words, the recesses 1210 have an inward taper.

The outermost portion 1210*a* of a respective recess 1210 is disposed at one of either a lateral edge 1202*c* of the bottom surface 1202 or a medial edge 1202*d* of the bottom surface 1202. In an example, a first one of the recesses 1210 includes the outermost portion 1210*a* on the lateral edge 1202*c*. A second one of the recesses 1210 includes the outermost portion 1210*a* on the medial edge 1202*d*. A third one of the recesses 1210 includes the outermost portion 1210A on the lateral edge 1202*c*. A fourth one of the recesses 1210 includes the outermost portion 1210*a* on the medial edge 1202*d*. A fifth one of the recesses 1210 includes the outermost portion 1210*a* on the medial edge 1202*d*. The recesses 1210 alternate having the outermost portion 1210*a* on the lateral edge 1202*c* and the medial edge 1202*d*. The recesses 1210 can include one, two, three, four, five, or more recesses 1210. The recesses 1210 may alternate in this fashion when traveling from the anterior portion 1202*b* to the posterior portion 1202*a* for any number configuration of the recesses 1210.

The plurality of flat surfaces 1212 of the anterior portion 1202*b* of the bottom surface 1202 extend between each of the plurality of recesses 1210. The flat surfaces 1212 have a consistent width between respective recesses 1210. The flat surfaces 1212 space longitudinally adjacent recesses 1210 apart from one another.

First support element 1107 includes a support material suitable for providing a desired cushioning characteristic to the article of footwear 1000. For example, first support element 1107 may consist of or comprise a polymeric support material. The polymeric support material may be a foamed polymeric support material, as described in greater detail below.

Figure 13A:
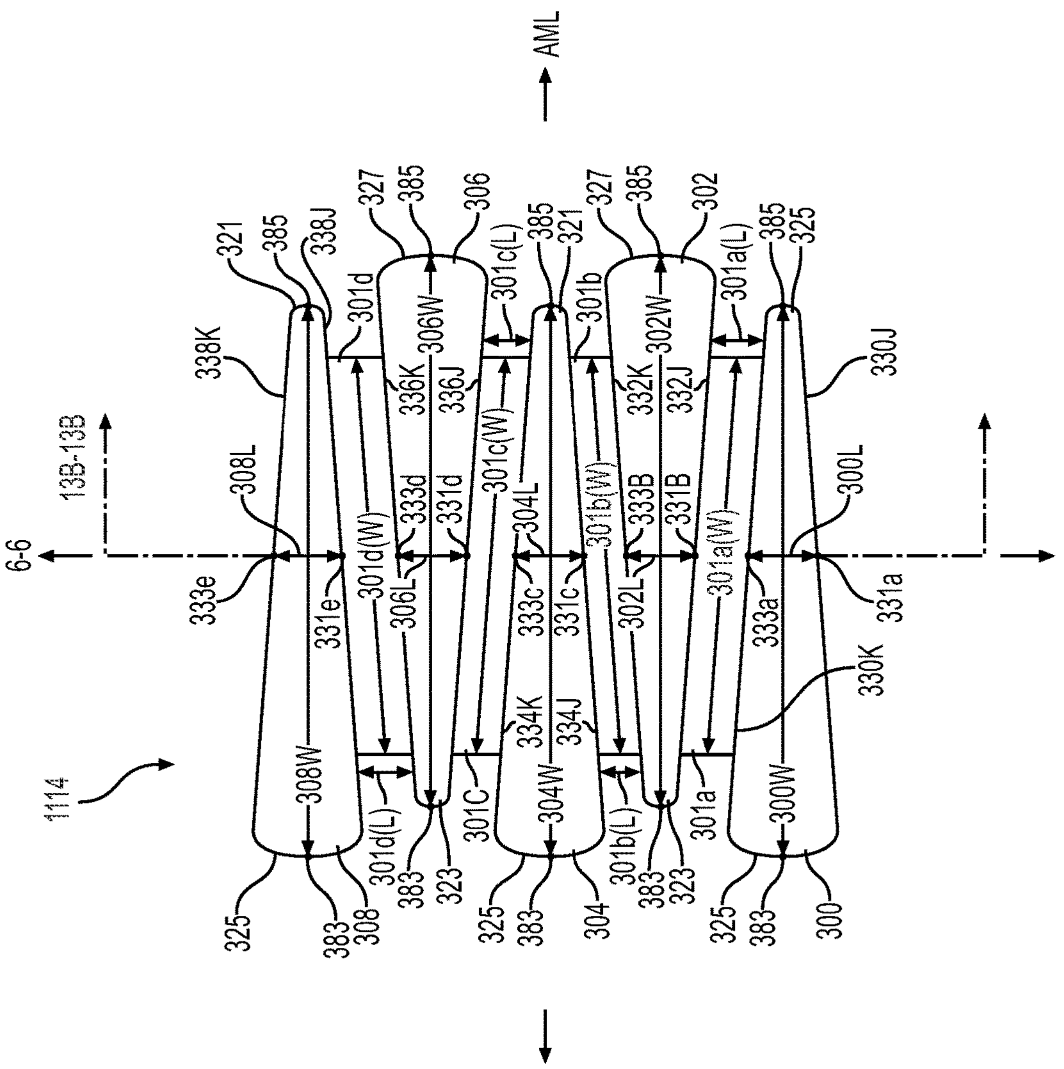
FIG. 13A is a top view of a cushioning element of the article of footwear of FIG. 11A.

With reference to FIG. 13A, the forefoot cushioning element 1114 is a fluid-filled cushioning element, such as an airbag or bladder. The forefoot cushioning element 1114 may comprise a barrier material similar to that described with respect to the heel cushioning element 104. The forefoot cushioning element 1114 includes barrier films 316 and 318. The barrier films 316 and 318 (shown in FIG. 13B) are joined to each other at discrete locations to define tubes 300, 302, 304, 306, and 308 and distinct web areas 301*a*, 301*b*, 301*c*, and 301*d*. It is contemplated that tubes 300, 302, 304, 306, and 308 are triangular, cylindrical, pentagonal, cubed, or the like.

Each of web areas 301*a*, 301*b*, 301*c*, and 301*d* includes a dimension along each of the longitudinal axis 6-6 and the vertical axis 8-8. Additionally, each of web areas 301*a*, 301*b*, 301*c*, and 301*d* includes a dimension that extends offset from the medial-lateral axis AML. Each web area 301*a*, 301*b*, 301*c*, and 301*d* includes a length, a width, and a thickness. Web area 301*a* includes a length 301*a*(L) along the longitudinal axis 6-6, a width 301*a*(W) is offset from the medial-lateral axis AML, and a thickness 301*a*(*t*) (shown in FIG. 13B) along the vertical axis 8-8. Web area 301*b* includes a length 301*b*(L) along the longitudinal axis 6-6, a width 301*b*(W) is offset from the medial-lateral axis AML, and a thickness 301*b*(*t*) along the vertical axis 8-8. Web area 301*c* includes a length 301*c*(L) along the longitudinal axis 6-6, a width 301*c*(W) is offset from the medial-lateral axis AML, and a thickness 301*c*(*t*) along the vertical axis 8-8. Web area 301*d* includes a length 301*d*(L) along the longitudinal axis 6-6, a width 301*d*(W) is offset from the medial-lateral axis AML, and a thickness 301*d*(*t*) along the vertical axis 8-8. Any one of web areas 301*a*, 301*b*, 301*c*, and/or 301*d* may have the same or different dimensions as another web area 301*a*, 301*b*, 301*c*, and/or 301*d*. The web areas 301*a*, 301*b*, 301*c*, and 301*d* alternate in orientation when travelling longitudinally from the forefoot 12 to the heel 16.

The web areas 301*a*, 301*b*, 301*c*, and 301*d* include a parallelogram shape. Each of the web areas 301*a*, 301*b*, 301*c*, and 301*d* include a medial edge, a lateral edge, a posterior edge, and an anterior edge. The medial edge and the lateral edge of each of respective web areas 301*a*, 301*b*, 301*c*, and 301*d* are parallel to one another. The posterior edge and the anterior edge of each of respective web areas 301*a*, 301*b*, 301*c*, and 301*d* are parallel to one another. Adjacent portions of the respective medial edge, lateral edge, posterior edge, and anterior edge intersect one another. In an example, web areas 301*a* and 301*c* are oriented in a similar manner. Web areas 301*b* and 301*d* are oriented in a similar manner. Web areas 301*a* and 301*c* include the medial side longitudinally anterior to the lateral side. Web areas 301*b* and 301*d* include the medial side longitudinally posterior to the lateral side.

In one example, length 301*a*(L), length 301*b*(L), length 301*c*(L) and length 301*d*(L) are all the same. In another example, each of length 301*a*(L), length 301*b*(L), length 301*c*(L) and length 301*d*(L) are different from one another.

In another example some of the lengths are the same while others are different. For example, length 301*a*(L) and length 301*b*(L) have a first length, and length 301*c*(L) and length 301*d*(L) have a second length different than the first length. Or, length 301*a*(L) and length 301*c*(L) have a third length, and length 301*b*(L) and length 301*d*(L) have a fourth length different than the third length. In an example, the length 301*a*(L) is 1 cm, the length 301*b*(L) is 1 cm, the length 301*c*(L) is 1 cm, and the length 301*d*(L) is 1 cm. In another example, the length 301*a*(L) is 1 cm, the length 301*b*(L) is 2 cm, the length 301*c*(L) is 1 cm, and the length 301*d*(L) is 2 cm. In another example, the length 301*a*(L) is 1 cm, the length 301*b*(L) is 1.5 cm, the length 301*c*(L) is 2 cm, and the length 301*d*(L) is 2.5 cm. In another embodiment, the length 301*a*(L) is 1 cm, the length 301*b*(L) is 2 cm, the length 301*c*(L) is 2 cm, and the length 301*d*(L) is 2 cm. In another example, the length 301*a*(L) is 1 cm, the length 301*b*(L) is 1 cm, the length 301*c*(L) is 2 cm, and the length 301*d*(L) is 2 cm.

In one example, the dimensions of web areas 301*a*, 301*b*, 301*c*, and 301*d* are formed as ratios of one another. The ratios may all be the same, all different, or a combination of the same and/or different ratios. For example, one length could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another length. As an example, length 301*a*(L) is 2 cm, length 301*b*(L) is 1.75 cm, length 301*c*(L) is 1.5 cm, and length 301*d*(L) is 1.25 cm making length 301*b*(L) 0.875 times the length of 301*a*(L), length 301*c*(L) is 0.75 times the length of 301*b*(L), and length 301*d*(L) is 0.625 times the length of 301*c*(L).

In one example, width 301*a*(W), width 301*b*(W), width 301*c*(W), and width 301*d*(W) are all the same. In another example, each of width 301*a*(W), width 301*b*(W), width 301*c*(W), and width 301*d*(W) are different from one another. Each of the widths 301*a*(W), 301*b*(W), 301*c*(W), and 301*d* (W) may be measured from a longitudinal center of the medial edge of a respective web area 301*a*, 301*b*, 301*c*, and 301*d* to a longitudinal center of the lateral edge of a respective web area 301*a*, 301 *b*, 301*c*, and 301*d.*

In another example some of the widths are the same while others are different. For example, width 301*a*(W) and width 301*b*(W) have a first width, and width 301*c*(W) and width 301*d*(W) have a second width different than the first width. Or, width 301*a*(W) and width 301*c*(W) have a third width, and width 301*b*(W) and width 301*d*(W) have a fourth width different than the third width. In an example, the width 301*a*(W) is 5 cm, the width 301*b*(W) is 5 cm, the width 301*c*(W) is 5 cm, and the width 301*d*(W) is 5 cm. In another example, the width 301*a*(W) is 5 cm, the width 301*b*(W) is 6 cm, the width 301*c*(W) is 5 cm, and the width 301*d*(W) is 6 cm. In another example, the width 301*a*(W) is 5 cm, the width 301*b*(W) is 5.5 cm, the width 301*c*(W) is 6 cm, and the width 301*d*(W) is 6.5 cm. In another example, the width 301*a*(W) is 5 cm, the width 301*b*(W) is 6 cm, and the widths 301*c*(W) is 6 cm, and the width 301*d*(W) is 6 cm. In another example, the width 301*a*(W) is 5 cm, the width 301*b*(W) is 5 cm, and the widths 301*c*(W) is 6 cm, and the width 301*d*(W) is 6 cm.

In one example, the dimensions of web areas 301*a*, 301*b*, 301*c*, and 301*d* are formed as ratios of one another. The ratios may all be the same, all different, or a combination of the same and/or different ratios. For example, one width could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another width. As an example, width 301*a*(W) is 5 cm, width 301*b*(W) is 4.5 cm, width 301*c*(W) is 4.25 cm, and width 301*d*(W) is 4 cm making width 301*b*(W) 0.9 times the width of 301*a*(W), width 301*c*(W) is 0.85 times the width of 301*b*(W), and width 301*d*(W) is 0.8 times the width of 301*c*(W).

In one example, thickness 301*a*(*t*), thickness 301*b*(*t*), thickness 301*c*(*t*), and thickness 301*d*(*t*) are all the same. In another example, each of thickness 301*a*(*t*), thickness 301*b* (*t*), thickness 301*c*(*t*), and thickness 301*d*(*t*) are different from one another.

In another example some of the thicknesses are the same while others are different. For example, thickness 301*a*(*t*) and thickness 301*b*(*t*) have a first thickness, and thickness 301*c*(*t*) and thickness 301*d*(*t*) have a second thickness different than the first thickness. Or, thickness 301*a*(*t*) and thickness 301*c*(*t*) have a third thickness, and thickness 301*b*(*t*) and thickness 301*d*(*t*) have a fourth thickness different than the third thickness. In an example, the thickness 301*a*(*t*) is 0.5 mm, the thickness 301*b*(*t*) is 0.5 mm, the thickness 301*c*(*t*) is 0.5 mm, and the thickness 301*d*(*t*) is 0.5 mm. In another example, the thickness 301*a*(*t*) is 0.5 mm, the thickness 301*b*(*t*) is 1 mm, the thickness 301*c*(*t*) is 0.5 mm, and the thickness 301*d*(*t*) is 1 mm. In another example, the thickness 301*a*(*t*) is 0.5 mm, the thickness 301*b*(*t*) is 0.75 mm, the thickness 301*c*(*t*) is 1 mm, and the thickness 301*d*(*t*) is 1.25 mm. In another example, the thickness 301*a*(*t*) is 0.5 mm, the thickness 301*b*(*t*) is 1 mm, the thickness 301*c*(*t*) is 1 mm, and the thickness 301*d*(*t*) is 1 mm. In another example, the thickness 301*a*(*t*) is 0.5 mm, the thickness 301*b*(*t*) is 0.5 mm, and the thickness 301*c*(*t*) is 1 mm, and the thickness 301*d*(*t*) is 1 mm.

In one example, the dimensions of web areas 301*a*, 301*b*, 301*c*, and 301*d* are formed as ratios of one another. The ratios may all be the same, all different, or a combination of the same and/or different ratios. For example, one thickness could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another thickness. As an example, thickness 301*a*(*t*) is 0.5 mm, thickness 301*b*(*t*) is 0.45 mm, thickness 301*c*(*t*) is 0.4 mm, and thickness 301*d*(*t*) is 0.35 mm making thickness 301*b*(*t*) 0.9 times the thickness of 301*a*(*t*), thickness 301*c*(*t*) is 0.8 times the thickness of 301*b*(*t*), and thickness 301*d*(*t*) is 0.7 times the thickness of 301*c*(*t*).

Alternatively, the tubes 300, 302, 304, 306, and 308 may be produced from any suitable combination of one or more barrier films. Web areas 301*a*, 301*b*, 301*c*, and 301*d* are areas where opposing films 316 and 318 are bonded directly to one another without an intervening gap between the films.

The tubes 300, 302, 304, 306, and 308 are shown in a fluid-filled (e.g., FIG. 13A) state, but may be in an unfilled state. The tubes 300, 302, 304, 306, and 308 are filled to include any suitable fluid, such as a gas or liquid. In an aspect, the gas includes air, nitrogen gas ($N_2$), inert gases, or any other suitable gas. In other examples, the tubes 300, 302, 304, 306, and 308 include other media, such as pellets, beads, ground recycled material, and the like (e.g., foamed beads and/or rubber beads). The fluid provided to the tubes 300, 302, 304, 306, and 308 results in the tubes 300, 302, 304, 306, and 308 being pressurized. The tubes 300, 302, 304, 306, and 308 are pressurized to a value ranging between about 3 pounds per square inch (PSI) to about 40 PSI (about 20 kilopascals (kPA) to about 276 kPA). Alternatively, the fluid provided to the tubes 300, 302, 304, 306, and 308 may be at atmospheric pressure such that the tubes 300, 302, 304, 306, and 308 are not pressurized but, rather, each contains a volume of fluid at atmospheric pressure.

The tubes 300, 302, 304, 306, and 308 are configured to retain a fluid, particularly a gas such as air, oxygen or nitrogen. The tubes 300, 302, 304, 306, and 308 may have a gas transmission rate for nitrogen gas that is at least about ten (10) times lower than a nitrogen gas transmission rate for a butyl rubber layer of substantially the same dimensions. In one embodiment, the tubes 300, 302, 304, 306, and 308 may have a nitrogen gas transmission rate of 15 cubic-centimeter/square-meter-atmosphere-day ($cm^3/m^2 \cdot atm \cdot day$) or less for an average film thickness of 500 micrometers (based on thicknesses of barrier films 316, 318). In further aspects, the transmission rate is 10 $cm^3/m^2 \cdot atm \cdot day$ or less, 5 $cm^3/m^2 \cdot atm \cdot day$ or less, or 1 $cm^3/m^2 \cdot atm \cdot day$ or less.

Still referring to FIG. 13A, each of tubes 300, 304, and 308 has a medial face 321 and a lateral face 325. Each of tubes 302 and 306 has a lateral face 323 and a medial face 327. Each of faces 321, 323, 325, and 327 are substantially rounded surfaces. The medial face 321 is a substantially rounded surface of each of the tubes 300, 304, and 308 on the medial side 22 of the article of footwear 1000. The lateral face 325 is a substantially rounded surface of each of the tubes 300, 304, and 308 on the lateral side 24 of the article of footwear 1000. The lateral face 323 is a substantially rounded surface of each of the tubes 302 and 306 on the lateral side 24 of the article of footwear 1000. The medial face 327 is a substantially rounded surface of each of the tubes 302 and 306 on the medial side 22 of the article of footwear 1000. The lateral face 323 is different in dimension than the medial face 327. In other embodiments, the lateral face 323 is substantially similar in dimension to the medial face 327. The lateral face 325 is different in dimension than the medial face 321. In other embodiments, the lateral face 325 is substantially similar in dimension to the medial face 321.

In an example, the total number of tubes of the one or more tubes 300, 302, 304, 306, and 308 is five. It is contemplated that the number of tubes in the forefoot may be one, two, three, four, five, or more to provide a desired cushioning characteristic. In the example, the tubes 300, 302, 304, 306, and 308 may be arranged such that there is a first, posterior most lateral tube 300, a first, posterior most medial tube 302, a second, central lateral tube 304, a second anterior most medial tube 306, and a third, anterior most lateral tube 308.

Each of tubes 300, 304, and 308 taper inward from its respective medial face 321 to its respective lateral face 325. In other words, as will be described in greater detail below, a length of the tubes 300, 304, and 308 is greatest at its respective medial face 321 and smallest at its respective lateral face 325. Each of tubes 302 and 306 taper inward from its respective lateral face 323 to its respective medial face 327. In other words, as will be described in greater detail below, a length of the tubes 302 and 306 is greatest at its respective lateral face 323 and smallest at its respective medial face 327. The tubes 300, 302, 304, 306, and 308 alternate the direction of their inward taper from the respective medial face 321 and 327 to the respective lateral face 323 and 325, from posterior most tube 300 to anterior most tube 308. In other words, the inward taper of the respective tubes 300, 302, 204, 306, and 308 from its respective medial face to its respective lateral face, and vice versa, alternates when travelling longitudinally from the forefoot region 12 to the heel region 16. Having tubes 300, 302, 304, 306, and 308 as shown in the example in FIG. 13A aids in transition during walking of a user as well as providing a desired form of underfoot cushioning.

Tubes 300, 302, 304, 306, and 308 of the forefoot cushioning element 1114 extend from the medial side 1022 to the lateral side 1024 or from the lateral side 1024 to the medial side 1022 corresponding to a width (e.g., a medial-lateral diameter) of the one or more tubes 300, 302, 304, 306, and 308. The widths of each of tubes 300, 302, 304, 306, and 308 extends parallel to the medial-lateral axis AML. The width of a given tube is measured from a medial longitudinal center point 383 on its respective medial face 321 and 327 to a lateral longitudinal center point 385 on its respective lateral face 323 and 325. Center point 383 is disposed at a center of the respective medial face 321 and 327 The width of a given tube can be measured using the centerline. In addition to or in place of using the centerline, the width can be measured using any line extending between the respective medial face 321 and 327 and the respective lateral face 323 and 325, and parallel to the medial-lateral axis AML. The lines extending between the respective medial face 321 and 327 and the respective lateral face 323 and 325 and parallel to the medial-lateral axis AML of a given tube include a value that can be represented as an average width. The average width is the average of the values attained via the lines taken between the respective medial face 321 and 327 and the respective lateral face 323 and 325 and parallel to the medial-lateral axis AML. Tube 300 has a width 300W. Tube 302 has a width 302W. Tube 304 has a width 304W. Tube 306 has a width 306W. Tube 308 has a width 308W. The widths 300W, 302W, 304W, 306W, and 308W may range from about 0.5 to about 18 cm. The widths 300W, 302W, 304W, 306W, and 308W may range from about 0.75 cm to about 15 cm. The widths 300W, 302W, 304W, 306W, and 308W may range from about 1 cm to about 10 cm. The widths 300W, 302W, 304W, 306W, and 308W may range from about 2 cm to about 8 cm. In an example, width 300W is about 5 cm. In an example, width 302W is about 5 cm. In an example, width 304W is about 5 cm. In an example, width 306W is about 5 cm. In an example, width 308W is about 5 cm.

In one example, the widths 300W, 302W, 304W, 306W, and 308W of each of the tubes 300, 302, 304, 306, and 308 are substantially similar or the same. In one example, the widths 300W, 302W, 304W, 306W, and 308W of each of the tubes 300, 302, 304, 306, and 308 may vary from one tube to another.

Tubes 300, 302, 304, 306, and 308 of the forefoot cushioning element 1114 extend in a longitudinal direction corresponding to a length of the one or more tubes 300, 302, 304, 306, and 308. The length of each of tubes 300, 302, 304, 306, and 308 includes a greatest length at an outer portion, a middle length at a middle portion, and a shortest length at an inner portion opposite the outer portion, as will be described in greater detail below.

Each tube 300, 302, 304, 306, and 308 has a respective first end (330J, 332J, 334J, 336J, and 338J) and a respective second end (330K, 332K, 334K, 336K, and 338K). The respective first end (330J, 332J, 334J, 336J, and 338J) is a rearmost surface of the respective tube when traveling in the longitudinal direction from the posterior end 20 toward the anterior end 18. Each of the respective first ends (330J, 332J, 334J, 336J, and 338J) include a first center point (331*a*, 331*b*, 331*c*, 331*d*, and 331*e*). The center points 331*a*, 331*b*, 331*c*, 331*d*, and 331*e* are disposed centrally along each of the respective first ends 330J, 332J, 334J, 336J, and 338J. The respective second end (330K, 332K, 334K, 336K, and 338K) is a forward-most surface of the respective tube when traveling in the longitudinal direction from the posterior end 20 to the anterior end 18. Each of the respective second ends (330K, 332K, 334K, 336K, and 338K) include a second center point (333*a*, 333*b*, 333*c*, 333*d*, and 333*e*). The center points 333*a*, 333*b*, 333*c*, 333*d*, and 333*e* are disposed centrally along each of the respective second ends 330K, 332K, 334K, 336K, and 338K at an intersection between the medial-lateral axis AML, the vertical axis 8-8, and the longitudinal axis 6-6.

The length of a respective tube 300, 302, 304, 306, and 308 is measured between the respective posterior center points (331*a*, 331*b*, 331*c*, 331*d*, and 331*e*) and respective anterior center points (333*a*, 333*b*, 333*c*, 333*d*, and 333*e*). Between the respective center points (331*a*, 331*b*, 331*c*, 331*d*, and 331*e*) and respective center points (333*a*, 333*b*, 333*c*, 333*d*, and 333*e*) exists a centerline extending along the longitudinal axis 6-6. The length of a given tube is measured using the centerline. In addition to or in place of using the centerline, the length can be measured using any line extending between the respective posterior center points (331*a*, 331*b*, 331*c*, 331*d*, and 331*e*) and respective anterior center points (333*a*, 333*b*, 333*c*, 333*d*, and 333*e*) and parallel to the longitudinal axis 6-6. The lines extending between the respective anterior center points (331*a*, 331*b*, 331*c*, 331*d*, and 331*e*) and respective posterior center points (333*a*, 333*b*, 333*c*, 333*d*, and 333*e*) and parallel to the longitudinal axis 6-6 of a given tube include a value that can be represented as an average length. The average length is the average of the values attained via the lines taken between the respective first ends (330J, 332J, 334J, 336J, and 338J) and respective seconds ends (330K, 332K, 334K, 336K, and 338K) and parallel to the longitudinal axis 6-6. Tube 300 has a length 300L. Tube 302 has a length 302L. Tube 304 has a length 304L. Tube 306 has a length 306L. Tube 308 has a length 308L. The lengths 300L, 302L, 304L, 306L, and 308L range from about 0.25 to about 4 cm. In an example, length 300L is about 1 cm. In an example, length 302L is about 1 cm. In an example, length 304L is about 1 cm. In an example, length 306L is about 1 cm. In an example, length 308L is about 1 cm.

In one example, the length 300L, 302L, 304L, 306L, and 308L of each of the tubes 300, 302, 304, 306, and 308 are substantially similar or the same. In one example, the lengths 300L, 302L, 304L, 306L, and 308L of each of the tubes 300, 302, 304, 306, and 308 may vary from one length to another. The length of a respective tube 300, 302, 304, 306, and 308 is the dimension that tapers inwardly between the respective medial face 321 and 327 and respective lateral face 323 and 325.

Figure 13B:
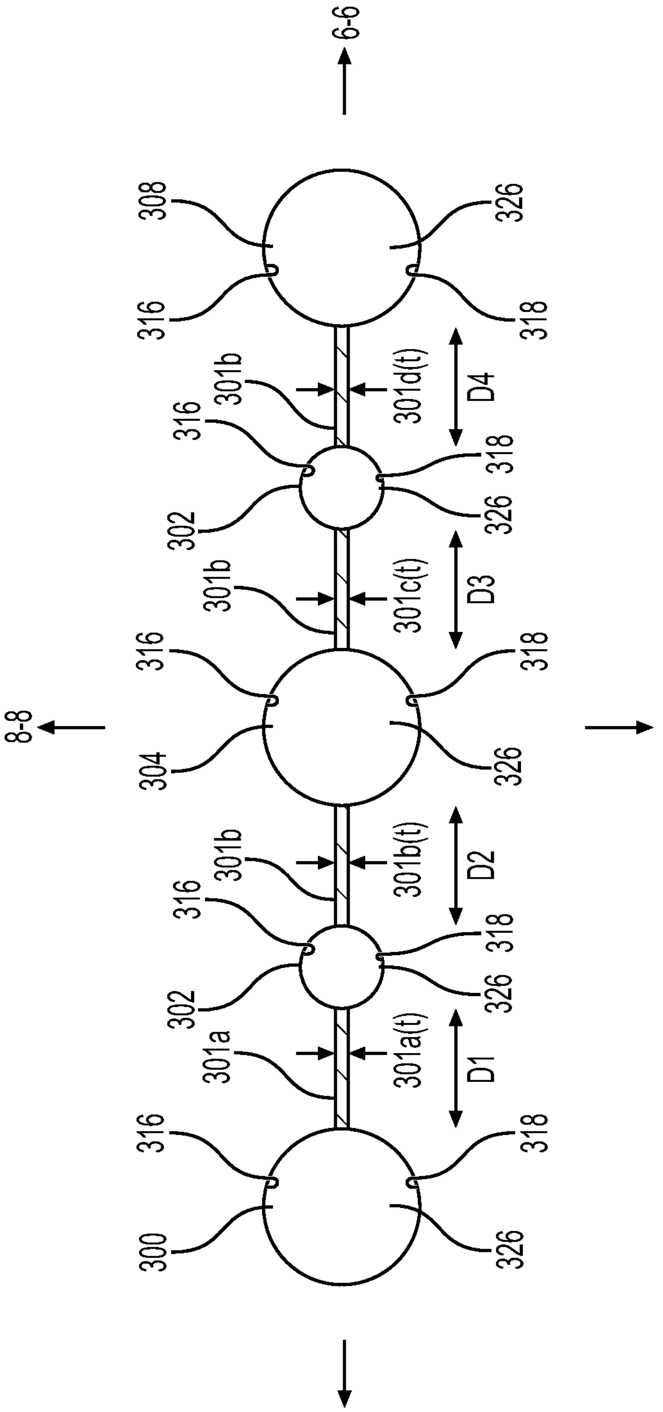
FIG. 13B is a cross-sectional view of the cushioning element of FIG. 13A.

With reference to FIG. 13B, the tube 300 is connected to tube 302 via the web area 301*a*. The tube 300 is spaced apart from the tube 302 by a first distance D1 corresponding to the length 301*a*(L) of the web area 301*a*. The tube 300 is connected to the tube 302 at a posterior facing side of tube 300. The tube 302 is connected to tube 300 at an anterior facing side of tube 302. The tube 302 is connected to tube 304 via the web area 301*b*. The tube 302 is spaced apart from the tube 304 by a second distance D2 corresponding to the length 301*b*(L) of the web area 301*b*. The tube 302 is connected to tube 304 at a posterior facing side of tube 302. The tube 304 is connected to tube 302 at an anterior facing side of tube 304. The tube 304 is connected to the tube 306 via the web area 301*c*. The tube 304 is spaced apart from the tube 306 by a third distance D3 corresponding to the length 301*c*(L) of the web area 301*c*. The tube 306 is connected to tube 304 at an anterior facing side of tube 306. The tube 304 is connected to tube 306 at a posterior facing side of tube 304. The tube 306 is connected to the tube 308 via the web area 301*d*. The tube 306 is spaced apart from the tube 308 by a fourth distance D4 corresponding to the length 301*d*(L) of the web area 301*d*. The tube 308 is connected to tube 306 at an anterior facing side of tube 308. The tube 306 is connected to tube 308 at a posterior facing side of tube 306. In other words, each of the web areas 301*a*, 301*b*, 301*c*, and 301*d* interconnect each of the tubes 300, 302, 304, 306, and 308. In an example, each of the first distance D1, the second distance D2, the third distance D3, and the fourth distance D4 are the same. In alternate examples, each of the first distance D1, the second distance D2, the third distance D3, and the fourth distance D4 vary from one another. In an example, the first distance D1, the second distance D2, the third distance D3, and the fourth distance D4 are about 1 cm. Alternatively, the first distance D1, the second distance D2, the third distance D3, and the fourth distance D4 are about 2 cm. In a further alternative example, the first distance and the third distance are about 1 cm, and the second distance and the fourth distance are about 1.5 cm.

Referring back to FIG. 13B, the web areas 301*a*, 301*b*, 301*c*, and 301*d* are disposed at a vertical midpoint of adjacent tubes 300, 302, 304, 306, and 308. In one example, the web areas 301*a*, 301*b*, 301*c*, and 301*d* are disposed vertically and/or horizontally offset from the vertical midpoint of adjacent tubes 300, 302, 304, 306, and 308. In an exemplary embodiment, the web areas 301*a*, 301*b*, 301*c*, and 301*d* are co-planar with one another. It is contemplated that the web areas 301*a*, 301*b*, 301*c*, and 301*d* are not co-planar, but rather rest in offset planes from one another. In other embodiments, some of the web areas 301*a*, 301*b*, 301*c*, and 301*d* are co-planar with one another while other of web areas 301*a*, 301*b*, 301*c*, and 301*d* are not co-planar with one another.

In one example, the distances D1, D2, D3, and D4 are substantially similar or the same. In one example, the distances D1, D2, D3, and D4 vary from one distance to another. For example, when moving from the forefoot region 12 to mid-foot region 14, the distances may decrease. In such an example, distance D4 is less than distance D3, distance D3 is less than distance D2, and distance D2 is less than distance D1. As another example, when moving from the forefoot region 12 to mid-foot region 14, the distances may increase. In this example, distance D4 is greater than distance D3, distance D3 is greater than distance D2, and distance D2 is greater than distance D1.

In one example, distance D1, distance D2, and distance D3 are all the same. In another example, each of distance D1, distance D2, and distance D3 are different from one another. In another example some of the distances are the same while others are different.

In an example, each of tubes 300, 302, 304, 306, and 308 are fluidly isolated from one another. For example, some or all of tubes 300, 302, 304, 306, and 308 may be pressurized to different values. One or more of the tubes 300, 302, 304, 306, and 308 may have a first pressure. One or more of the tubes 300, 302, 304, 306, and 308 may have a second pressure different from the first pressure. One or more of tubes 300, 302, 304, 306, and 308 may have a third pressure different from the first pressure and the second pressure. One or more of the tubes 300, 302, 304, 306, and 308 may have a fourth pressure different from the first pressure, the second pressure, and the third pressure. One or more of the tubes 300, 302, 304, 306, and 308 may have a fifth pressure different from the first pressure, the second pressure, the third pressure, and the fourth pressure. One or more groups of the one or more tubes 300, 302, 304, 306, and 308 may have the same first pressure. Other groups of the one or more tubes 300, 302, 304, 306, and 308 may have the same second pressure.

In one example, the pressure values of each of the tubes 300, 302, 304, 306, and 308 are substantially similar or the same. In one example, the pressure values of each of the tubes 300, 302, 304, 306, and 308 vary from one tube to another. For example, when moving from the mid-foot region 14 to forefoot region 12, the pressure values decrease. In such an example, the pressure value of tube 300 is less than the pressure value of tube 302, the pressure value of tube 302 is less than the pressure value of tube 304, the pressure value of tube 304 is less than the pressure value of tube 306, and the pressure value of tube 306 is less than the pressure value of tube 308.

As another example, when moving from the mid-foot region 14 to forefoot region 12, the pressure values may increase. In this example, the pressure value of tube 300 is greater than the pressure value of tube 302, the pressure value of tube 302 is greater than the pressure value of tube

304, the pressure value of tube 304 is greater than the pressure value of tube 306, and the pressure value of tube 306 is greater than the pressure value of tube 308.

In one example, a first (lateral) set of tubes has a first pressure value while a second (medial) set of tubes have a second pressure value. For example, the first set of tubes comprises tubes 300, 304, and 308 and the second set of tubes comprises tubes 302 and 306. The first set of tubes 300, 304, and 308 have a first pressure value that is greater than a second pressure value of the second set of tubes 302 and 306. As another example, the first set of tubes can have a first pressure value that is less than a second pressure value of the second set of tubes.

For example, the pressure value ranges from about atmospheric pressure to about 40 PSI (276 kPA). In an example, the pressure of the tubes 300, 304, and 308 is about 7 PSI (48 kPA) and the pressure of the tubes 302 and 306 are about 15 PSI (103 kPA).

Alternatively, each of tubes 300, 302, 304, 306, and 308 could have the same pressure value. In an alternative example, each of tubes 300, 302, 304, 306, and 308 has a pressure value of about 15 PSI (103 kPA). In another alternative example, each of tubes 300, 302, 304, 306, and 308 could have a different pressure value. The pressure values of each of tubes 300, 302, 304, 306, and 308 could increase when traveling from tube 300 to tube 308. The pressure values of each of tubes 300, 302, 304, 306, and 308 could decrease when traveling from tube 300 to tube 308. In another alternative example, tubes 300, 304, and 308 have the same pressure value, and tubes 302 and 306 have the same pressure value. The pressure value of tubes 300, 304, and 308 may be different from the pressure value of tubes 302 and 306.

It is contemplated that in alternate examples, web areas 301*a*, 301*b*, 301*c*, and 301*d* may be configured so as to allow fluid communication between each of tubes 300, 302, 304, 306, and 308. For example, web areas 301*a*, 301*b*, 301*c*, and 301*d* may include a fluid channel (not shown) connecting each of the tubes 300, 302, 304, 306, and 308 to allow fluid flow.

With continued reference to FIG. 13B, a space formed between opposing interior surfaces of the upper and lower films 316, 318 define the interior void 326 of the tubes 300, 302, 304, 306, and 308. Exterior surfaces of the upper and lower films 316, 318 define an exterior profile of the tubes 300, 302, 304, 306, and 308. Accordingly, the upper and lower films 316 and 318 define respective upper and lower surfaces of the forefoot cushioning element 1114.

Figure 14:
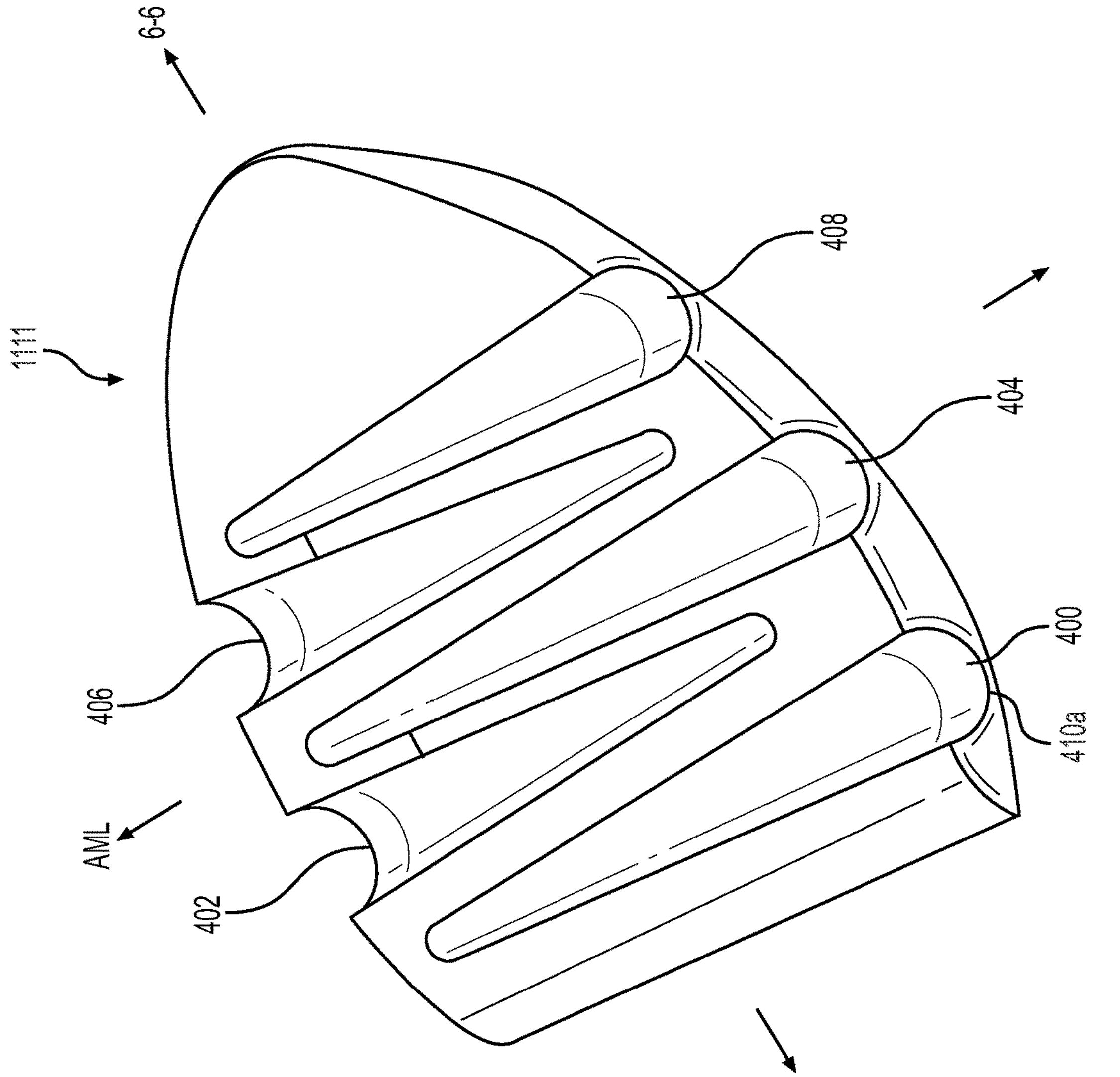
FIG. 14 is a perspective view of a foam element of the article of footwear of FIG. 11A.

Referring to FIG. 14, third support element 1111 includes a plurality of cut-outs 400, 402, 404, 406, and 408. The third support element 1111 includes a medial portion disposed on the medial side 1022 and a lateral portion disposed on the lateral side 1024. Each of the cut-outs 400, 404, and 408 extend from the lateral portion of the third support element 1111 toward the medial portion of the third support element 1111. Each of the cut-outs 402 and 406 extend from the medial portion of the third support element 1111 toward the lateral portion of the third support element 1111. Each of the cut-outs 400, 402, 404, 406, and 408 taper inward. Cut-outs 400, 404, and 408 taper inward from the lateral portion of the third support element 1111 to the medial portion of the third support element 1111. Cut-outs 402 and 406 taper inward from the medial portion of the third support element 1111 to the lateral portion of the third support element 1111.

Each cut-out 400, 402, 404, 406, and 408 includes an outermost portion 410*a* disposed on either the medial side 1022 or the lateral side 1024. The outermost portion 420*a* of each of the cut-outs 400, 402, 404, 406, and 408 being a portion open to the exterior environment on either the medial side 1022 or the lateral side 1024. The cut-outs 400, 402, 404, 406, and 408 an innermost portion 410*b* disposed opposite the outermost portion 410*a*. The innermost portion 410*b* of the cut-outs 400, 402, 404, 406, and 408 disposed such that its face is adjacent to an inner portion of the third support element 1111. The cut-outs 400, 402, 404, 406, and 408 do not extend entirely from the medial side 1022 to the lateral side 1024 or vice versa. The cut-outs 400, 402, 404, 406, and 408 include a largest width at the outermost portion 410*a* on either the lateral side 1024 or the medial side 1022. The cut-outs 400, 402, 404, 406, and 408 include a smallest width at the innermost portion 410*b*. The width of the cut-outs 400, 402, 404, 406, and 408 progressively decreases from the largest width at the outermost portion 410*a* to the smallest width at the innermost portion 410*b*. In this manner, the cut-outs 400, 402, 404, 406, and 408 have the inward taper.

In an example, a first cut-out 400 includes the outermost portion 410*a* on the lateral side 1024. A second cut-out 402 includes the outermost portion 410*a* on the medial side 1022. A third cut-out 404 includes the outermost portion 410*a* on the lateral side 1024. A fourth cut-out 406 includes the outermost portion 410*a* on the medial 1022. A fifth cut-out 408 includes the outermost portion 410*a* on the lateral side 1024. The cut-outs 400, 402, 404, 406, and 408 alternate having the outermost portion 410*a* on the lateral side 1024 and the medial side 1022. The cut-outs 400, 402, 404, 406, and 408 can include one, two, three, four, five, or more cut-outs 400, 402, 404, 406, and 408. The cut-outs 400, 402, 404, 406, and 408 may alternate in this fashion when traveling from the forefoot region 12 to the anterior region 16 for any number configuration of the cut-outs 400, 402, 404, 406, and 408. The number of cut-outs 400, 402, 404, 406, and 408 mirrors the number of tubes 300, 302, 304, 306, and 308.

The lateral most portion of cut-outs 400, 404, and 408 is exposed to the environment by the lateral portion of the third support element 1111 while the footwear 1000 is fully assembled. The medial most portion of cut-outs 400, 404, and 408 is bounded by the medial portion of the third support element 1111 such that the medial most portion of the cut-outs 400, 404, and 408 is not exposed to the environment when the footwear 1000 is fully assembled. The medial most portion of cut-outs 402 and 406 is exposed to the environment, when the footwear 1000 is fully assembled, by the medial portion of the third support element 1111. The lateral most portion of cut-outs 402 and 406 is bounded by the lateral portion of the third support element 1111 such that the lateral most portion of the cut-outs 402 and 406 is not exposed to the environment, when the footwear 1000 is fully assembled.

Figure 15:
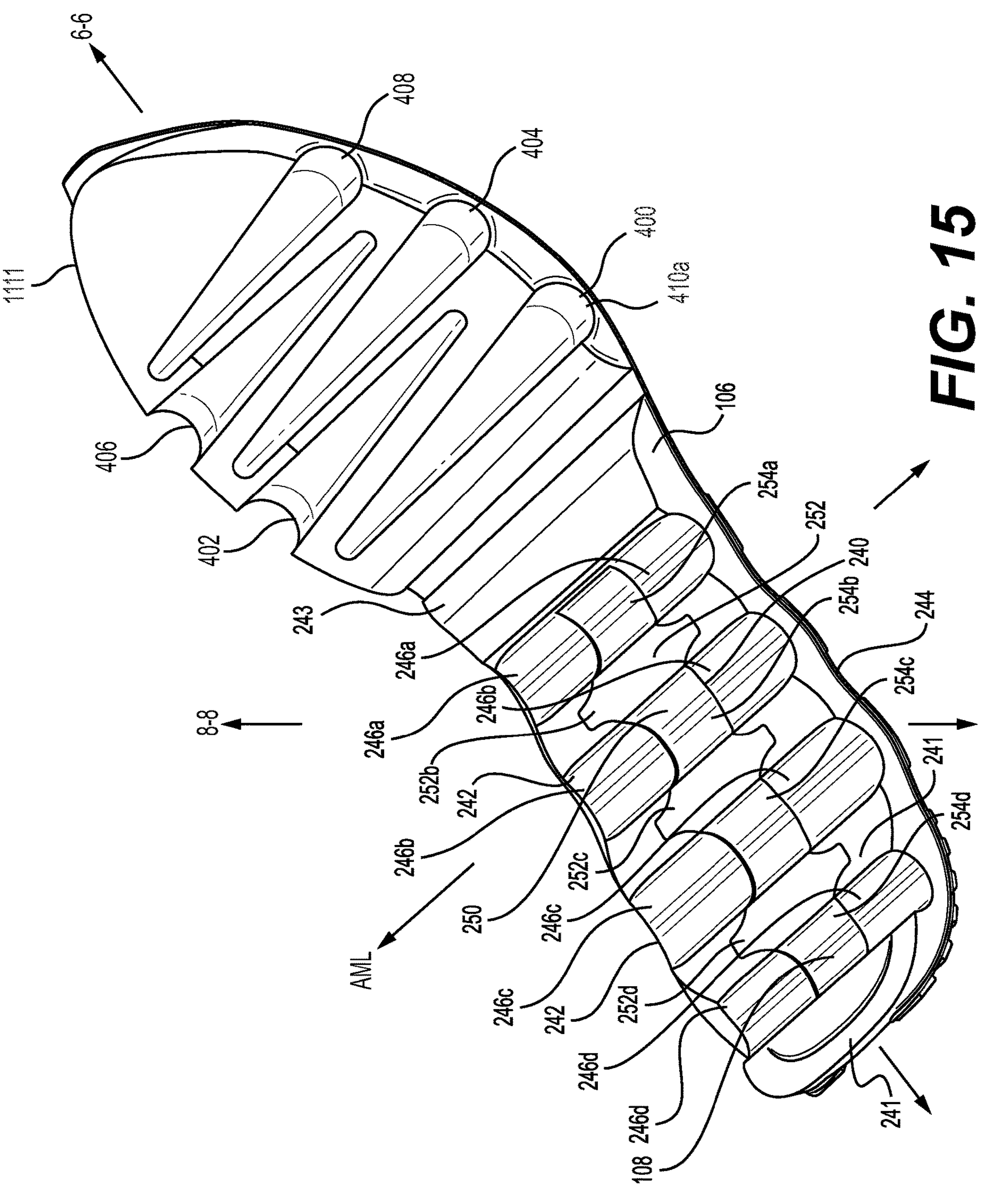
FIG. 15 is a perspective view of an outsole of the article of footwear of FIG. 11A.

With reference to FIG. 15, the second support element 106 and the third support element 1111 are coupled to an upper facing surface of the outsole layer 1110. The second support element 106 disposed posterior the third support element 1111.

Figure 16A:
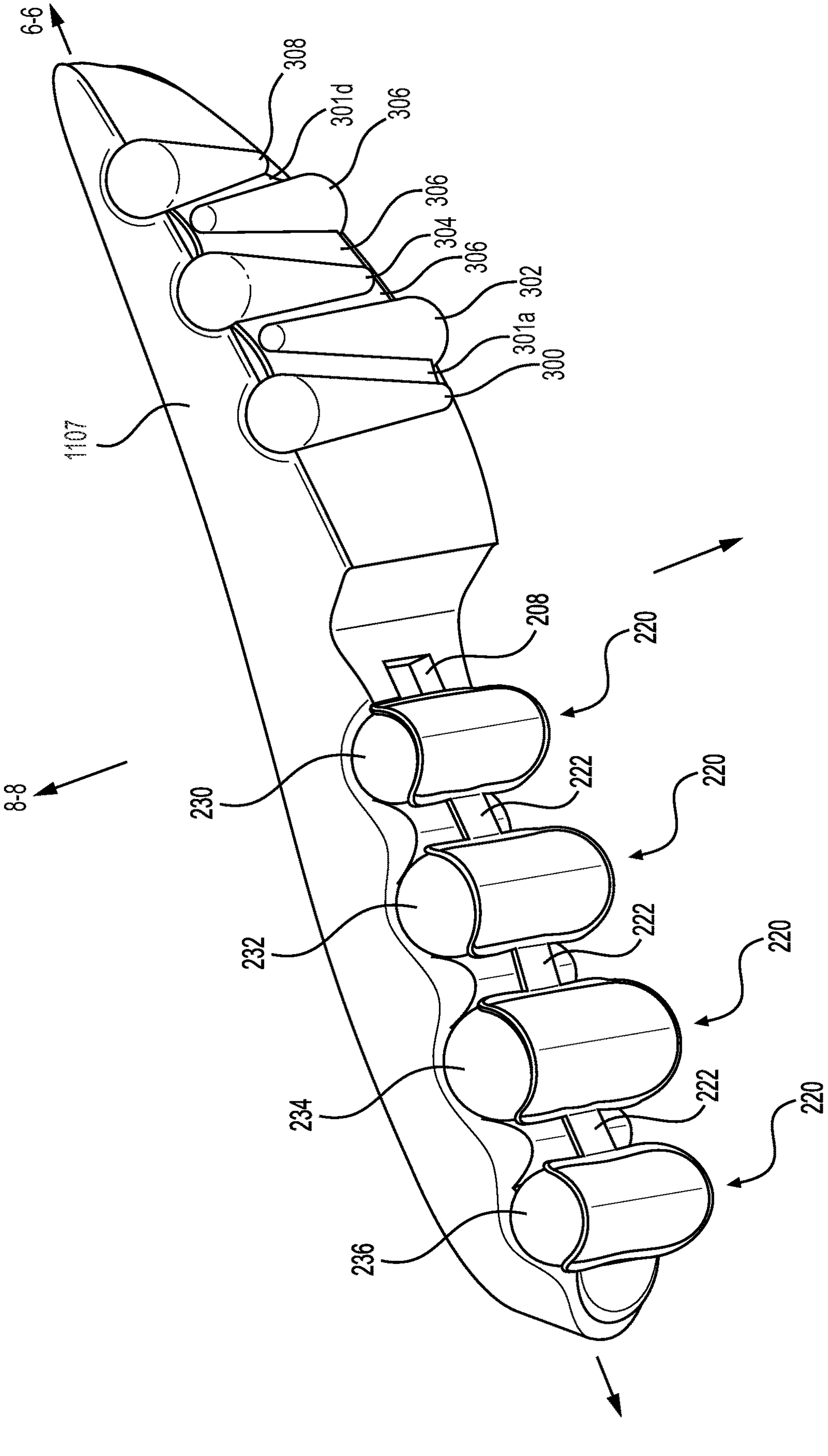
FIG. 16A is a bottom perspective view of a midsole, a first cushioning element, and a second cushioning element of the sole structure of FIG. 12.
Figure 16B:
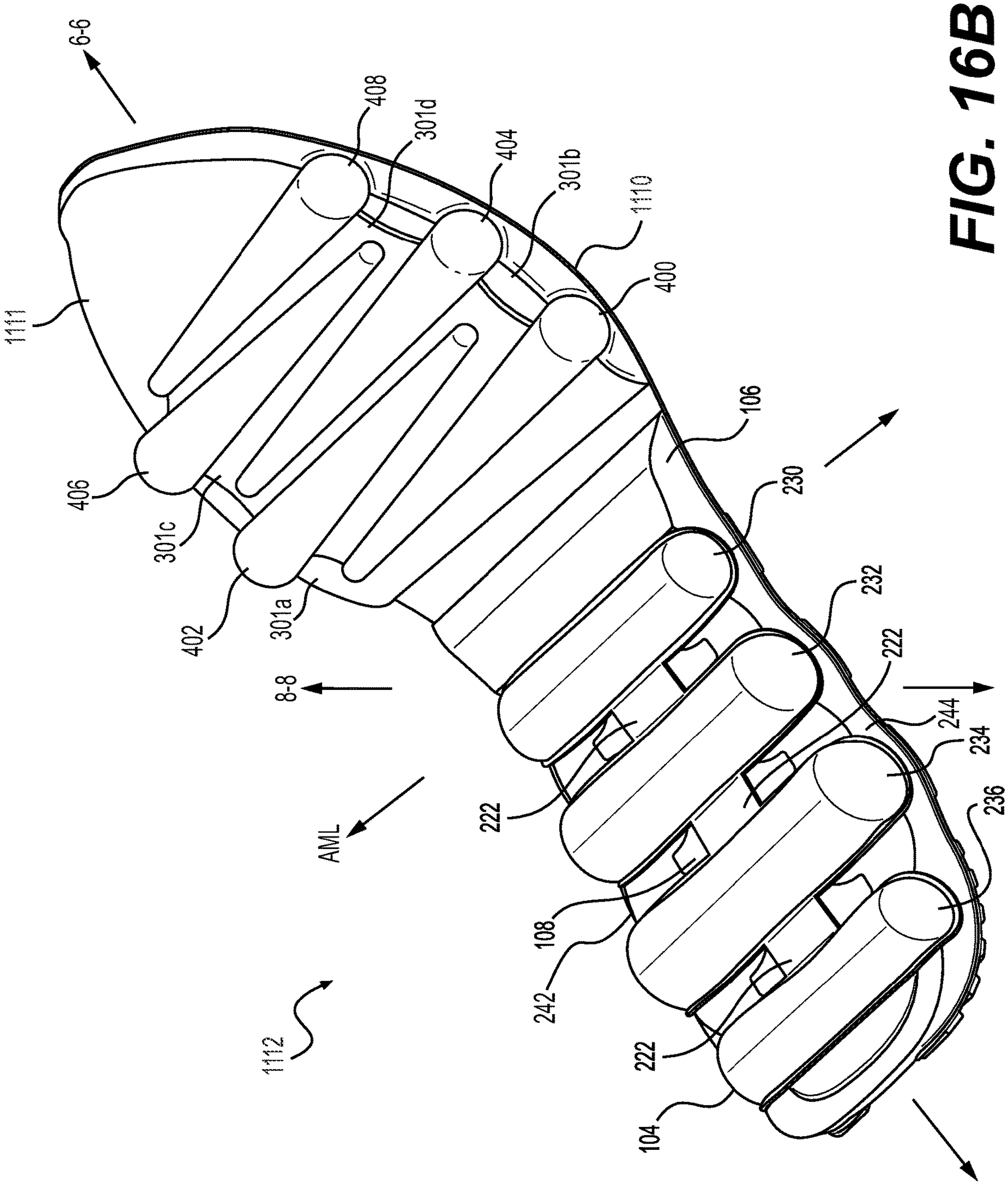
FIG. 16B is a top perspective view of an outsole, a first cushioning element, and a second cushioning element of the sole structure of FIG. 12.

Referring to FIGS. 16A and 16B, the heel cushioning element 104 is coupled to the first support element 1107 and the second support element 106. The forefoot cushioning element 1114 is coupled to the third support element 1111 and the first support element 1107. The heel cushioning element 104 is coupled to the first support element 1107 substantially similarly to that described with respect to FIG. 7A. The one or more tubes 300, 302, 304, 306, and 308 of the forefoot cushioning element 1114 fit within the confines of cut-outs 400, 402, 404, 406, and 408 (shown in FIG. 15) and recesses 1210 of first support element 1107. When assembled, the cut-outs 400, 402, 404, 406, and 408 form a continuous receiving area for the one or more tubes 300, 302, 304, 306, and 308. In an example, the recesses 1210 of the first support element 1107 rest on a top surface of the tubes 300, 302, 304, 306, and 308 and the flat surfaces 1212 mate with the web areas 301*a*, 301*b*, 301*c*, and 301*d*. It is contemplated that in alternative examples, the recesses 1210 of first support element 1107 do not contact the top surface of the tubes 300, 302, 304, 306, and 308. In further alternative examples, the recesses 1210 contact outer peripheries of the tubes 300, 302, 304, 306, and 308, but do not contact a central portion of the tubes 300, 302, 304, 306, and 308.

Figure 17:
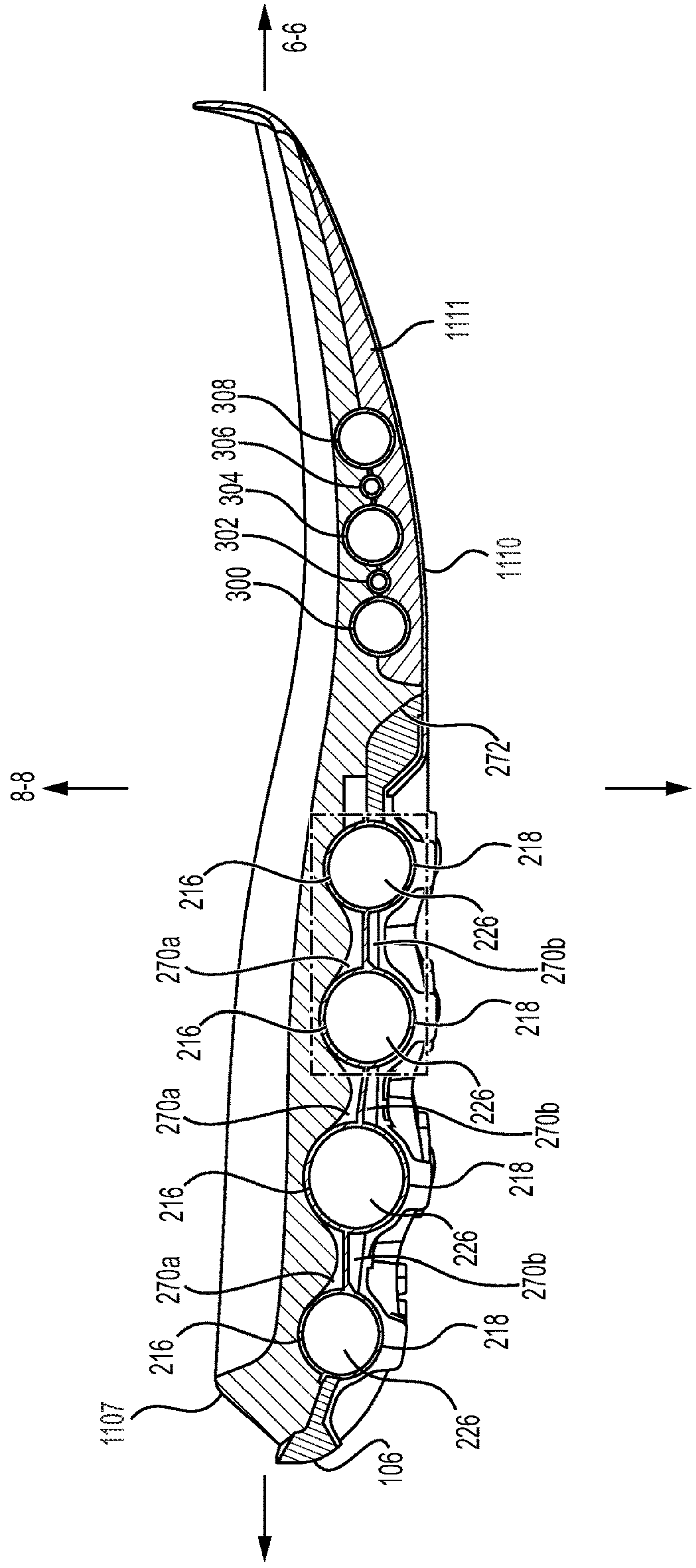
FIG. 17 is a cross-sectional view of the sole structure of article of footwear of FIG. 11A.

Referring to FIG. 17, the outer surfaces of the forefoot cushioning element 1114 are enclosed (i.e. not exposed or open) at regions anterior to and at regions posterior to each of tubes 300, 302, 304, 306, and 308, when the footwear 1000 is fully assembled.

Figure 18:
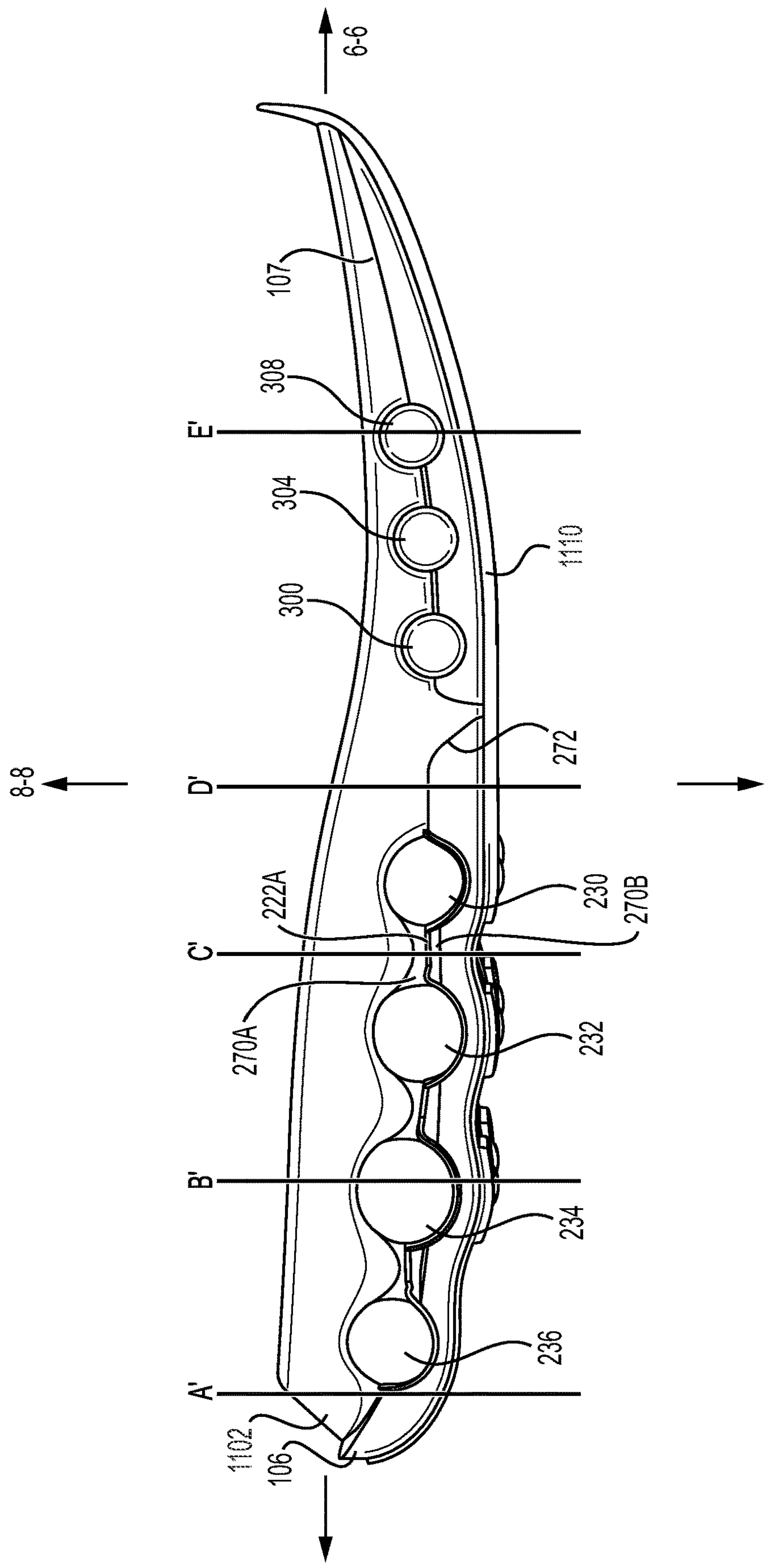
FIG. 18 is a side view of the sole structure of the article of footwear of FIG. 11A.

Referring to FIG. 18, when viewing the exterior of the footwear 1000 from the ground up, the sole structure may include some combination of the outsole layer 1110, the coupling portion 108, the second support element 106, the heel cushioning element 104, the first support element 1107, the forefoot cushioning element 1114, and the third support element 1111.

When viewing the stacked sole structure from the ground up along the exterior path of line A', the stacked sole structure may include the outsole layer 1110 and the first support element 1107. When viewed along the exterior path of line B', the stacked sole structure may include the outsole layer 1110, the second support element 106, one of tubes 230, 232, 234, and 236 of the heel cushioning element 104, and the first support element 1107. When viewed along the exterior path of line C', the stacked sole structure may include the outsole layer 1110, the exposed gap 270B, the web area 222, the exposed gap 270A, and the first support element 1107. When viewed along the exterior path of line D', the stacked sole structure may include the outsole layer 1110, the second support element 106, and the first support element 1107. When viewed along the exterior path of line E', the stacked sole structure may include the outsole layer 1110, the third support element 1111, the forefoot cushioning element 1114, and the first support element 1107.

The combination of the first support element 1107, the second support element 106, and the third support element 1111 enclosing the heel cushioning element 104 and the forefoot cushioning element 1114 provides improved sensation and performance during use of the article of footwear 10. In an exemplary embodiment, when the heel cushioning element 104 and the forefoot cushioning element 1114 are fluid-filled bladders, the first support element 1107 is an elastomeric material, the second support element 106 is an elastomeric material, and the third support element 1111 is an elastomeric material, the sole structure 1001 provides a uniquely durable and comfortable sensation to the article of footwear 1000.

Figure 19:
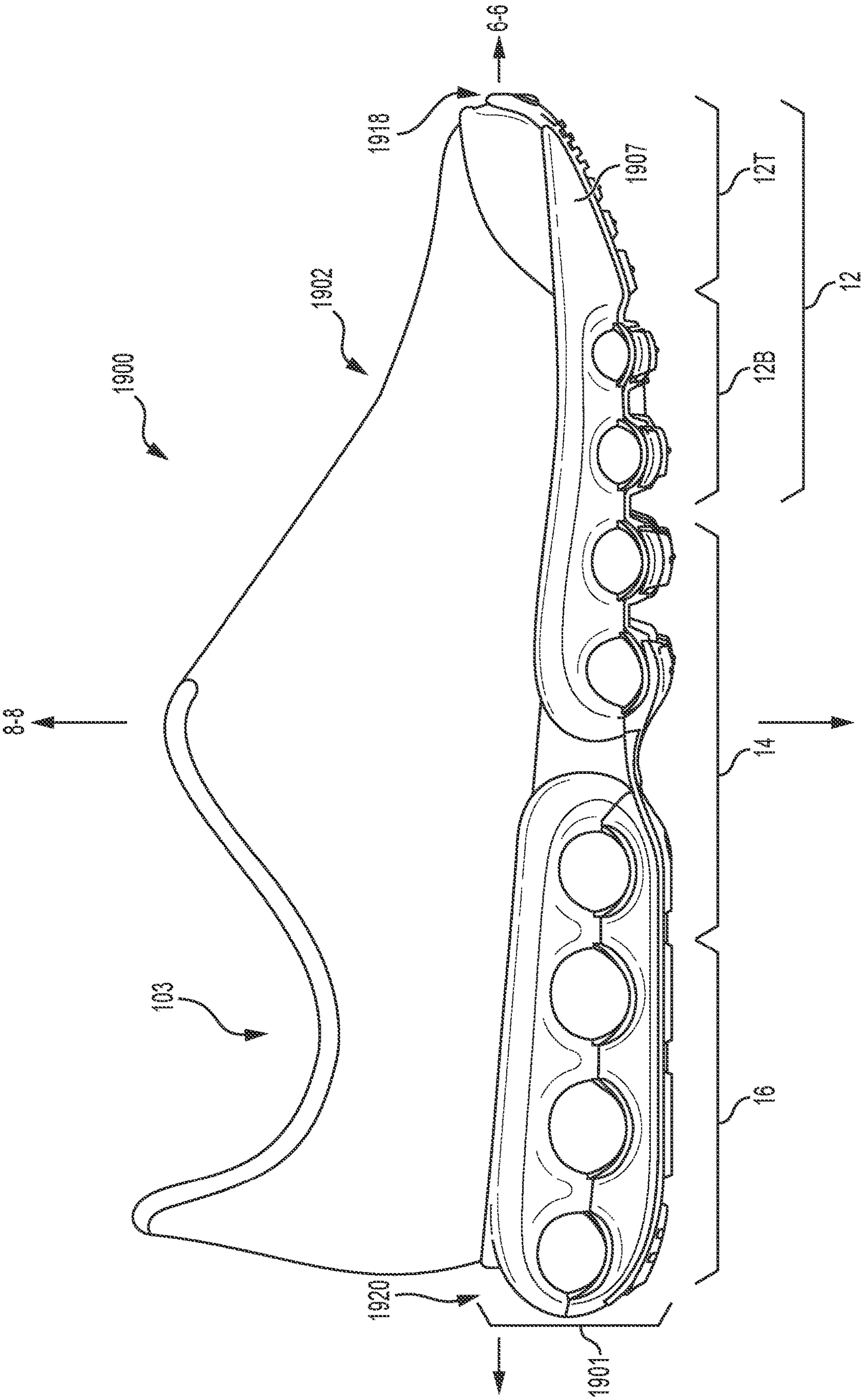
FIG. 19 is a side view of an alternative embodiment of an article of footwear.

As shown in FIG. 19, footwear 1900 includes a sole structure 1901 and an upper 1902 attached to the sole structure 1901. The article of footwear 1900 is similarly divided as article of footwear 10 including the forefoot region 12, the mid-foot region 14, and the heel region 16. The footwear 1900 further includes an anterior end 1918 including a forward-most point of the forefoot region 12, and a posterior end 1920 including a rearward-most point of the heel region 16. For ease of discussion, the footwear 1900 is discussed with reference to the longitudinal axis 6-6, the medial-lateral axis AML (shown in FIG. 21A), and the vertical axis 8-8, where the longitudinal axis 6-6, the medial-lateral axis AML, and the vertical axis 8-8 are perpendicular to each other. The longitudinal axis 6-6 of the footwear 1900 extends along a length of the footwear 1900 from the anterior end 1918 to the posterior end 1920, and generally divides the footwear 1900 into a medial side 1922 and a lateral side 1924 (shown in FIG. 22). The medial-lateral axis AML extends from medial side 1922 to lateral side 1924. Accordingly, the medial side 1922 and the lateral side 1924 respectively correspond with opposite sides of the footwear 1900 and extend from the anterior end 1918 to the posterior end 1920. The vertical axis 8-8 extends from a bottom (i.e., ground-contacting portion) of the footwear 1900 to a top of the footwear 1900.

Figure 20:
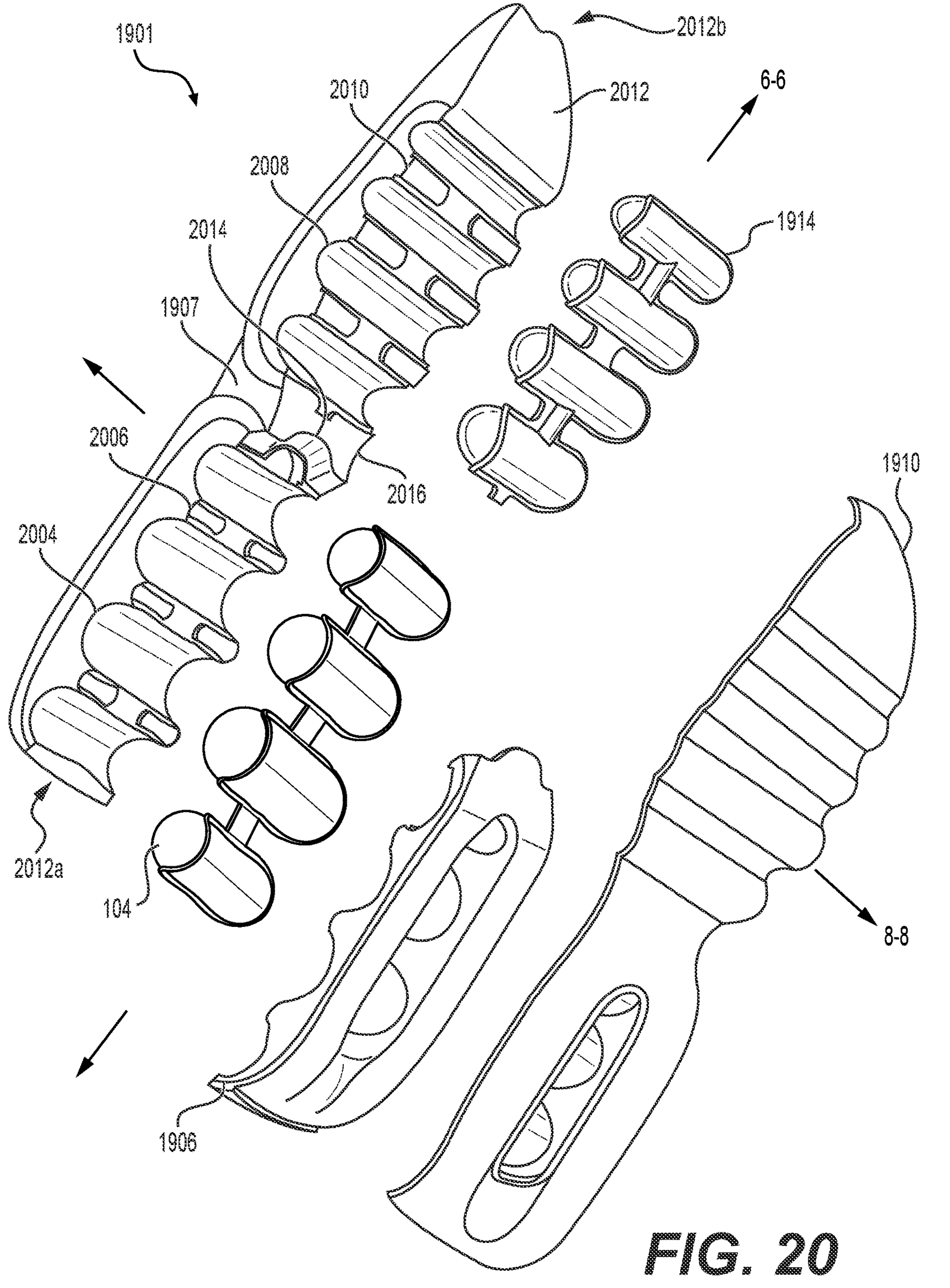
FIG. 20 is an exploded perspective view of an alternative embodiment of the sole structure of FIG. 19.

With reference to FIG. 20, the sole structure 1901 includes a first support element 1907, a second support element 1906, the heel cushioning element 104, a forefoot cushioning element 1914, and an outsole layer 1910. The forefoot cushioning element 1914 is a fluid-filled cushioning element. Portions of the outsole 1910 are configured to provide a ground-engaging surface of the article of footwear 1900 that directly contacts the ground. The sole structure 1901 is configured to provide cushioning characteristics to the article of footwear 1900.

The first support element 1907 includes a bottom surface 2012. The bottom surface 2012 is disposed opposite of an upper facing surface of the first support element 1907. The bottom surface 2012 includes a posterior portion 2012*a* and an anterior portion 2012*b*. The posterior portion 2012*a* of the bottom surface 2012 extending from the mid-foot region 14 to the heel region 16. The anterior portion 2012*b* of the bottom surface 2012 extending from the mid-foot region 14 to the forefoot region 12. The posterior portion 2012*a* of the bottom surface 2012 including recesses 2004, which are similarly formed to recesses 204, and a first set of raised portions 2006. The first set of raised portions 2006 may be substantially linear. The first set of raised portions 2006 separate adjacent pairs of recesses 2004. A receiving area 2014 is disposed adjacent a forward most recess 2004. Receiving area 2014 may receive a portion of the heel cushioning element 104 substantially similarly to receiving portion 208.

The anterior portion 2012*b* of the bottom surface 2012 includes a plurality of recesses 2008, and a second set of raised portions 2010. The plurality of recesses 2008 may be similarly formed as recesses 2004 and 204, but may be narrower in a lengthwise dimension than the recesses 2004 and 204.

First support element 1907 includes a support material suitable for providing a desired cushioning characteristic to the article of footwear 1900. For example, first support element 1907 may consist of or comprise a polymeric support material. The polymeric support material may be a foamed polymeric support material, as described in greater detail below.

Figure 21A:
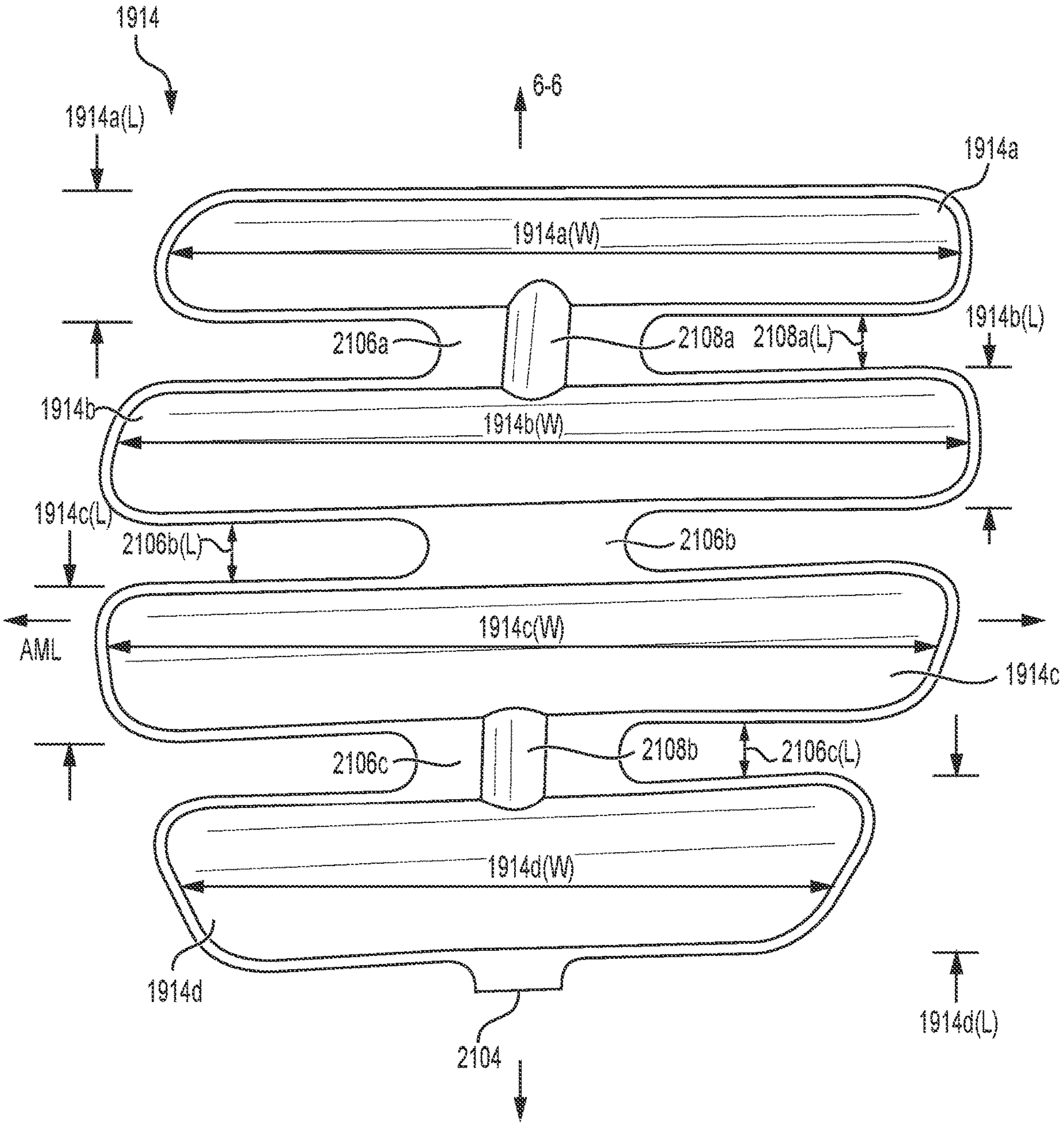
FIG. 21A is a bottom view of an alternative cushioning element of the article of footwear of FIG. 20.
Figure 21B:
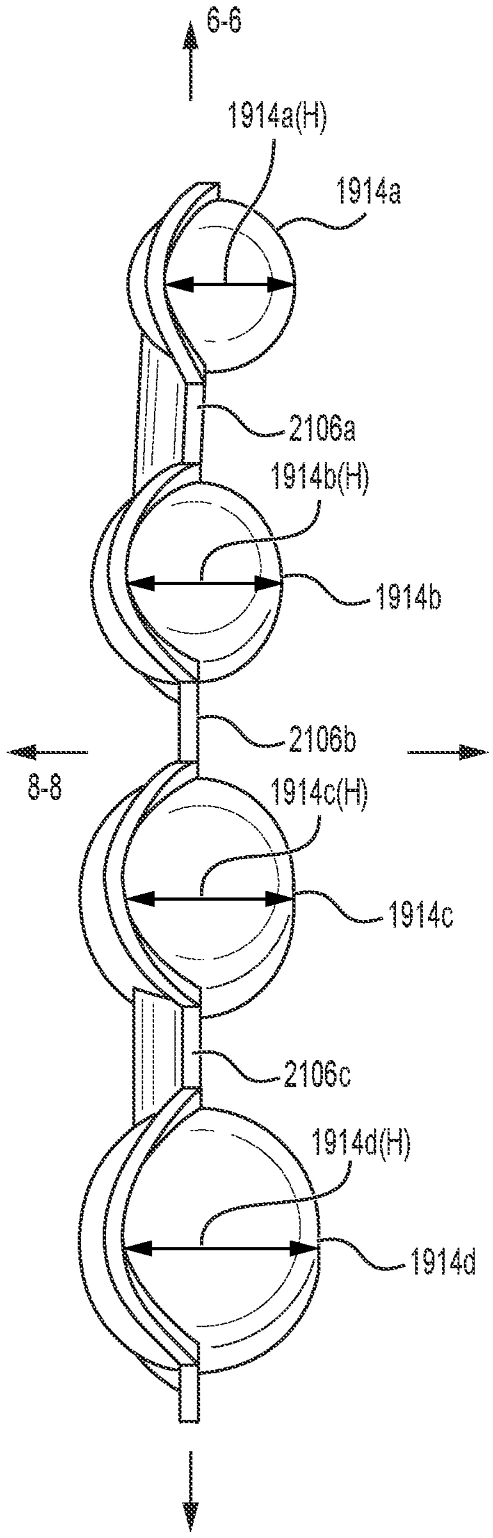
FIG. 21B is a side view of the alternative cushioning element of the article of footwear of FIG. 21A.

With reference to FIG. 21A, the cushioning element 1914 is a fluid-filled cushioning element, such as an airbag or bladder. The cushioning element 1914 may comprise a barrier material. The cushioning element 1914 may be similarly constructed as described with respect to cushioning element 104. As shown in FIG. 21A, cushioning element 1914 includes tubes 1914*a*, 1914*b*, 1914*c*, and 1914*d*, distinct web areas 2106*a*, 2106*b*, and 2106*c*, and channels 2108*a* and 2108*b*. It is contemplated that tubes 1914*a*, 1914*b*, 1914*c*, and 1916*d* are cylindrical, triangular, pentagonal, cubed, or the like.

Each of web areas 2106*a*, 2106*b*, and 2106*c* include a dimension along each of the longitudinal axis 6-6, the medial-lateral axis AML, and the vertical axis 8-8. Each web area 2106*a*, 2106*b*, and 2106*c* includes a length, a width, and a thickness. Web area 2106*a* includes a length 2106*a*(L) along the longitudinal axis 6-6, a width 2106*a*(W) along the medial-lateral axis AML (shown in FIG. 21D), and a thickness 2106*a*(*t*) along the vertical axis 8-8 (shown in FIG. 21C). Web area 2106*b* includes a length 2106*b*(L) along the longitudinal axis 6-6, a width 2106*b*(W) along the medial-lateral axis AML (shown in FIG. 21D), and a thickness 2106*b*(*t*) along the vertical axis 8-8 (shown in FIG. 21C). Web area 2106*c* includes a length 2106*c*(L) along the longitudinal axis 6-6, a width 2106*c*(W) along the medial-lateral axis AML (shown in FIG. 21D), and a thickness 2106*c*(*t*) along the vertical axis 8-8 (shown in FIG. 21C). Any one of web areas 2106*a*, 2106*b*, and/or 2106*c* may have the same or different dimensions as another web area 2106*a*, 2106*b*, and/or 2106*c*.

In one example, length 2106*a*(L), length 2106*b*(L), and length 2106*c*(L) are all the same. In another example, each of length 2106*a*(L), length 2106*b*(L), and length 2106*c*(L) are different from one another.

In another example some of the lengths are the same while others are different. For example, length 2106*a*(L) and length 2106*b*(L) have a first length, and length 2106*c*(L) has a second length different than the first length. Or, length 2106*a*(L) and length 2106*c*(L) have a third length, and length 2106*b*(L) has a fourth length different than the third length. As another example, length 2106*b*(L) and length 2106*c*(L) have a fifth length, and length 2106*a*(L) has a sixth length different than the fifth length. In an example, the length 2106*a*(L) is 1 cm, the length 2106*b*(L) is 1 cm, and the length 2106*c*(L) is 1 cm. In another example, the length 2106*a*(L) is 1 cm, the length 2106*b*(L) is 2 cm, and the length 2106*c*(L) is 1 cm. In another example, the length 2106*a*(L) is 1 cm, the length 2106*b*(L) is 1.5 cm, and the length 2106*c*(L) is 2 cm. In another embodiment, the length 2106*a*(L) is 1 cm, the length 2106*b*(L) is 2 cm, and the length 2106*c*(L) is 2 cm. In another example, the length 2106*a*(L) is 1 cm, the length 2106*b*(L) is 1 cm, and the length 2106*c*(L) is 2 cm.

In one example, the dimensions of web areas 2106*a*, 2106*b*, and 2106*c* are formed as ratios of one another. The ratios may all be the same, all different, or a combination of the same and/or different ratios. For example, one length could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another length. As an example, length 2106*a*(L) is 2 cm, length 2106*b*(L) is 1 cm, and length 2106*c*(L) is 0.9 cm making length 2106*b*(L) 0.5 times the length of 2106*a*(L) and length 2106*c*(L) is 0.9 times the length of 2106*b*(L).

In one example, width 2106*a*(W), width 2106*b*(W), and length 2106*c*(W) are all the same. In another example, each of width 2106*a*(W), width 2106*b*(W), and width 2106*c*(W) are different from one another.

In another example some of the lengths are the same while others are different. For example, width 2106*a*(W) and width 2106*b*(W) have a first width, and width 2106*c*(W) has a second width different than the first width. Or, width 2106*a*(W) and width 2106*c*(W) have a third width, and width 2106*b*(W) has a fourth width different than the third width. As another example, width 2106*b*(W) and width 2106*c*(W) have a fifth width, and width 2106*a*(W) has a sixth width different than the fifth width. In an example, the width 2106*a*(W) is 3 cm, the width 2106*b*(W) is 3 cm, and the width 2106*c*(W) is 3 cm. In another example, the width 2106*a*(W) is 3 cm, the width 2106*b*(W) is 3.5 cm, and the width 2106*c*(W) is 3 cm. In another example, the width 2106*a*(W) is 3 cm, the width 2106*b*(W) is 3.5 cm, and the width 2106*c*(W) is 4 cm. In another example, the width 2106*a*(W) is 3 cm, the width 2106*b*(W) is 3.5 cm, and the widths 2106*c*(W) is 3.5 cm. In another example, the width 2106*a*(W) is 3 cm, the width 2106*b*(W) is 3 cm, and the widths 2106*c*(W) is 3.5 cm.

In one example, the dimensions of web areas 2106*a*, 2106*b*, and 2106*c* are formed as ratios of one another. The ratios may all be the same, all different, or a combination of the same and/or different ratios. For example, one width could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another width. As an example, width 2106*a*(W) is 3 cm, length 2106*b*(W) is 1.5 cm, and length 2106*c*(W) is 2.7 cm making length 2106*b*(W) 0.5 times the length of 2106*a*(W) and length 2106*c*(W) is 0.9 times the length of 2106*b*(W).

In one example, thickness 2106*a*(*t*), thickness 2106*b*(*t*), and thickness 2106*c*(*t*) are all the same. In another example, each of thickness 2106*a*(*t*), thickness 2106*b*(*t*), and thickness 2106*c*(*t*) are different from one another.

In another example some of the thicknesses are the same while others are different. For example, thickness 2106*a*(*t*) and thickness 2106*b*(*t*) have a first thickness, and thickness 2106*c*(*t*) has a second thickness different than the first thickness. Or, thickness 2106*a*(*t*) and thickness 2106*c*(*t*) have a third thickness, and thickness 2106*b*(*t*) has a fourth thickness different than the third thickness. As another example, thickness 2106*b*(*t*) and thickness 2106*c*(*t*) have a fifth thickness, and thickness 2106*a*(*t*) has a sixth thickness different than the fifth thickness. In an example, the thickness 2106*a*(*t*) is 0.25 mm, the thickness 2106*b*(*t*) is 0.25 mm, and the thickness 2106*c*(*t*) is 0.25 mm. In another example, the thickness 2106*a*(*t*) is 0.25 mm, the thickness 2106*b*(*t*) is 0.5 mm, and the thickness 2106*c*(*t*) is 0.25 mm. In another example, the thickness 2106*a*(*t*) is 0.25 mm, the thickness 2106*b*(*t*) is 0.35 mm, and the thickness 2106*c*(*t*) is 0.5 mm. In another example, the thickness 2106*a*(*t*) is 0.25 mm, the thickness 2106*b*(*t*) is 0.5 mm, and the thickness 2106*c*(*t*) is 0.5 mm. In another example, the thickness 2106*a*(*t*) is 0.25 mm, the thickness 2106*b*(*t*) is 0.25 mm, and the thickness 2106*c*(*t*) is 0.5 mm.

In one example, the dimensions of web areas 2106*a*, 2106*b*, and 2106*c* are formed as ratios of one another. The ratios may all be the same, all different, or a combination of the same and/or different ratios. For example, one thickness could be any of 0.1, 0.2, 0.25, 0.3, 0.4, 0.5, 0.6, 0.7, 0.75, 0.8, 0.9, 1, 1.25, 1.5, 1.75, 2.0 2.5, 3, 4, 5, or more times another thickness. As an example, thickness 2106*a*(*t*) is 0.5 mm, thickness 2106*b*(*t*) is 0.25 mm, and thickness 2106*c*(*t*) is 0.45 mm making thickness 2106*b*(*t*) 0.5 times the thickness of 2106*a*(*t*) and thickness 2106*c*(*t*) is 0.9 times the thickness of 2106*b*(*t*). The barrier films 216, 218 of tubes 230, 232, 234, and 236 described earlier are substantially similar to films of tubes 1914*a*, 1914*b*, 1914*c*, and 1914*d*.

With continued reference to FIG. 21A, the tubes 1914*a*, 1914*b*, 1914*c*, and 1914*d* are shown in a fluid-filled (e.g., FIGS. 21A-21D) state. The tubes 1914*a*, 1914*b*, 1914*c*, and 1914*d* are filled to include any suitable fluid, such as a gas or liquid. In an aspect, the gas includes air, nitrogen gas ($N_2$), inert gasses, or any other suitable gas. In other examples, the tubes 1914*a*, 1914*b*, 1914*c*, and 1914*d* include other media, such as pellets, beads, ground recycled material, and the like (e.g., foamed beads and/or rubber beads). The fluid provided to the tubes 1914*a*, 1914*b*, 1914*c*, and 1914*d* results in the tubes 1914*a*, 1914*b*, 1914*c*, and 1914*d* being pressurized.

The tubes 1914*a*, 1914*b*, 1914*c*, and 1914*d* are pressurized to a value ranging between about 3 pounds per square inch (PSI) to about 25 PSI (about 20 kilopascals (kPA) to about 172 kPA). Alternatively, the fluid provided to the tubes 1914*a*, 1914*b*, 1914*c*, and 1914*d* may be at atmospheric pressure such that the tubes 1914*a*, 1914*b*, 1914*c*, and 1914*d* are not pressurized but, rather, each contains a volume of fluid at atmospheric pressure.

The tubes 1914*a*, 1914*b*, 1914*c*, and 1914*d* are configured to retain a fluid, particularly a gas such as air, oxygen or nitrogen. The tubes 1914*a*, 1914*b*, 1914*c*, and 1914*d* may have a gas transmission rate for nitrogen gas that is at least about ten (10) times lower than a nitrogen gas transmission rate for a butyl rubber layer of substantially the same dimensions. In one embodiment, the tubes 1914*a*, 1914*b*, 1914*c*, and 1914*d* may have a nitrogen gas transmission rate of 15 cubic-centimeter/square-meter-atmosphere-day ($cm^3/m^2\cdot atm\cdot day$) or less for an average film thickness of 500 micrometers (based on thicknesses of barrier films 216, 218). In further aspects, the transmission rate is 10 $cm^3/m^2\cdot atm\cdot day$ or less, 5 $cm^3/m^2\cdot atm\cdot day$ or less, or 1 $cm^3/m^2\cdot atm\cdot day$ or less. The forefoot cushioning element 1914 seals the fluid (e.g., air) within an interior void 2110*a*, 2110*b*, 2110*c*, and 2110*d* of each tube 1914*a*, 1914*b*, 1914*c*, and 1914*d* (shown in FIG. 21C). In one example, interior voids 2110*a* and 2110*b* may be in fluid communication with one another. In one example, interior voids 2110*c* and 2110*d* may be in fluid communication with one another. In another example, interior voids 2110*a* and 2110*b* may not be in fluid communication with one another. In another example, interior voids 2110*c* and 2110*d* may not be in fluid communication with one another. In another example, some of interior voids 2110*a*, 2110*b*, 2110*c*, and 2110*d* may be in fluid communication while others of interior voids 2110*a*, 2110*b*, 2110*c*, and 2110*d* are not in fluid communication The web areas 2106*a*, 2106*b*, and 2106*c* are disposed at a vertical midpoint of adjacent tubes 1914*a*, 1914*b*, 1914*c*, and 1914*d*. In one example, the web areas 2106*a*, 2106*b*, and 2106*c* are disposed vertically and/or horizontally offset from the vertical midpoint of adjacent tubes 1914*a*, 1914*b*, 1914*c*, and 1914*d*. In an exemplary embodiment, the web areas 2106*a*, 2106*b*, and 2106*c* are co-planar with one another. It is contemplated that the web areas 2106*a*, 2106*b*, and 2106*c* are not co-planar, but rather rest in offset planes from one another. In other embodiments, some of the web areas 2106*a*, 2106*b*, and 2106*c* are co-planar with one another while other of web areas 2106*a*, 2106*b*, and 2106*c* are not co-planar with one another.

In an example, the total number of tubes of the one or more tubes 1914*a*, 1914*b*, 1914*c*, and 1914*d* is four. It is contemplated that the number of tubes may be one, two, three, four, or more to provide a desired cushioning characteristic. In the example, the tubes 1914*a*, 1914*b*, 1914*c*, and 1914*d* may be arranged such that there is a first, front most tube 1914*a*, one or more central tubes (e.g. second and third tubes) 1914*b*, 1914*c*, and a fourth, rear most tube 1914*d*. The first tube 1914*a* and the second tube 1914*b* may be shorter in height than the third tube 1914*c* and the fourth tube 1914*d*. The first tube 1914*a* and the second tube 1914*b* may have substantially similar heights. The third tube 1914*c* and the fourth tube 1914*d* may have substantially similar heights. It is contemplated that any one of tubes 1914*a*, 1914*b*, 1914*c*, or 1914*d* may have a height that varies from one another. It is also contemplated that all of tubes 1914*a*, 1914*b*, 1914*c*, or 1914*d* may have substantially similar heights. Having tubes 1914*a*, 1914*b*, 1914*c*, and 1914*d* as shown in the example in FIGS. 21A-21D aids in transition during walking of a user as well as providing a desired form of underfoot cushioning. Additionally, the configuration of tubes 1914*a*, 1914*b*, 1914*c*, and 1914*d* aids in maintaining a proper height of the article of footwear for a desired level of comfort.

As shown in FIG. 21A, tubes 1914*a*, 1914*b*, 1914*c*, and 1914*d* of the forefoot cushioning element 1914 extend from the medial side 1922 of the article of footwear 1900 to the lateral side 1924 of the article of footwear 1900 corresponding to a width (e.g., a medial-lateral diameter) of the one or more tubes 1914*a*, 1914*b*, 1914*c*, and 1914*d*. The widths of each of tubes 1914*a*, 1914*b*, 1914*c*, and 1914*d* extends parallel to the medial-lateral axis AML. The width of a given tube 1914*a*, 1914*b*, 1914*c*, and 1914*d* is measured substantially similarly to the widths of tubes 230, 232, 234, and 236. Tube 1914*a* has a width 1914*a*W. Tube 1914*b* has a width 1914*b*W. Tube 1914*c* has a width 1914*c*W. Tube 1914*d* has a width 1914*d*W. The widths 1914*a*W, 1914*b*W, 1914*c*W, 1914*d*W may range from about 1 to about 18 cm. The widths 1914*a*W, 1914*b*W, 1914*c*W, 1914*d*W may range from about 2 cm to about 15 cm. The widths 1914*a*W, 1914*b*W, 1914*c*W, 1914*d*W may range from about 3 cm to about 12 cm. The widths 1914*a*W, 1914*b*W, 1914*c*W, 1914*d*W may range from about 5 cm to about 10 cm. In an example, width 1914*a*W is about 8 cm. In an example, width 1914*b*W is about 8.5 cm. In an exemplary embodiment, width 1914*c*W is about 8.5 cm. In an example, width 1914*d*W is about 8.25 cm.

In one example, the widths 1914*a*W, 1914*b*W, 1914*c*W, and 1914*d*W of each of the tubes 1914*a*, 1914*b*, 1914*c*, and 1914*d* are substantially similar or the same. In one example, the widths 1914*a*W, 1914*b*W, 1914*c*W, and 1914*d*W of each of the tubes 1914*a*, 1914*b*, 1914*c*, and 1914*d* may vary from one width to another. For example, when moving from the heel region 16 to mid-foot region 14, the widths may decrease. In such an example, width 1914*a*W is less than 1914*b*W, width 1914*b*W is less than 1914*c*W, and width 1914*c*W is less than 1914*d*W. As another example, when moving from the heel region 16 to mid-foot region 14, the widths may increase. In this example, width 1914*a*W is greater than 1914*b*W, width 1914*b*W is greater than 1914*c*W, and width 1914*c*W is greater than 1914*d*W.

In another example, some of the widths are the same while others are different. In one embodiment, some of the widths are greater than other widths. In this example, the tubes 1914*a*, 1914*b*, 1914*c*, and 1914*d* form an hourglass figure when viewed along the vertical axis 8-8. For example, width 1914*a*W and width 1914*b*W have a first width, and width 1914*c*W and width 1914*d*W have a second width greater than the first width.

In one other example, the tubes 1914*a*, 1914*b*, 1914*c*, and 1914*d* form a reverse hourglass figure when viewed along the vertical axis 8-8. For example, width 1914*a*W and width 1914*d*W have a first width, and width 1914*b*W and width 1914*c*W have a second width greater than the first width.

Tubes 1914*a*, 1914*b*, 1914*c*, and 1914*d* of the cushioning element 1914 extend in a longitudinal direction corresponding to a length of the one or more tubes 1914*a*, 1914*b*, 1914*c*, and 1914*d*. The length of each of tubes 1914*a*, 1914*b*, 1914*c*, and 1914*d* extends along or parallel to the longitudinal axis 6-6. The length is measured using a line extending from a first end inclusive of a first center point to a second end inclusive of a second center point in the longitudinal direction, similar to how length is measured with respect to tubes 230, 232, 234, and 236. Any line taken between the first end and the second end and parallel to the longitudinal axis 6-6 is a length of the respective tube.

Tube 1914*a* has a length 1914*a*(L). Tube 1914*b* has a length 1914*b*(L). Tube 1914*c* has a length 1914*c*(L). Tube 1914*d* has a length 1914*d*(L). The lengths 1914*a*(L), 1914*b* (L), 1914*c*(L), 1914*d*(L) is between about 0.5 cm-about 4 cm. In an example, length 1914*a*(L) is about 2 cm. In an example, length 1914*b*(L) is about 2.5 cm. In an exemplary embodiment, length 1914*c*(L) is about 3 cm. In an example, length 1914*d*(L) is about 3.5 cm.

In one example, the length 1914*a*(L), 1914*b*(L), 1914*c* (L), and 1914*d*(L) of each of the tubes 1914*a*, 1914*b*, 1914*c*, and 1914*d* are substantially similar or the same. In one example, the lengths 1914*a*(L), 1914*b*(L), 1914*c*(L), and 1914*d*(L) of each of the tubes 1914*a*, 1914*b*, 1914*c*, and 1914*d* may vary from one length to another. For example, when moving from the heel region 16 to mid-foot region 14, the lengths may decrease. In such an example, length 1914*a*(L) is less than 1914*b*(L), length 1914*b*(L) is less than 1914*c*(L), and length 1914*c*(L) is less than 1914*d*(L).

As another example, when moving from the heel region 16 to mid-foot region 14, the lengths may increase. In this example, length 1914*a*(L) is greater than 1914*b*(L), length 1914*b*(L) is greater than 1914*c*(L), and length 1914*c*(L) is greater than 1914*d*(L). For example, length 1914*a*(L) is about 5% greater than length 1914*b*(L), length 1914*b*(L) is about 5% greater than length 1914*c*L, and length 1914*c*L is about 5% greater than length 1914*d*(L).

In one example, a first (inner) set of lengths have a first value while a second (outer) set of the lengths have a second value. For example, the first set of lengths comprises 1914*b* (L) and 1914*c*(L) and the second set of lengths comprises 1914*d*(L) and 1914*a*(L). The first set of lengths can have a first value that is less than a second value of the second set of lengths. As another example, the first set of lengths can have a first value that is greater than a second value of the second set of lengths.

Still referring to FIG. 21A, the first tube 1914*a* is connected to second tube 1914*b* via the web area 2106*a*. The first tube 1914*a* is spaced apart from the second tube 1914*b* by a first distance corresponding to the length 2106*a*(L) of the web area 2106*a*. First tube 1914*a* is connected to the second tube 1914*b* at a posterior facing side of first tube 1914*a*. Second tube 1914*b* is connected to first tube 1914*a* at an anterior facing side of second tube 1914*b*. The first tube 1914*a* and the second tube 1914*b* may additionally be connected by channel 2108*a*. The second tube 1914*b* is connected to third tube 1914*c* via the web area 2106*b*. The second tube 1914*b* is spaced apart from the third tube 1914*c* by a second distance corresponding to the length 2106*b*(L) of the web area 2106*b*. Second tube 1914*b* is connected to third tube 1914*c* at a posterior facing side of second tube 1914*b*. Third tube 1914*c* is connected to second tube 1914*b* at an anterior facing side of third tube 1914*c*. The third tube 1914*c* is connected to the fourth tube 1914*d* via the web area 2106*c*. The third tube 1914*c* is spaced apart from the fourth tube 1914*d* by a third distance corresponding to the length 2106*c*(L) of the web area 2106*c*. Fourth tube 1914*d* is connected to third tube 1914*c* at an anterior facing side of fourth 1914*d*. Third tube 1914*c* is connected to fourth tube 1914*d* at a posterior facing side of third tube 1914*c*. The third tube 1914*c* and the fourth tube 1914*d* may additionally be connected by channel 2108*b*. In other words, each of the web areas 2106*a*, 2106*b*, and 2106*c* interconnect two of the tubes 1914*a*, 1914*b*, 1914*c*, and 1914*d*. In an example, each of the first distance, the second distance, and the third distance are the same. In alternate examples, each of the first distance, the second distance, and the third distance vary from one another. In an example, the first distance, the second distance, and the third distance are about 9 mm. Alternatively, the first distance, the second distance, and the third distance are about 12 mm. In a further alternative example, the first distance and the third distance are about 12 mm and the second distance is about 9 mm.

In one example, the distances are substantially similar or the same. In one example, the distances vary from one distance to another. For example, when moving from the heel region 16 to mid-foot region 14, the distances may decrease. In such an example, the third distance is less than the second distance and the second distance is less than the second distance. As another example, when moving from the heel region 16 to mid-foot region 14, the distances may increase. In this example, the third distance is greater than the second distance and the second distance is greater than the first distance D1.

In one example, the first distance, the second distance, and the third distance are all the same. In another example, each of the first distance, the second distance, and the third distance are different from one another.

Figure 21C:
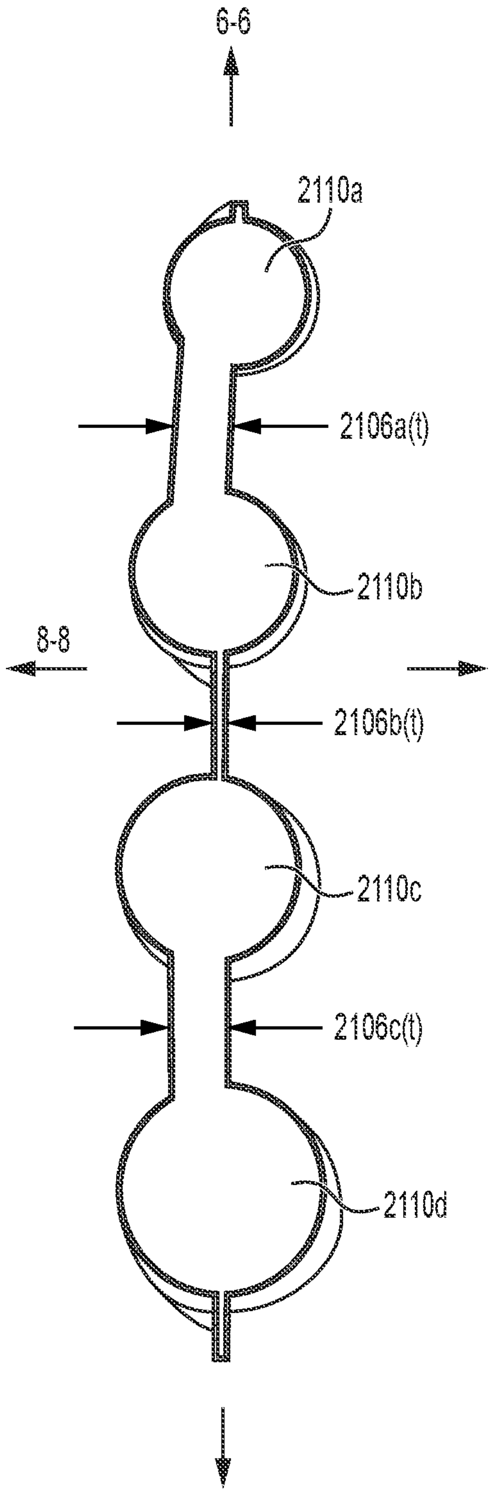
FIG. 21C is a cross-sectional of the alternative cushioning element of FIG. 21B taken along the axis 6-6.
Figure 21D:
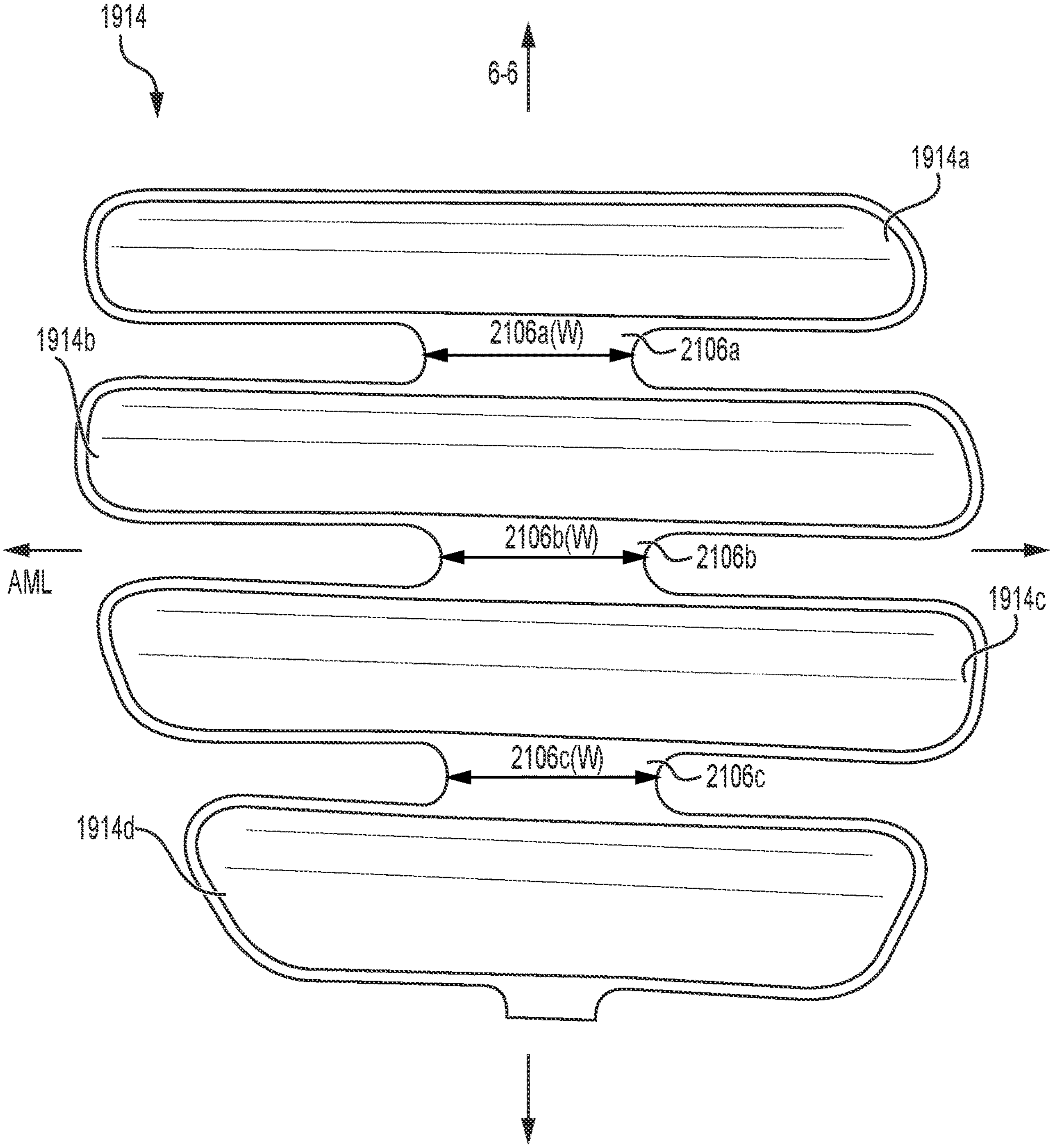
FIG. 21D is a top view of the alternative cushioning element of FIG. 20.

With reference to FIG. 21C, tubes 1914*a*, 1914*b*, 1914*c*, and 1914*d* of the cushioning element 1914 include an average cross-sectional dimension (e.g., an average diameter). The average diameter can be the average of all diameters of a given longitudinal-vertical plane. The longitudinal-vertical plane is taken at a midpoint along the medial-lateral axis AML and may be measured similarly as to tubes 230, 232, 234, and 236. The tubes 1914*a*, 1914*b*, 1914*c*, and 1914*d* can be sliced and viewed along a line extending parallel to the vertical plane 8-8, the line representing a diameter.

In one example, the average diameter of each of the tubes 1914*a*, 1914*b*, 1914*c*, and 1914*d* is the same when viewed in the plane extending parallel to the longitudinal axis 6-6 and/or the vertical axis 8-8. The average diameter is 5 cm in this embodiment. In one example, the average diameter varies when viewed in the plane extending parallel to the longitudinal axis 6-6 and/or the vertical axis 8-8. For example, when moving from the medial side 1922 to the lateral side 1924, the average diameter may decrease. As another example, when moving from the medial side 1922 to the lateral side 1924, the average diameter may increase. As another example when moving from the medial side 1922 to the lateral side 1924, the average diameter is wider at outer areas of the respective tubes 1914*a*, 1914*b*, 1914*c*, and 1914*d* and narrower at inner areas of the respective tubes 1914*a*, 1914*b*, 1914*c*, and 1914*d*.

The tubes 1914*a*, 1914*b*, 1914*c*, and 1914*d* may each include a depression similar to depression 228 of tubes 230, 232, 234, and 236.

In an example, each of tubes 1914*a*, 1914*b*, 1914*c*, and 1914*d* are fluidly isolated from one another. For example, some or all of tubes 1914*a*, 1914*b*, 1914*c*, and 1914*d* may be pressurized to different values. One or more of the tubes 1914*a*, 1914*b*, 1914*c*, and 1914*d* may have a first pressure. One or more of the tubes 1914*a*, 1914*b*, 1914*c*, and 1914*d* may have a second pressure different from the first pressure. One or more of tubes 1914*a*, 1914*b*, 1914*c*, and 1914*d* may have a third pressure different from the first pressure and the second pressure. One or more of the tubes 1914*a*, 1914*b*, 1914*c*, and 1914*d* may have a fourth pressure different from the first pressure, the second pressure, and the third pressure. One or more groups of the one or more tubes 1914*a*, 1914*b*, 1914*c*, and 1914*d* may have the same first pressure. Other groups of the one or more tubes 1914*a*, 1914*b*, 1914*c*, and 1914*d* may have the same second pressure.

In one example, the pressure values of each of the tubes 1914*a*, 1914*b*, 1914*c*, and 1914*d* are substantially similar or the same. In one example, the pressure values of each of the tubes 1914*a*, 1914*b*, 1914*c*, and 1914*d* vary from one tube to another. For example, when moving from the heel region 16 to mid-foot region 14, the pressure values decrease. In such an example, the pressure value of tube 1914*a* is less than the pressure value of tube 1914*b*, the pressure value of tube 1914*b* is less than the pressure value of tube 1914*c*, and pressure value of tube 1914*c* is less than the pressure value of tube 1914*d*.

As another example, when moving from the heel region 16 to mid-foot region 14, the pressure values may increase. In this example, the pressure value of tube 1914*a* is less than the pressure value of tube 1914*b*, the pressure value of tube 1914*b* is less than the pressure value of tube 1914*c*, and pressure value of tube 1914*c* is less than the pressure value of tube 1914*d*.

In one example, a first (anterior) set of tubes has a first pressure value while a second (posterior) set of tubes have a second pressure value. For example, the first set of tubes comprises tubes 1914*a* and 1914*b* and the second set of tubes comprises tubes 1914*c* and 1914*d*. The first set of tubes 1914*b* and 1914*c* have a first pressure value that is less than a second pressure value of the second set of tubes 1914*a* and 1914*d*. As another example, the first set of tubes can have a first pressure value that is greater than a second pressure value of the second set of tubes.

For example, the pressure value ranges from about atmospheric pressure to about 40 PSI (276 kPA). In an example, the first pressure of the first tube 1914*a* and the second pressure of the second tube 1914*b* are about 10 PSI (69 kPA) and the third pressure of the third tube 1914*c* and the fourth pressure of the fourth tube 1914*d* are about 10 PSI (69 kPA). In another example, the first pressure of the first tube 1914*a* and the second pressure of the second tube 1914*b* are about 5 PSI (35 kPA) and the third pressure of the third tube 1914*c* and the fourth pressure of the fourth tube 1914*d* are about 15 PSI (103 kPA). In another example, the first pressure of the first tube 1914*a* and the second pressure of the second tube 1914*b* are about 15 PSI (103 kPA) and the third pressure of the third tube 1914*c* and the fourth pressure of the fourth tube 1914*d* are about 5 PSI (35 kPA). Alternatively, each of tubes 1914*a*, 1914*b*, 1914*c*, and 1914*d* could have the same pressure value. In an example, each of tubes 1914*a*, 1914*b*, 1914*c*, and 1914*d* has a pressure value of about 2 PSI (14 kPA). It is contemplated that in alternate examples, web areas 2106*a*, 2106*b*, and 2106*c* may be configured so as to allow fluid communication between each of tubes 1914*a*, 1914*b*, 1914*c*, and 1914*d*. For example, web areas 2106*a*, 2106*b*, and 2106*c*, may include a fluid channel (not shown) connecting each of the tubes 1914*b*, 1914*b*, 1914*c*, and 1914*d* to allow fluid flow.

Figure 22:
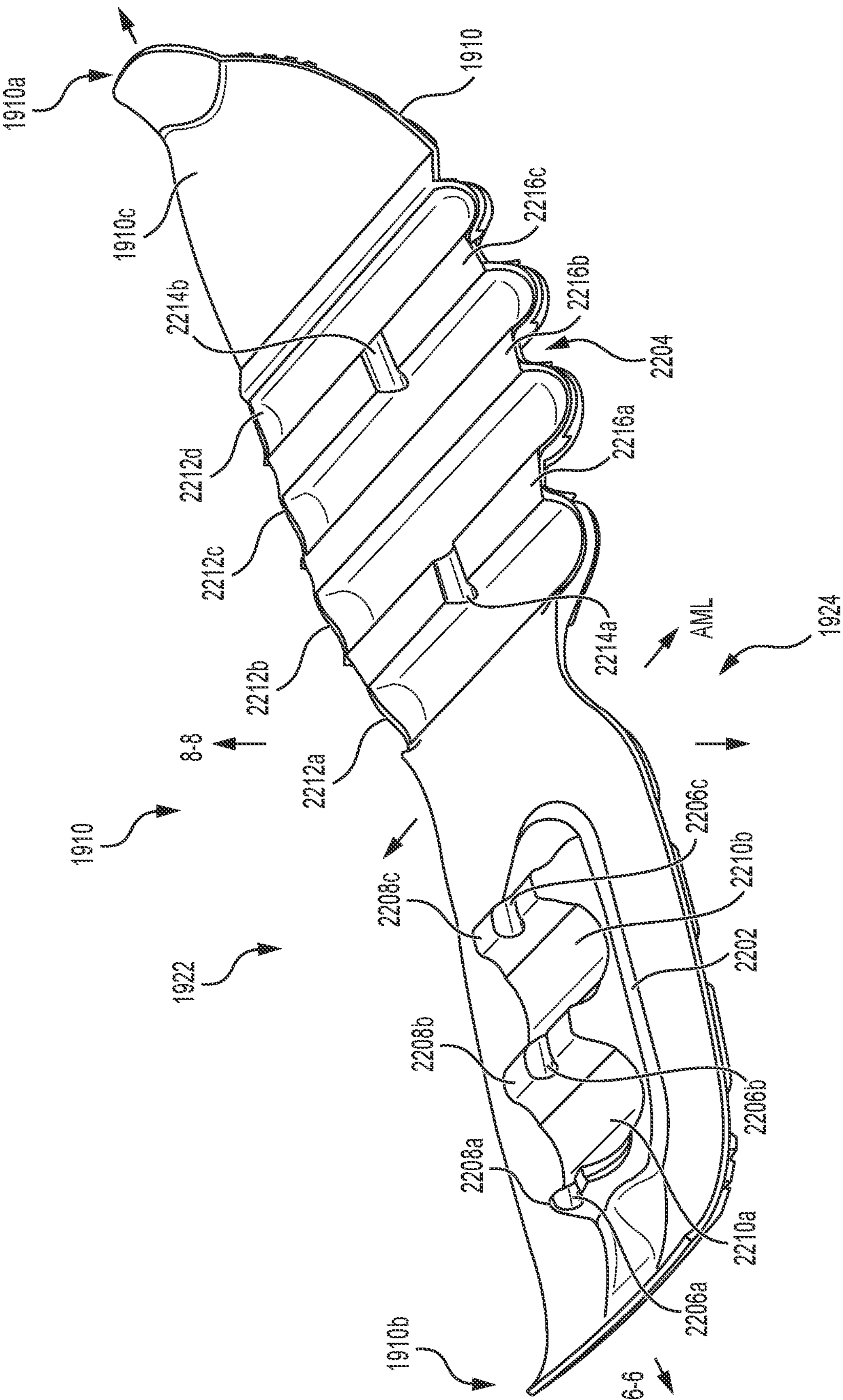
FIG. 22 is a top perspective view of an outsole layer of the article of footwear of FIG. 20.

With reference to FIG. 22, the outsole layer 1910 includes an anterior end 1910*a*, a posterior end 1910*b*, and an upper facing surface 1910*c*. The upper facing surface 1910*c* includes a first engagement area 2202 and a second engagement area 2204. The first engagement area 2202 is disposed posterior to the second engagement area 2204. In other words, the first engagement area 2202 is disposed nearer the posterior end 1910*b* than is the second engagement area 2204. Portions of the upper facing surface 1910*c* between the first engagement area 2202 and the second engagement area 2204 are substantially smooth or flat. Portions lateral and medial of the first engagement area 2202 are substantially smooth or flat. Portions of the upper facing surface 1910*c* anterior the second engagement area 2204 are substantially smooth or flat. The first engagement area 2202 extends toward the upper 1902 from the upper facing surface 1910*c*.

The first engagement area 2202 includes notches 2206*a*, 2206*b*, and 2206*c* disposed on respective ridges 2208*a*, 2208*b*, and 2208*c*. Ridges 2208*a*, 2208*b*, and 2208*c* extend above a plane of the upper facing surface 1910*c*. Notch 2206*a* is disposed on ridge 2208*a*. Notch 2206*b* is disposed on ridge 2208*b*. Notch 2206*c* is disposed on ridge 2208*c*. A depression is disposed between adjacent ridges of ridges 2208*a*, 2208*b*, and 2208*c*. A first depression 2210*a* is disposed between ridges 2208*a* and 2208*b*. A second depression 2210*b* is disposed between ridges 2208*b* and 2208*c*. Each of notches 2206*a*, 2206*b*, and 2206*c* and each depression 2210*a*, 2210*b* is configured to receive a corresponding portion of heel cushioning element 104. The notches 2206*a*, 2206*b*, and 2206*c* may be aligned along the axis 6-6, and may further be configured to receive portions of heel cushioning element 104. Notches 2206*a*, 2206*b*, and 2206*c* are disposed perpendicular to ridges 2208*a*, 2208*b*, and 2208*c* and perpendicular to depressions 2210*a* and 2210*b*. The first engagement area 2202 is raised above the upper facing surface 1910*c* such that the first engagement area 2202 rests in a plane that is different from the upper facing surface 1910*c*.

The second engagement area 2204 includes one or more depressions, one or more flat surfaces, and one or more notches. The one or more depressions include a first depression 2212*a*, a second depression 2212*b*, a third depression 2212*c*, and a fourth depression 2212*d*. The one or more flat surfaces includes a first flat surface 2216*a*, a second flat surface 2216*b*, and a third flat surface 2216*c*. First flat surface 2216*a* is disposed between first depression 2212*a* and second depression 2212*b*. Second flat surface 2216*b* is disposed between second depression 2212*b* and third depression 2212*c*. Third flat surface 2216*c* is disposed between third depression 2212*c* and fourth depression 2212*d*. The one or more notches disposed on the flat surfaces includes a first notch 2214*a* disposed on the first flat surface 2216*a* and a second notch 2214*b* disposed on the third flat surface 2216*c*. Each notch 2214*a* and 2214*b* may be aligned along the axis 6-6. Notches 2214*a* and 2214*b* are disposed perpendicular to flat surfaces 2216*a*, 2216*b*, and 2216*c* and perpendicular to depressions 2212*a*, 2212*b*, 2212*c*, and 2212*d*. Each depression 2212*a*, 2212*b*, 2212*c*, and 2212*d* and each notch 2214*a*, 2214*b* is configured to receive corresponding portions of cushioning element 1914.

Figure 23:
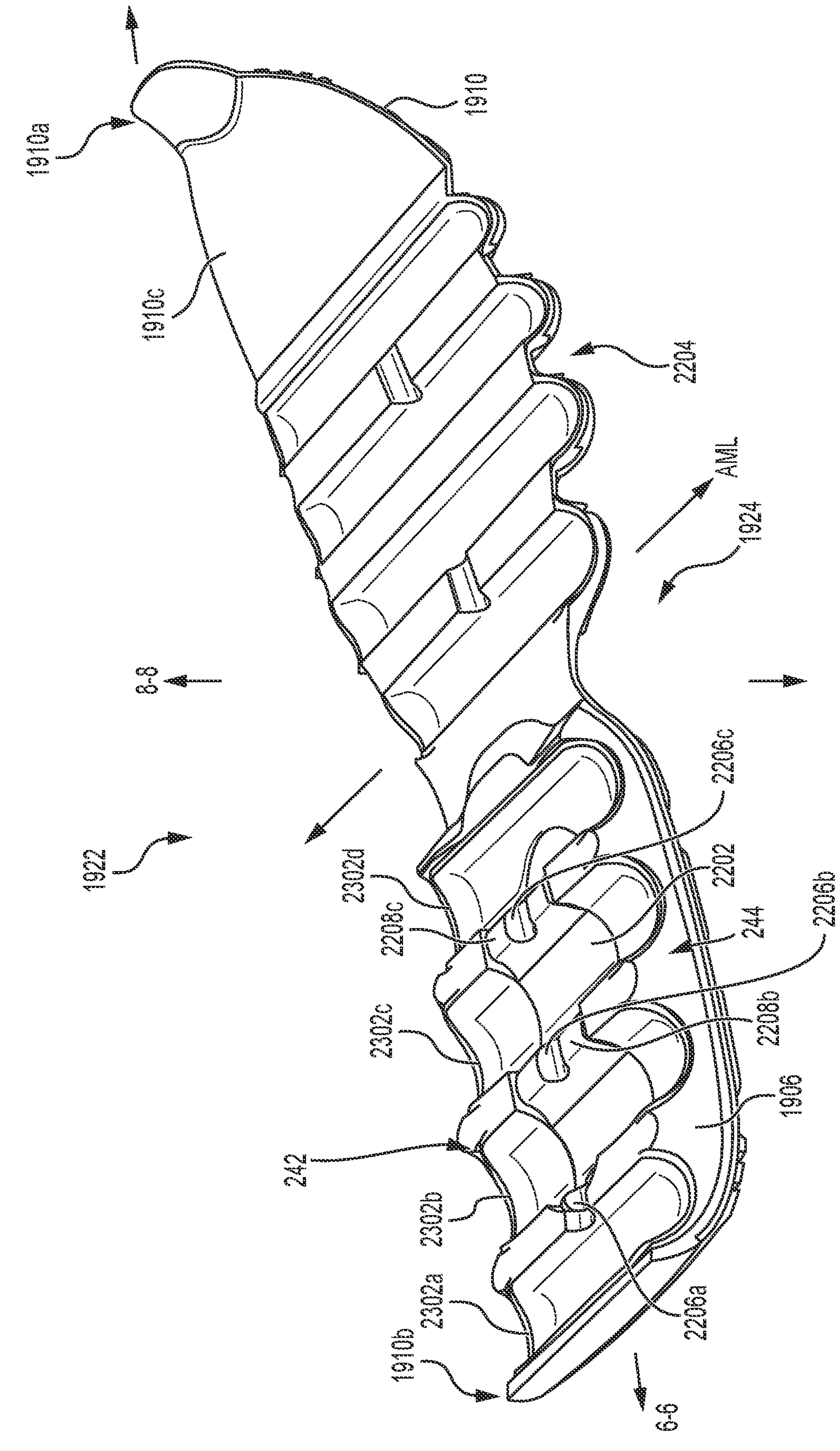
FIG. 23 is a perspective view of an outsole of the article of footwear of FIG. 20.

With reference to FIG. 23, the second support element 1906 is coupled with the first engagement area 2202. The second support element 1906 is similarly formed as coupling portion 108 except recess 2302*a* extends from a medial side of the second support element 1906 to a lateral side of the second support element 1906, and a majority of the recess 2302*d* extends from the medial side of the second support element 1906 to the lateral side of the second support element 1906. A lowest point of the depressions 2210*a*, 2210*b* of the first engagement area 2202 have a lowest point that sits level with the lowest point of the respective recesses 2302*b* and 2302*c* of the second support element 1906. In other words, the depressions 2210*a*, 2210*b* of the first engagement area 2202 and the respective recesses 2302*a*, 2302*b*, 2302*c*, and 2302*d* of the second support element 1906 are flush with one another and thereby form a flush receiving surface. The second support element 1906 is coupled to the upper facing surface 1910*c*, adjacent the posterior end 1910*b*. The ridges 2208*a*, 2208*b*, and 2208*c* extend through a cavity 240 of the second support element 1906 and are aligned with the portions of the respective medial segment 242 and lateral segment 244 separating adjacent recesses 2302*a*, 2302*b*, 2302*c*, and 2302*d* forming a smooth and flush surface. Thus, the second support element 1906 receives the first engagement area 2202.

Figure 24A:
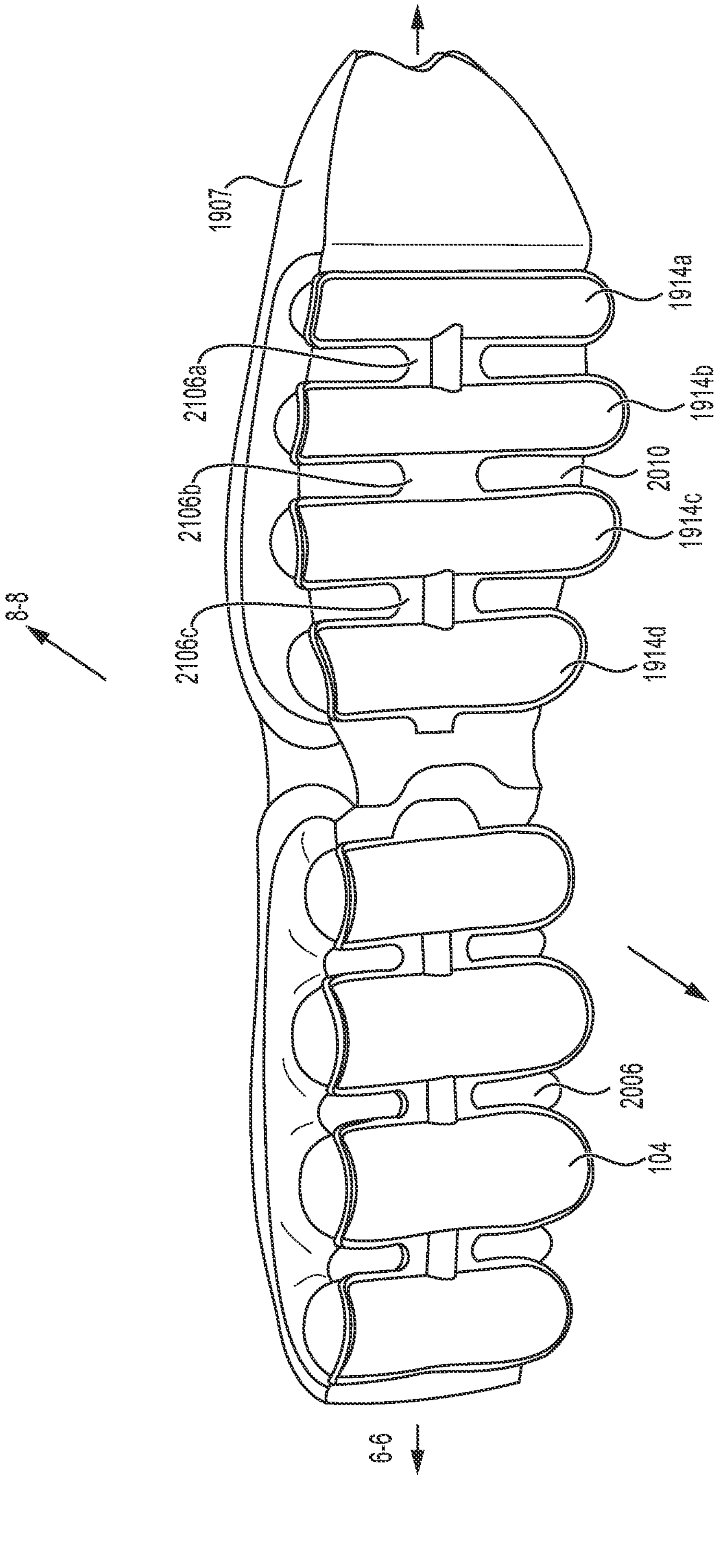
FIG. 24A is a bottom perspective view of a midsole, a first cushioning element, and a second cushioning element of the sole structure of FIG. 20.

Referring to FIG. 24A, the heel cushioning element 104 is coupled to the first support element 1907, and the cushioning element 1914 is coupled to the first support element 1907. The heel cushioning element 104 is disposed such that the raised portions 2006 extend between respective tubes of the heel cushioning element 104. Each respective tube 1914*a*, 1914*b*, 1914*c*, and 1914*d* is disposed in the first support element 1907 such that raised portions 2010 extend between respective tubes 1914*a*, 1914*b*, 1914*c*, and 1914*d*.

Figure 24B:
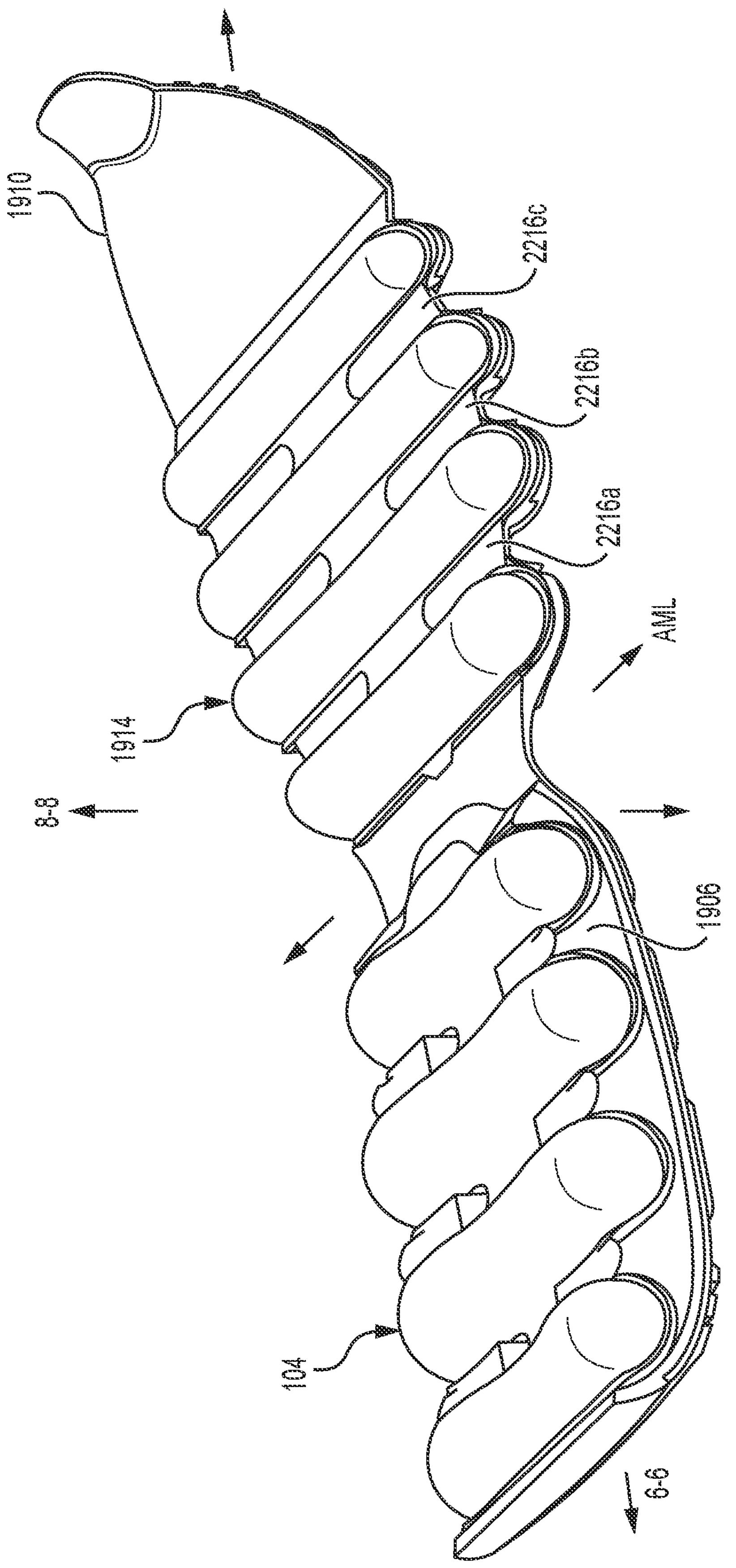
FIG. 24B is a top perspective view of an outsole, a first cushioning element, and a second cushioning element of the sole structure of FIG. 20.

Referring to FIG. 24B, the cushioning element 1914 is coupled with the engagement area 2204 of the outsole layer 1910, and heel cushioning element 104 is coupled with engagement area 2202 of the outsole layer 1910 and second support element 1906. The tubes 1914*a*, 1914*b*, 1914*c*, and 1914*d* are coupled to the depressions 2212*a*, 2212*b*, 2212*c*, and 2212*d*. The heel cushioning element 104 is coupled in a substantially similar manner as described with respect to FIG. 7A. The cushioning element 1914 is coupled directly to the outsole layer 1910. Heel cushioning element 104 is coupled substantially similarly to second support element 1906 and first engagement area 2202 as heel cushioning element 104 is coupled to second support element 106 and coupling portion 108. Respective tubes 1914*a*, 1914*b*, 1914*c*, and 1914*d* are disposed within respective depressions 2212*a*, 2212*b*, 2212*c*, and 2212*d*. Flat surfaces 2216*a*, 2216*b*, and 2216*c* are exposed between respective tubes 1914*a*, 1914*b*, 1914*c*, and 1914*d*. Channels 2106*a*, 2106*b* are disposed within the respective notches 2214*a*, 2214*b*.

The cushioning element 1914 may be adhesively bonded to the outsole layer 1910. The cushioning element 1914 may be coupled or bonded to the outsole layer 1910 in any other suitable manner for bonding the cushioning element 1914 directly to the outsole layer 1910 such that there are no intervening elements apart from the adhering material between the cushioning element 1914 and the outsole layer 1910. In other words, it is meant by direct contact that there are no gaps formed between the cushioning element 1914 and the outsole layer 1910. This configuration of the article of footwear 1900 reduces the overall height of the article of footwear 1900 and provides a desired form of cushioning and stability to the article of footwear 1900.

Figure 25:
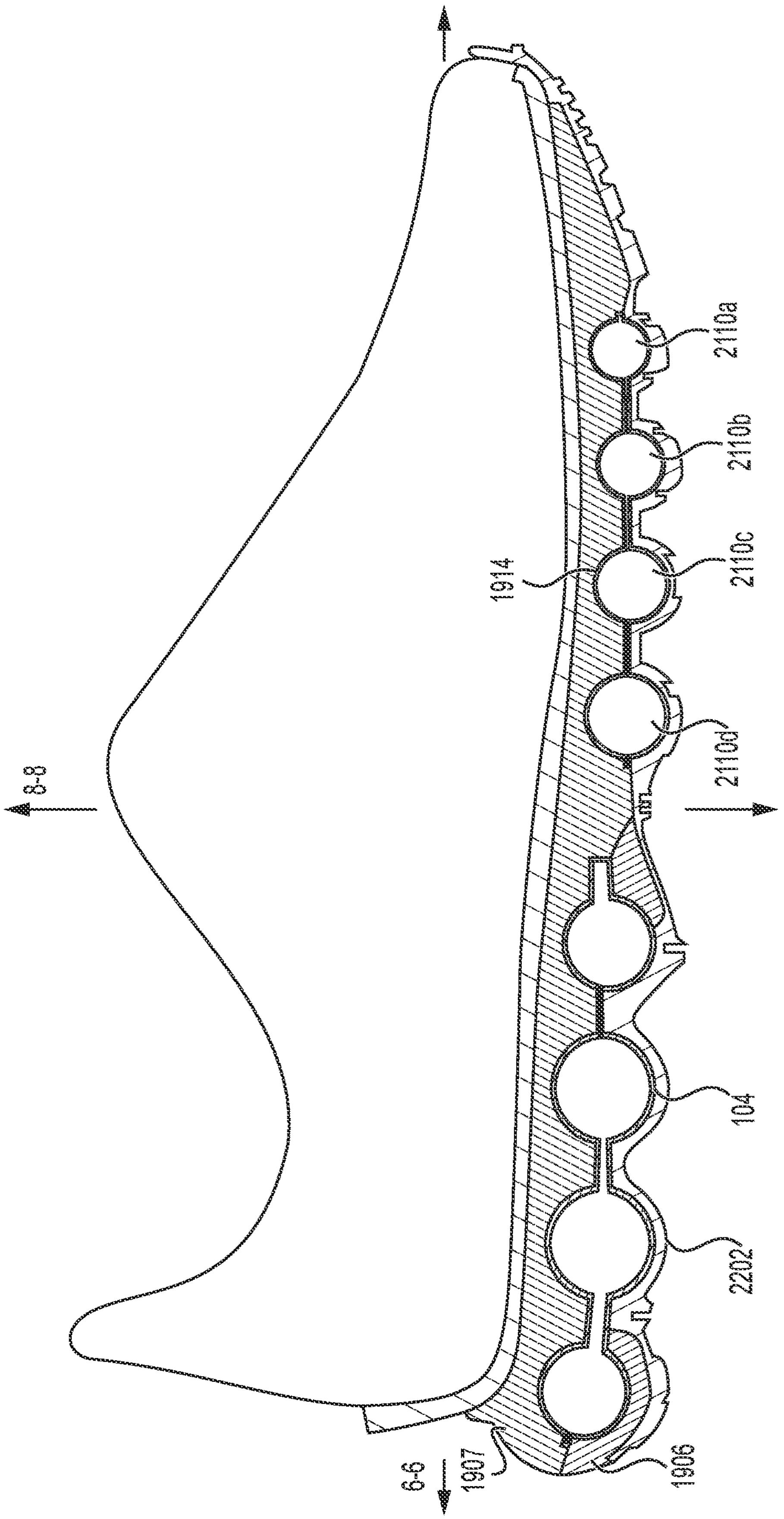
FIG. 25 is a cross-sectional view of the sole structure of article of footwear of FIG. 20.

Referring to FIG. 25, when fully assembled, the flat surfaces 2216*a*, 2216*b*, and 2216*c* mate with the raised portions 2010 such that the first support element 1907 and the outsole layer 1910 directly contact one another. The outer surfaces of the cushioning element 1914 are enclosed (i.e. not exposed or open to the exterior or external environment) at regions anterior to and at regions posterior to each of tubes 1914*a*, 1914*b*, 1914*c*, and 1914*d*, when the footwear 1900 is fully assembled.

Figure 26:
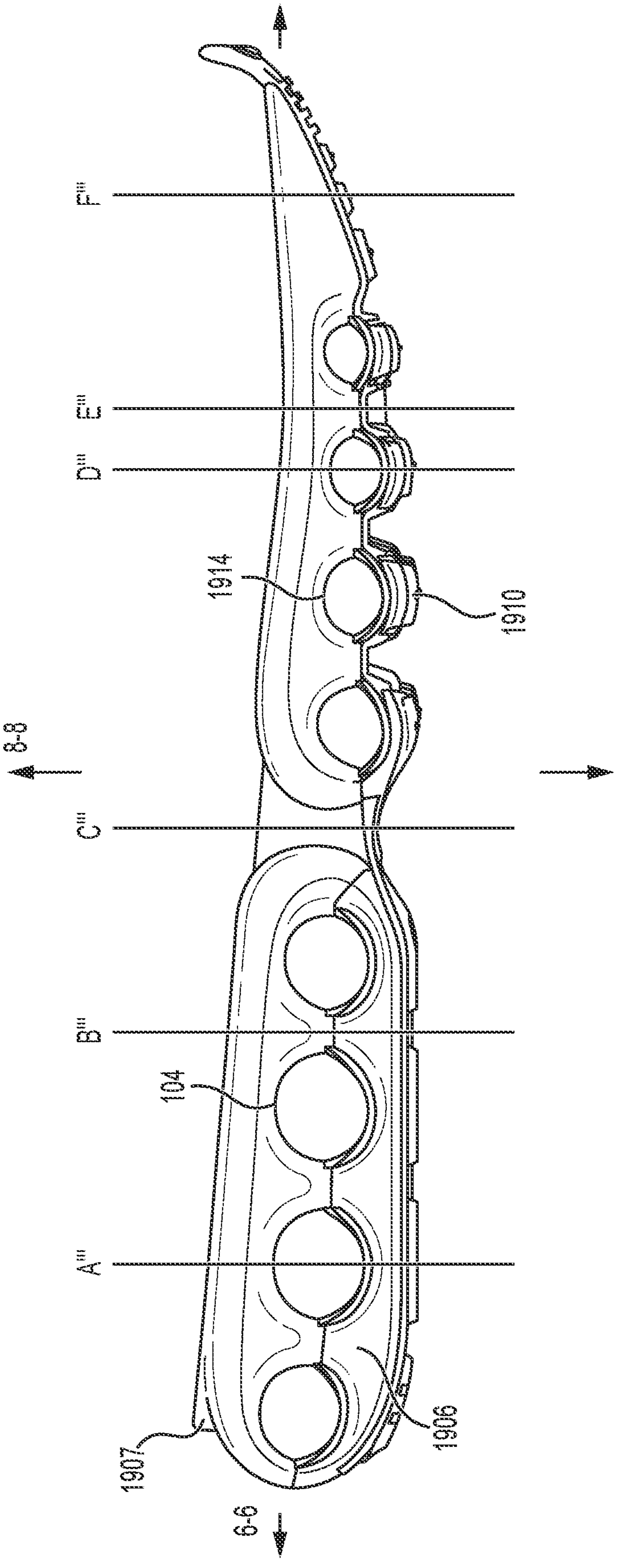
FIG. 26 is a side view of the sole structure of the article of footwear of FIG. 20.

Referring to FIG. 26, when viewing the exterior of the footwear 1900 from the ground up, the sole structure may include some combination of the outsole layer 1910, the second support element 1906, the heel cushioning element 104, the first support element 1907, and the cushioning element 1914.

When viewing the stacked sole structure from the ground up along the exterior path of line A''', the stacked sole structure may include the outsole layer 1910, the second support element 1906, the heel cushioning element 104, and the first support element 1907. When viewed along the exterior path of line B''', the stacked sole structure may include the outsole layer 1910 and the first support element 1907. When viewed along the exterior path of line C''', the stacked sole structure may include the outsole layer 1910, and the first support element 1907. When viewed along the exterior path of line D''', the stacked sole structure may include the outsole layer 1910, the cushioning element 1914, and the first support element 1907. When viewing the stacked sole structure from the ground up along the exterior path of line E''', the stacked sole structure may include the outsole layer 1910 and the first support element 1907. When viewed along the exterior path of line F''', the stacked sole structure may include the outsole layer 1910, and the first support element 1907.

The combination of the first support element 1907, the second support element 1906, and the outsole layer 1910 enclosing a combination of the heel cushioning element 104 and the cushioning element 1914 provides improved sensation and performance during use of the article of footwear 1900. In an exemplary embodiment, when the heel cushioning element 104 and the cushioning element 1914 are fluid-filled bladders, the first support element 1907 is an elastomeric material, the second support element 1906 is an elastomeric material, the sole structure 1901 provides a uniquely durable and comfortable sensation to the article of footwear 1900.

Figure 27:
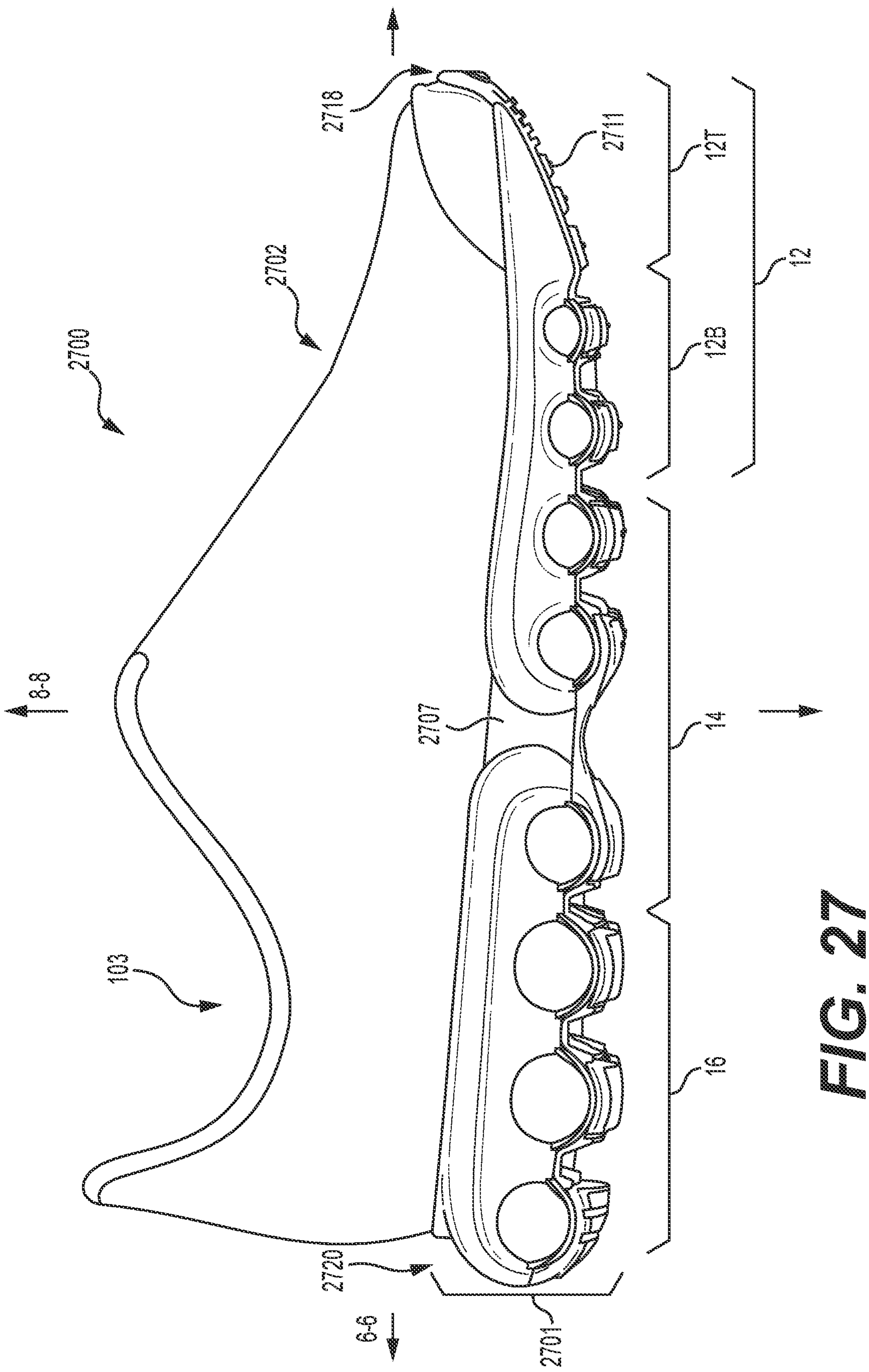
FIG. 27 is a side view of an alternative embodiment of an article of footwear.

As shown in FIG. 27, footwear 2700 includes a sole structure 2701 and an upper 2702 attached to the sole structure 2701. The article of footwear 2700 is similarly divided as article of footwear 10 including the forefoot region 12, the mid-foot region 14, and the heel region 16. The footwear 2700 further includes an anterior end 2718 including a forward-most point of the forefoot region 12, and a posterior end 2720 including a rearward-most point of the heel region 16. For ease of discussion, the footwear 2700 is discussed with reference to the longitudinal axis 6-6, the medial-lateral axis AML (shown in FIG. 29), and the vertical axis 8-8, where the longitudinal axis 6-6, the medial-lateral axis AML, and the vertical axis 8-8 are perpendicular to each other. The longitudinal axis 6-6 of the footwear 2700 extends along a length of the footwear 2700 from the anterior end 2718 to the posterior end 2720, and generally divides the footwear 2700 into a medial side 2922 and a lateral side 2924 (shown in FIG. 29). The medial-lateral axis AML extends from medial side 2922 to lateral side 2924. Accordingly, the medial side 2922 and the lateral side 2924 respectively correspond with opposite sides of the footwear 2700 and extend from the anterior end 2718 to the posterior end 2720. The vertical axis 8-8 extends from a bottom (i.e., ground-contacting portion) of the footwear 2700 to a top of the footwear 2700.

Figure 28:
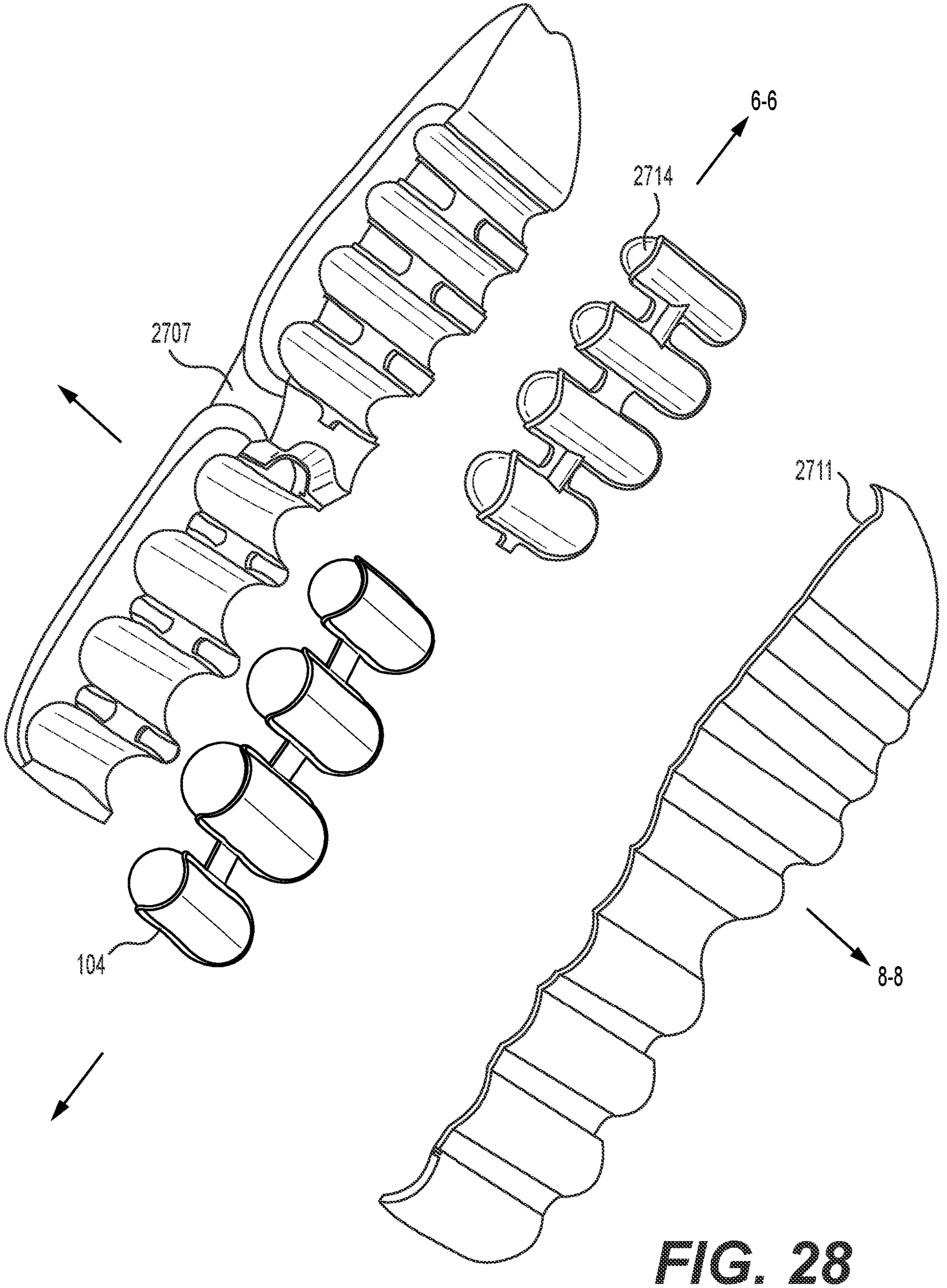
FIG. 28 is an exploded perspective view of a sole structure of the article of footwear of FIG. 27.

With reference to FIG. 28, the sole structure 2701 includes a first support element 2707, the heel cushioning element 104, a forefoot cushioning element 2714, and an outsole layer 2711. The forefoot cushioning element 2714 is a fluid-filled cushioning element. Forefoot cushioning element 2714 is similarly formed as cushioning element 1914. Portions of the outsole layer 2711 are configured to provide a ground-engaging surface of the article of footwear 2700 that directly contacts the ground. The sole structure 2701 is configured to provide cushioning characteristics to the article of footwear 2700. The first support element 2707 is similarly formed to first support element 1907.

Figure 29:
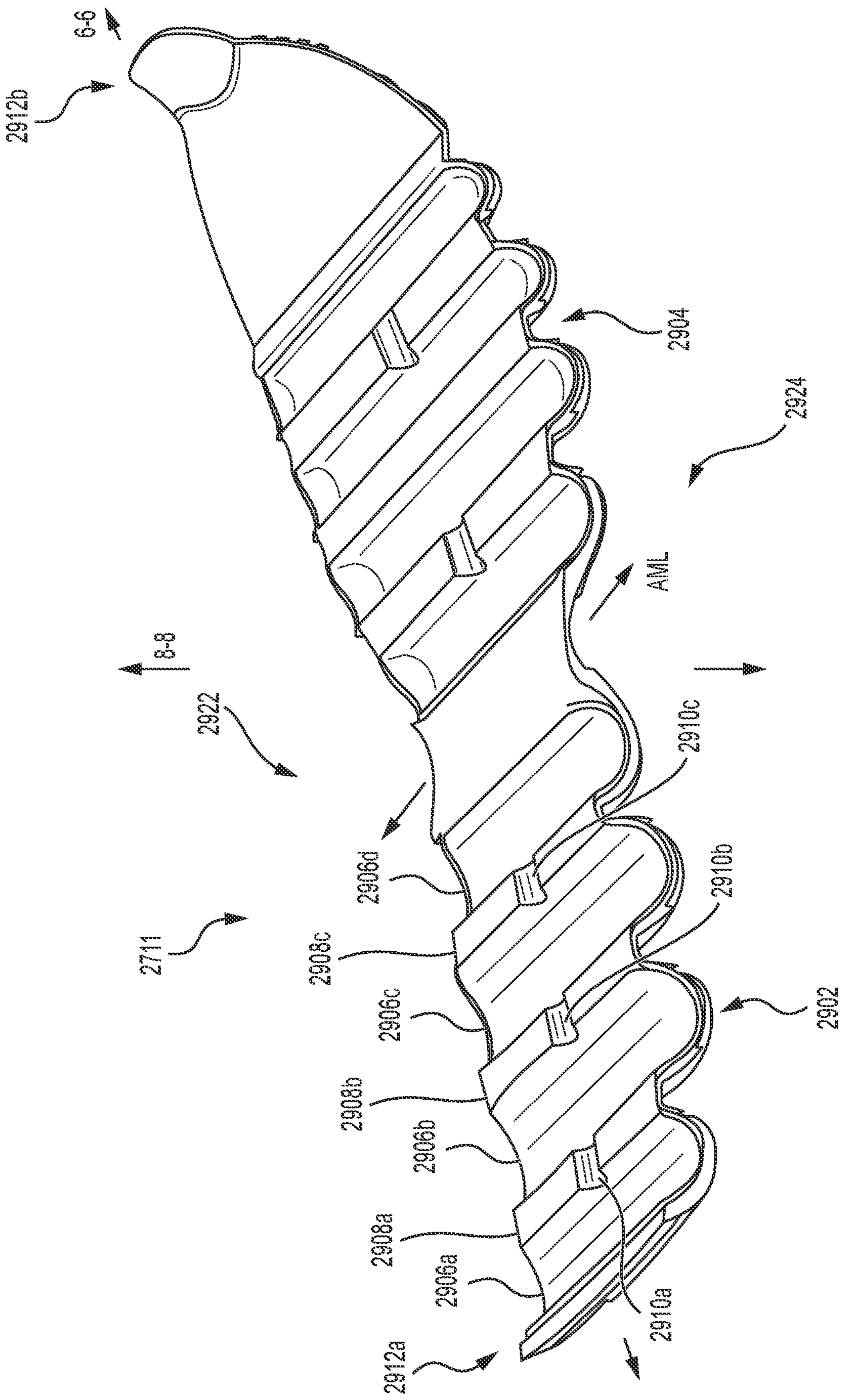
FIG. 29 is a top perspective view of an outsole layer of the article of footwear of FIG. 28.

With reference to FIG. 29, the outsole layer 2711 includes a posterior end 2912*a* and an anterior end 2912*b*. The outsole layer 2711 includes a first engagement area 2902 and a second engagement area 2904. The first engagement area 2902 is disposed posterior to the second engagement area 2904. In other words, the first engagement area 2902 is disposed nearer the posterior end 2912*a* than is the second engagement area 2904.

The first engagement area 2902 includes notches 2910*a*, 2910*b*, and 2910*c* disposed on respective ridges 2908*a*, 2908*b*, and 2908*c*. Notch 2910*a* is disposed on ridge 2908*a*. Notch 2910*b* is disposed on ridge 2908*b*. Notch 2910*c* is disposed on ridge 2908*c*. A depression is disposed between adjacent ridges of ridges 2908*a*, 2908*b*, and 2908*c*. A first depression 2906*a* is disposed between ridge 2908*a* and the posterior end 2912*a*. A second depression 2906*b* is disposed between ridges 2908*a* and 2208*b*. A third depression 2906*c* is disposed between ridges 2908*b* and 2908*c*. A fourth depression 2906*d* is disposed between ridge 2908*c* and a portion of an upper facing surface 2711*a* of the outsole layer 2711. Each of notches 2910*a*, 2910*b*, and 2910*c* and each depression 2906*a*, 2906*b*, 2906*c*, and 2906*d* is configured to receive a corresponding portion of cushioning element 104. The notches 2910*a*, 2910*b*, and 2910*c* may be aligned along the axis 6-6. The second engagement area 2904 may be similarly formed as second engagement area 2204.

Figure 30A:
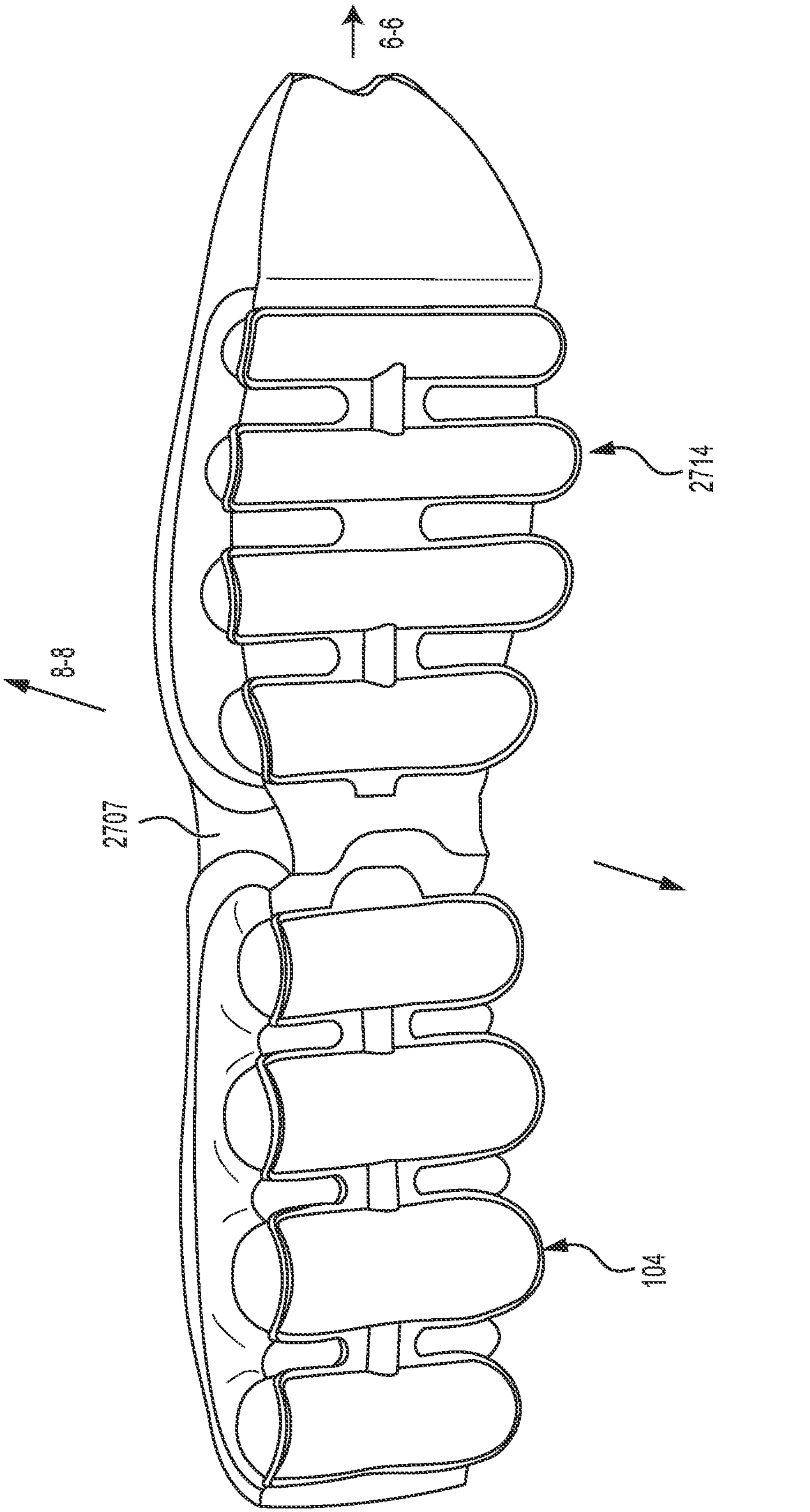
FIG. 30A is a bottom perspective view of a midsole, a first cushioning element, and a second cushioning element of the sole structure of FIG. 28.

With reference to FIG. 30A, the coupling of the heel cushioning element 104 and the forefoot cushioning element 2714 is substantially similar to the coupling shown in FIG. 24A.

Figure 30B:
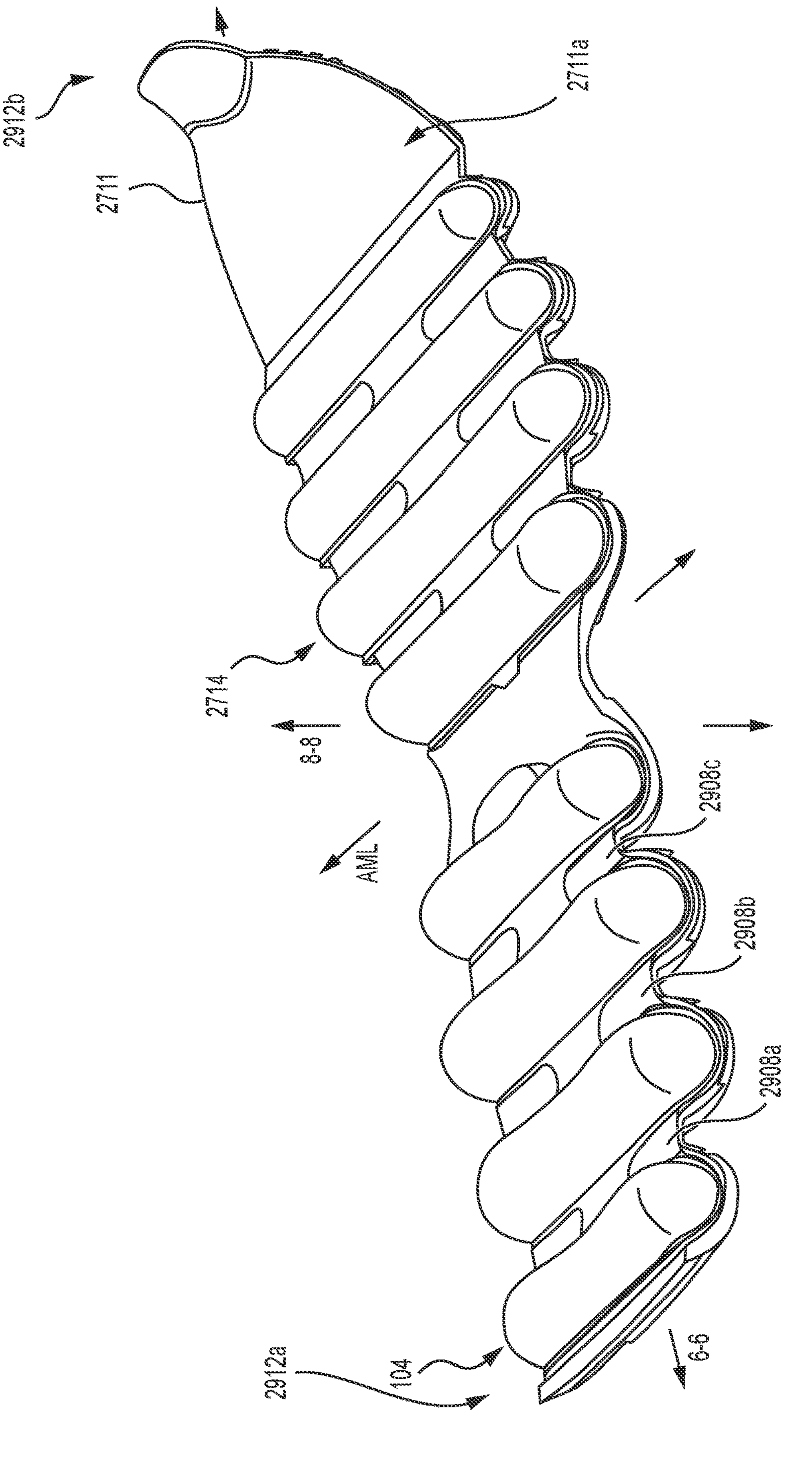
FIG. 30B a top perspective view of an outsole, a first cushioning element, and a second cushioning element of the sole structure of FIG. 28.

Referring to FIG. 30B, the forefoot cushioning element 2714 is coupled to engagement area 2904 of the outsole layer 1910, and heel cushioning element 104 is coupled to engagement area 2902 of the outsole layer 2711. Forefoot cushioning element 2714 is coupled directly to outsole layer 2711. Heel cushioning element 104 is coupled directly to outsole layer 2711. Respective portions of the heel cushioning element 104 are disposed within corresponding portions of the engagement area 2902. In an example, tubes 230, 232, 234, and 236 are coupled with depressions 2906*a*, 2906*b*, 2906*c*, and 2906*d*, and web areas 222*a*, 222*b*, and 222*c* are coupled with notches 2910*a*, 2910*b*, and 2910*c*. In the example, tube 230 is coupled to depression 2906*d*. In the example, tube 232 is coupled to depression 2906*c*. In the example, tube 234 is coupled to depression 2906*b*. In the example, tube 236 is coupled to depression 2906*a*. In the example, web area 222*a* is coupled with notch 2910*c*. In the example, web area 222*b* is coupled with notch 2910*b*. In the example, web area 222*c* is coupled with notch 2910*a*. In other words, each of the heel cushioning element 104 and the forefoot cushioning element 2714 are directly coupled to the outsole layer 2711 such that there are no other elements disposed there between.

The forefoot cushioning element 2714 may be adhesively bonded to the outsole layer 2711. The heel cushioning element 104 may be adhesively bonded to the outsole layer 2711. The cushioning elements 2714,104 may be coupled or bonded to the outsole layer 2711 in any other suitable manner for bonding the cushioning elements 2714, 104 directly to the outsole layer 2711 such that there are no intervening elements apart from the adhering material between the cushioning elements 2714, 104 and the outsole layer 2711. In other words, it is meant by direct contact that there are no gaps formed between the cushioning elements 2714, 104 and the outsole layer 2711. This configuration of the article of footwear 2700 reduces the overall height of the article of footwear 2700 and provides a desired form of cushioning and stability to the article of footwear 2700.

Figure 31:
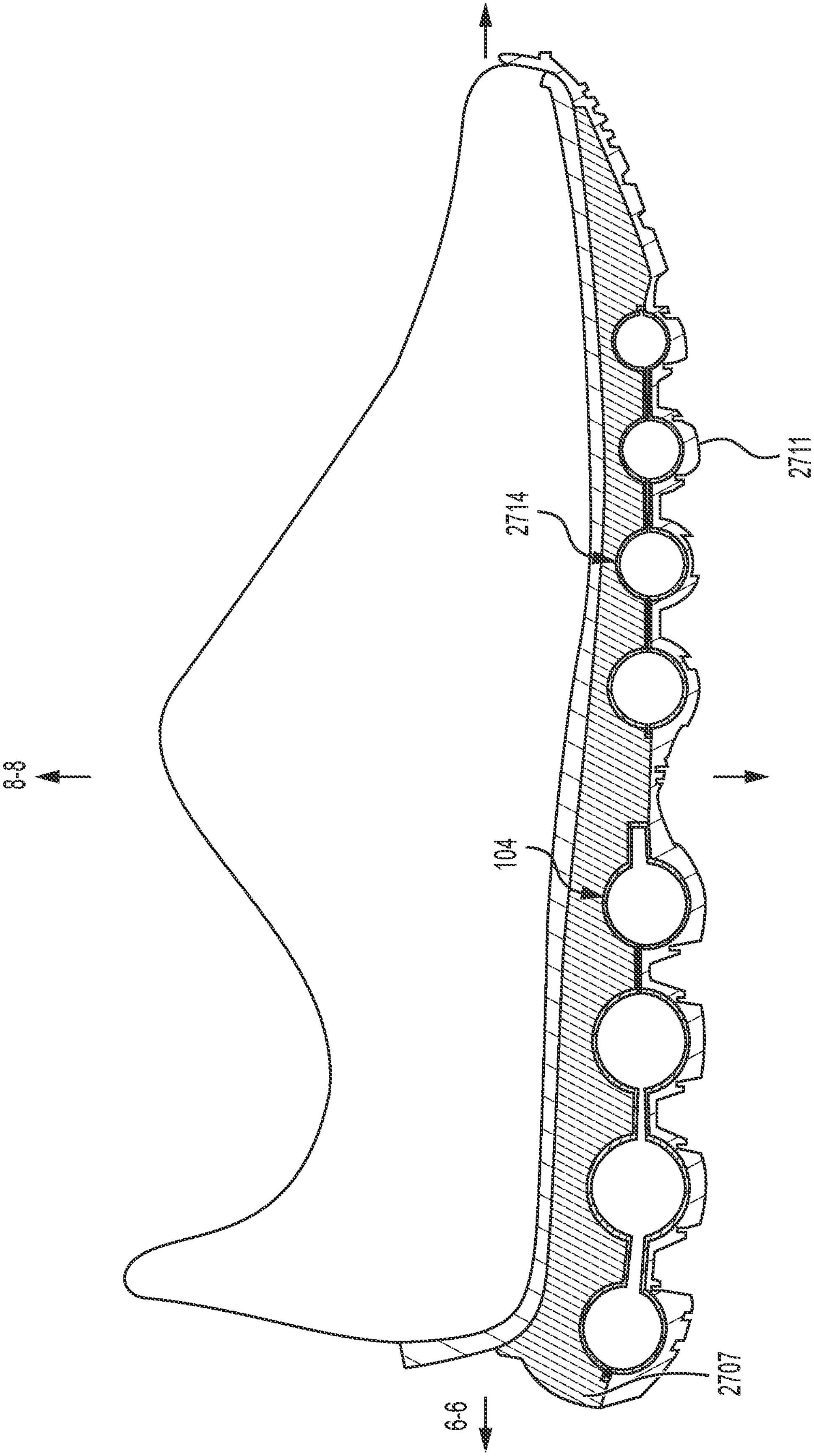
FIG. 31 is a cross-sectional view of the sole structure of article of footwear of FIG. 27.

Referring to FIG. 31, when fully assembled, the ridges 2908*a*, 2908*b*, and 2908*c* mate with the first support element 2707, and the outsole layer 2711 and the first support element 2707 directly contact one another. As similarly described with respect to FIG. 25, the second engagement area 2904 mates with the first support element 2707. In other words, the first support element 2707 and the outsole layer 2711 directly contact one another. The outer surfaces of the heel cushioning element 104 and forefoot cushioning element 2714 are enclosed (i.e. not exposed or open) at regions anterior to and at regions posterior to each of the tubes of forefoot cushioning element 2714, when the footwear 1900 is fully assembled.

Figure 32:
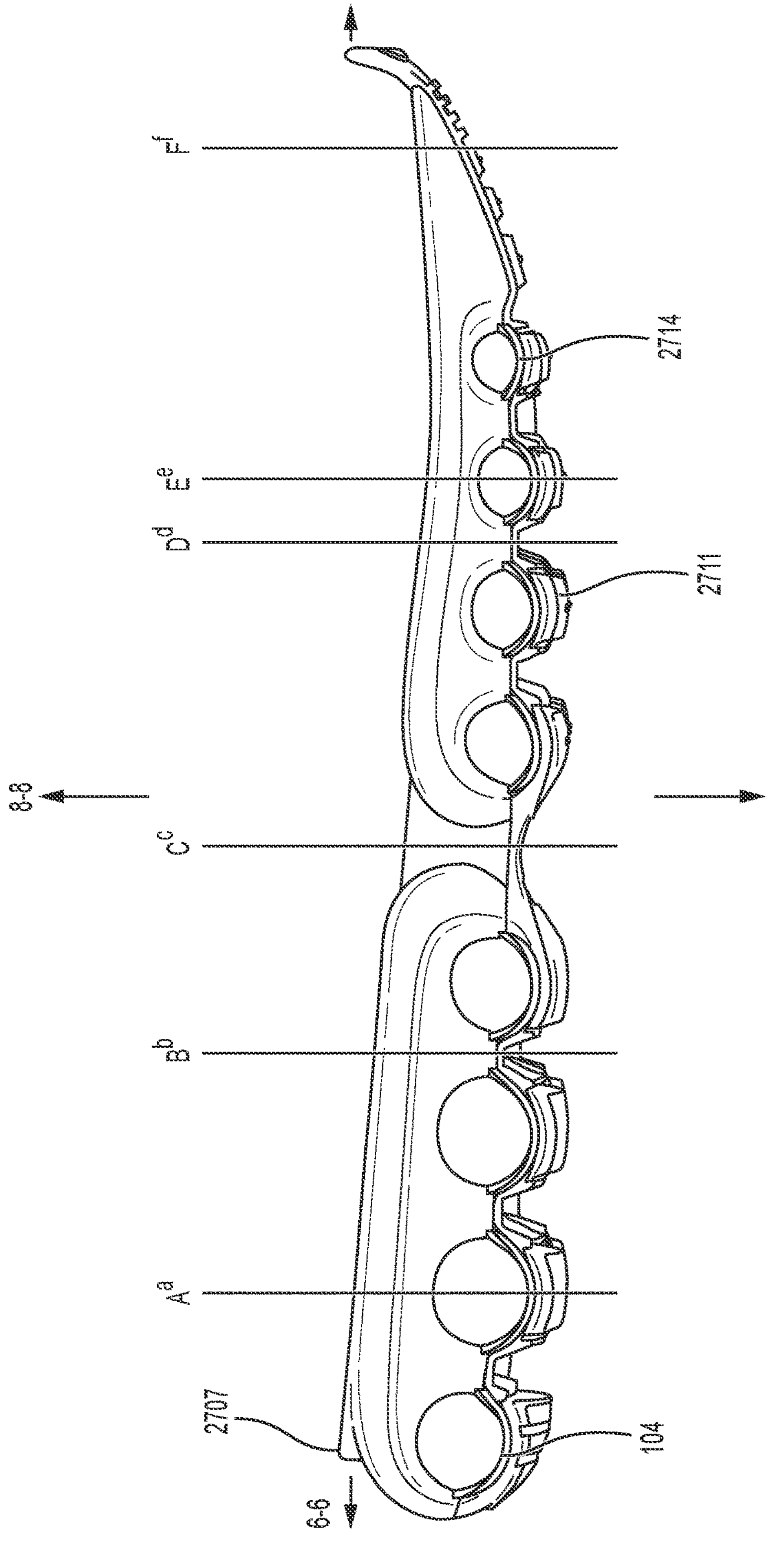
FIG. 32 is a side view of the sole structure of the article of footwear of FIG. 27.

Referring to FIG. 32, when viewing the exterior of the footwear 2700 from the ground up, the sole structure may include some combination of the outsole layer 2711, the heel cushioning element 104, the first support element 2707, and the forefoot cushioning element 2714.

When viewing the stacked sole structure from the ground up along the exterior path of line $A^a$, the stacked sole structure may include the outsole layer 2711, the heel cushioning element 104, and the first support element 2707. When viewed along the exterior path of line $B^b$, the stacked sole structure may include the outsole layer 2711 and the first support element 2707. When viewed along the exterior path of line $C^c$, the stacked sole structure may include the outsole layer 2711, and the first support element 2707. When viewed along the exterior path of line $D^d$, the stacked sole structure may include the outsole layer 2711, and the first support element 2707. When viewed along the exterior path of line $E^e$, the stacked sole structure may include the outsole layer 2711, the forefoot cushioning element 2714, and the first support element 2707. When viewed along the exterior path of line $F^f$, the stacked sole structure may include the outsole layer 2711, and the first support element 2707.

The combination of the first support element 2707 and the outsole layer 2711 enclosing a combination of the heel cushioning element 104 and the cushioning element 2714 provides improved sensation and performance during use of the article of footwear 2700. Additionally, directly coupled the first support element 2707 to the outsole layer 2711 provides a reduction in weight and height of the article of footwear 2700. In an exemplary embodiment, when the heel cushioning element 104 and the forefoot cushioning element 2714 are fluid-filled bladders, the first support element 2707 is an elastomeric material and the outsole layer 2711 may be a thermoplastic elastomer (TPE), the sole structure 2701 provides a uniquely durable and comfortable sensation to the article of footwear 2700.

In alternative examples, the plurality of recesses 204 and the plurality of mounds 206 do not extend into the mid-foot region 14 and are disposed solely in the heel region 16. In other examples, the plurality of recesses 204 and the plurality of mounds 206 extend through the entirety of the mid-foot region 14. It is further contemplated that the plurality of recesses 204 and the plurality of mounds 206 extend through the entirety of the mid-foot region 14 and into a portion or an entirety of the forefoot region 12. It is further contemplated that the plurality of recesses 204 and the plurality of mounds 206 extend longitudinally across the entirety of the first support element 107 from the heel region 16 through the forefoot region 12.

Figure 33A:
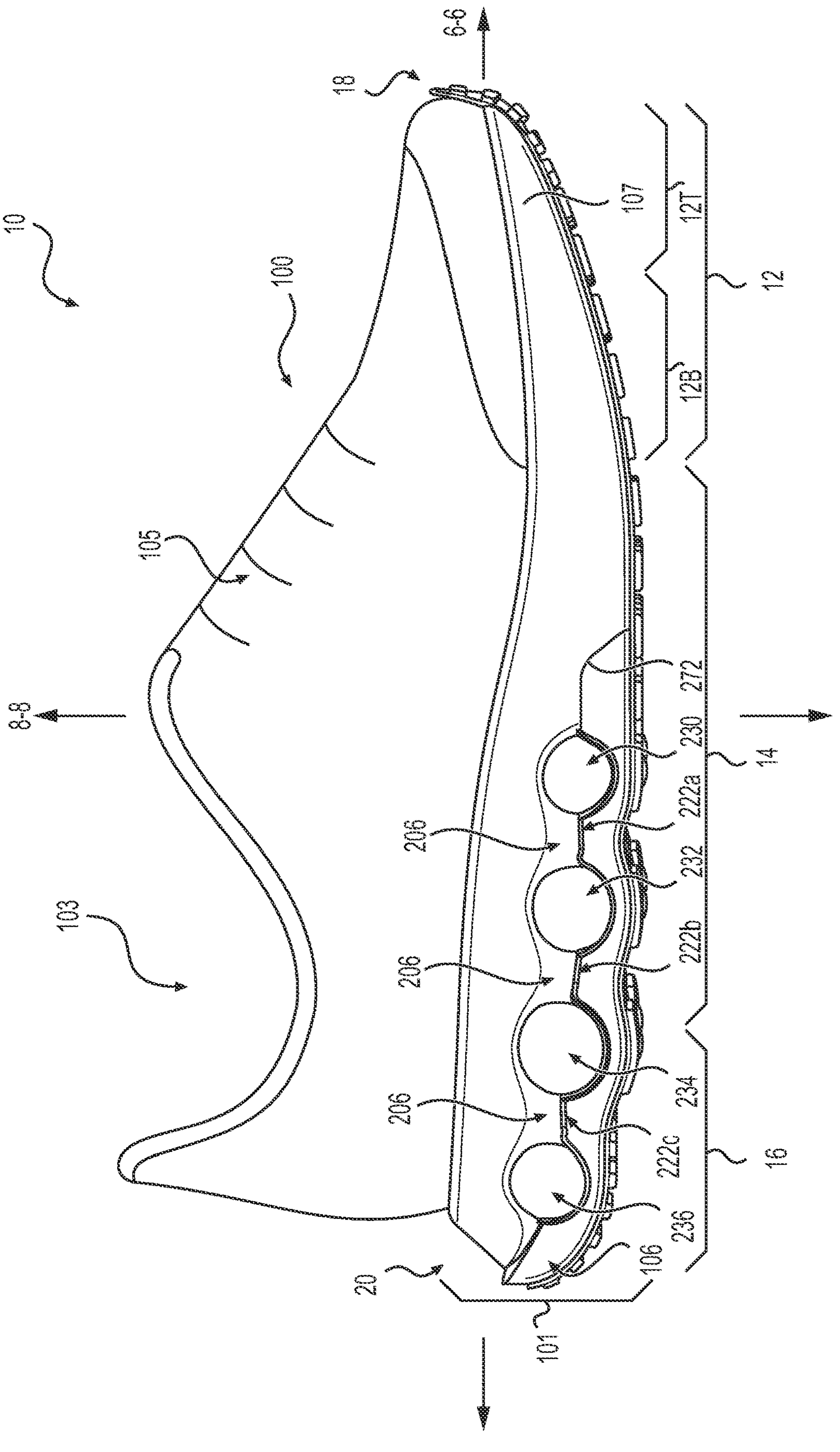
FIG. 33A is a side view of an alternative embodiment of an article of footwear of FIG. 1.

In some examples, e.g. as shown in FIG. 33A, there are no gaps between first support element 107 and cushioning element 104, and also no gaps between second support element 106 and cushioning element 104. For example, the recesses 204 of the first support element 107 rest on a top surface of the tubes 230, 232, 234, and 236 and the mounds 206 extend down toward the web areas 222*a*, 222*b*, and 222*c*. In this alternative example, the mounds 206 contact the top or bottom of the web areas 222*a*, 222*b*, or 222*c* while the shoe is at rest without a foot of a user inserted therein. In other words, there is no exposed gap between the mounds 206 and the web areas 222*a*, 222*b*, or 222*c*. The mounds 206 rest flush with the web areas 222*a*, 222*b*, or 222*c*. The first support element 107 covers an entirety of a top surface of the cushioning element 104. Additionally, a bottom surface of the cushioning element 104 is enclosed by the second support element 106 such that there is no gap between the cushioning element 104 and the second support element 106. In this alternative example, an entirety of the top surface and an entirety of the bottom surface of the cushioning element 104 are enclosed by the first support element 107 and the second support element 106 respectively.

Figure 33B:
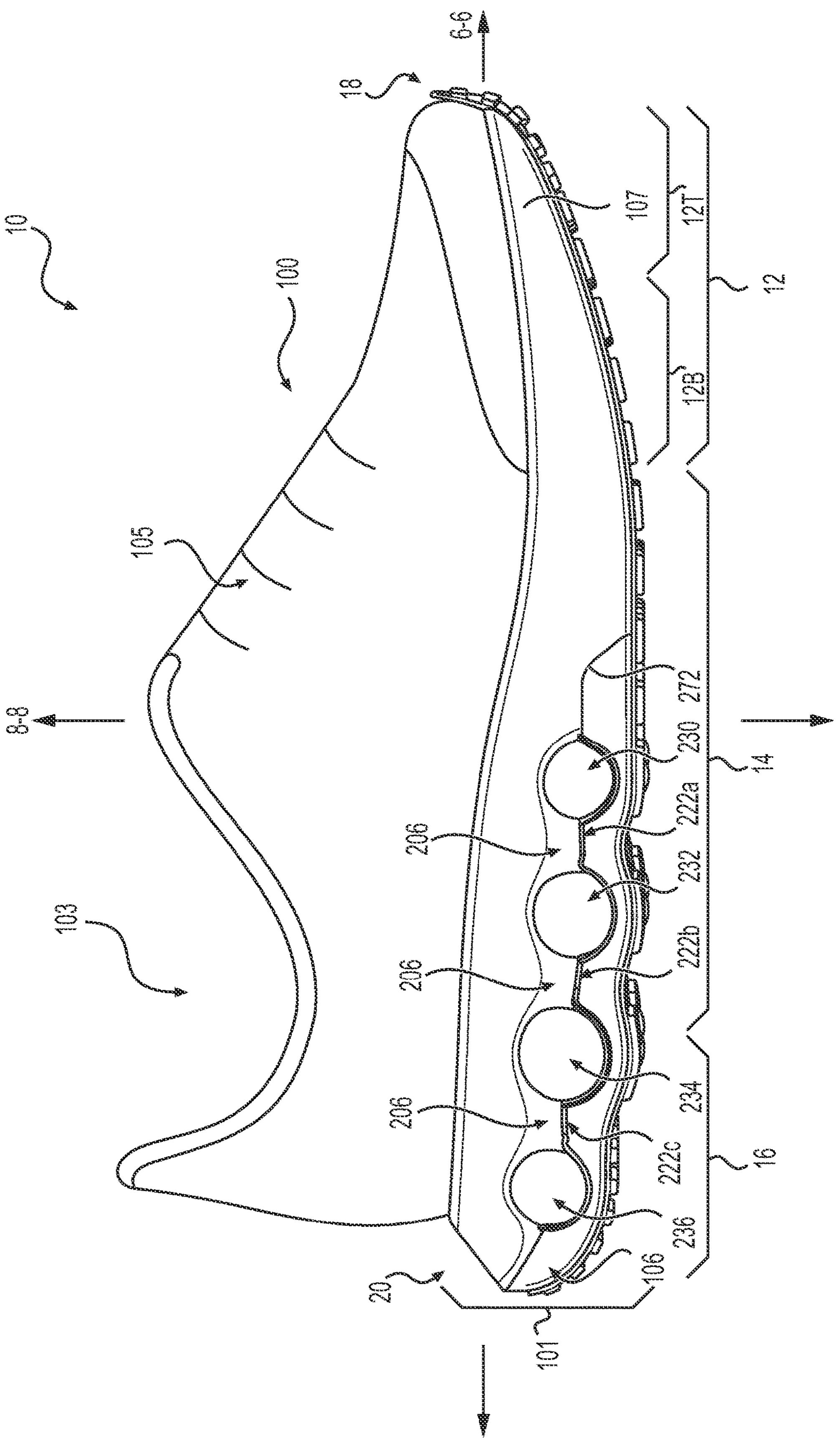
FIG. 33B is a side view an alternative embodiment of an article of footwear of FIG. 1.

In some examples, e.g., as shown in FIG. 33B, rear portions of the midsole 102 and the second support element 106 rest flush with one another at the posterior end 20 forming a flush interface.

Figure 34:
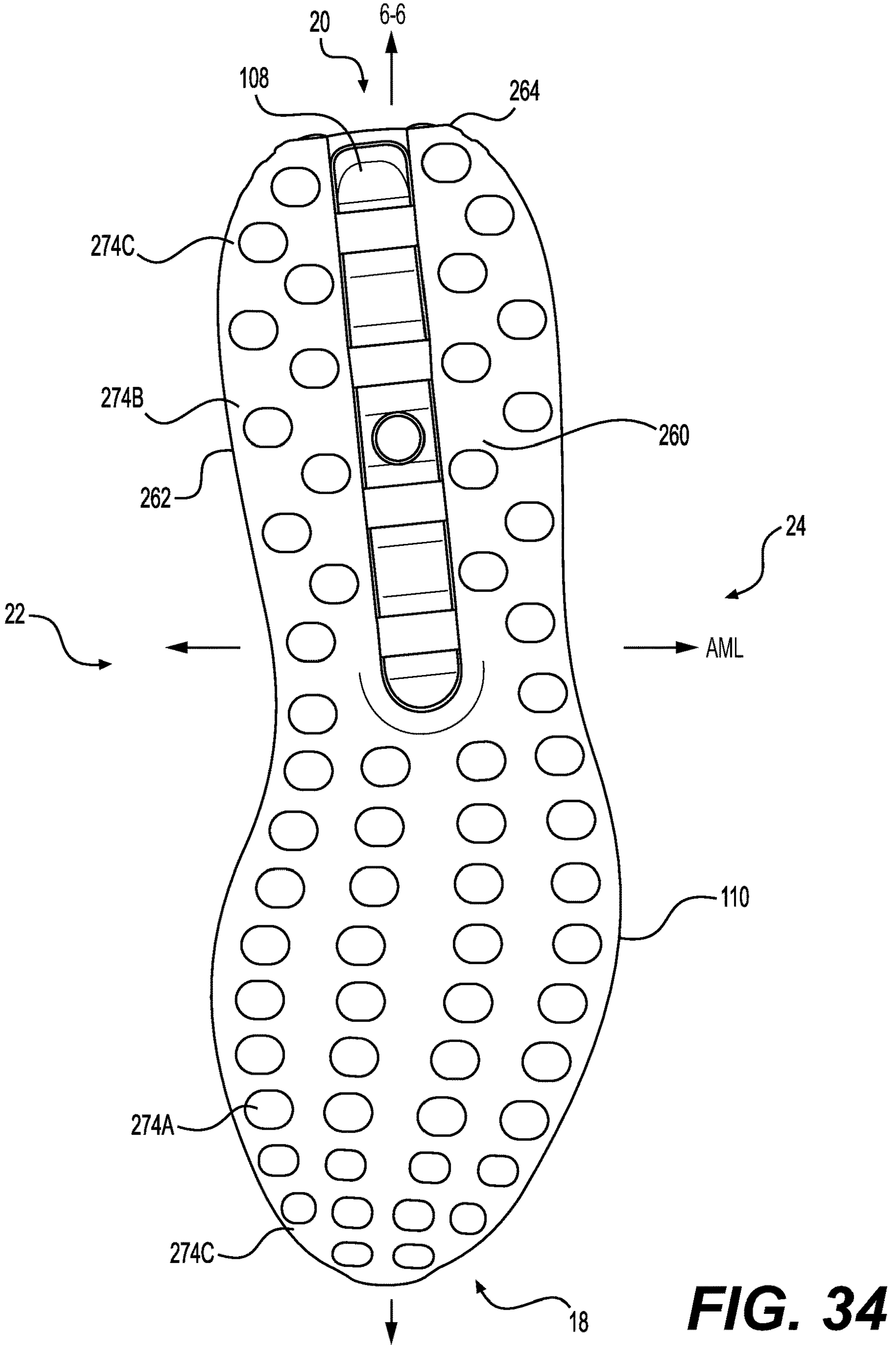
FIG. 34*a* bottom view of an alternative embodiment of an article of footwear.
Figure 35:
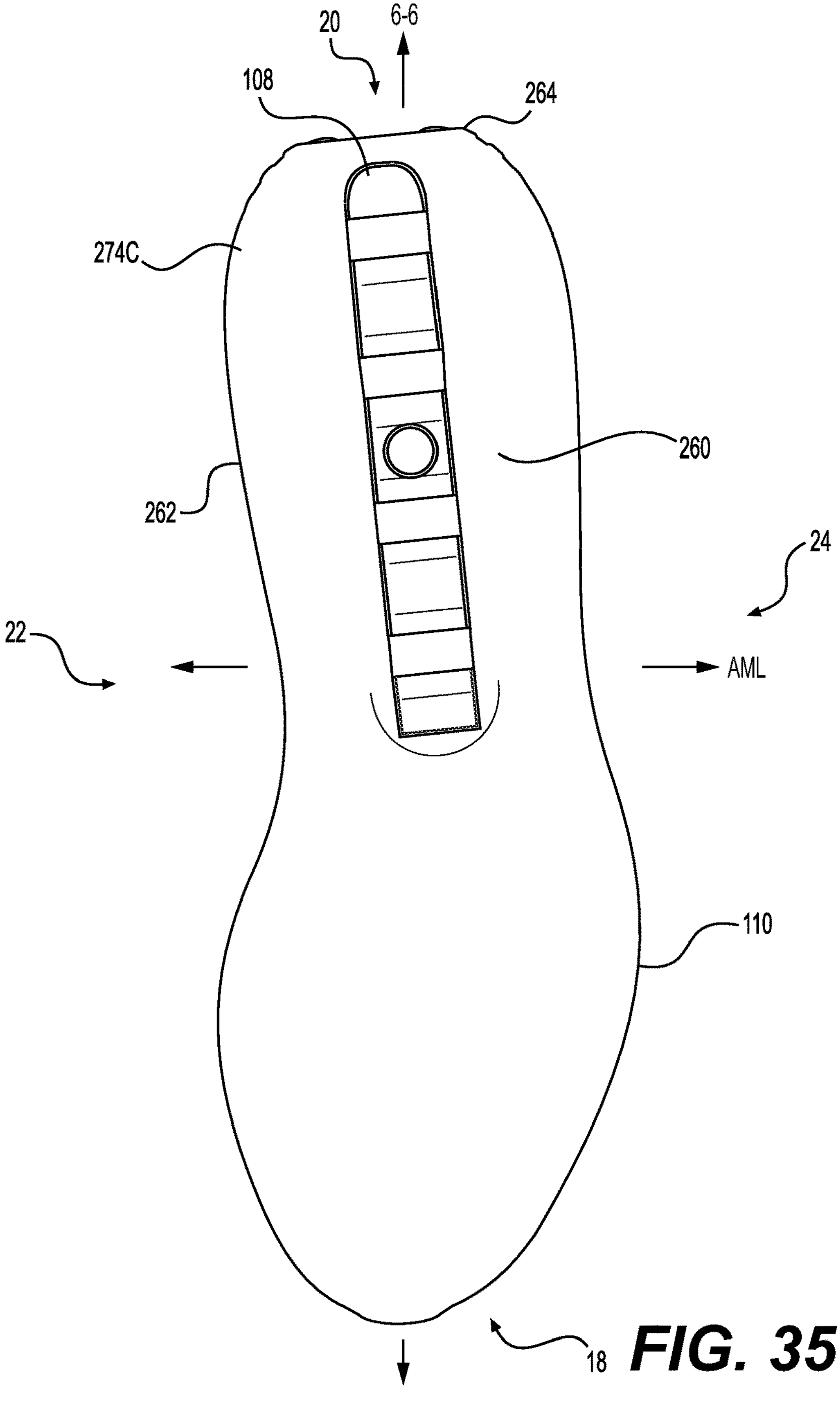
FIG. 35 is a bottom view of an alternative embodiment of an article of footwear.

In alternative examples, shown in FIG. 34, the plurality of traction elements 274 include only one shape. In the alternative embodiment shown in FIG. 35, outsole layer 110 is devoid of traction elements 274. In other words, in alternative embodiments, outsole layer 110 has a bottom surface that is smooth or relatively smooth.

Figure 36:
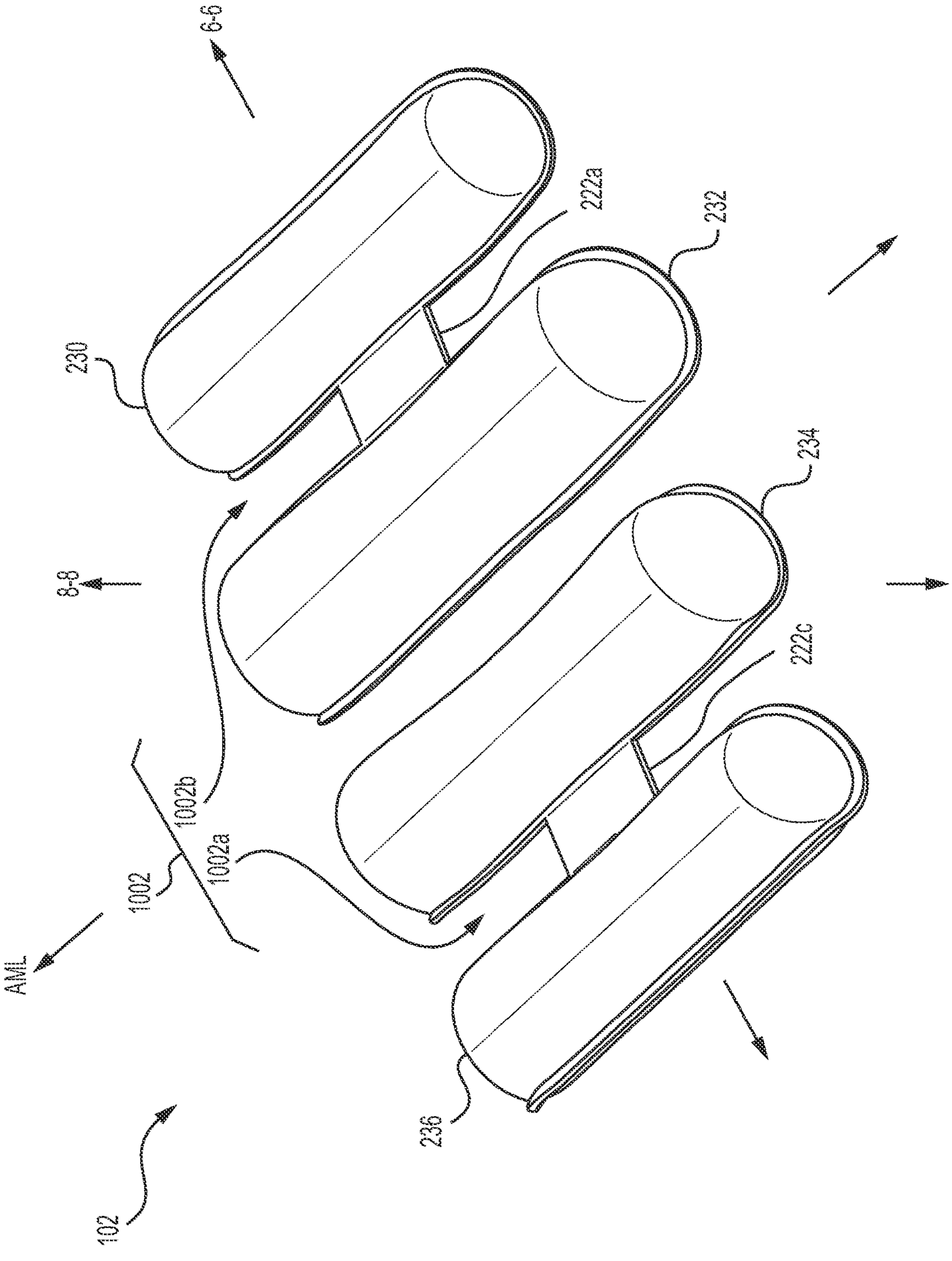
FIG. 36 is a perspective view of an alternative cushioning element of the article of footwear.

In an alternative example shown in FIG. 36, the cushioning element 3602 includes groups of connected tubes 1002 where some of the tubes 230, 232, 234, and 236 are interconnected and others are not. Groups of tubes 1002 includes a first group 1002*a* and a second group 1002*b*. The groups of tubes 1002 includes tubes 230, 232, 234, and 236 and web areas 222. The tubes 230, 232, 234, and 236 are substantially similar to those described above. The web areas 222 are substantially similar to those described above. In one embodiment, the first group 1002*a* includes tubes 230 and 232, and the second group 1002*b* includes tubes 234 and 236. Individual tubes 230 and 232 of the first group are interconnected by web area 222*a*. Individual tubes 234 and 236 of the second group are interconnected by web area 222*c*. The first group 1002*a* is not coupled to or otherwise in communication with second group 1002*b*.

Figure 37:
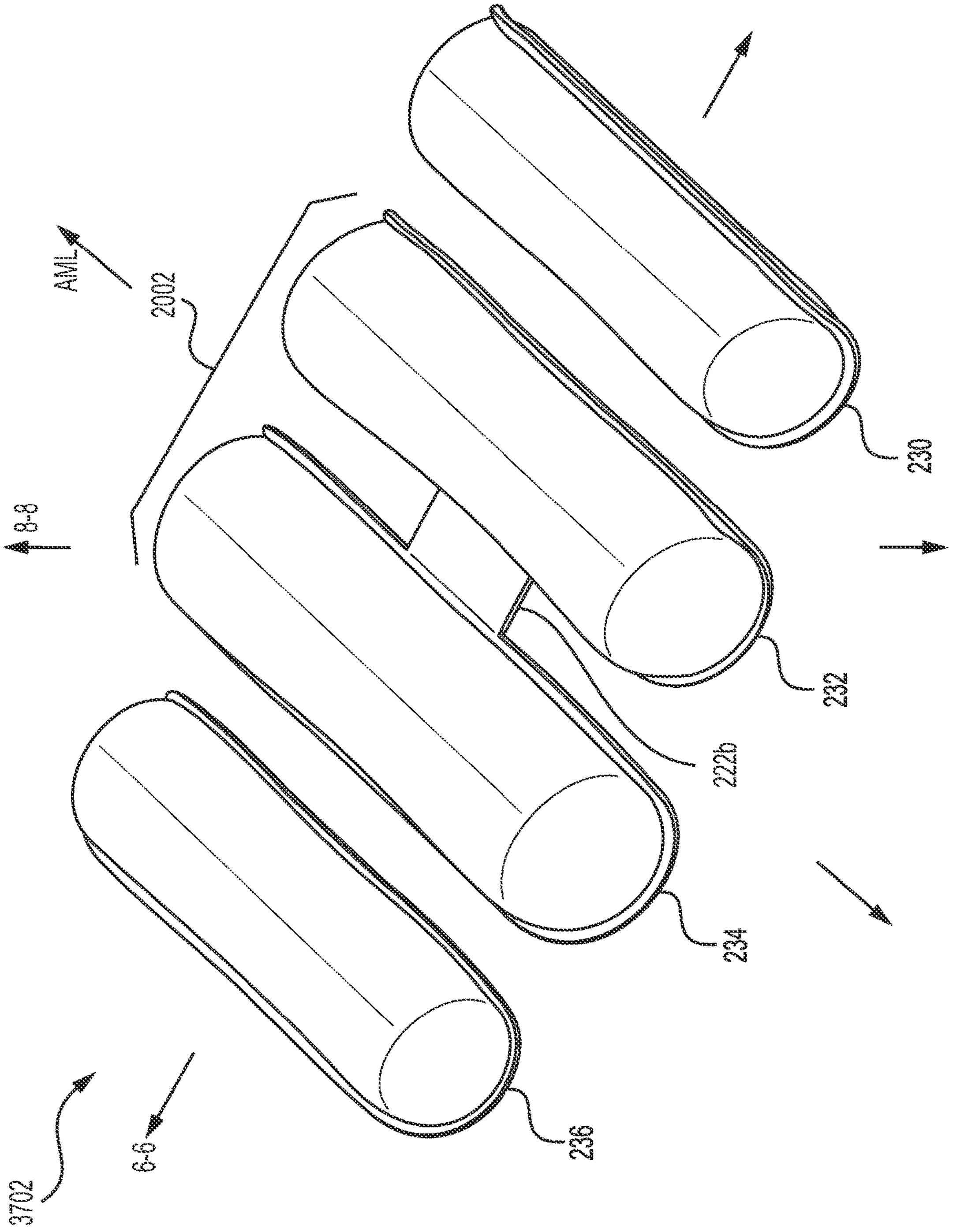
FIG. 37 is a perspective view of an alternative cushioning element of the article of footwear.

In an alternative example shown in FIG. 37, the cushioning element 3702 includes a group of tubes 2002 where some of the tubes 230, 232, 234, and 236 are interconnected in a single structure and others are not. The group 2002 includes tubes 232 and 234 web area 222*b*. The tubes 230, 232, 234, and 236 are substantially similar to those described above. The web areas 222 are substantially similar to those described above. In one embodiment, the group 2002 is interconnected by web area 222*b*. Group 2002 is disposed between tube 230 and tube 236. Individual tubes 230 and 236 are separated from and otherwise spaced apart from the group 2002. Each of individual tubes 230 and 236 are free floating or otherwise not connected to any other tube. In other words, the group 2002 is not coupled to or otherwise in communication with the individual tubes 230 and 236.

Figure 38:
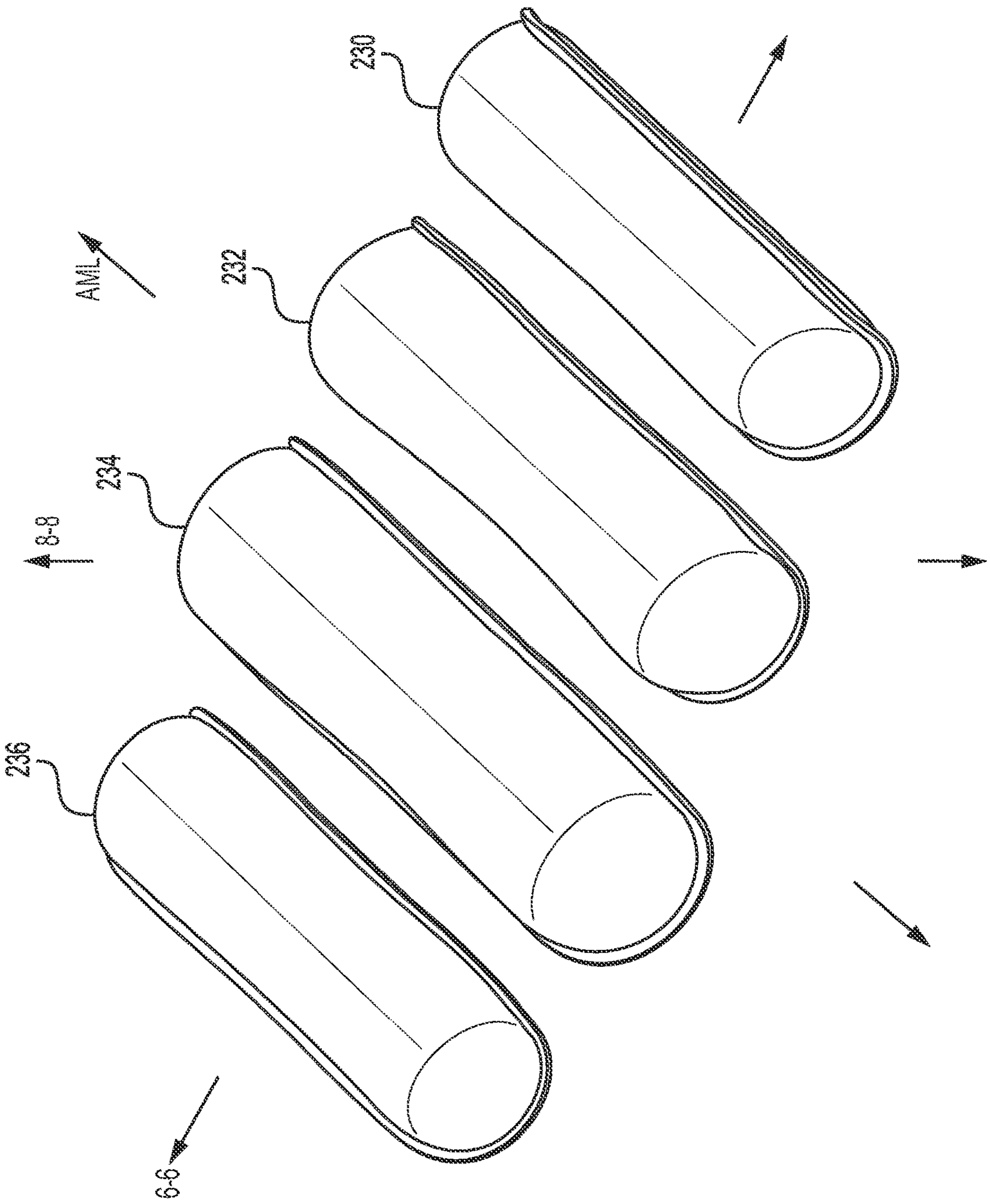
FIG. 38 is a perspective view of an alternative cushioning element of the article of footwear.

In an alternative example shown in FIG. 38, the tubes 230, 232, 234, and 236 are free floating. By free floating, it is meant that the tubes 230, 232, 234, and 236 are not connected or otherwise coupled to one another. In other words, each of tubes 230, 232, 234, and 236 are separated from one another. As such, tubes 230, 232, 234, and 236 are isolated from one another. The tubes 230, 232, 234, and 236 are substantially similar to those described above.

Figure 39:
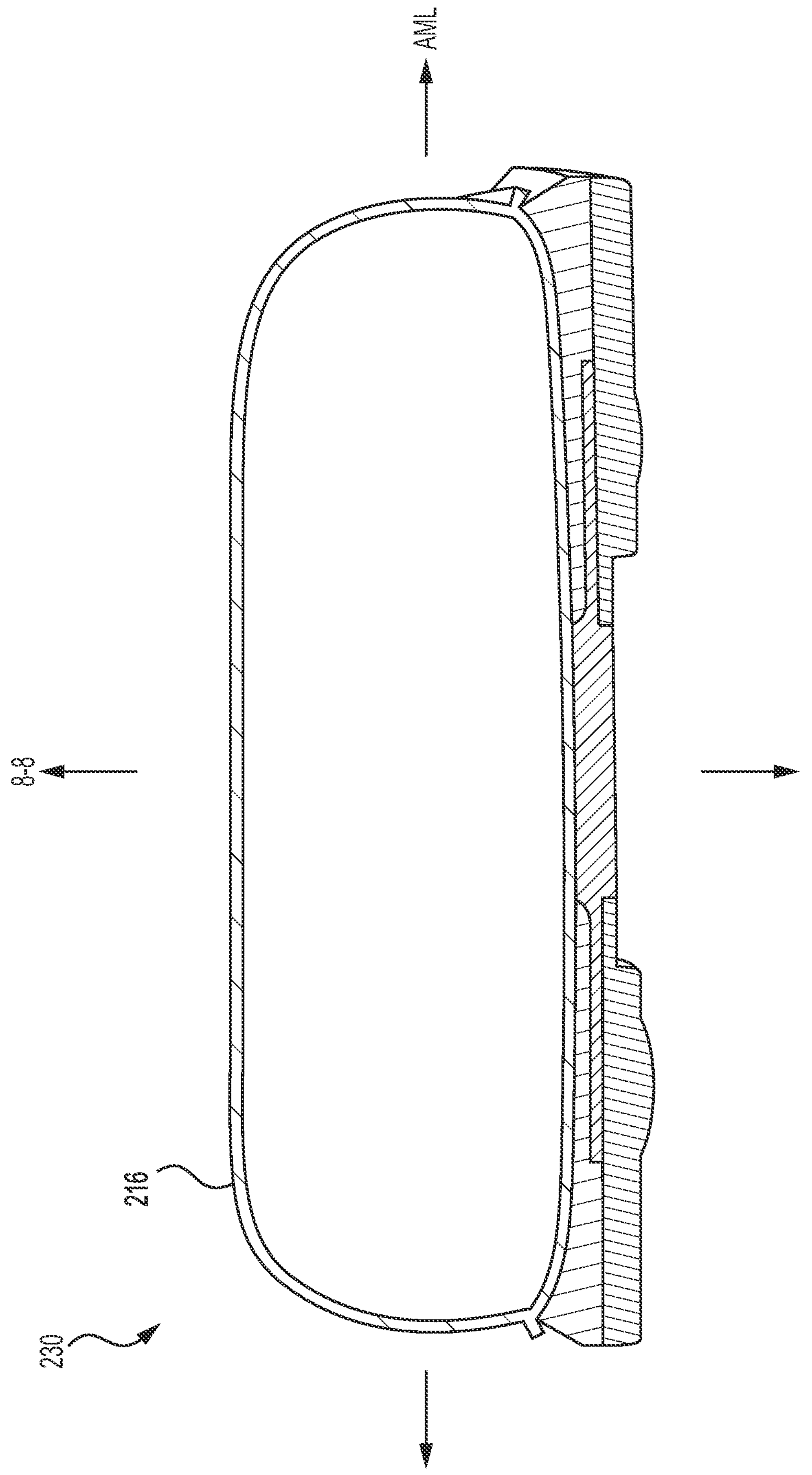
FIG. 39 is a cross-section view of an alternative cushioning element of the article of footwear.

In an alternative example shown in FIG. 39, the tubes 230, 232, 234, and 236 have a substantially consistent vertical height along the medial-lateral axis AML. In other words, each of the tubes 230, 232, 234, and 236 do not include the depression 228. Only tube 230 is shown for reference.

Figure 40:
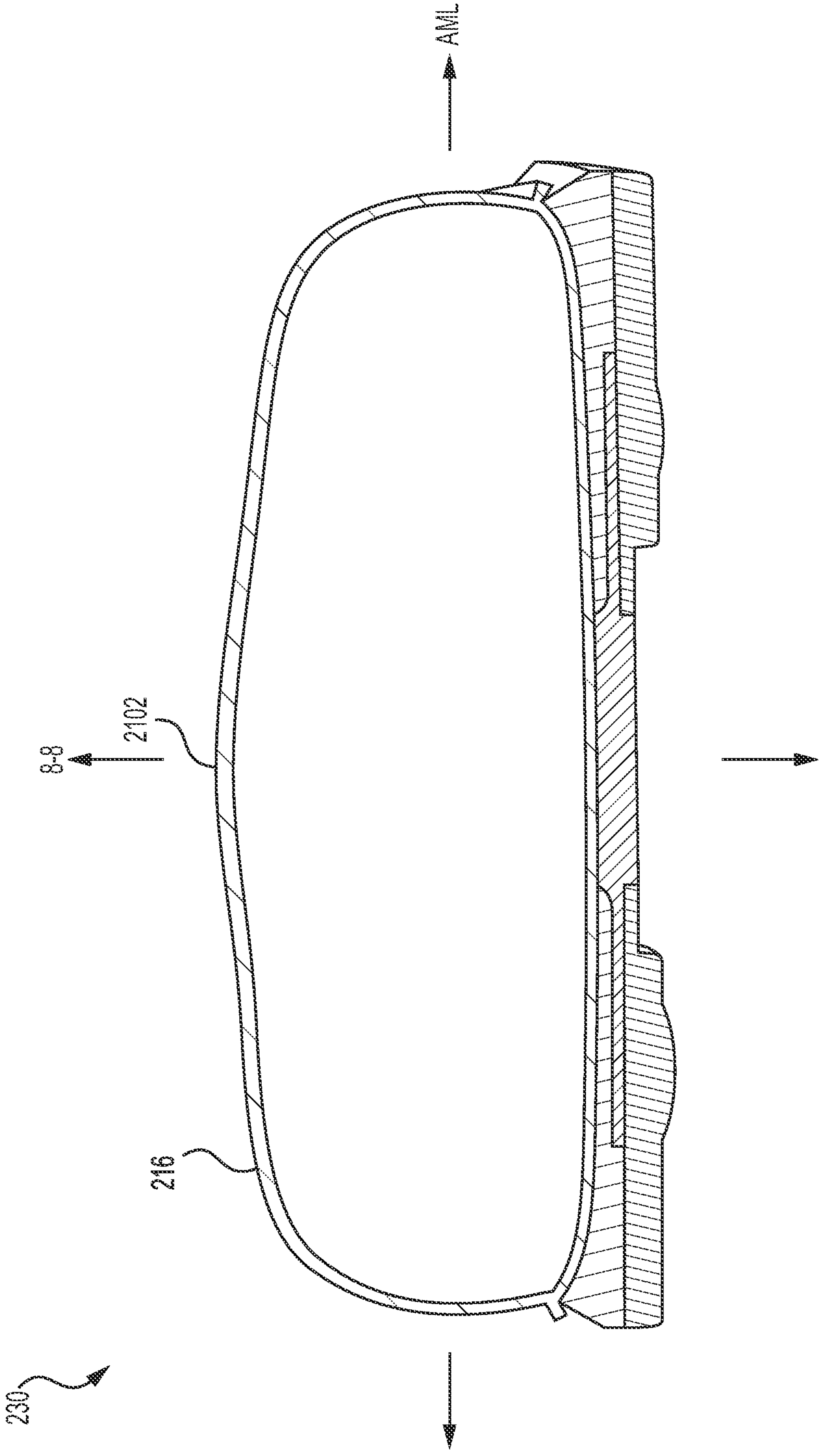
FIG. 40 is a cross-section view of an alternative cushioning element of the article of footwear.

In an alternative example shown in FIG. 40, tubes 230, 232, 234, and 236 include a hump 2102 in place of depression 228. Hump 2102 is formed on the barrier film 216. Hump 2102 has a higher vertical height than other portions the tubes 230, 232, 234, and 236. Hump 2102 is disposed centrally within each of the tubes 230, 232, 234, and 236. The hump 2102 creates a taller article of footwear 10. Only tube 230 is shown for reference.

Figure 41:
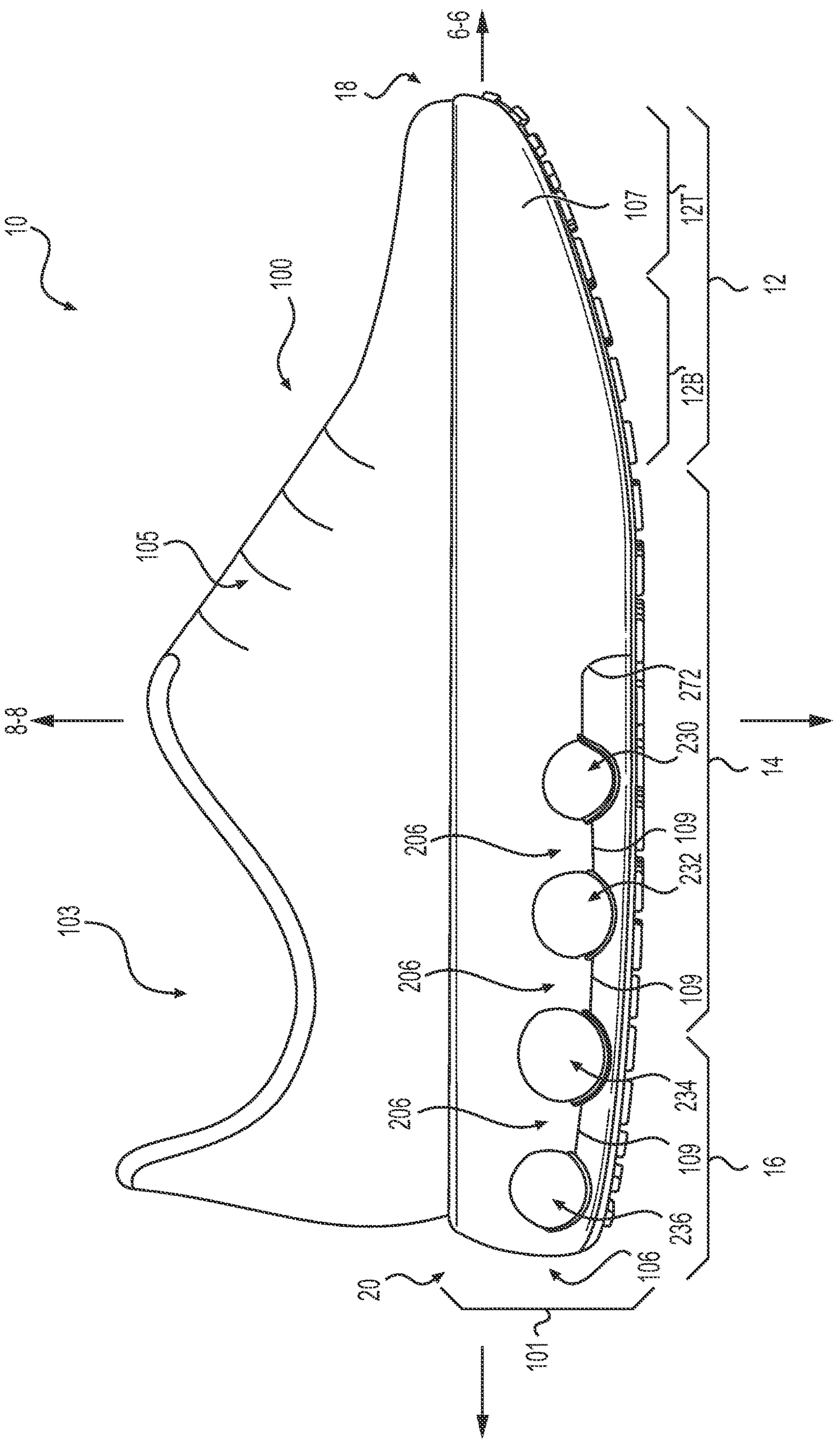
FIG. 41 is a side view of an alternative embodiment of the article of footwear.

The article of footwear 10 includes alternatively shaped elements to provide varying underfoot sensation. In an alternative example shown in FIG. 41, the first support element 107 contacts the second support element 106 at contact areas 109. Further, a medial exterior most portion and a lateral exterior most portion of the mounds 206 may contact outer edges of the web areas 222*a*, 222*b*, and 222*c* as well as the second support element 106 while, a middle portion of the mounds 206 does not contact the web areas 222*a*, 222*b*, and 222*c*. In other words, the mounds 206 may form an arc shape such that only the medial base and the lateral base of the arc contacts the outer edges of the respective web areas 222*a*, 222*b*, or 222*c* and second support element 106 below. In this example, gaps are disposed between first support element 107 and cushioning element 104 in the center area along the medial-lateral axis AML, but are not visible from an exterior vantage point due to contact between mounds 206 and the second support element 106 at medial and lateral exterior most positions. The contact between the medial exterior most portion and the lateral exterior most portion of the mounds 206 and the second support element 106 forms a sealed end preventing fluid flow. In one embodiment, the sealed end is porous to allow for some fluid flow.

Figure 42:
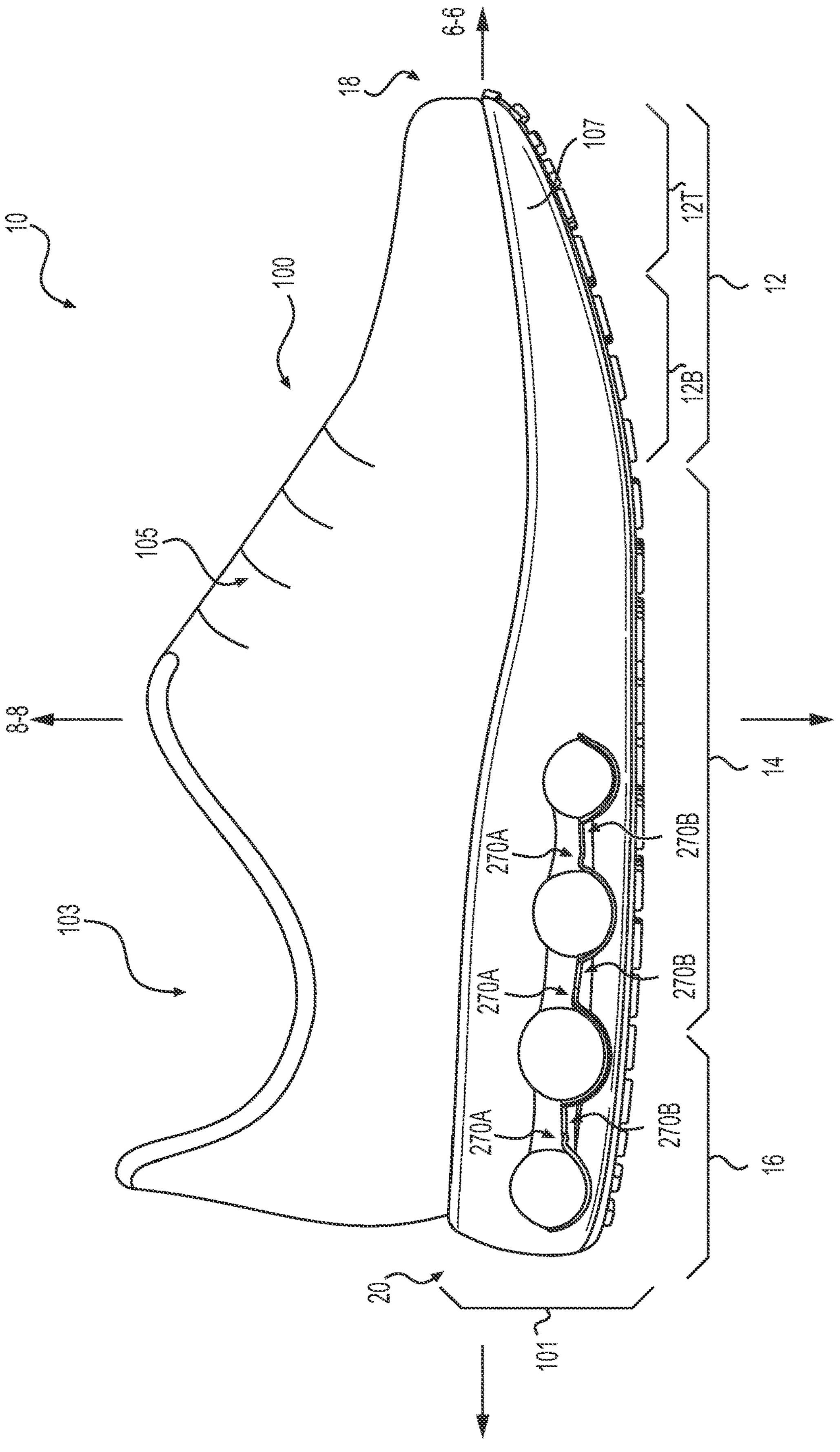
FIG. 42 is a side view of an alternative embodiment of the article of footwear.

An alternative example of the article of footwear 10 with alternative shaped features providing varying underfoot sensation is shown in FIG. 42.

Figure 43:
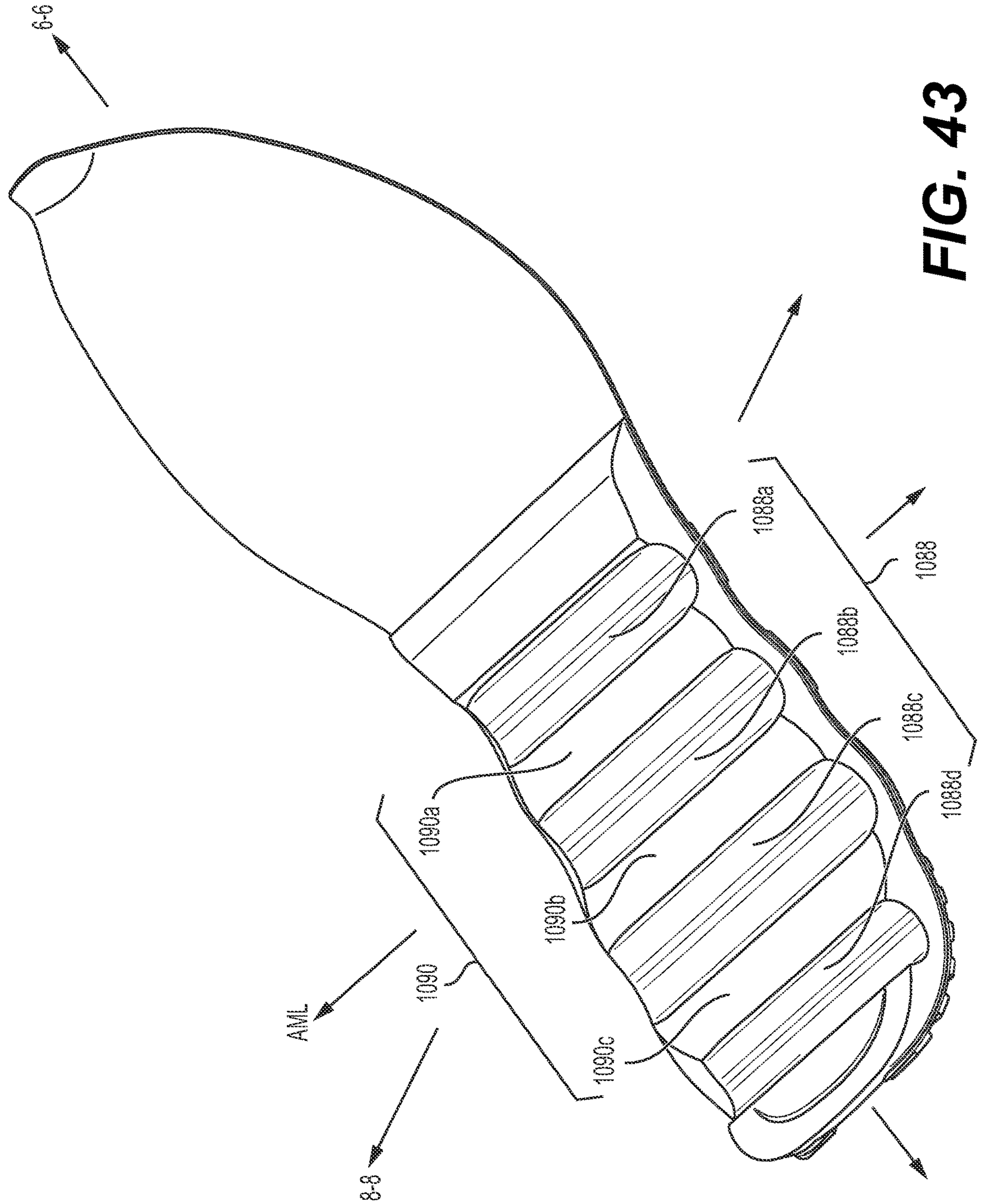
FIG. 43 is a perspective view of an alternative foam element of the article of footwear.

In an alternative example shown in FIG. 43, a unitary support element 1086 can replace the combination of the coupling portion 108 and the second support element 106 for receiving the cushioning element 104. Unitary support element 1086 is substantially similar to the combination of the coupling portion 108 and the second support element 106 except for as detailed below.

Unitary support element 1086 includes channels 1088. Channels 1088 include a first channel 1088*a*, a second channel 1088*b*, a third channel 1088*c*, and a fourth channel 1088*d*. Unitary support element 1086 includes ridges 1090. Ridges 1090 include a first ridge 1090*a*, a second ridge 1090*b*, and a third ridge 1090*c*. First ridge 1090*a* is disposed between first channel 1088*a* and second channel 1088*b*. Second ridge 1090*b* is disposed between second channel 1088*b* and third channel 1088*c*. Third ridge 1090*c* is disposed between third channel 1088*c* and fourth channel 1088*d*. The channels 1088 and the ridges 1090 form a continuous receiving area for receiving the cushioning element 104.

Figure 44:
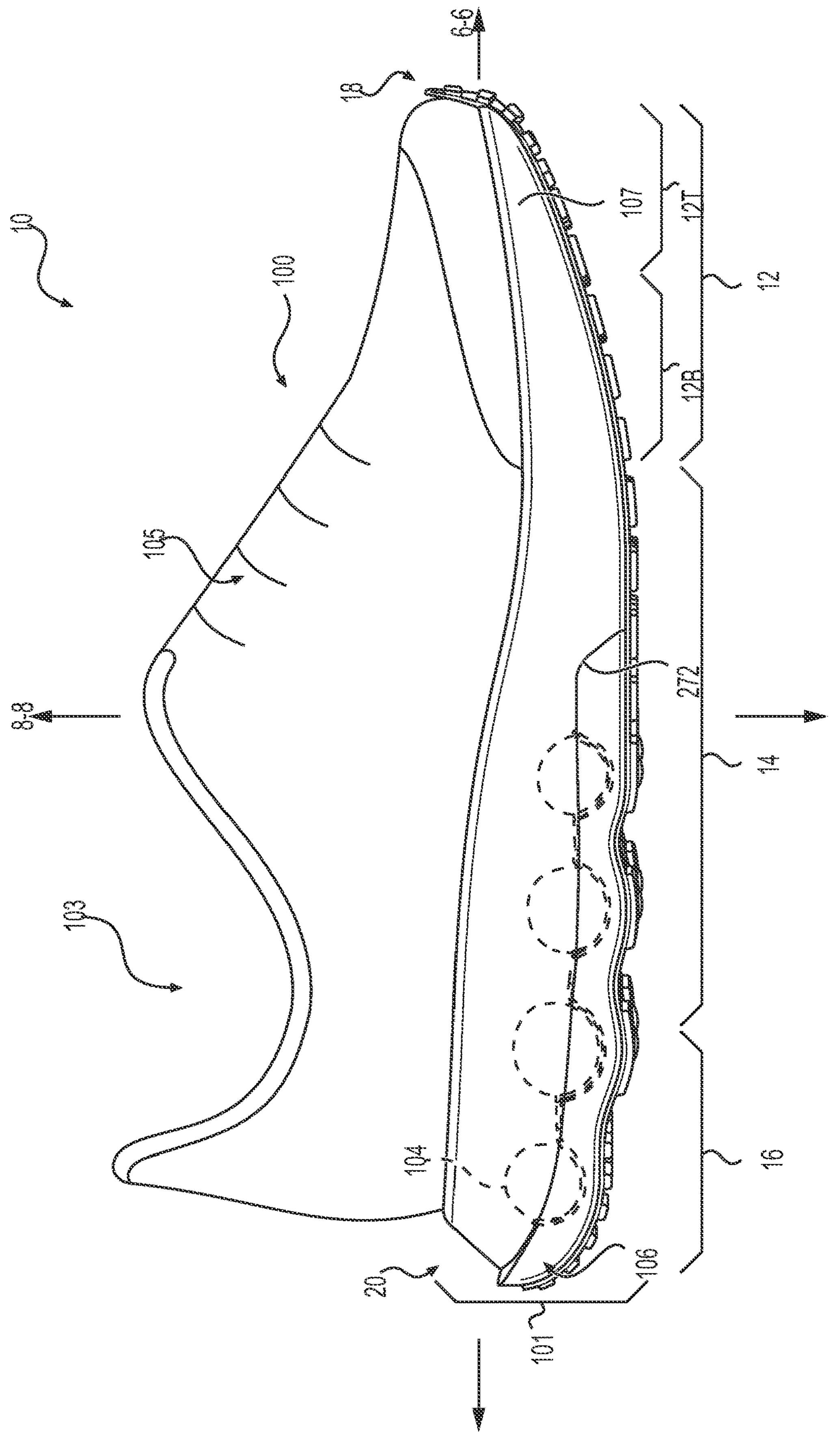
FIG. 44 is a side view of an alternative embodiment of the article of footwear.
Figure 45:
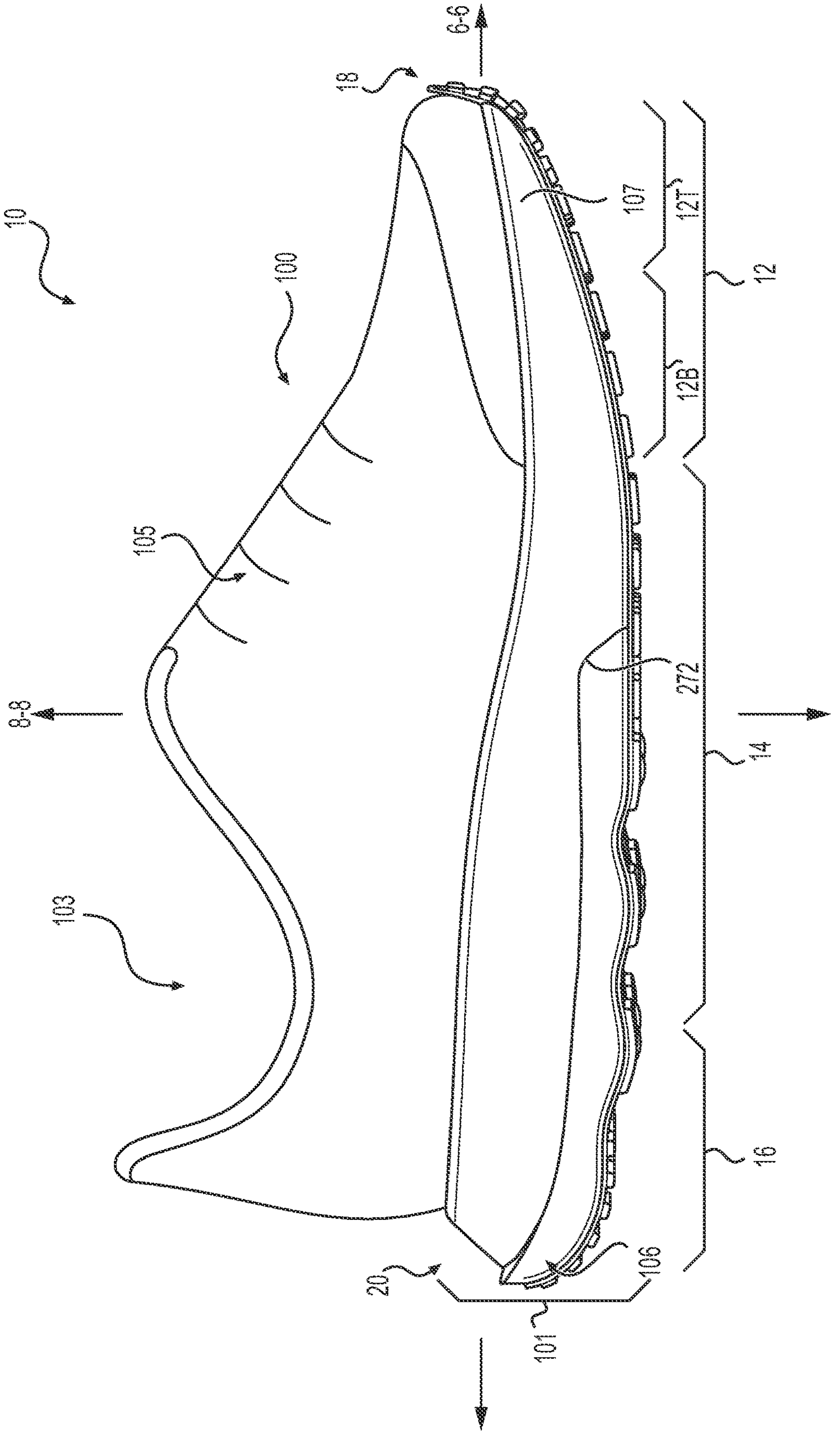
FIG. 45 is a side view of the alternative embodiment of the article of footwear of FIG. 44.

FIGS. 44 and 45 show an example of an alternative sole structure where the cushioning element 104 is not visible from the outside environment. The cushioning element 104 is housed entirely within the midsole 102 of the sole structure 101. It is contemplated that the cushioning element 104 may be only partially enclosed by the midsole 102.

Figure 46A:
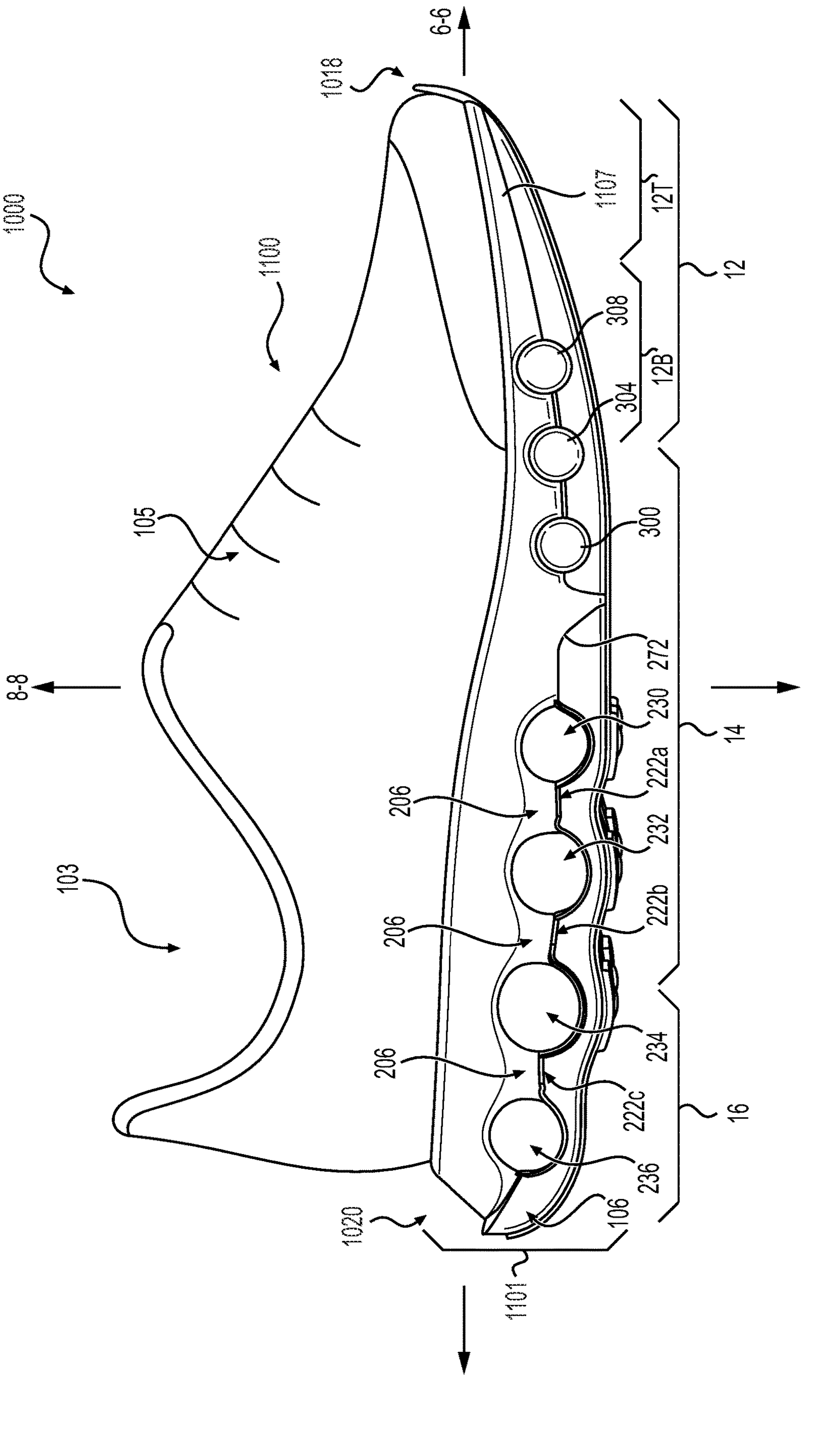
FIG. 46A is a side view of an alternative embodiment of an article of footwear.

In some examples, e.g. as shown in FIG. 46A, there are no gaps between first support element 107 and cushioning element 104, and also no gaps between second support element 106 and cushioning element 104, similar to the example of FIG. 33A.

Figure 46B:
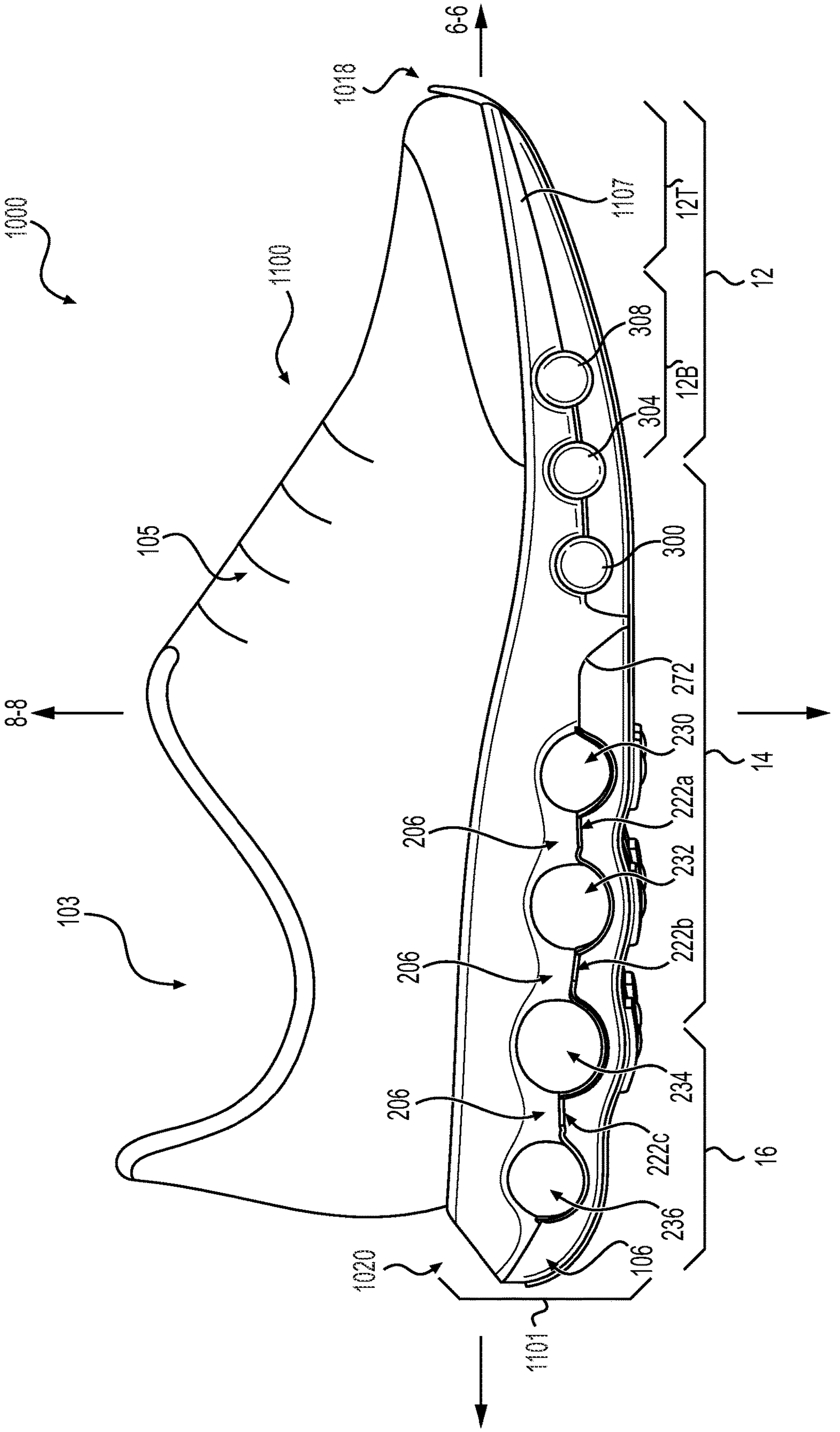
FIG. 46B is a side view an alternative embodiment of an article of footwear.

In some examples, e.g., as shown in FIG. 46B, rear portions of the midsole 102 and the outsole 106 rest flush with one another at the posterior end 20 forming a flush interface.

Figure 47:
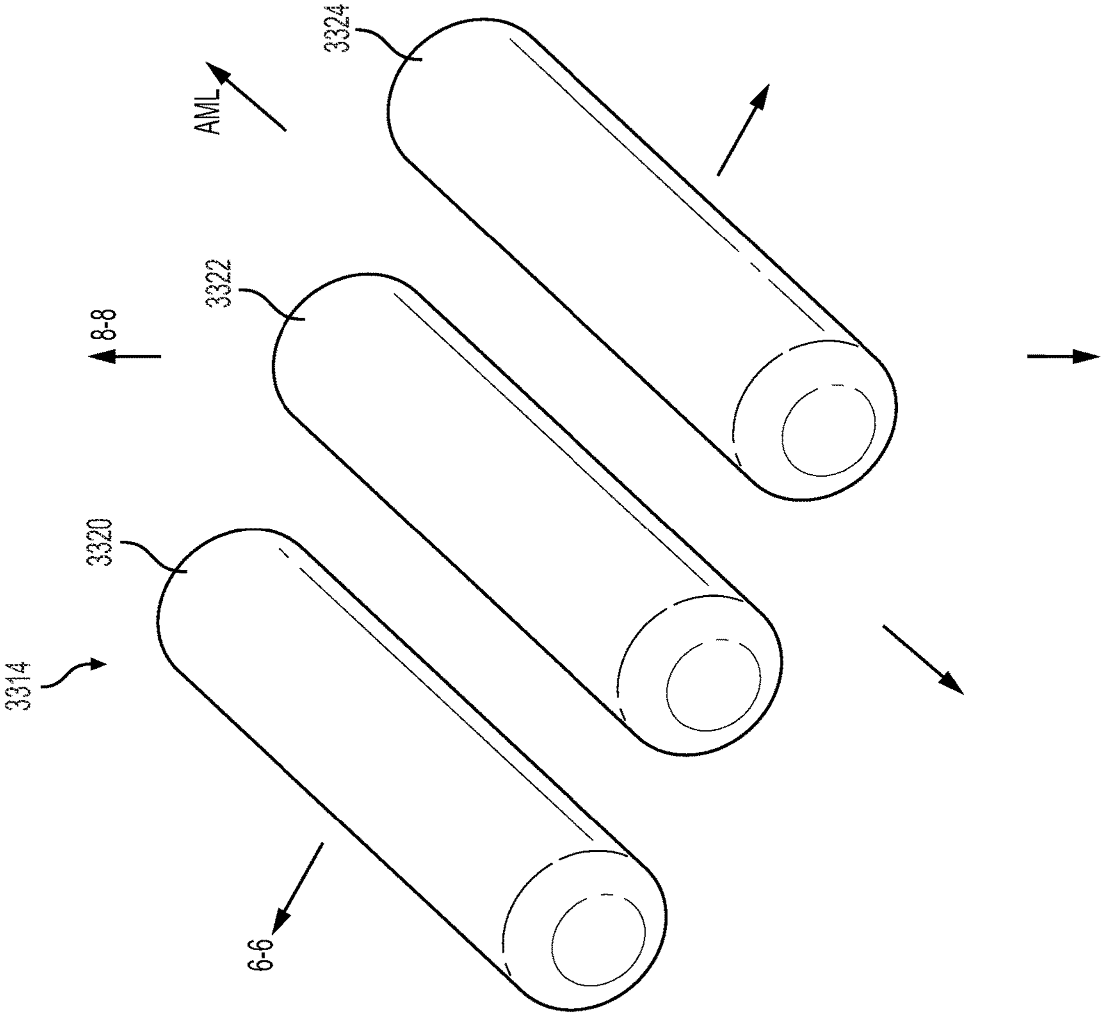
FIG. 47 is a perspective view of an alternative cushioning element of the article of footwear.

In an alternative example shown in FIG. 47, the cushioning element 3314 includes disconnected tubes 3320, 3322, and 3324. Tubes 3320, 3322, and 3324 are substantially cylindrical. None of the tubes 3320, 3322, or 3324 are coupled to or otherwise in communication with any other tube 3320, 3322, or 3324.

Figure 48:
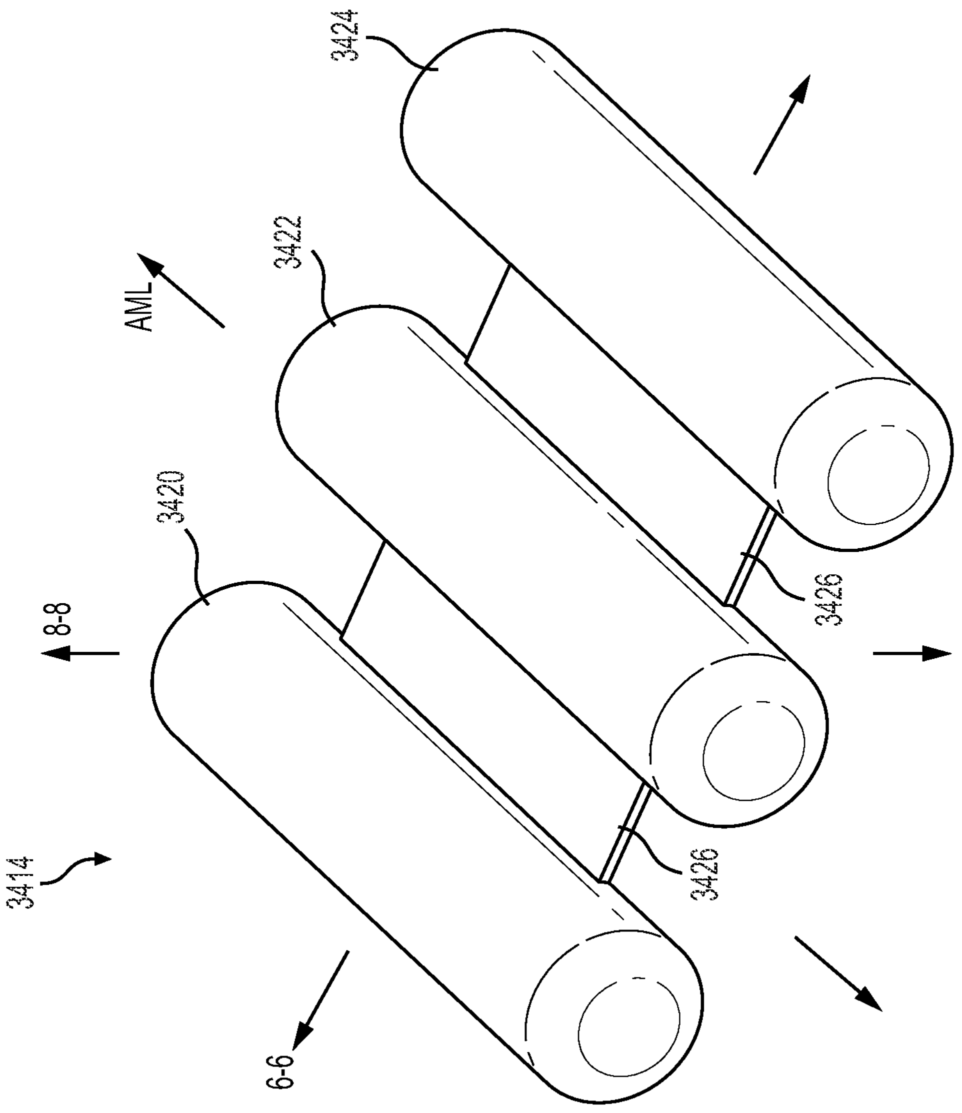
FIG. 48 is a perspective view of an alternative cushioning element of the article of footwear.

In an alternative example shown in FIG. 48, the cushioning element 3414 includes tubes 3420, 3422, and 3424, where the tubes 3420, 3422, and 3424 are interconnected by a web area 3426. Tubes 3420, 3422, and 3424 may be formed substantially similarly to tubes 3320, 3322, and 3324. Web area 1026 may be substantially similar to web areas 222 and 301.

Figure 49:
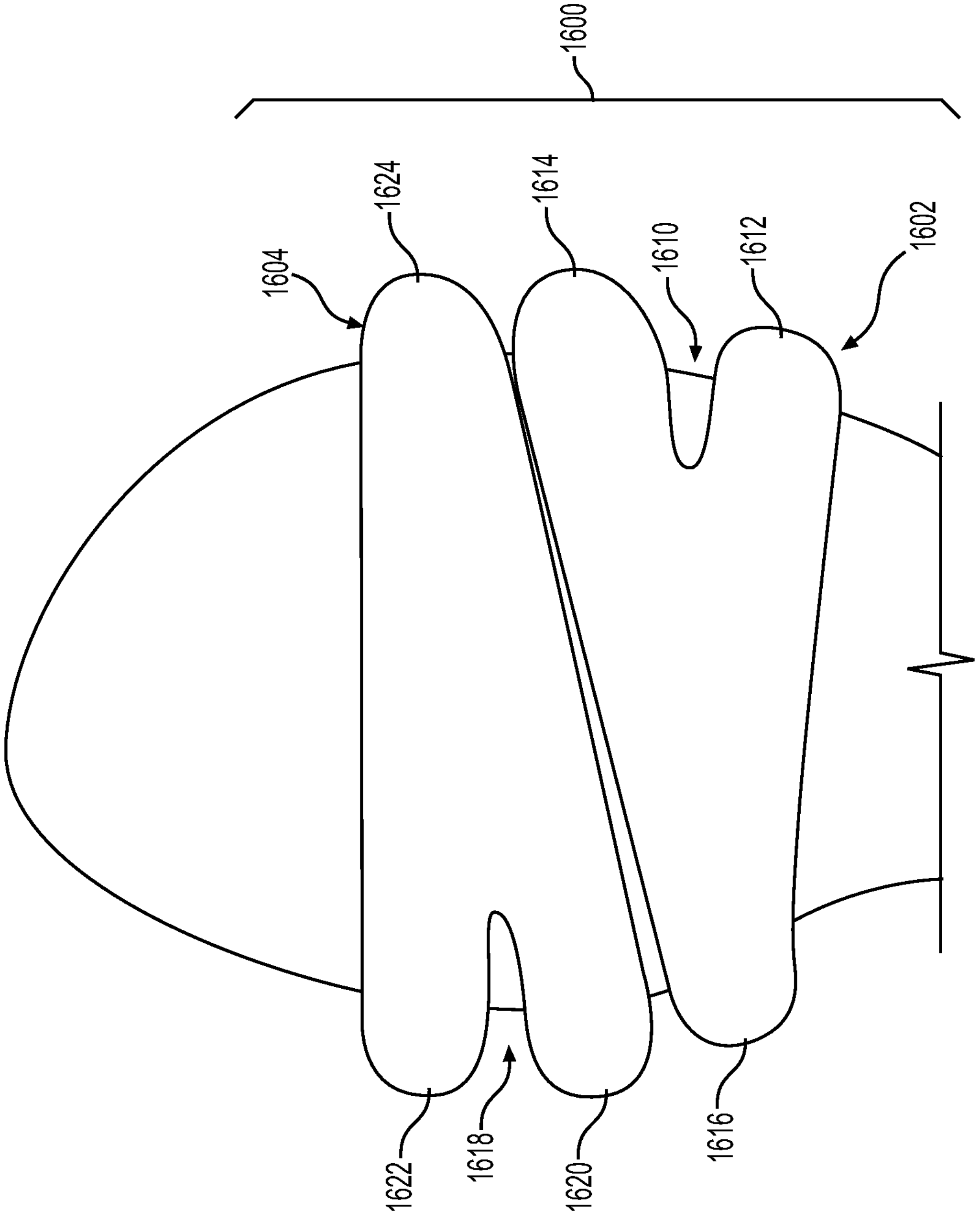
FIG. 49 is a bottom view of an alternative cushioning element of the article of footwear.

In an alternative example shown in FIG. 49, the cushioning element 1600 includes a first bladder 1602 and a second bladder 1604. The first bladder 1602 may be substantially v-shaped. The second bladder 1604 may be substantially v-shaped. The cushioning element 1600 may extend past a medial edge and a lateral edge of the article of footwear 1000. The first bladder 1602 includes a gap 1610, a first finger 1612, a second finger 1614, and a medial end 1616. The gap 1610 may separate the first finger 1612 and the second finger 1614. The second bladder 1604 includes a gap 1618, a first finger 1620, a second finger 1622, and a lateral end 1624. The gap 1618 may separate the first finger 1620 and the second finger 1622.

Figure 50:
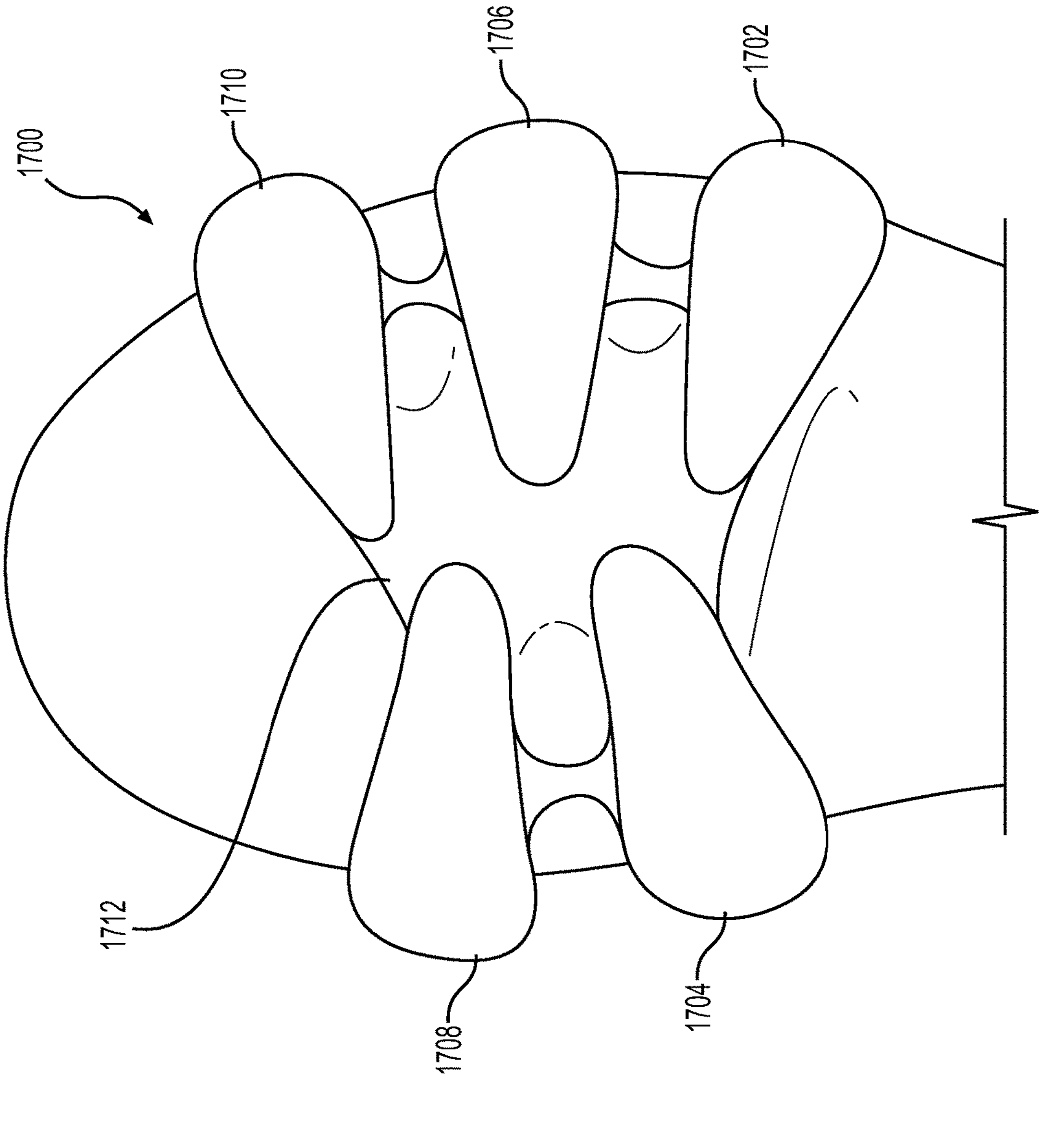
FIG. 50 is a bottom view of an alternative cushioning element of the article of footwear.

In an alternative example shown in FIG. 50, a cushioning element 1700 is shown with a web-like configuration. The cushioning element 1700 includes a plurality of tubes 1702, 1704, 1706, 1708, and 1710. Tubes 1702, 1706, and 1710 are disposed on a lateral portion of the article of footwear 1000. Tubes 1704 and 1708 are disposed on a medial portion of the article of footwear. Each of tubes 1702, 1704, 1706, 1708, and 1710 are interconnected by a web area 1712.

Figure 51:
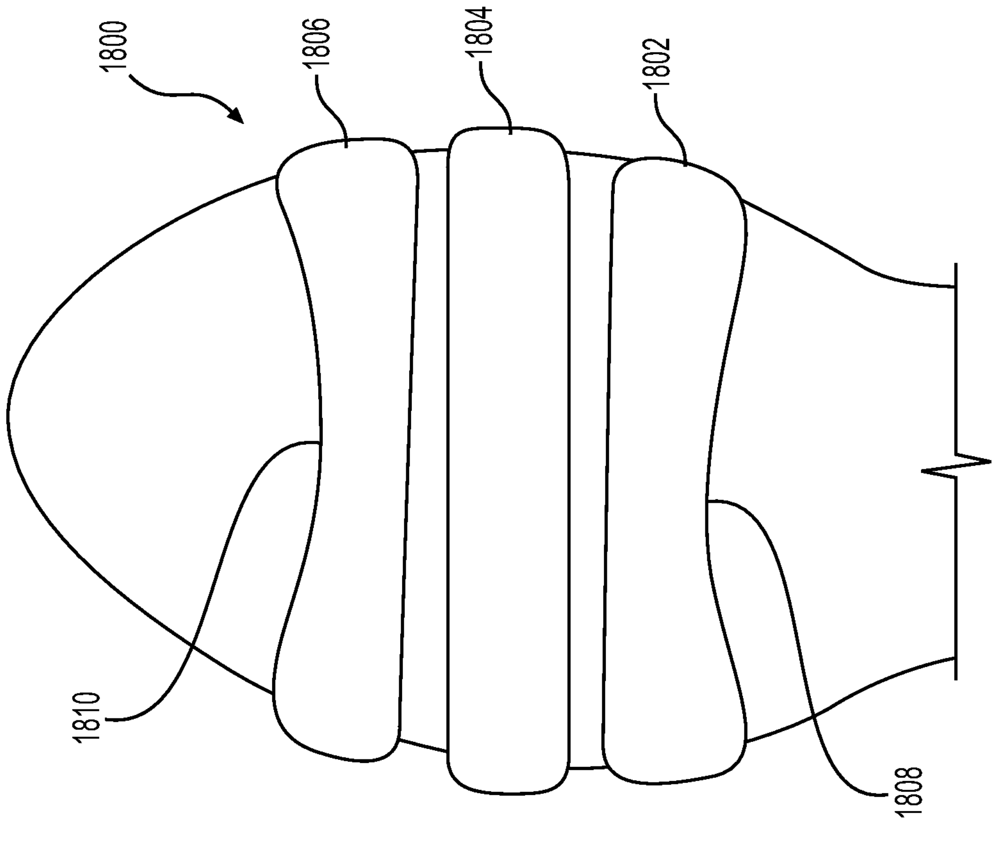
FIG. 51 is a bottom view of an alternative cushioning element of the article of footwear.

In an alternative example shown in FIG. 51, a cushioning element 1800 includes a plurality of tubes 1802, 1804, and 1806. The tubes 1802, 1804, and 1806 may be substantially similar to tubes 230, 232, 234, and 236, but disposed in the forefoot. Tubes 1802 and 1806 each includes a respective longitudinal depression 1808 and 1810.

Figure 52:
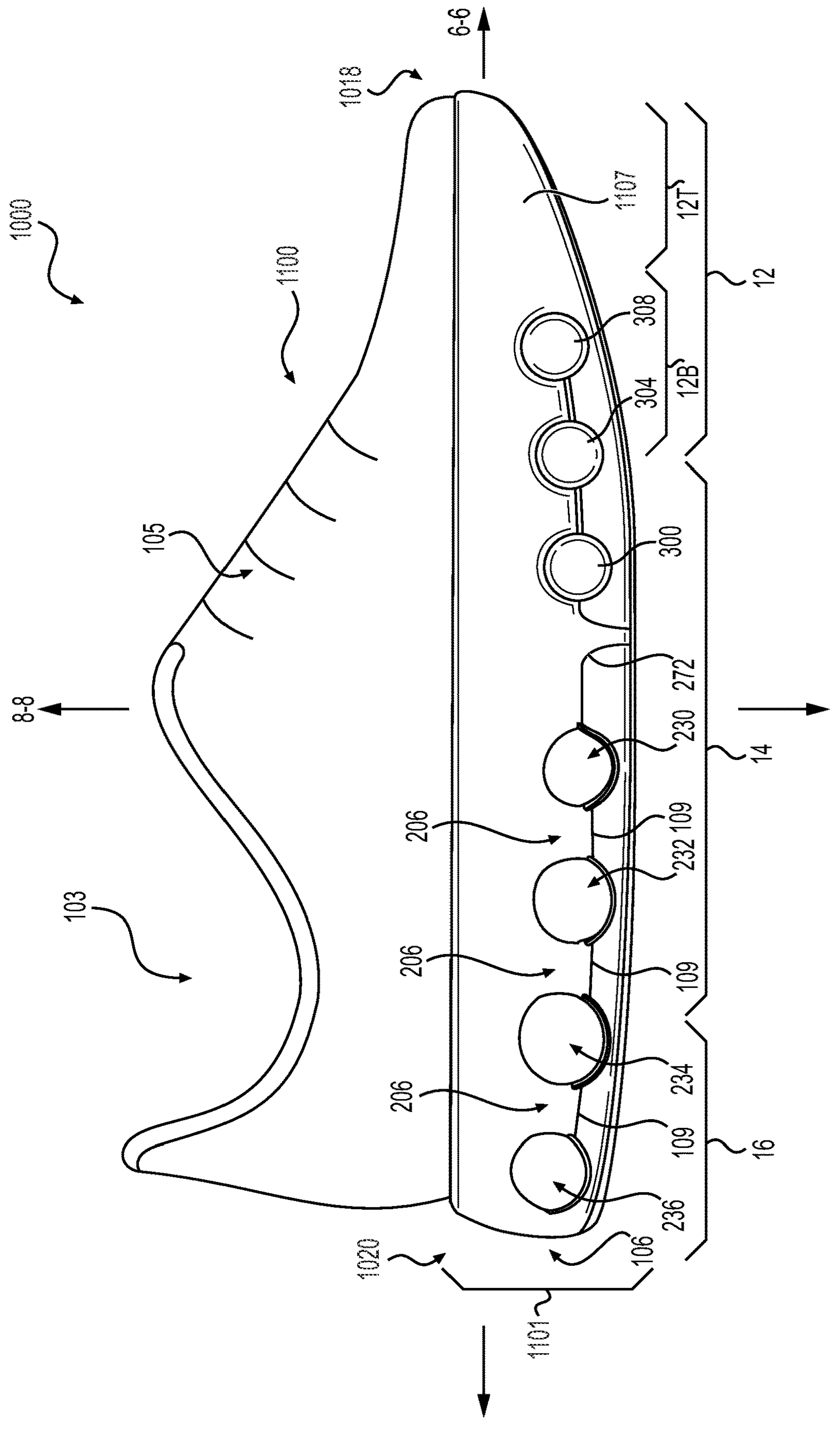
FIG. 52 is a side view of an alternative embodiment of the article of footwear.

The article of footwear 1000 includes alternatively shaped elements to provide varying underfoot sensation. In an alternative example shown in FIG. 52, the first support element 1107 contacts the second support element 106 at contact areas 109, substantially similarly to the footwear described in FIG. 41.

Figure 53:
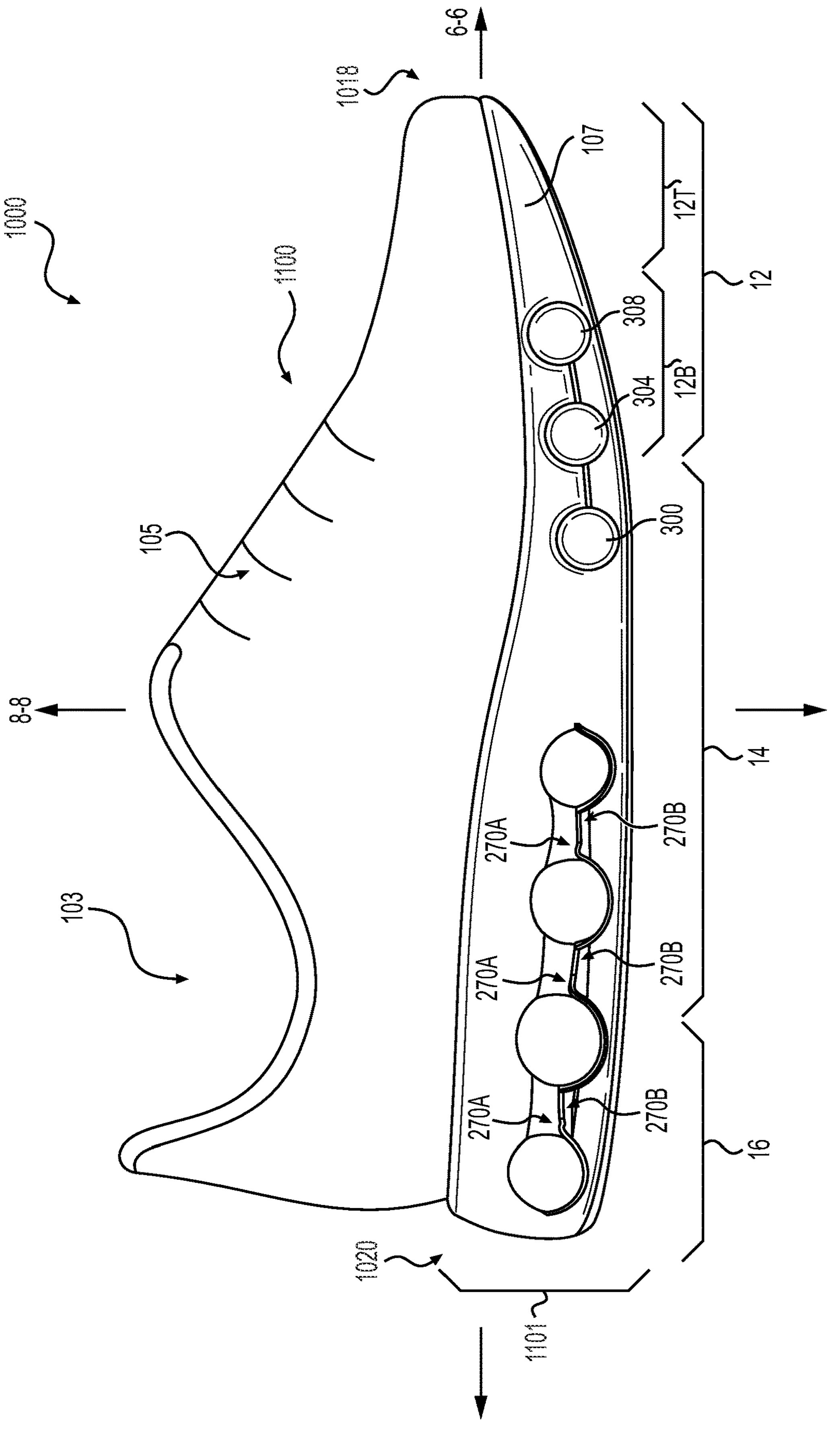
FIG. 53 is a side view of an alternative embodiment of the article of footwear.

An alternative example of the article of footwear 1000 with alternative shaped features providing varying underfoot sensation is shown in FIG. 53.

Figure 54:
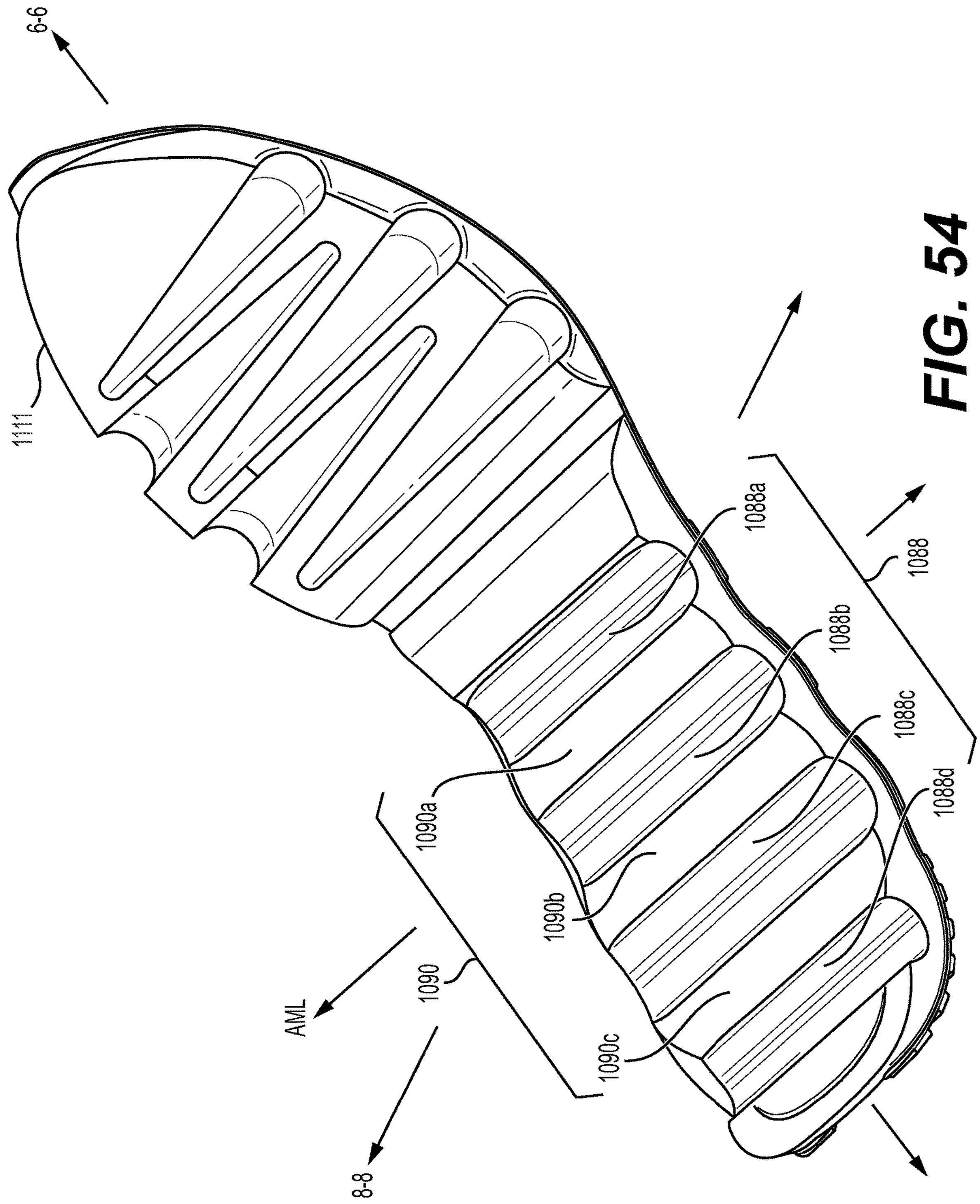
FIG. 54 is a perspective view of an alternative first foam element of the article of footwear.

In an alternative example shown in FIG. 54, the unitary support element 1086 can be used in combination with the third support element 1111.

Figure 55:
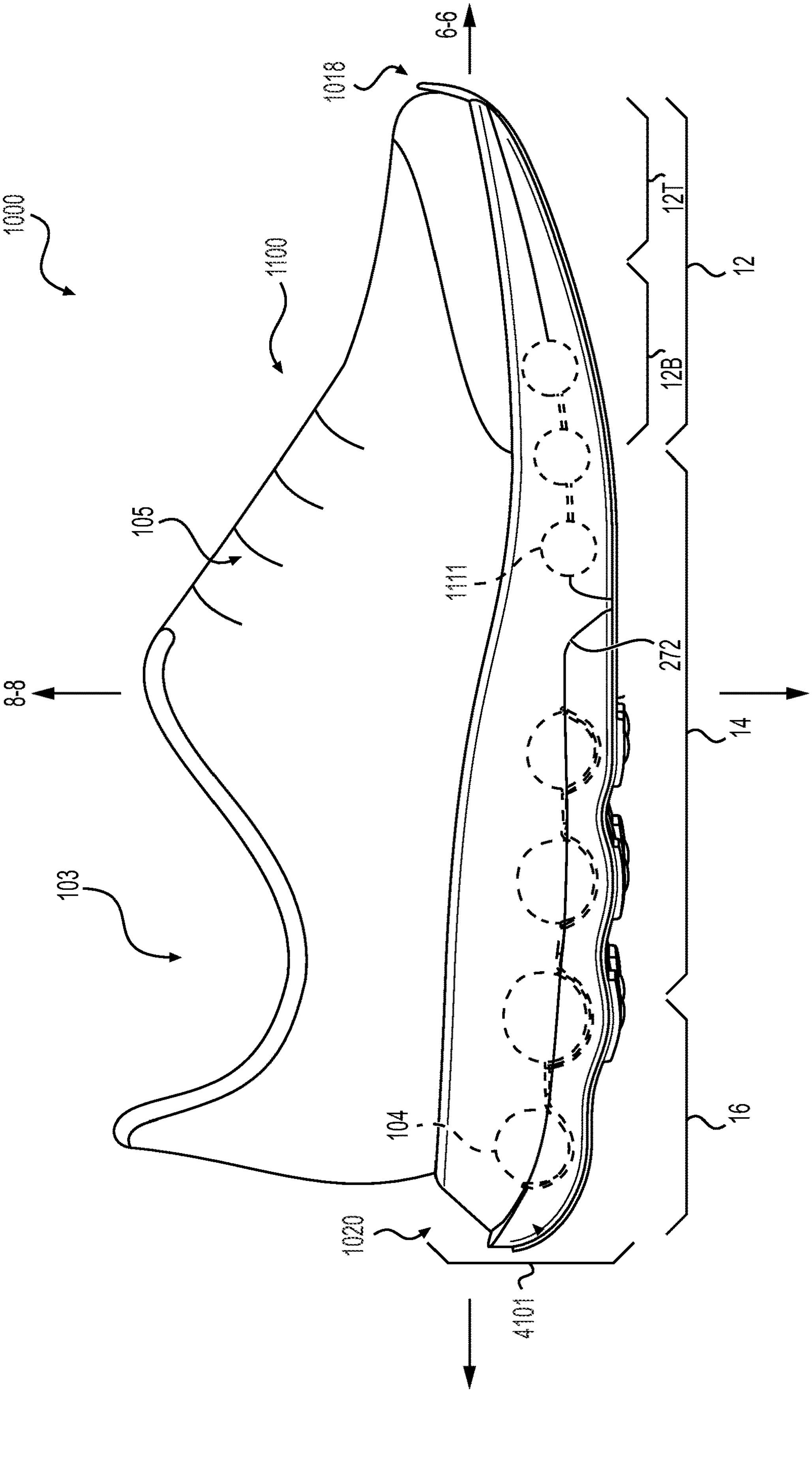
FIG. 55 is a side view of an alternative embodiment of the article of footwear.
Figure 56:
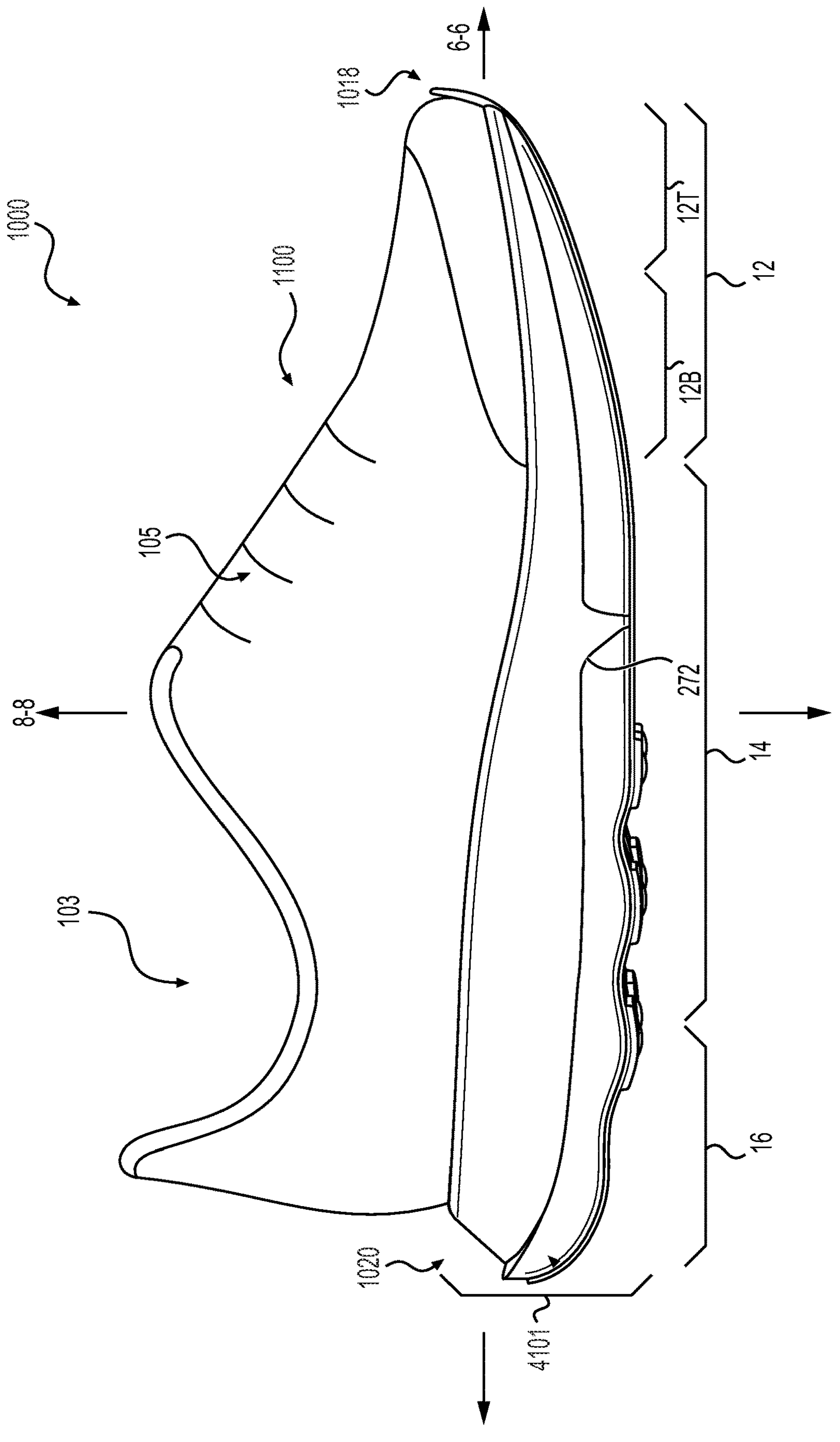
FIG. 56 is a side view of the alternative embodiment of the article of footwear of FIG. 55.

FIGS. 55 and 56 show an example of an alternative sole structure where the heel cushioning element 104 and the forefoot cushioning element 1114 are not visible from the outside environment. The heel cushioning element 104 and the forefoot cushioning element 1114 are housed entirely within the midsole 1102 of the sole structure 1001. It is contemplated that the heel cushioning element 104 and the forefoot cushioning element 1114 may be only partially enclosed by the midsole 1102.

Figure 57:
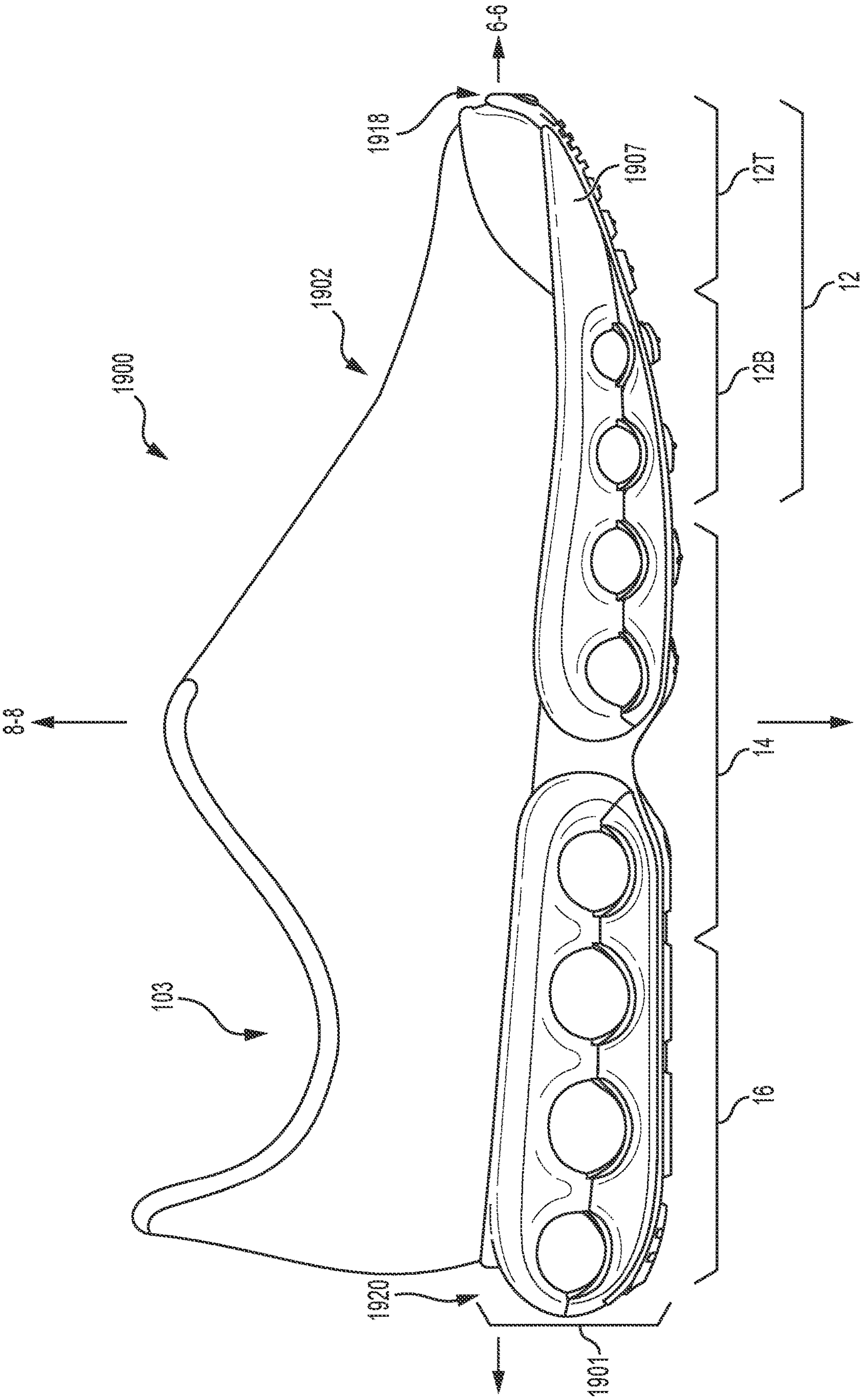
FIG. 57 is a side view of an alternative embodiment of the article of footwear.

FIG. 57 shows an example of an alternative sole structure 5701 including an additional support element 5706 disposed between the forefoot cushioning element 1914 and an outsole layer 5711. Support element 5706 is configured to provide added moderation to the forefoot cushioning element 1914. Support element 5706 may be substantially similar to the combination of second support element 1906 and first engagement area 2202. Support element 5706 extends from a portion of the midfoot region 14 to a portion of the forefoot region 12.

Figure 58:
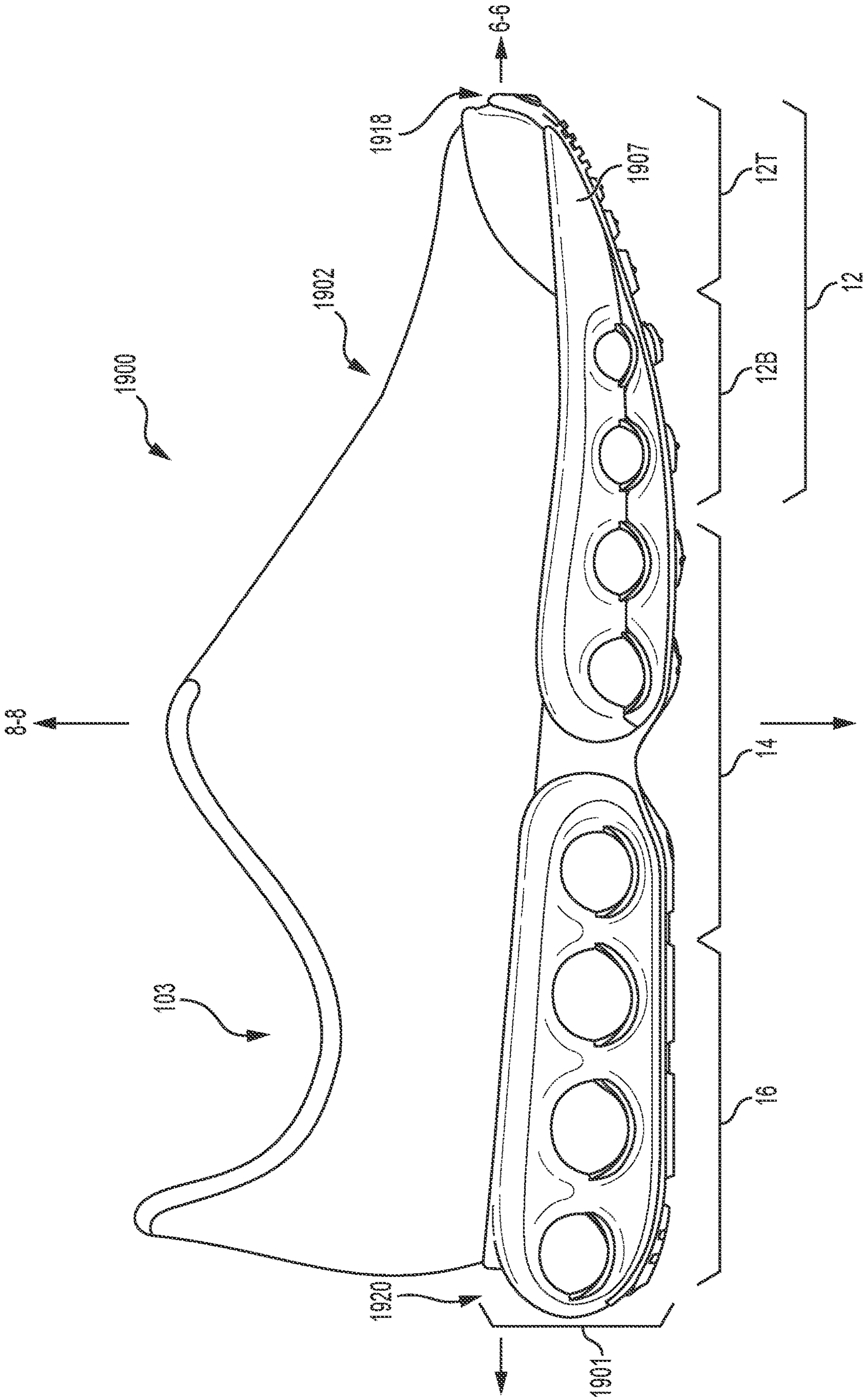
FIG. 58 is a side view of an alternative embodiment of the article of footwear.

FIG. 58 shows an example of an alternative sole structure 5801 including an additional support element 5806, similar to additional support element 5706, and a midsole 5807. Midsole 5807 is configured to receive forefoot cushioning element 1914 and is configured to enclose the heel cushioning element 104. Midsole 5807 engages an outsole layer 5811 in the heel region 16 and at an anterior end 5818.

Figure 59:
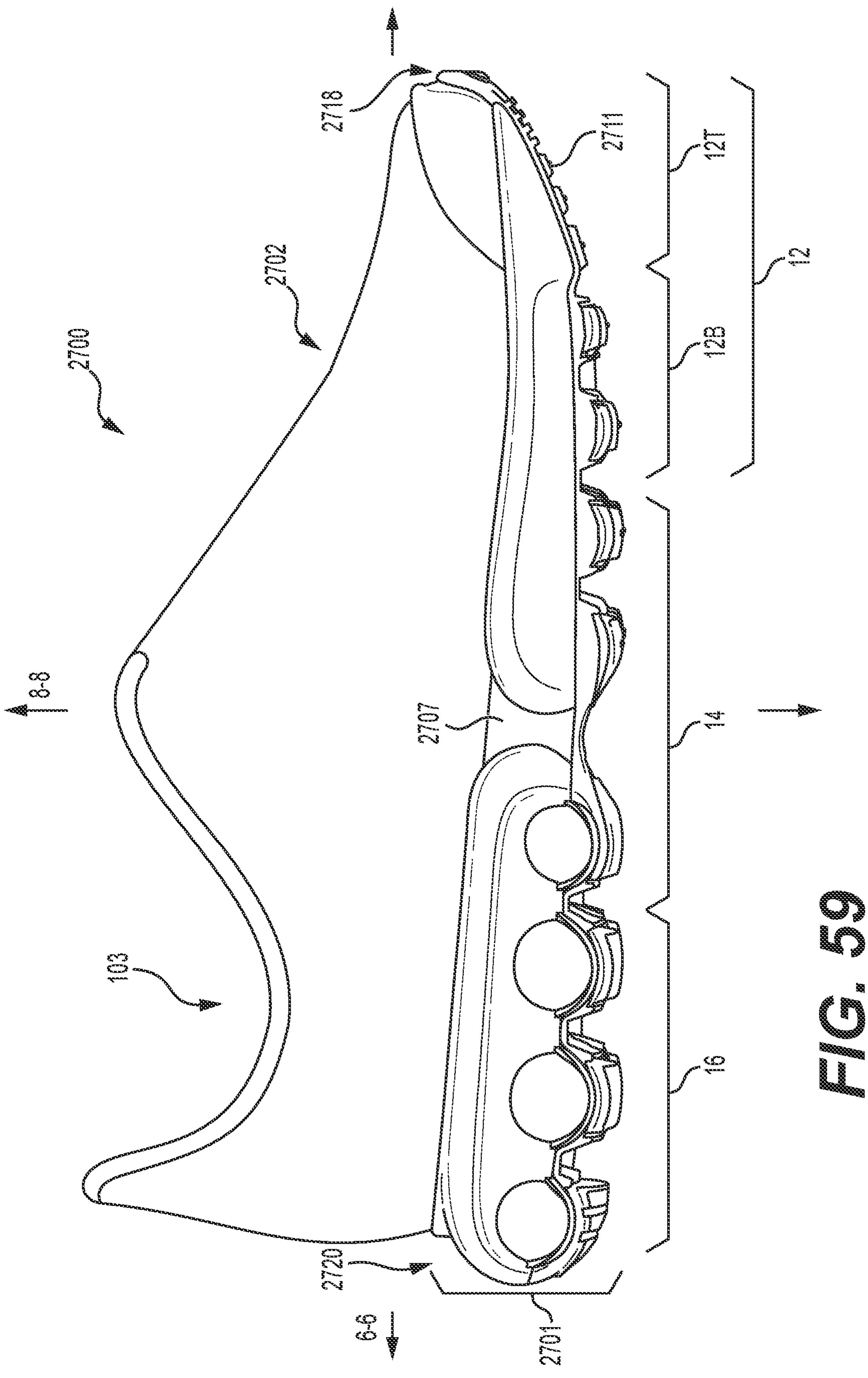
FIG. 59 is a side view of an alternative embodiment of the article of footwear.

FIG. 59 shows an example of an alternative sole structure 5901 including the heel cushioning element 104 coupled directly to an outsole layer 5911. A midsole 5907 may be coupled accordingly to the heel cushioning element 104 in the heel region 16 and a portion of the midfoot region 14, and may be coupled to the outsole layer 5911 in a portion of the midfoot region 14 and the forefoot region 12. The heel cushioning element 104 is coupled directly to the outsole layer 5911. The outsole layer 5911 is configured to attach directly to the cushioning element 104 in the heel region 16 and to the midsole 5907 in the midfoot region 14 and the forefoot region 12.

Figure 60:
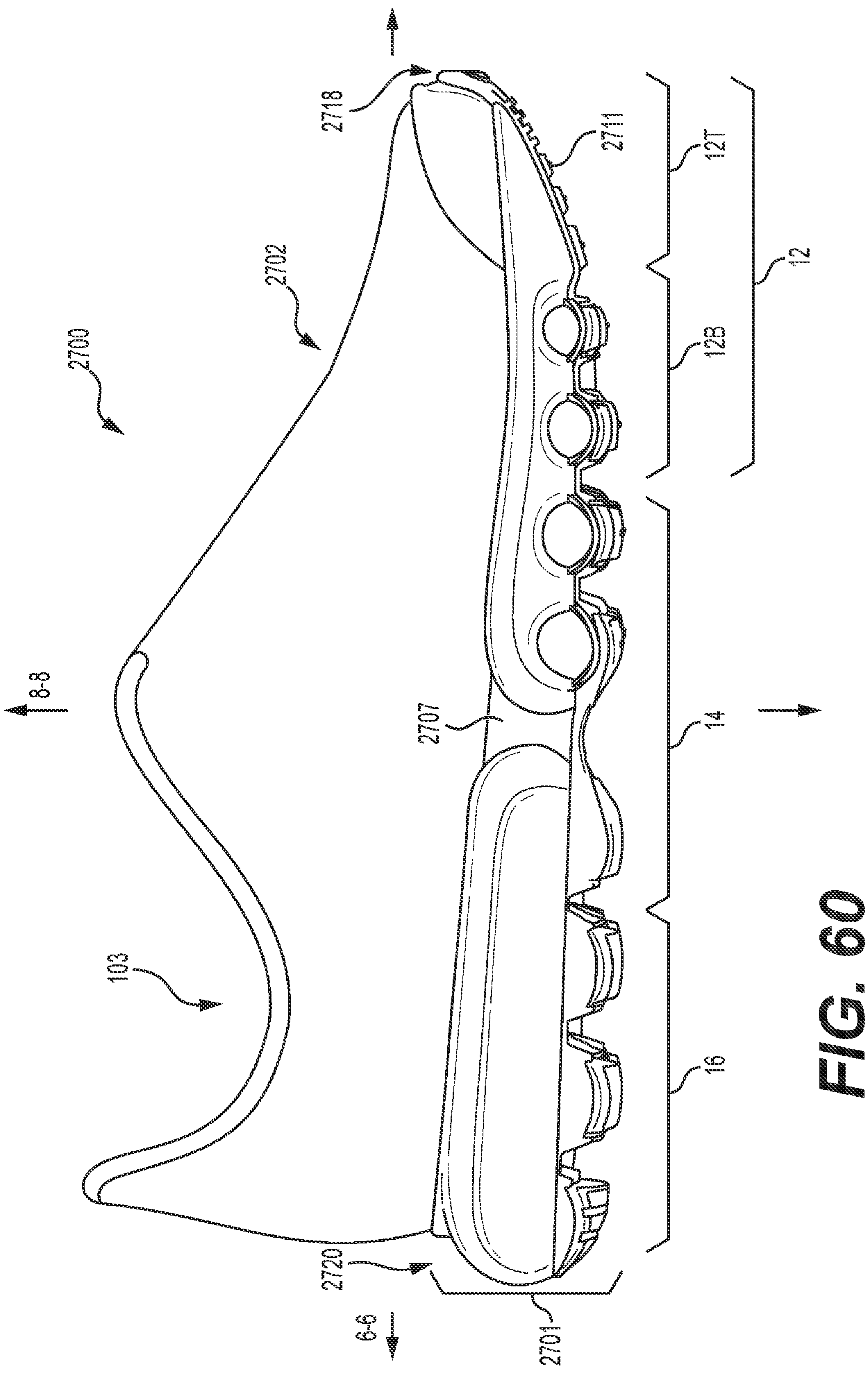
FIG. 60 is a side view of an alternative embodiment of the article of footwear.

FIG. 60 shows an example of an alternative sole structure 6001 including the heel cushioning element 104 coupled directly to an outsole layer 6011. A midsole 6007 may be coupled accordingly to the forefoot cushioning element 1904 in the forefoot region 12 and a portion of the midfoot region 14, and may be coupled to the outsole layer 5911 in a portion of the midfoot region 14 and the heel region 16. The forefoot cushioning element 1904 is coupled directly to the outsole layer 6011. The outsole layer 6011 is configured to attach directly to the cushioning element 1904 in the forefoot region 12 and to the midsole 6007 in the midfoot region 14 and the heel region 16.

Figure 61:
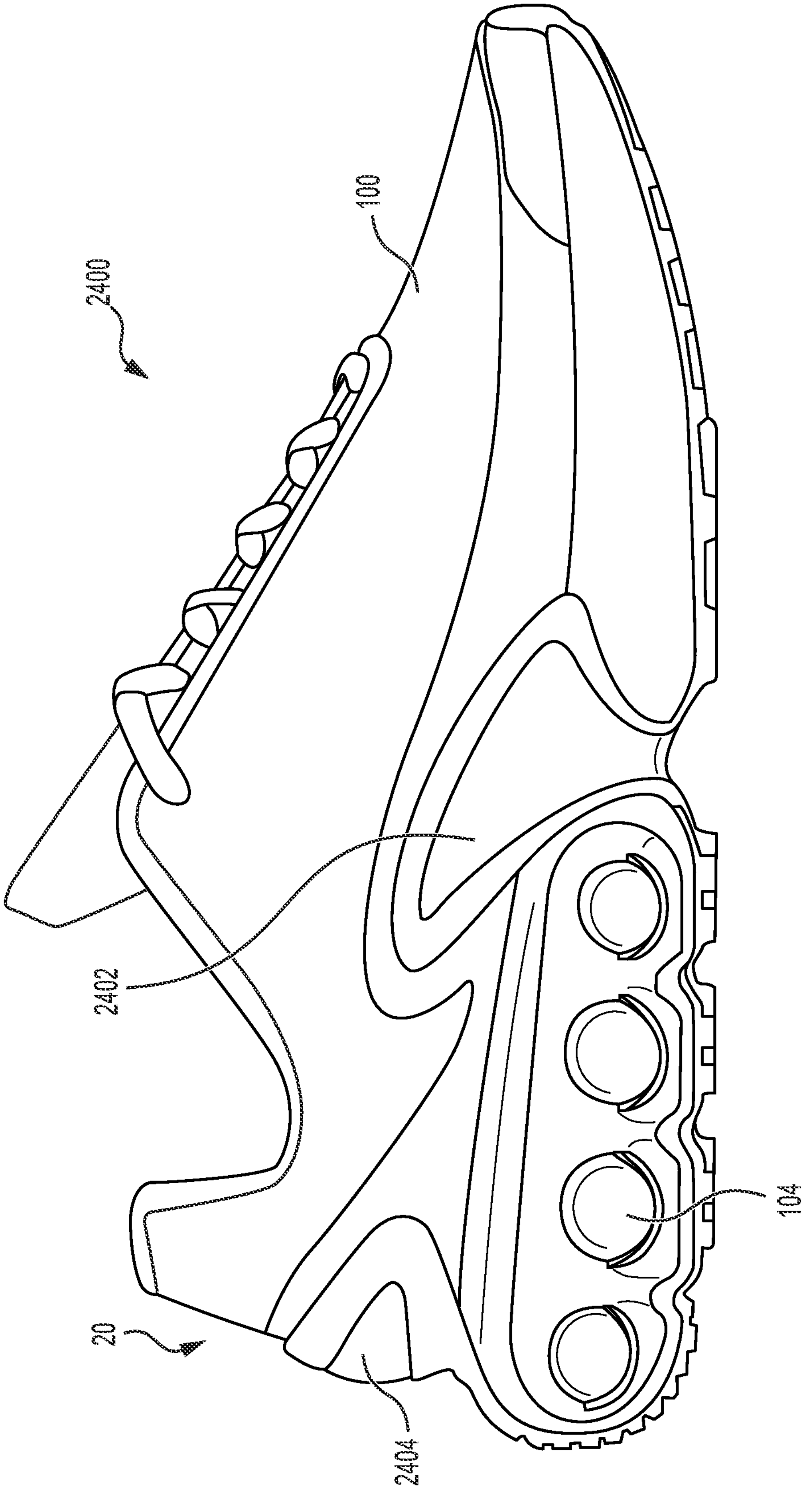
FIG. 61 is a side of an alternative embodiment of the article of footwear.
Figure 62:
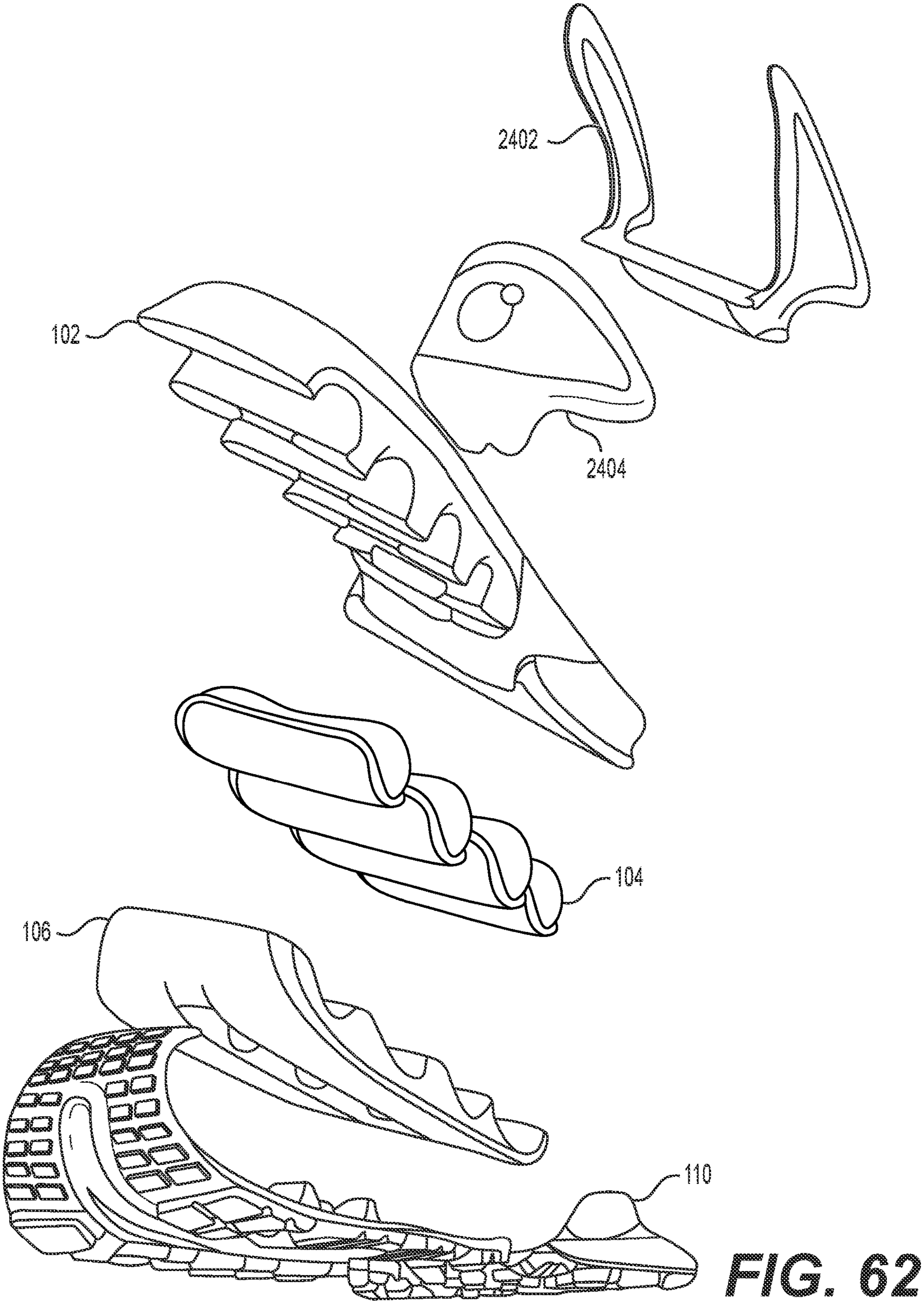
FIG. 62 is an exploded view of an alternative embodiment of the article of footwear of FIG. 61.

FIGS. 61 and 62 show an example of an alternative article of footwear 2400 including a shank 2402 and a heel counter 2404. Article of footwear 2400 includes like reference numerals for portions that are substantially similar to article of footwear 10. The shank 2402 may be disposed in the mid-foot region 14. Shank 2402 extends from the medial side 22 to the lateral side 24. In an example, the shank 2402 continuously extends from the medial side 22 to the lateral side 24. In other examples, the shank 2402 may be compositely formed such that separate elements form the shank 2402. The shank 2402 may include a thermoplastic polyurethane (TPU) or any other suitable material for providing a desired form of medial and/or lateral support to the article of footwear 2400.

The heel counter 2404 may wrap around the posterior end 20 of the footwear 2400. In an example, the upper 100 and the heel counter 2404 may be formed as separate components and joined together using a fastening means, such as an adhesive or welding process. The upper 100 and the heel counter 2404 may include different materials. For example, the upper 100 may include a material having a different hardness and/or stiffness than the heel counter 2404. In one example, the heel counter 2404 includes a rigid material having a greater hardness than the upper 100. Alternatively, the upper 100 and the heel counter 204 may be integrally formed of a continuous and unitary (i.e., seamless) piece of material.

It is contemplated that in other alternative examples, the heel cushioning element 104 and/or the forefoot cushioning element 1114 may directly contact the outsole layer 110 or the outsole layer 1110. In other words, the second support element 106 and the third support element 1111 may be omitted in certain alternative examples. In other alternative examples, the heel cushioning element 104 and/or the forefoot cushioning element 1114 may directly contact a ground surface. In other words, the outsole layer 110 may not extend to the heel region, and the second support element 106 and the coupling portion 108 may be omitted, or the outsole layer 1110 may not extend to the forefoot region, and the third support element 1111 may be omitted.

In some examples, portions of the cushioning element formed by the upper and lower films 216, 218 may be formed by respective mold portions during a thermoforming process. Each mold portion may define various surfaces for forming depressions and pinched surfaces corresponding to locations where the web area 222 and/or the peripheral seam 224 are formed when the upper film 216 and the lower film 218 are joined and bonded together. In some examples, adhesive bonding may join the upper film 216 and the lower film 218 to form the web area 222 and the peripheral seam 224. In other examples, the upper film 216 and the lower film 218 may be joined to form the web area 222 and the peripheral seam 224 by thermal bonding. In some examples, one or both of the films 216, 218 may be heated to a temperature that facilitates shaping and melding. In some examples, the films 216, 218 may be heated prior to being located between their respective molds. In other examples, the mold may be heated to raise the temperature of the films 216, 218. In some implementations, a molding process used to form the tubes 230, 232, 234, and 236 as well as the tubes 300, 302, 304, 306, and 308 may incorporate vacuum ports within mold portions to remove air such that the upper and lower films 216, 218 are drawn into contact with respective mold portions. In other examples, fluids such as air may be injected into areas between the upper and lower films 216, 218 such that pressure increases cause the films 216, 218 to engage with surfaces of their respective mold portions. The fluid may be injected into tubes 230, 232, 234, and 236 until a desired pressure is achieved. Once tubes 234, and 236 achieve the desired pressure, tubes 234 and 236 are fluidly sealed off from one another as well as tubes 230 and 232. After sealing tubes 234 and 236, tubes 230 and 232 may have fluid bled out until a desired pressure is achieved in tubes 230 and 232. Once tubes 230 and 232 are bled to their desired pressure, each of tubes 230 and 232 are fluidly sealed from one another as well as tubes 234 and 236. The fluid may be injected into the tubes 300, 302, 304, 306, and 308 until a desired pressure is achieved.

As used herein, the term "barrier film" (e.g., barrier films 216, 218) encompasses both monolayer and multilayer films. In some examples, one or both of barrier films 216, 218 are each produced (e.g., thermoformed or blow molded) from a monolayer film (a single layer). In other examples, one or both of barrier films 216, 218 are each produced (e.g., thermoformed or blow molded) from a multilayer film (multiple layers).

The multi-layered film may comprise a plurality of layers. The plurality of layers may comprise one or more barrier layers. The one or more barrier layers may comprise a barrier material. The barrier material may comprise or consist essentially of one or more gas barrier compounds. The multi-layered film may comprise at least 5 layers or at least 10 layers. In other embodiments, the multi-layered film may comprise from about 5 layers to about 400 layers. In one aspect of a multi-layered film, the plurality of layers may include a series of alternating layers, in which the alternating layers include two or more barrier layers. Each of the two or more barrier layers may individually comprise a barrier material, the barrier material comprising or consisting essentially of one or more gas barrier compounds. In the series of alternating layers, adjacent layers may be individually formed of materials which differ from each other at least in their chemical compositions based on the individual components present (e.g., the materials of adjacent layers may differ based on whether or not a gas barrier compound is present, or differ based on class or type of gas barrier compound present), the concentration of the individual components present (e.g., the materials of adjacent layers may differ based on the concentration of a specific type of gas barrier compound present), or may differ based on both the components present and their concentrations.

The barrier film may be a multi-layered film comprising a plurality of layers, the plurality of layers including one or more layers comprising, consisting essentially of, or consisting of one or more barrier materials, the one or more barrier materials comprising, consisting essentially of, or consisting of one or more gas barrier compounds. The one or more gas barrier compounds may comprise, consist essentially of, or consist of one or more gas barrier polymers. The multi-layered film may comprise a total of at least 5 layers or at least 10 layers. The multi-layered film may comprise at least 5 barrier layers or at least 10 barrier layers. The multi-layered film may comprise a total of from about 5 to about 200 layers, from about 10 to about 100 layers, from about 20 to about 80 layers, from about 20 to about 50 layers, or from about 40 to about 90 layers. The multi-layered film may comprise from about 5 to about 200 barrier layers, from about 10 to about 100 barrier layers, from about 20 to about 80 barrier layers, from about 20 to about 50 barrier layers, or from about 40 to about 90 barrier layers.

The plurality of layers of the multi-layered film may include a series of alternating layers, wherein the alternating layers include two or more barrier layers, each of the two or more barrier layers individually comprising a barrier material, the barrier material comprising, consisting essentially of, or consisting of one or more gas barrier compounds. Optionally, the one or more gas barrier compounds may comprise, consist essentially of, or consist of one or more gas barrier polymers, one or more non-polymeric gas barrier compounds, or a mixture of one or more gas barrier polymers and one or more non-polymeric gas barrier compounds. In the series of alternating layers, adjacent layers are individually formed of materials which differ from each other at least in their chemical compositions based on the individual components present in the materials forming the adjacent layers. For example, the materials of adjacent layers may differ based on whether or not a gas barrier compound is present, or may differ based on a class or type of gas barrier compound present (e.g., may differ based on whether or not a gas barrier polymer is present, or whether or not a non-polymeric gas barrier compound is present), or may differ based on a concentration of an individual compound present (e.g., may differ based on the concentration of a gas barrier compound present), or any combination thereof. In one example, the series of alternating layers of a multi-layer barrier film may include barrier layers comprising, consisting essentially of, or consisting of a polymeric barrier compound, and layers which are substantially free of the polymeric barrier compound. In another example, the series of alternating layer of a multi-layer barrier film may include barrier layers consisting essentially of a polymeric barrier compound, and layers of a polymeric material comprising a mixture of one or more non-barrier polymers and less than about 20 weight percent of the polymeric barrier compound based on the total weight of the polymeric material. The multi-layered film may have a gas transmittance rate as described herein.

The plurality of layers of the multi-layered film may include first barrier layers comprising a first barrier material and second barrier layers comprising a second barrier material, wherein the first and second barrier materials comprise first and second gas barrier compounds which differ from each other either based on their chemical structures or based on their concentration in the barrier material or based on both their chemical structures and their concentrations in the barrier material. The first barrier material may comprise, consist essentially of, or consist of a first gas barrier component, the first gas barrier component consisting of all the gas barrier compounds present in the first barrier material. Similarly, the second barrier material may comprise, consist essentially of, or consist of a second gas barrier component, the second barrier material component consisting of all the gas barrier compounds present in the second barrier material. In a first example, the first barrier component may consist of one or more one gas barrier polymers, and the second barrier component may consist of one or more inorganic gas barrier compounds. In a second example, the first barrier component may consist of a first gas barrier polymer, and the second component may consist of a second gas barrier polymer, wherein the first gas barrier polymer differs from the second gas barrier polymer based on its chemical structure, for example, based on the chemical structures of the monomers or oligomers used to make the polymers, or based on molecular weight of the polymers, or based on both. In a third example, the first barrier component and the second barrier component may both include one or more of the same gas barrier compounds, but the concentration of the gas barrier compounds in the first barrier material and the second barrier material may differ, optionally the concentrations may differ by at least 5 weight percent based on the weight of the barrier material. In the multi-layered film, the first barrier layers and the second barrier layers may alternate with each other, or may alternate with additional barrier layers (e.g., third barrier layers comprising a third barrier material, fourth barrier layers comprising a fourth barrier material, etc., wherein each of the first, second, third and fourth, etc., barrier materials differ from each other as described above). The multi-layer film may have a gas transmittance rate as described herein.

In addition to the one or more barrier layers (e.g., one or more first barrier layers, one or more second barrier layers, etc.), the multi-layered film may further comprise one or more second layers, the one or more second layers comprising a second material. The one or more second layers may comprise or consist of non-barrier layers, i.e., layers which do not include a barrier material, and which may have a relatively high gas permeation rate. The second layers, including the non-barrier layers, may comprise a polymeric material, such as a thermoplastic material, an elastomeric material, or a thermoplastic elastomeric material. The second material of the second layers may comprises one or more polymers. In one such configuration of the multi-layered film, the one or more barrier layers comprise or consist of a plurality of barrier layers alternating with a plurality of second layers. Each of the one or more barrier layers may be positioned between two second layers (e.g., with one second layer positioned on a first side of the barrier layer, and another second layer on a second side of the barrier layer, the second side opposing the first side). Optionally the concentrations may differ by at least 5 weight percent based on the weight of the barrier material. In these multi-layered films, the first barrier layers and the second barrier layers may alternate with each other, or may alternate with additional barrier layers (e.g., third barrier layers comprising a third barrier material, fourth barrier layers comprising a fourth barrier material, etc., wherein each of the first, second, third and fourth, etc., barrier materials differ from each other as described above).

In either example, each layer can have a film thickness ranging from about 0.2 micrometers to about 1 millimeter. In further examples, the film thickness for each layer can range from about 0.5 micrometers to about 500 micrometers. In yet further examples, the film thickness for each layer can range from about 1 micrometer to about 100 micrometers.

The lower barrier film 218 may have a greater thickness than the upper barrier film 216. It is contemplated that the upper barrier film 216 may have a greater thickness than the lower barrier film 218. It is also contemplated that the lower barrier film 218 may have a thickness that is equal to the upper barrier film 216.

One or both of barrier films 216, 218 may independently be transparent, translucent, and/or opaque. For example, the upper barrier film 216 may be transparent, while the lower barrier film 218 is opaque. It is contemplated that upper barrier film 216 may be transparent or translucent, while lower barrier film 218 is opaque, or upper barrier film 216 may be opaque, while lower barrier film 218 is transparent or translucent, etc. As used herein, the term "transparent" for a barrier film and/or a fluid-filled chamber means that light passes through the barrier film in substantially straight lines and a viewer can see through the barrier film. In comparison, for an opaque barrier film, light does not pass through the barrier film and one cannot see clearly through the barrier film at all. A translucent barrier film falls between a transparent barrier film and an opaque barrier film, in that light passes through a translucent film but some of the light is scattered so that a viewer cannot see clearly through the film.

The one or more tubes 230, 232, 234, and 236 may be produced from barrier films 216, 218 using any suitable technique, such as thermoforming (e.g. vacuum thermoforming), blow molding, extrusion, injection molding, vacuum molding, rotary molding, transfer molding, pressure forming, heat sealing, casting, low-pressure casting, spin casting, reaction injection molding, radio frequency (RF) welding, and the like. In an example, barrier films 216, 218 may be produced by co-extrusion followed by vacuum thermoforming to produce an inflatable tube of the one or more tubes 230, 232, 234, and 236, which may optionally include one or more valves 237 (e.g., one way valves) that allows the tubes 230, 232, 234, and 236 to be filled with a fluid (e.g., gas) and formed as a fluid-filled barrier. An example of fluid-filled bladders is shown in Rudy, U.S. Pat. No. 4,183,156, the disclosure of which are incorporated by reference in their entirety.

Barrier films 216, 218 may each be produced from an elastomeric material that includes one or more thermoplastic polymers and/or one or more cross-linkable polymers. In an example, the elastomeric material can include one or more thermoplastic elastomeric materials, such as one or more thermoplastic polyurethane (TPU) copolymers, one or more ethylene-vinyl alcohol (EVOH) copolymers, and the like.

As used herein, "polyurethane" refers to a copolymer (including oligomers) that contains a urethane group (—N(C═O)O—). These polyurethanes can contain additional groups such as ester, ether, urea, allophanate, biuret, carbodiimide, oxazolidinyl, isocynaurate, uretdione, carbonate, and the like, in addition to urethane groups. In an aspect, one or more of the polyurethanes can be produced by polymerizing one or more isocyanates with one or more polyols to produce copolymer chains having (—N(C═O)O—) linkages.

Examples of suitable isocyanates for producing the polyurethane copolymer chains include diisocyanates, such as aromatic diisocyanates, aliphatic diisocyanates, and combinations thereof. Examples of suitable aromatic diisocyanates include toluene diisocyanate (TDI), TDI adducts with trimethyloylpropane (TMP), methylene diphenyl diisocyanate (MDI), xylene diisocyanate (XDI), tetramethylxylylene diisocyanate (TMXDI), hydrogenated xylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and combinations thereof. In some embodiments, the copolymer chains are substantially free of aromatic groups.

In particular examples, the polyurethane polymer chains are produced from diisocynates including HMDI, TDI, MDI, H12 aliphatics, and combinations thereof. In an aspect, the thermoplastic TPU can include polyester-based TPU, polyether-based TPU, polycaprolactone-based TPU, polycarbonate-based TPU, polysiloxane-based TPU, or combinations thereof.

In another example, the polymeric layer can be formed of one or more of the following: EVOH copolymers, poly(vinyl chloride), polyvinylidene polymers and copolymers (e.g., polyvinylidene chloride), polyamides (e.g., amorphous polyamides), amide-based copolymers, acrylonitrile polymers (e.g., acrylonitrile-methyl acrylate copolymers), polyethylene terephthalate, polyether imides, polyacrylic imides, and other polymeric materials known to have relatively low gas transmission rates. Blends of these materials as well as with the TPU copolymers described herein and optionally including combinations of polyimides and crystalline polymers, are also suitable.

The barrier films 216, 218 may be multi-layer films including two or more layers. Barrier films 216, 218 may each independently include alternating layers of one or more TPU copolymer materials and one or more EVOH copolymer materials, where the total number of layers in each of barrier films 216, 218 includes at least four (4) layers, at least ten (10) layers, at least twenty (20) layers, at least forty (40) layers, and/or at least sixty (60) layers.

The cushioning elements described herein are resilient structures configured to retain a fluid, particularly a gas. Typically, the fluid needs to be retained over an intended lifetime of the cushioning element, including when the cushioning element is exposed to repeated cycles of applying and releasing force or pressure, as would be encountered when the cushioning element is used in an article of footwear. As many of the polymeric materials conventionally used to manufacture consumer goods are relatively impermeable to water and aqueous solutions but are permeable to small gas molecules such as air, oxygen ($O_2$) gas and nitrogen ($N_2$) gas and inert gasses, barrier materials, i.e., materials which have relatively low rates of fluid transmittance, and so provide relatively high levels of liquid and gas retention to the cushioning element, may be used alone or in combination with conventional polymeric materials. Thus, the cushioning elements described herein, including the various structures forming the cushioning elements, may comprise, consist essentially of, or consist of a barrier material. The inclusion of the barrier material in the cushioning element may allow the cushioning element to retain a fluid, such as small gas molecules, over the lifetime of the cushioning element. The inclusion of the barrier material in the cushioning element may allow the cushioning element to remain adequately pressurized over its lifetime. The cushioning element may retain a minimum pressure of about 2 PSI (14 kPA) to about 40 PSI (276 kPA) over a minimum duration of about 5 years to about 30 years.

As used herein, a barrier material refers to a material comprising, consisting essentially of, or consisting of one or more gas barrier compounds. The gas barrier compound may be a polymeric gas barrier compound (i.e., a gas barrier polymer), or may be a non-polymeric gas barrier compound, such as an inorganic gas barrier compound. The barrier material may be a polymeric barrier material comprising, consisting essentially of, or consisting of one or more gas barrier polymers. The barrier material may be a polymeric barrier material comprising, consisting essentially of, or consisting of a mixture of one or more non-gas barrier polymers and one or more gas barrier polymers, or a barrier material comprising, consisting essentially of, or consisting of a mixture of one or more non-gas barrier polymers and one or more non-polymeric gas barrier compounds. The barrier material may comprise, consist essentially of, or consist of a non-polymeric barrier material, i.e., a material comprising, consisting essentially of, or consisting of a non-polymeric gas barrier compound. The barrier material may be present in a structure which includes regions of polymeric materials and non-polymeric barrier materials, such as a polymeric film coated with one or more layers of a non-polymeric barrier material. The gas transmission rate of the portion of the cushioning element comprising the barrier material may be less than 4 or less than 3 or less than 2 cubic centimeters per square meter per atmosphere per day per day. The portion of the cushioning element comprising the barrier material may be a portion of a tube, an entire tube, a portion of a web area, an entire web area, or any combination thereof. The cushioning element may comprise a barrier film comprising the barrier material. The portion of the cushioning element comprising the barrier film may be a portion of a tube, an entire tube, a portion of a web area, an entire web area, or any combination thereof. The gas transmission rate of the barrier film may be less than 4 or less than 3 or less than 2 cubic centimeters per square meter per atmosphere per day per day for a barrier film having a thickness of from about 72 micrometers to about 320 micrometers, as measured at 23 degrees Celsius and 0 percent relative humidity. The gas transmission rate of the barrier film may be from about 0.1 to about 3, or from about 0.5 to about 3, or from about 0.5 to about 3 cubic centimeters per square meter per atmosphere per day per day, including from about 0.1 to about 3, or from about 0.5 to about 3, or from about 0.5 to about 3 cubic centimeters per square meter per atmosphere per day per day for a film having a thickness of from about 72 micrometers to about 320 micrometers, as measured at 23 degrees Celsius and 0 percent relative humidity. The gas transmission rate, such as the oxygen gas or nitrogen gas transmission rate, may be measured using ASTM D1434.

The barrier material may comprise, consist essentially of, or consist of one or more non-polymeric gas barrier compounds, including one or more inorganic gas barrier compounds. The one or more inorganic gas barrier compounds may be chosen from a form of carbon, silica, silicate, clay, a metal, an any combination thereof. The metal may include a metal oxide or a metal alloy. The one or more inorganic gas barrier compounds may take the form of fibers, particulates, platelets, or combinations thereof. The fibers, particulates, or platelets may be nanoscale structures, including nanoscale fibers, nanoscale particulates, nanoscale platelets, and combinations thereof. Examples of inorganic barrier compounds include carbon fibers, glass fibers, glass flakes, silica particles, silica platelets, silica flakes, silicate particles, silicate platelets, silicate flakes, calcium carbonate particles, clay particles, clay platelets, mica platelets, talc particles, carbon black particles, graphite particles, graphite platelets, graphite flakes, metallic particles, metallic platelets, metallic flakes, and the like. The barrier material may comprise an inorganic gas barrier component consisting of all the inorganic gas barrier compounds present in the barrier material. The inorganic gas barrier component may consist of one or more clays. Suitable clays include bentonite, montmorillonite, kaolinite, and mixtures thereof. Optionally, in addition to the one or more non-polymeric gas barrier compounds, the barrier material may further comprise one or more additional ingredients, such as a polymer, processing aid, colorant, or any combination thereof. When one or more inorganic gas barrier compounds are included in the barrier material, the total concentration of the inorganic gas barrier component present in the barrier material may be less than 60 weight percent, or less than 40 weight percent, or less than 20 weight percent of the barrier material.

The one or more gas barrier compounds of the barrier material may comprise, consist essentially of one, or consist of one or more gas barrier polymers. The barrier material may be a thermoplastic material, meaning that the polymeric component of the barrier material consists of one or more thermoplastic polymers, optionally including thermoplastic polymers which are not gas barrier polymers. The barrier material may comprise, consist essentially of, or consist of one or more thermoplastic gas barrier polymers. The barrier material comprises a gas barrier polymer component consisting of all gas barrier polymers present in the barrier material. The gas barrier polymer component of the barrier material may consist of one or more gas barrier polymer of a single class of polymers such as, for example, one or more polyolefins. The gas barrier polymer component may consist of gas barrier polymers having similar or the same chemical structures, such as one or more ethylene-vinyl alcohol copolymers. Optionally, the barrier material may further comprise one or more non-polymeric additives, such as one or more fillers, processing aids, colorants, or any combination thereof; or one or more non-polymeric barrier compounds, such as one or more inorganic barrier compounds. Many gas barrier polymers are known in the art. Examples of gas barrier polymers include vinyl polymers such as vinylidene chloride polymers, acrylic polymers such as acrylonitrile polymers, polyamides, epoxy polymers, amine polymers, polyolefins such as polyethylenes and polypropylenes, copolymers thereof, such as ethylene-vinyl alcohol copolymers, and mixtures thereof. When the barrier material comprises, consists essentially of, or consists of one or more gas barrier polymers, the one or more gas barrier polymers may be chosen from a vinyl polymer, an acrylic polymer, an amide polymer, an imide polymer, an epoxy polymer, an olefin polymer, any homopolymer thereof, any copolymer thereof, and any mixture thereof. The one or more gas barrier polymer may comprise, consist essentially of, or consist of one or more thermoplastic gas barrier polymers. Examples of thermoplastic gas barrier polymers include thermoplastic vinyl homopolymers and copolymers, thermoplastic acrylic homopolymers and copolymers, thermoplastic amine homopolymers and copolymers, thermoplastic polyolefin homopolymers and copolymers, and mixtures thereof. The one or more gas barrier polymers may comprise, consist essentially of, or consist of one or more thermoplastic polyethylene copolymers. The one or more gas barrier polymers may comprise, consist essentially of, or consist of one or more thermoplastic ethylene-vinyl alcohol copolymers. The thermoplastic ethylene-vinyl alcohol copolymer may be an ethylene-vinyl alcohol copolymer having from about 28 mole percent to about 44 mole percent ethylene content, or from about 32 mole percent to about 44 mole percent ethylene content. The one or more gas barrier polymers may comprise, consist essentially of, or consist of one or more one or more polyethyleneimine, polyacrylic acid, polyethyleneoxide, polyacrylamide, polyamidoamine, or any combination thereof.

The barrier material (including a first barrier material, a second barrier material, etc.) may have a low gas transmittance rate. For example, when formed into a single-layer film consisting essentially of the barrier material, the single-layer film may have a low gas transmittance rate of less than 4 cubic centimeters per square meter per atmosphere per day per day for a film having a thickness of from about 72 micrometers to about 320 micrometers, as measured at 23 degrees Celsius and 0 percent relative humidity, and may be measured using ASTM D1434. The barrier material may comprise, consists essentially of, or consist of one or more gas barrier compounds. The one or more gas barrier compounds may comprise, consist essentially of, or consist of one or more gas barrier polymers, or may comprise one or more non-polymeric gas barrier compounds, including one or more inorganic gas barrier compounds. The barrier material may comprise, consist essentially of, or consist of a combination of at least one gas barrier polymer and at least one inorganic gas barrier compound. The combination of at least one gas barrier polymer and at least one inorganic gas barrier compound may comprise a blend or mixture, or may comprise a composite in which fibers, particles, or platelets of the inorganic gas barrier compound are surrounded by the gas barrier polymer.

The cushioning elements disclosed herein may comprise or consist of a barrier film comprising one or more barrier materials. The barrier film may be a thermoformed, welded or molded barrier film. The barrier film may be thermoformed, welded or molded into the shape of a portion of a tube or into an entire tube, or into the shape of a portion of a web or into an entire web, or both into the shape of a portion of a tube or an entire tube and into the shape of a portion of a web or an entire web of a cushioning element. The barrier film comprises a barrier material as described herein. The barrier material of the barrier film may comprise, consist essentially of, or consist of a polymeric gas barrier compound (i.e., a gas barrier polymer); or the barrier material of the barrier film may comprise, consist essentially of, or consist of a non-polymeric gas barrier compound; or the barrier material of the barrier film may comprise, consist essentially of, or consist of or a mixture of a polymeric gas barrier compound and a non-polymeric gas barrier compound. The barrier film may have a gas transmission rate as described above. When used alone or in combination with other materials in a cushioning element, the barrier film resiliently retains the fluid. Depending upon the structure and use of the cushioning element, the barrier film may retain the fluid at a pressure which is above, at, or below atmospheric pressure. The fluid may be a liquid or a gas, such as air, oxygen gas, or nitrogen gas. The barrier film may comprise a polymeric barrier material which is a nitrogen gas barrier material having a nitrogen gas transmission rate as described above.

Depending upon the gas barrier compounds used and the intended use of the multi-layered film, the second material may have a higher gas transmittance rate than the barrier material, meaning that the second material is a poorer gas barrier than the barrier material. The one or more second layers may act as substrates for the one or more barrier layers, and may serve to increase the strength, elasticity, and/or durability of the multi-layered film. The one or more second layers may serve to decrease the amount of gas barrier material(s) needed, thereby reducing the overall material cost. Even when the second material has a relatively high gas transmittance rate, the presence of the one or more second layers, particularly when the one or more second layers are positioned between one or more barrier layers, may help maintain the overall barrier properties of the film by increasing the distance between cracks in the barrier layers, thereby increasing the distance gas molecules must travel between cracks in the barrier layers in order to pass through the multi-layered film. While small fractures or cracks in the barrier layers of a multi-layered film may not significantly impact the overall barrier properties of the film, using a larger number of thinner barrier layers may avoid or reduce visible cracking, crazing, or hazing of the multi-layered film. The one or more second layers may include, but are not limited to, a tie layer located between and promoting adhesion between two different layers of the multi-layered film, a structural layer providing mechanical support to the multi-layered film, a bonding layer including a bonding material such as a hot melt adhesive material, on an exterior surface of the multi-layered film, a cap layer providing protection to an exterior surface of the multi-layered film, and any combination thereof.

The second material may be an elastomeric material comprising, consisting essentially of, or consist of one or more elastomers. The one or more elastomers may consist of one or more thermoplastic elastomers. Many gas barrier compounds (including gas barrier polymers) are brittle and/or relatively inflexible, and so the one or more barrier layers may be susceptible to cracking when subjected to repeated, excessive stress loads, such as those potentially generated during when a multi-layered film is exposed to repeated flexing and releasing cycles. A multi-layered film which includes one or more barrier layers alternating with second layers, wherein the second layers consist of one or more elastomeric materials, may produce a multi-layered film which is better able to withstand repeated flexing and releasing cycles while maintaining its gas barrier properties, as compared to a film comprising the same materials except without the elastomeric second layers.

The second material may comprise, consist essentially of, or consist of one or more polymers. As used herein, the one or more polymers present in the second material are referred to as "second polymers" or a "second polymer", as these polymers are present in the second material. References to "second polymer(s)" are not intended to indicate that a "first polymer" necessarily is present, either in the second material, or in the multi-layered film as a whole, although multiple polymers may be present. The second material may comprise, consist essentially of, or consist of one or more thermoplastic polymers. The second material may comprise, consist essentially of, or consist of one or more elastomeric polymers. The second material may comprise, consist essentially of, or consist of one or more thermoplastic elastomers. The second material may include a polymeric component consisting of all polymers present in the second material. The polymeric component of the second material may comprise, consist essentially of, or consist of one or more elastomers, such as one or more thermoplastic elastomers. Alternatively, the polymeric component may comprise, consist essentially of, or consist of one or more thermoset elastomers, or thermosetting elastomers which react to become thermoset in the finished cushioning element. Examples of thermoset and thermosetting elastomers include natural and synthetic rubbers such as a butadiene rubber, an isoprene rubber, a silicone rubber, and the like. Optionally, the second material may further comprise one or more non-polymeric additives, such as fillers, processing aids, and/or colorants. Many polymers which are suitable for use in the second material are known in the art. Exemplary polymers which may be included in the second material (e.g., second polymers) include a polymer chosen from a polyolefin, a polyamide, a polyimide, a polycarbonate, a polyester, a polyether, a polyacrylate, a polystyrene, a polyvinyl, a polyurea, a polyurethane, a polysilane, a polysiloxane, any copolymer thereof, and any mixture thereof. The one or more second polymers of the second material may comprise, consist essentially of, or consist of a polymer chosen from a polyolefin, a polyamide, a polyester, a polystyrene, and a polyurethane.

The second material may comprise one or more polyolefin. The polymeric component of the second material may comprise, consist essentially of, or consist of one or more polyolefin, including a thermoplastic polyolefin, for example a thermoplastic polyolefin elastomer. Polyolefins are a class of polymers which include monomeric units derived from simple alkenes, such as ethylene, propylene, and butene. The one or more polyolefin may be a polyolefin homopolymer, a polyolefin copolymer, or any mixture thereof. Examples of polyolefins include ethylene homopolymers, propylene homopolymers, propylene copolymers (including polyethylene-polypropylene copolymers), polybutene, ethylene-octene copolymers, olefin block copolymers, propylene-butane copolymers, and combinations thereof, including blends of ethylene homopolymers and propylene homopolymers. Ethylene-vinyl acetate (EVA) is an example of an ethylene copolymer. Examples of polyolefin elastomers include polyisobutylene elastomers, poly(alpha-olefin) elastomers, ethylene propylene elastomers, ethylene propylene diene monomer elastomers, and combinations thereof.

The second material may comprise one or more polyamide. The polymeric component of the second material may comprise, consist essentially of, or consist of one or more polyamide, including a thermoplastic polyamide, for example a thermoplastic polyamide elastomer. Polyamides are a class of polymers which include monomeric units linked by amide bonds. Naturally-occurring polyamides include proteins such as wool and silk, while synthetic amides include polymers such as nylons and aramids. The one or more second polymers may include thermoplastic polyamides such as nylon 6, nylon 6-6, and/or nylon-11, as well as thermoplastic amide copolymers and thermoplastic amide copolymer elastomers, such as a polyether block amide (PEBA) copolymer.

The second material may comprise one or more polyester. The polymeric component of the second material may comprise, consist essentially of, or consist of one or more polyester, including a thermoplastic polyester, for example a thermoplastic polyester elastomer. Polyesters are a class of polymers which include monomeric units derived from an ester functional group, and are commonly made by condensing dibasic acids such as, for example, terephthalic acid, with one or more polyols. The one or more polyesters may include polyesters such as polyethylene terephthalate (PET), polybutylene terephthalate (PBT), and poly-1,4-cyclohexylene-dimethylene terephthalate, as well as copolymers such as polyester-ether copolymers and polyester-polyurethane copolymers.

The second material may comprise one or more polystyrene. The polymeric component of the second material may comprise, consist essentially of, or consist of one or more polystyrene, including a thermoplastic polystyrene, for example a thermoplastic polystyrene elastomer. Polystyrenes are a class of polymers which include monomeric units derived from styrene. The one or more polymers may include a polystyrene homopolymer, a styrenic random copolymer, a styrenic block copolymer, such as a acrylonitrile-butadiene-styrene (ABS) block copolymer, a styrene acrylonitrile block copolymer, a styrene-ethylene-butylene-styrene (SEBS) block copolymer, a styrene-butadiene-styrene (SBS) block copolymer, a styrene-ethylene-propylene-styrene (SEPS) block copolymer, or a mixture thereof.

The second material may comprise one or more polyurethane. The polymeric component of the second material may comprise, consist essentially of, or consist of one or more polyurethane, including a thermoplastic polyurethane (often referred to as a thermoplastic polyurethane (TPU), for example a thermoplastic polyurethane elastomer. Polyurethanes are a class of polymers which include monomeric units joined by carbamate linkages. Polyurethanes are commonly formed by reacting a polyisocyanate (e.g., a diisocyanate or a triisocyanate) with a polyol (e.g., a diol or triol), optionally in the presence of a chain extender. The monomeric units derived from the polyisocyanate are often referred to as the hard segments of the polyurethane, while the monomeric units derived from the polyols are often referred to as the soft segments of the polyurethane. The hard segments may be derived from aliphatic polyisocyanates, or from organic isocyanates, or from a mixture of both. The soft segments may be derived from saturated polyols, or from unsaturated polyols such as polydiene polyols, or from a mixture of both. When the second material is to be bonded to natural or synthetic rubber, the presence of soft segments derived from one or more polydiene polyols may facilitate bonding between the rubber and the second material when the rubber and the second material are crosslinked in contact with each other, such as in a vulcanization process. Examples of suitable polyisocyanates from which the hard segments of the polyurethane may be derived include hexamethylene diisocyanate (HDI), isophorone diisocyanate (IPDI), butylenediisocyanate (BDI), bisisocyanatocyclohexylmethane (HMDI), 2,2,4-trimethylhexamethylene diisocyanate (TMDI), bisisocyanatomethylcyclohexane, bisisochanatomethyltricyclodecane, norbornane diisocyanate (NDI), cyclohexane diisocyanate (CHDI), 4,4'-dicyclohexhylmethane diisocyanate (H12MDI), diisocyanatododecane, lysine diisocyanate, toluene diisocyanate (TDI), TDI adducts with trimethylolpropane (TMP), methylene diphenyl diisocyanate (MDI), xylylene diisocyanate (XDI), tetramethylxylylene diisocyanate (TMXDI), hydrogenated xylylene diisocyanate (HXDI), naphthalene 1,5-diisocyanate (NDI), 1,5-tetrahydronaphthalene diisocyanate, para-phenylene diisocyanate (PPDI), 3,3'-dimethyldiphenyl-4,4'-diisocyanate (DDDI), 4,4'-dibenzyl diisocyanate (DBDI), 4-chloro-1,3-phenylene diisocyanate, and any combination thereof. In one aspect, the polyurethane comprises or consists essentially of hard segments derived from toluene diisocyanate (TDI), or from methylene diphenyl diisocyanate (MDI), or from both. The soft segments of the polyurethane may be derived from a wide variety of polyols, including polyester polyols, polyether polyols, polyester-ether polyols, polycarbonate polyols, polycaprolactone polyethers, and combinations thereof. The polyurethane may comprise, consist essentially of, or consist of monomeric units derived from $C_4$-$C_{12}$ polyols, or $C_6$-$C_{10}$ polyols, or $C_8$ or lower polyols, meaning polyols with 4 to 12 carbon molecules, or with 6 to 10 carbon molecules, or with 8 or fewer carbon molecules in their chemical structures. The polyurethane may comprise, consist essentially of, or consist of monomeric units derived from polyester polyols, polyester-ether polyols, polyether polyols, or any combination thereof. In yet another aspect, the polyurethane comprises or consists essentially of soft segments derived from polyols or diols having polyester functional units. The soft segments derived from polyols or diols having polyester functional units may comprise about 10 to about 50, or about 20 to about 40, or about 30 weight percent of the soft segments present in the polyurethane. The one or more polymers may include a urethane copolymer. Examples of urethane copolymers include polyester-polyurethane copolymers, including polyester-polyurthane elastomers.

The multi-layered film may be produced by various means such as co-extrusion, lamination, layer-by-layer deposition, or the like. When co-extruding one or more barrier layers alone or with one or more second layers, selecting materials (e.g., a first barrier material and a second barrier material, or a single barrier material and a second material) having similar processing characteristics such as melt temperature and melt flow index, may reduce interlayer shear during the extrusion process, and may allow the alternating barrier layers and second layers to be co-extruded while retaining their structural integrities and desired layer thicknesses. In one example, the one or more barrier materials and, optionally, the second material when used, may be extruded into separate individual films, which may then be laminated together to form the multi-layered film.

The multi-layered film may be produced using a layer-by-layer deposition process. A substrate, which optionally may comprise a second material or a barrier material, may be built into a multi-layered film by depositing a plurality of layers onto the substrate. The layers may include one or more barrier layers (e.g., first barrier layers, second barrier layers, etc.). Optionally, the layers may include one or more second layers. The one or more barrier layers and/or second layers may be deposited by any means known in the art such as, for example, dipping, spraying, coating, or another method. The one or more barrier layers may be applied using charged solutions or suspensions, e.g., cationic solutions or suspensions or anionic solutions or suspensions, including a charged polymer solution or suspension. The one or more barrier layers may be applied using a series of two or more solutions having opposite charges, e.g., by applying a cationic solution, followed by an anionic solution, followed by a cationic solution, followed by an anionic solution, etc.

The barrier films, including the multi-layered film, may have an overall thickness of from about 40 micrometers to about 500 micrometers, or about 50 micrometers to about 400 micrometers, or about 60 micrometers to about 350 micrometers. Each individual layer of the plurality of layers of the multi-layered film may have a thickness of from about 0.001 micrometers to about 10 micrometers. The thickness of an individual barrier layer may range from about 0.001 micrometers to about 3 micrometers thick, or from about 0.5 micrometers to about 2 micrometers thick, or from about 0.5 micrometers to about 1 micrometer thick. The thickness of an individual second layer may range from about 2 micrometers to about 8 micrometers thick, or from about 2 micrometers to about 4 micrometers thick. The thickness of the film and/or their individual layers may be measured by any method known in the art such as, for example, ASTM E252, ASTM D6988, ASTM D8136, or using light microscopy or electron microscopy.

The barrier material, including the multi-layered film comprising the barrier material, may have a Shore hardness of from about 35 A to about 95 A, optionally from about 55 A to about 90 A. In these aspects, hardness may be measured using ASTM D2240 using the Shore A scale.

When a co-extrusion process is used to form the barrier film from a plurality of alternating barrier layers and second layers, the barrier material may have a melt flow index of from about 5 to about 7 grams per 10 minutes at 190 degrees Celsius when using a weight of 2.16 kilograms, while the second material may have a melt flow index of from about 20 to about 30 grams per 10 minutes at 190 degrees Celsius when using a weight of 2.16 kilograms. The melt flow index of the barrier material may be from about 80 percent to about 120 percent of the melt flow index of the second material per 10 minutes when measured at 190 degrees Celsius when using a weight of 2.16 kilograms. The melt flow index may be measured using ASTM D1238. The barrier material or the second material or both may have a melting temperature of from about 165 degrees Celsius to about 183 degrees Celsius, or from about 155 degrees Celsius to about 165 degrees Celsius. The barrier material may have a melting temperature of from about 165 degrees Celsius to about 183 degrees Celsius, while the second material may have a melting temperature of from about 155 degrees Celsius to about 165 degrees Celsius. The melting temperature may be measured using ASTM D3418.

In an alternative example, instead of being a fluid-filled bladder, any of the cushioning elements 104, 1114, 1914, and 2714 comprise a material, such as a foam or an unfoamed solid, to impart properties of cushioning, responsiveness, and energy distribution to the foot of the wearer. In this example, the support elements 106 and 107 may otherwise take the same shape. For example, the sole structure 101 may include any of the cushioning elements 104, 1114, 1914, and 2714. Any of the cushioning elements 104, 1114, 1914, and 2714 may comprise a foam. The foam may comprise a material. Example materials for the alternate cushioning elements 104, 1114, 1914, and 2714 may include those based on foaming or molding material, e.g. a resilient material, comprising one or more polymers, such as one or more elastomers (e.g., thermoplastic elastomers (TPE)). The one or more polymers may include aliphatic polymers, aromatic polymers, or mixtures of both; and may include homopolymers, copolymers (including terpolymers), or mixtures of both.

In addition to one or more barrier materials, the sole structures described herein may comprise one or more additional polymeric materials. A polymeric material is understood to comprise, consist essentially of, or consist of one or more polymers. In addition to a cushioning element, the sole structures may include additional elements such as support elements, and the support elements may be made using one or more additional materials. Also, in addition to a barrier material, a cushioning element may be made using one or more additional materials, such as a second material as described above.

The additional material may be an elastomeric material comprising, consisting essentially of, or consist of one or more elastomers. The one or more elastomers may consist of one or more thermoplastic elastomers. The additional material may comprise, consist essentially of, or consist of one or more thermoplastic polymers. The additional material may comprise, consist essentially of, or consist of one or more elastomeric polymers. The additional material may comprise, consist essentially of, or consist of one or more thermoplastic elastomers. The additional material may include a polymeric component consisting of all polymers present in the additional material. The polymeric component of the additional material may comprise, consist essentially of, or consist of one or more elastomers, such as one or more thermoplastic elastomers. Alternatively, the polymeric component may comprise, consist essentially of, or consist of one or more thermoset elastomers, or thermosetting elastomers which react to become a thermoset in the finished sole structure. Examples of thermoset and thermosetting elastomers include natural and synthetic rubbers such as a butadiene rubber, an isoprene rubber, a silicone rubber, and the like. Optionally, the additional material may further comprise one or more non-polymeric additives, such as fillers, processing aids, and/or colorants. The additional material may comprise, consist essentially of, or consist of one or more polymers chosen from a polyolefin, a polyamide, a polyimide, a polycarbonate, a polyester, a polyether, a polyacrylate, a polystyrene, a polyvinyl, a polyurea, a polyurethane, a polysilane, a polysiloxane, any copolymer thereof, and any mixture thereof. The one or more polymers of the additional material may comprise, consist essentially of, or consist of a polymer chosen from a polyolefin, a polyamide, a polyester, a polystyrene, and a polyurethane. The additional material may comprise one or more polyolefins. The polymeric component of the additional material may comprise, consist essentially of, or consist of one or more polyolefin, including a thermoplastic polyolefin, for example a thermoplastic polyolefin elastomer. The polyolefin may be an olefin homopolymer or copolymer as described above with respect to second materials. The one or more polyolefin may comprise, consist essentially of, or consist of an EVA copolymer, including a crosslinked EVA copolymer. The additional material may comprise one or more polyamide. The polymeric component of the additional material may comprise, consist essentially of, or consist of one or more polyamide, including a thermoplastic polyamide, for example a thermoplastic polyamide elastomer. The polyamide may be an amide homopolymer or copolymer as described above with respect to second materials. The one or more polyamide may comprise, consist essentially of, or consist of a PEBA copolymer. The additional material may comprise one or more polyester. The polymeric component of the additional material may comprise, consist essentially of, or consist of one or more polyester, including a thermoplastic polyester, for example a thermoplastic polyester elastomer. The polyester may be a polyester homopolymer or copolymer as described above with respect to second materials. The additional material may comprise one or more polystyrene. The polymeric component of the additional material may comprise, consist essentially of, or consist of one or more polystyrene, including a thermoplastic polystyrene, for example a thermoplastic polystyrene elastomer. The one or more polystyrene may be a polystyrene homopolymer or copolymer as described above with respect to second polymers. The one or more polystyrene may comprise, consist essentially of, or consist of a SEBS copolymer. The additional material may comprise one or more polyurethane. The polymeric component of the additional material may comprise, consist essentially of, or consist of one or more polyurethane, including a TPU, such as a TPU elastomer. One example of a polyurethane copolymer is a polyester-polyurethane copolymer, including a polyester-polyurethane elastomer. The one or more polyurethane may be a polyurethane as described above with respect to second polymers.

Optionally, when the resilient material is a foam, the foam may be a compression molded foam. Compression molding may be used to alter the physical properties (e.g., density, stiffness and/or durometer) of a foam, or to alter the physical appearance of the foam (e.g., to fuse two or more pieces of foam, to shape the foam, etc.), or both. Examples of foamed polymeric materials commonly used in footwear include a foamed polymeric material comprising a polyurethane (PU) or a foamed polymeric material comprising an ethylene-vinyl acetate copolymer (EVA). A solid polymeric support material is also contemplated. Examples of solid polymeric materials commonly used in footwear include solid elastomeric materials, including a solid elastomeric material comprising a polyurethane elastomer or comprising a polyamide elastomer.

The compression molding process desirably starts by forming one or more foam preforms, such as by injection molding and foaming a material, e.g. a resilient material, by forming foamed particles or beads, by cutting foamed sheet stock, and the like. The compression molded foam may then be made by placing the one or more foam preforms in a compression mold, and applying sufficient pressure to the one or more preforms to compress the one or more foam preforms in a closed mold. Once the mold is closed, sufficient heat and/or pressure is applied to the one or more foam preforms in the closed mold for a sufficient duration of time to alter the foam preform(s), to form a skin on the outer surface of the compression molded foam, or to fuse individual foam particles to each other, to permanently or semi-permanently increase the density of the foam(s), or any combination thereof. Following the heating and/or application of pressure, the mold is opened and the molded foam article is removed from the mold.

In another example, the resilient material is an unfoamed solid. The material may be shaped using a molding process, including an injection molding process. In one example, when the material is an elastomeric material, the elastomeric material (e.g., uncured rubber) may be mixed in a Banbury mixer with an optional filler and a curing package such as, for example, a UV curing package or a thermal curing package including a sulfur-based or peroxide-based curing package, calendared, formed into shape, placed in a mold, and cured (e.g., using a UV curing process or a thermal curing process such as a vulcanization process).

The coupling portion 108, the outsole layer 110, and traction elements 274*a*-274*c* of the outsole 112 may be formed of resilient materials configured to impart properties of abrasion resistance and traction to the sole structure 101. First support element 107 may be formed of a material having a higher hardness than that of second support element 106. For example, the first support element 107 may be formed of a foam material having a first hardness, while the second support element 106 may be formed of a foam material having a second hardness, less than the first hardness. The first support element may include a polymeric material such as a foamed polymeric material and/or an unfoamed (e.g., solid resin) polymeric material having a first hardness. The second support element 106 may include a polymeric material with a second hardness. It is contemplated that second support element 106 could include a second polymeric material having a third hardness or another suitable foam material capable of providing a desired cushioning characteristic. Alternatively, second support element 106 may include a solid polymeric material that may have a durometer that is different than the selected foam material.

The following clauses provide an exemplary configuration for an article of footwear and sole structure described above.

Clause 1. An article of footwear comprising: a heel region including a posterior end of the article of footwear, a mid-foot region, and a forefoot region including an anterior end of the article of footwear; a lateral side, and a medial side opposite the lateral side; an upper; and a sole structure coupled to the upper, wherein the sole structure includes: a cushioning element, comprising a plurality of tubes and a plurality of web areas, wherein adjacent tubes are connected to one another by a respective web area of the plurality of web areas, disposed between a first support element and a second support element, wherein one or more of the respective web areas is exposed to the external environment.

Clause 2. The article of footwear of Clause 1, wherein one or more of the plurality of tubes is a fluid-filled bladder.

Clause 3. The article of footwear of Clause 2, wherein at least some of the plurality of tubes are fluidly separated from at least some other tubes of the plurality of tubes.

Clause 4. The article of footwear of Clause 2, wherein each of the plurality of tubes is fluidly separated from each of the other plurality of tubes.

Clause 5. The article of footwear of Clause 1, wherein the plurality of tubes are in fluid communication with one another.

Clause 6. The article of footwear of Clause 1, wherein the plurality of tubes further includes four or more tubes, each extending from the lateral side of the article of footwear to the medial side of the article of footwear.

Clause 7. The article of footwear of Clause 1, wherein at least one of the plurality of tubes includes, on a top surface, a radially-inward extending depression that is concave from a perspective posterior or anterior of the article of footwear while an outsole layer is in contact with the ground.

Clause 8. The article of footwear of Clause 7, wherein the sole structure further includes the first support element coupled to a top surface of one or more of the plurality of tubes, and the second support element coupled to a bottom surface of one or more of the plurality of tubes.

Clause 9. The article of footwear of Clause 8, wherein the second support element includes an opening extending through bottom and top surfaces of the second support element.

Clause 10. The article of footwear of Clause 9, further including a coupling portion configured to at least partially extend through the opening of the second support element, wherein the second support element and the coupling portion together form a plurality of recesses, each of the plurality of recesses being configured to receive one of the plurality of tubes.

Clause 11. The article of footwear of Clause 10, further including the outsole layer coupled to the second support element and forming at least part of a ground-engaging surface of the article of footwear.

Clause 12. The article of footwear of Clause 11, wherein a bottom surface of the coupling portion forms at least part of the ground-engaging surface of the article of footwear.

Clause 13. The article of footwear of Clause 10, wherein a top surface of the outsole layer is in direct contact with 1)

a bottom surface of the second support element at a posterior region, and with 2) a bottom surface of the first support element at an anterior position.

Clause 14. The article of footwear of Clause 1, wherein each of the respective web areas is exposed to the environment.

Clause 15. The article of footwear of Clause 14, wherein each web area includes a top surface and a bottom surface opposite the top surface, and wherein the top and bottom surfaces of each of the respective web areas is exposed to the environment.

Clause 16. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first support element extending from the heel region to the forefoot region; a second support element extending from the heel region to the mid-foot region, wherein the second support element includes an opening extending therethrough; a cushioning element disposed between the first support element and the second support element, in the heel region, the cushioning element including a plurality of tubes and at least one web area, wherein the plurality of tubes extend from the lateral side of the article of footwear to the medial side of the article of footwear; an outsole layer extending from the heel region to the forefoot region, the outsole layer forming at least part of a ground-engaging surface of the article of footwear.

Clause 17. The article of footwear of Clause 16, wherein along a first path of an exterior of the sole structure, the heel region is arranged from a bottom to a top of the article, to include: a) the outsole layer; b) the second support element; and c) the first support element.

Clause 18. The article of footwear of Clause 17, wherein along a second path of the exterior of the sole structure, the heel region is arranged from the bottom to the top of the article, to include: a) the outsole layer; b) the second support element; c) one of the plurality of tubes; and d) the first support element.

Clause 19. The article of footwear of Clause 18, wherein the first path is posterior to the second path when moving from the heel region to the mid-foot region.

Clause 20. The article of footwear of Clause 19, wherein along a third path of the exterior of the sole structure, the heel region is arranged from the bottom to the top of the article, to include: a) the outsole layer; b) the second support element; c) a first gap that is open to the external environment, the first gap being defined at a bottom end by the second support element, and at a top end by a web of the cushioning element; d) the at least one web area of the cushioning element; e) a second gap that is open to the environment, the second gap being defined at a bottom end by the web, and at a top end by the first support element; and f) the first support element.

Clause 21. The article of footwear of Clause 20, wherein the second path is posterior to the third path when moving from the heel region to the mid-foot region.

Clause 22. The article of footwear of Clause 21, wherein along a fourth path of the exterior of the sole structure, the heel region is arranged from the bottom to the top of the article, to include: a) the outsole layer; b) the second support element; and c) the first support element.

Clause 23. The article of footwear of Clause 22, wherein the third path is posterior to the fourth path when moving from the heel region to the mid-foot region.

Clause 24. The article of footwear of Clause 23, wherein along a fifth path of the exterior of the sole structure, the heel region is arranged from the bottom to the top of the article, to include: a) the outsole layer; and b) the first support element.

Clause 25. The article of footwear of Clause 24, wherein the fourth path is posterior to the fifth path when moving from the heel region to the mid-foot region.

Clause 26. A cushioning element for an article of footwear, the cushioning element comprising: a plurality of hollow tubes, wherein top surfaces of one or more of the plurality of hollow tubes include a radially-inward extending depression; a plurality of web areas, wherein adjacent tubes of the plurality of hollow tubes are connected to one another by one of the plurality of web areas.

Clause 27. The cushioning element of Clause 26, wherein the cushioning element includes a first film and a second film, the first film and the second film each including a multi-layer film.

Clause 28. The cushioning element of Clause 27, wherein the plurality of hollow tubes are fluid-filled, and wherein each of the plurality of hollow tubes include a peripheral seam disposed adjacent the second film.

Clause 29. The cushioning element of Clause 26, wherein each of the plurality of hollow tubes is fluidly separated from each of the other plurality of hollow tubes.

Clause 30. The cushioning element of Clause 26, wherein at least some of the plurality of hollow tubes are fluidly separated from at least some other tubes of the plurality of hollow tubes.

Clause 31. The cushioning element of Clause 26, wherein the plurality of hollow tubes are in fluid communication with one another.

Clause 32. The cushioning element of Clause 26, wherein the plurality of hollow tubes further includes four or more hollow tubes, each tube extending from a lateral side of the article of footwear to a medial side of the article of footwear.

Clause 33. A sole structure comprising the cushioning element according to any one of Clauses 26-29.

Clause 34. An article of footwear comprising the sole structure of Clause 33.

Clause 35. A method of manufacturing a cushioning element, the method comprising: molding a first barrier film and a second barrier film via one or more mold portions; bonding the first barrier film to the second barrier film to form one or more web areas and a peripheral seam, wherein the one or more web areas are positioned in a plane offset from a plane containing substantially all of the peripheral seam, and wherein the first barrier film and the second barrier film form one or more hollow tubes having a radially inward depression disposed on a top surface thereof; increasing the temperature of one of the first barrier film and the second barrier film; and forcing the first barrier film and the second barrier film into contact with the one or more mold portions.

Clause 36. A cushioning element manufactured by the method of Clause 35.

Clause 37. A sole structure manufactured by coupling the cushioning element of Clause 36 with a midsole.

Clause 38. An article of footwear manufactured by coupling the sole structure of Clause 37 with an upper.

Clause 39. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first support element extending from the heel region to the forefoot region, the first support element including a first set of recesses; a second support element extending from the heel region to the mid-foot region, the second support element including a second set of recesses, and wherein the second support element includes an opening extending therethrough; a coupling portion extending from the heel region to the mid-foot region, the coupling portion including a third set of recesses, and wherein the coupling portion is disposed within the opening of the second support element; a cushioning element disposed between the first support element and the second support element, in the heel region, the cushioning element including a plurality of tubes, wherein the plurality of tubes extend from the lateral side of the article of footwear to the medial side of the article of footwear; and an outsole layer extending from the heel region to the forefoot region, the outsole layer forming at least part of a ground-engaging surface of the article of footwear.

Clause 40. The article of footwear of Clause 39, wherein the first set of recesses, the second set of recesses, and the third set of recesses form a continuous receiving area.

Clause 41. The article of footwear of Clause 40, wherein the cushioning element is disposed within the continuous receiving area.

Clause 42. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first support element extending from the heel region to the forefoot region, the first support element including a first set of recesses; a second support element extending from the heel region to the mid-foot region, the second support element including a second set of recesses, and wherein the second support element includes an opening extending therethrough; a coupling portion extending from the heel region to the mid-foot region, the coupling portion including a third set of recesses, and wherein the coupling portion is disposed within the opening of the second support element; a cushioning element disposed between the first support element and the second support element, in the heel region, the cushioning element including a plurality of tubes, wherein the plurality of tubes extend from the lateral side of the article of footwear to the medial side of the article of footwear, wherein the first set of recesses, the second set of recesses, and the third set of recesses form a continuous receiving area, and wherein the cushioning element is disposed within the continuous receiving area.

Clause 43. The article of footwear of Clause 42, wherein the cushioning element and the continuous receiving area form a flush transition between the first support element, the second support element, and the coupling portion.

Clause 44. The article of footwear of Clause 42, wherein the second set of recesses and third set of recesses are flush with one another, wherein the second set of recesses and the third set of recesses form a flush receiving area.

Clause 45. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first support element extending from the heel region to the forefoot region, the first support element including a first set of recesses; a unitary support element extending from the heel region to the mid-foot region, the unitary support element including a second set of recesses; a cushioning element disposed between the first support element and the unitary support element, in the heel region, the cushioning element including a plurality of tubes, wherein the plurality of tubes extend from the lateral side of the article of footwear to the medial side of the article of footwear, wherein the first set of recesses and the second set of recesses form a continuous receiving area, and wherein the cushioning element is disposed within the continuous receiving area.

Clause 46. An article of footwear comprising: a heel region including a posterior end of the article of footwear, a mid-foot region, and a forefoot region including an anterior end of the article of footwear; a lateral side, and a medial side opposite the lateral side; a medial-lateral axis, wherein the medial-lateral axis extends from the medial side to the lateral side; an upper; a sole structure, the sole structure coupled to the upper, and wherein the sole structure further comprises; a cushioning element disposed in the heel region, the cushioning element including a first tube and a second tube, wherein each of the first tube and the second tube extend from the lateral side of the article of footwear to the medial side of the article of footwear, wherein each of the first tube and the second tube include a width extending substantially parallel to the medial-lateral axis, and wherein the width for each of the first tube and the second tube is substantially the same.

Clause 47. The article of footwear of Clause 46, wherein the first tube includes a medial face and a lateral face, the second tube includes a medial face and a lateral face, wherein each of the medial face and the lateral face of the first tube include a center point, and each of the medial face and the lateral face of the second tube include a center point, and wherein a first width of the first tube is measured between the center point of the medial face and the center point of the lateral face, and wherein a second width of the second tube is measured between the center point of the medial face and the center point of the lateral face.

Clause 48. An article of footwear comprising: a heel region including a posterior end of the article of footwear, a mid-foot region, and a forefoot region including an anterior end of the article of footwear; a lateral side, and a medial side opposite the lateral side; a medial-lateral axis, wherein the medial-lateral axis extends from the medial side to the lateral side; an upper; a sole structure, the sole structure coupled to the upper, and wherein the sole structure further comprises; a cushioning element disposed in the heel region, the cushioning element including a first tube and a second tube, wherein each of the first tube and the second tube extends from the lateral side of the article of footwear to the medial side of the article of footwear, wherein the first tube has a first width and the second tube has a second width, the first and second width each extending substantially parallel to the medial-lateral axis, and wherein the first width and the second width are different from one another.

Clause 49. The article of footwear of Clause 48, wherein the first tube is anterior to the second tube.

Clause 50. The article of footwear of Clause 49, wherein the cushioning element further comprises a third tube having a third width and a fourth tube having a fourth width, wherein the third tube and the fourth tube are each disposed between the first tube and the second tube, wherein the third tube is adjacent the second tube and the fourth tube is adjacent the first tube.

Clause 51. The article of footwear of Clause 50, wherein the third tube includes a medial face and a lateral face, the fourth tube includes a medial face and a lateral face, wherein each of the medial face and the lateral face of the third tube include a center point, and each of the medial face and the lateral face of the fourth tube include a center point, and wherein a third width of the third tube is measured between the center point of the medial face and the center point of the lateral face, and wherein a fourth width of the fourth tube is measured between the center point of the medial face and the center point of the lateral face.

Clause 52. The article of footwear of Clause 51, wherein each of the first width and the second width are greater than each of the third width and the fourth width.

Clause 53. The article of footwear of Clause 51, wherein each of the first width and the second width are less than each of the third width and the fourth width.

Clause 54. The article of footwear of Clause 51, wherein the first width is greater than the fourth width, the fourth width is greater than the third width, and the third width is greater than the second width.

Clause 55. The article of footwear of Clause 51, wherein the first width is less than the fourth width, the fourth width is less than the third width, and the third width is less than the second width.

Clause 56. An article of footwear comprising: a heel region including a posterior end of the article of footwear, a mid-foot region, and a forefoot region including an anterior end of the article of footwear; a lateral side, and a medial side opposite the lateral side; a vertical axis, a longitudinal axis, and a medial-lateral axis, wherein the medial-lateral axis extends from the medial side of the article of footwear to the lateral side of the article of footwear, wherein the longitudinal axis extends from the posterior end to the anterior end, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube, wherein each of the first tube and the second tube extends from the lateral side of the article of footwear to the medial side of the article of footwear, wherein the first tube includes a first diameter and the second tube includes a second diameter, the first diameter and the second diameter each taken in a plane defined by the longitudinal axis and the vertical axis, and wherein the first diameter and the second diameter are substantially the same.

Clause 57. The article of footwear of Clause 56, wherein each of the first tube and the second tube includes a first barrier film and a second barrier film, the first barrier film including an inner surface and the second barrier film including an inner surface, wherein the first barrier film includes a medial interior surface and a lateral interior surface.

Clause 58. The article of footwear of Clause 57, wherein the first diameter is an average diameter of the first tube and the second diameter is an average diameter of the second tube.

Clause 59. An article of footwear comprising: a heel region including a posterior end of the article of footwear, a mid-foot region, and a forefoot region including an anterior end of the article of footwear; a lateral side, and a medial side opposite the lateral side; a vertical axis and a medial-lateral axis, wherein the medial-lateral axis extends from the medial side of the article of footwear to the lateral side of the article of footwear, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube, wherein each of the first tube and the second tube extends from the lateral side of the article of footwear to the medial side of the article of footwear, wherein the first tube includes a first diameter and the second tube includes a second diameter, and the first diameter is different than the second diameter.

Clause 60. The article of footwear of Clause 59, wherein the first tube is disposed nearer the anterior end than the second tube.

Clause 61. The article of footwear of Clause 60, wherein the cushioning element further comprises a third tube and a fourth tube, the third tube having a third diameter and the fourth tube having a fourth diameter, wherein the second tube and the third tube are disposed between the first tube and the fourth tube, the third tube adjacent the second tube and the second tube adjacent the first tube.

Clause 62. The article of footwear of Clause 61, wherein the first tube includes an interior void, the second tube includes an interior void, the third tube includes an interior void, and the fourth tube includes an interior void.

Clause 63. The article of footwear of Clause 62, wherein the first tube includes a first barrier film and a second barrier film, the second tube includes a first barrier film and a second barrier film, the third tube includes a first barrier film and a second barrier film, and the fourth tube includes a first barrier film and a second barrier film, the first barrier film and the second barrier film surrounding the interior void, wherein the first barrier film includes an interior surface facing the interior void and the second barrier film includes an interior surface facing the interior void, wherein the first barrier film includes a medial interior surface and a lateral interior surface.

Clause 64. The article of footwear of Clause 63, wherein a centerline extends parallel to the medial-lateral axis between the medial interior surface and the lateral interior surface within each respective first tube, second tube, third tube, and fourth tube, wherein a vertical line extends parallel to the vertical axis between the interior surface of the first barrier film, the interior surface of the second barrier film, and intersects the centerline, the vertical line representing a diameter within each respective first tube, second tube, third tube, and fourth tube.

Clause 65. The article of footwear of Clause 64, wherein a collection of vertical lines within the first tube, a collection of vertical lines within the second tube, a collection of vertical lines within the third tube, and a collection of vertical lines within the first tube is an average diameter of the first tube, a collection of vertical lines within the second tube is an average diameter of the second tube, a collection of vertical lines within the third tube is an average diameter of the third tube, and a collection of vertical lines within the fourth tube is an average diameter of the fourth tube.

Clause 66. The article of footwear of Clause 65, wherein the average diameter of the first tube is the first diameter, the average diameter of the second tube is the second diameter, the average diameter of the third tube is the third diameter, and the average diameter of the fourth tube is the fourth diameter.

Clause 67. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube and a second tube, wherein each of the first tube and the second tube extends from the lateral side of the article of footwear to the medial side of the article of footwear, wherein the first tube and the second tube each include a length taken parallel to the longitudinal axis, the first tube having a first length and the second tube having a second length, and wherein the first length and the second length are the same.

Clause 68. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube and a second tube, wherein each of the first tube and the second tube extends from the lateral side of the article of footwear to the medial side of the article of footwear, wherein the first tube and the second tube each include a length taken parallel to the longitudinal axis, the first tube having a first length and the second tube having a second length, and wherein the first length and the second length are different from one another.

Clause 69. The article of footwear of Clause 68, wherein the first tube is disposed nearer the anterior end than the second tube.

Clause 70. The article of footwear of Clause 69, wherein the cushioning element further comprises a third tube having a third length and a fourth tube having a fourth length, wherein the third tube and the fourth tube are disposed between the first tube and the second tube, the third tube adjacent the second tube and the fourth tube adjacent the first tube.

Clause 71. The article of footwear of Clause 70, wherein the first length and second length are greater than the third length and the fourth length.

Clause 72. The article of footwear of Clause 70, wherein the first length and second length are less than the third length and the fourth length.

Clause 73. The article of footwear of Clause 70, wherein the first length is greater than the fourth length, the fourth length is greater than the third length, and wherein the third length is greater than the second length.

Clause 74. The article of footwear of Clause 70, wherein the first length is less than the fourth length, the fourth length is less than the third length, and wherein the third length is less than the second length.

Clause 75. An article of footwear comprising: a heel region including a posterior end of the article of footwear, a mid-foot region, and a forefoot region including an anterior end of the article of footwear; a lateral side, and a medial side opposite the lateral side; a vertical axis, a longitudinal axis, and a medial-lateral axis, wherein the medial-lateral axis extends from the medial side of the article of footwear to the lateral side of the article of footwear, wherein the longitudinal axis extends from the posterior end to the anterior end, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a thickness taken parallel to the vertical axis, and wherein the thickness of each of the first web area and the second web area is equal to one another.

Clause 76. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a length taken parallel to the longitudinal axis, and wherein the length of each of the first web area and the second web area is equal to one another.

Clause 77. An article of footwear comprising: a heel region including a posterior end of the article of footwear, a mid-foot region, and a forefoot region including an anterior end of the article of footwear; a lateral side, and a medial side opposite the lateral side; a vertical axis, a longitudinal axis, and a medial-lateral axis, wherein the medial-lateral axis extends from the medial side of the article of footwear to the lateral side of the article of footwear, wherein the longitudinal axis extends from the posterior end to the anterior end, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a width taken parallel to the medial-lateral axis, and wherein the width of each of the first web area and the second web area is equal to one another.

Clause 78. An article of footwear comprising: a heel region including a posterior end of the article of footwear, a mid-foot region, and a forefoot region including an anterior end of the article of footwear; a lateral side, and a medial side opposite the lateral side; a vertical axis, a longitudinal axis, and a medial-lateral axis, wherein the medial-lateral axis extends from the medial side of the article of footwear to the lateral side of the article of footwear, wherein the longitudinal axis extends from the posterior end to the anterior end, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a thickness taken parallel to the vertical axis, and wherein the thickness of the first web area is different from the thickness of the second web area.

Clause 79. An article of footwear comprising: a heel region including a posterior end of the article of footwear, a mid-foot region, and a forefoot region including an anterior end of the article of footwear; a lateral side, and a medial side opposite the lateral side; a vertical axis, a longitudinal axis, and a medial-lateral axis, wherein the medial-lateral axis extends from the medial side of the article of footwear to the lateral side of the article of footwear, wherein the longitudinal axis extends from the posterior end to the anterior end, and wherein the vertical axis is substantially perpendicular to the medial-lateral axis; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a width taken parallel to the medial-lateral axis, and wherein the width of the first web area is different from the width of the second web area.

Clause 80. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube and a second tube and a first web area and a second web area, wherein the first tube and the second tube extend from the lateral side of the article of footwear to the medial side of the article of footwear, and wherein the first web area extends between the first tube and the second tube parallel to the longitudinal axis and the second web area extends from the first tube parallel to the longitudinal axis, wherein each of the first web area and the second web area include a length taken parallel to the longitudinal axis, and wherein the length of the first web area is different from the length of the second web area.

Clause 81. An article of footwear comprising: a heel region including a posterior end of the article of footwear, a mid-foot region, and a forefoot region including an anterior end of the article of footwear; a lateral side, and a medial side opposite the lateral side; an upper; a sole structure, the sole structure coupled to the upper, and wherein the sole structure further comprises; a cushioning element disposed in the heel region, the cushioning element including a first tube and a second tube, wherein each of the first tube and the second tube extend from the lateral side of the article of footwear to the medial side of the article of footwear, wherein the first tube includes a contained fluid volume at a first pressure, and the second tube includes a contained fluid volume at a second pressure, wherein the first pressure and the second pressure are equal to one another.

Clause 82. The article of footwear of Clause 81, wherein the first pressure and the second pressure are between atmospheric pressure and 40 PSI.

Clause 83. The article of footwear of Clause 82, wherein the first pressure and the second pressure are 15 PSI.

Clause 84. The article of footwear of Clause 83, wherein the cushioning element further comprises a third tube and a fourth tube, the third tube including a contained fluid volume at a third pressure and the fourth tube including a contained fluid volume at a fourth pressure, and wherein the first tube is disposed nearest to the anterior end, the fourth tube is disposed nearest the posterior end, the second tube is disposed adjacent to the first tube, the third tube is disposed adjacent to the second tube, and wherein the second tube is disposed nearer the first tube than is the third tube.

Clause 85. The article of footwear of Clause 84, wherein the first pressure, the second pressure, the third pressure, and the fourth pressure are all equal.

Clause 86. An article of footwear comprising: a heel region including a posterior end of the article of footwear, a mid-foot region, and a forefoot region including an anterior end of the article of footwear; a lateral side, and a medial side opposite the lateral side; an upper; a sole structure, the sole structure coupled to the upper, and wherein the sole structure further comprises; a cushioning element disposed in the heel region, the cushioning element including a first tube and a second tube, wherein each of the first tube and the second tube extend from the lateral side of the article of footwear to the medial side of the article of footwear, wherein the first tube includes a contained fluid volume at a first pressure, and the second tube includes a contained fluid volume at a second pressure, wherein the first pressure and the second pressure are different than one another.

Clause 87. The article of footwear of Clause 86, wherein the cushioning element further comprises a third tube and a fourth tube, the third tube including a contained fluid volume at a third pressure and the fourth tube including a contained fluid volume at a fourth pressure, and wherein the first tube is disposed nearest to the anterior end, the fourth tube is disposed nearest the posterior end, the second tube is disposed adjacent to the first tube, the third tube is disposed adjacent to the second tube, and wherein the second tube is disposed nearer the first tube than is the third tube.

Clause 88. The article of footwear of Clause 87, wherein the first pressure is 15 PSI, the second pressure is 12 PSI, the third pressure is 8 PSI, and the fourth pressure is 8 PSI.

Clause 89. The article of footwear of Clause 87, wherein the first tube and the second tube are forward most tubes of the cushioning element, and wherein the third tube, and the fourth tube are rear most tubes of the cushioning element.

Clause 90. The article of footwear of Clause 89, wherein the first pressure and the second pressure of the forward most tubes are the same, and the third pressure and the fourth pressure of the rear most tubes are the same.

Clause 91. The article of footwear of Clause 90, wherein the pressures of the forward most tubes are greater than the pressures of the rear most tubes.

Clause 92. The article of footwear of Clause 90, wherein the pressures of the forward most tubes are less than the pressures of the rear most tubes.

Clause 93. The article of footwear of Clause 87, wherein the first tube and the fourth tube are outermost tubes of the cushioning element, and the second tube and the third tube are innermost tubes of the cushioning element, and wherein the first and fourth pressures of the outermost tubes are the same, and the second and third pressures of the innermost tubes are the same.

Clause 94. The article of footwear of Clause 93, wherein the pressures of the outermost tubes are less than the pressures of the innermost tubes.

Clause 95. The article of footwear of Clause 93, wherein the pressures of the outermost tubes are greater than the pressures of the innermost tubes.

Clause 96. The article of footwear of Clause 87, wherein the first pressure of the first tube and the third pressure of the third tube are the same, and the second pressure of the second tube and the fourth pressure of the fourth tube are the same.

Clause 97. The article of footwear of Clause 96, wherein the first pressure and the third pressure are less than the second pressure and the fourth pressure.

Clause 98. The article of footwear of Clause 96, wherein the first pressure and the third pressure are greater than the second pressure and the fourth pressure.

Clause 99. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube, a second tube, a third tube, and a fourth tube, wherein each of the first tube, the second tube, the third tube, and the fourth tube extend from the lateral side of the article of footwear to the medial side of the article of footwear, wherein each of the first tube, the second, the third tube, and the fourth tube is a separately formed element.

Clause 100. The article of footwear of Clause 99, wherein none of the first tube, the second tube, the third tube, nor the fourth tube are directly in contact with one another.

Clause 101. The article of footwear of Clause 99, wherein the sole structure further comprises: a first foam element extending from the heel region to the forefoot region, the first foam element including a first set of recesses; a second foam element extending from the heel region to the mid-foot region, the second foam element including a second set of recesses, and wherein the second foam element includes an opening extending therethrough; a coupling portion extending from the heel region to the mid-foot region, the coupling portion including a third set of recesses, and wherein the coupling portion is disposed within the opening of the second foam element, wherein the first set of recesses, the second set of recesses, and the third set of recesses form a continuous receiving area, wherein each of the first tube, the second tube, the third tube, and the fourth tube are disposed within the continuous receiving area, and wherein each of the first tube, the second tube, the third tube, and the fourth tube are directly connected to only the first foam element, the second foam element, and the coupling portion.

Clause 102. The article of footwear of Clause 101, wherein the respective first tube, second tube, third tube, and fourth tube of the cushioning element rest flush within the continuous receiving area.

Clause 103. The article of footwear of Clause 101, wherein the first tube is disposed nearest to the anterior end, the fourth tube is disposed nearest the posterior end, the second tube is disposed near the first tube, the third tube is disposed near the second tube, and wherein the second tube is disposed nearer the first tube than is the third tube.

Clause 104. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube, a second tube, a third tube, and a fourth tube, wherein each of the first tube, the second tube, the third tube, and the fourth tube extend from the lateral side of the article of footwear to the medial side of the article of footwear, wherein none of the first tube, the second tube, the third tube, nor the fourth tube are directly in contact with one another.

Clause 105. The article of footwear of Clause 104, wherein the first tube is disposed nearest to the anterior end, the fourth tube is disposed nearest the posterior end, the second tube is disposed near the first tube, the third tube is disposed near the second tube, and wherein the second tube is disposed nearer the first tube than is the third tube.

Clause 106. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube, a second tube, a third tube, and a fourth tube, wherein each of the first tube, the second tube, the third tube, and the fourth tube extend from the lateral side of the article of footwear to the medial side of the article of footwear, a first foam element extending from the heel region to the forefoot region, the first foam element including a first set of recesses; a second foam element extending from the heel region to the mid-foot region, the second foam element including a second set of recesses, and wherein the second foam element includes an opening extending therethrough; and a coupling portion extending from the heel region to the mid-foot region, the coupling portion including a third set of recesses, and wherein the coupling portion is disposed within the opening of the second foam element, wherein the first set of recesses, the second set of recesses, and the third set of recesses form a continuous receiving area, wherein each of the first tube, the second tube, the third tube, and the fourth tube are disposed within the continuous receiving area, and wherein each of the first tube, the second tube, the third tube, and the fourth tube are directly connected to only the first foam element, the second foam element, and the coupling portion.

Clause 107. The article of footwear of Clause 106, wherein the first tube is disposed nearest to the anterior end, the fourth tube is disposed nearest the posterior end, the second tube is disposed near the first tube, the third tube is disposed near the second tube, and wherein the second tube is disposed nearer the first tube than is the third tube.

Clause 108. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube, a second tube, a third tube, a fourth tube, a first web area and a second web area, wherein each of the first tube, the second tube, the third tube, and the fourth tube extend from the lateral side of the article of footwear to the medial side of the article of footwear, wherein the first web area extends between the first tube and the second tube, and wherein the second web area extends between the third tube and the fourth tube, the first web area and the second web area extending parallel to the longitudinal axis, and wherein the first tube, the second tube, the third tube, and the fourth tube are divided into a first group and a second group, the first group including the combination of the first tube, the second tube, and the first web area, and the second group including the third tube, the fourth tube, and the second web area.

Clause 109. The article of footwear of Clause 108, wherein the first group and the second group are not in direct contact with another.

Clause 110. An article of footwear comprising: a heel region including a posterior end of the article of footwear, a mid-foot region, and a forefoot region including an anterior end of the article of footwear; a lateral side, and a medial side opposite the lateral side; a longitudinal axis extending from the posterior end to the anterior end; an upper; a sole structure, the sole structure coupled to the upper, and wherein the sole structure further comprises; a cushioning element disposed in the heel region, the cushioning element including a first tube, a second tube, a third tube, a fourth tube, a web area, wherein each of the first tube, the second tube, the third tube, and the fourth tube extend from the lateral side of the article of footwear to the medial side of the article of footwear, wherein the first web area extends between the second tube and the third tube, the web area extending parallel to the longitudinal axis, and wherein the first tube and the fourth tube are not directly connected to the second tube or the third tube.

Clause 111. The article of footwear of Clause 110, wherein the second tube and the third tube are disposed between the first tube and the fourth tube.

Clause 112. The article of footwear of Clause 111, wherein the first tube and the fourth tube are not in direct contact with one another.

Clause 113. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first foam element extending from the heel region to the forefoot region; a second foam element extending from the heel region to the mid-foot region, wherein the second foam element includes an opening extending therethrough; a cushioning element disposed between the first foam element and the second foam element, in the heel region, the cushioning element including a plurality of tubes, wherein the plurality of tubes extend from the lateral side of the article of footwear to the medial side of the article of footwear, and wherein a first gap is formed between the cushioning element and the first foam element, and wherein a second gap is formed between the cushioning element and the second foam element.

Clause 114. An article of footwear, comprising: a heel region including a posterior end of the article of footwear, a mid-foot region, and a forefoot region including an anterior end of the article of footwear; a lateral side, and a medial side opposite the lateral side; a sole structure extending from the heel region to the forefoot region including: a first foam element extending from the heel region to the forefoot region, the first foam element including one or more mounds, wherein the mounds are arched forming a respective medial arc base and a lateral arc base; a second foam element extending from the heel region to the mid-foot region, wherein the second foam element includes an opening extending therethrough; a cushioning element disposed between the first foam element and the second foam element, in the heel region, the cushioning element including a plurality of tubes, wherein the plurality of tubes extend from the lateral side of the article of footwear to the medial side of the article of footwear, and wherein the lateral arc base and the medial arc base of the mounds contact the second foam element, and wherein a center of the mound does not contact the cushioning element, thereby forming a gap between the center of the mound the cushioning element.

Clause 115. The cushioning element of Clause 26, wherein the plurality of hollow tubes include a first barrier film and a second barrier film, and the plurality of web areas include the first barrier film and the second barrier film, the first barrier film and the second barrier film forming an interior surface of the plurality of hollow tubes and the first barrier film and the second barrier film forming an interior surface of the plurality of web areas.

Clause 116. A cushioning element for an article of footwear, the cushioning element comprising: a plurality of hollow tubes including an interior void, each of the plurality of hollow tubes including one or more films, the one or more films including a barrier material, wherein the one or more films enclose the interior void.

Clause 117. The cushioning element of Clause 116, wherein the one or more films are a multi-layer film.

Clause 118. The cushioning element of Clause 117, wherein the multi-layer film comprises a plurality of layers.

Clause 119. The cushioning element of Clause 118, wherein the plurality of layers includes from 5 layers to 400 layers.

Clause 120. The cushioning element of Clause 118, wherein the plurality of layers includes a series of alternating layers, the series of alternating series individually formed of one or more differing materials.

Clause 121. The cushioning element of Clause 116, wherein the barrier material comprises one or more gas barrier compounds.

Clause 122. The cushioning element of Clause 116, wherein the plurality of hollow tubes are produced by a thermoforming process.

Clause 123. The cushioning element of Clause 116, wherein the one or more films are produced from an elastomeric material, the elastomeric material including one or more thermoplastic polymers.

Clause 124. A cushioning element for an article of footwear, the cushioning element comprising: a plurality of hollow tubes including an interior void, the interior void being inflated with a gaseous medium under pressure to a desired initial value, the gaseous medium in said chambers comprising a gas, the elastomeric material having characteristics of low gas transmission from the interior void.

Clause 125. The cushioning element of Clause 124, wherein the elastomeric material of the plurality of hollow tubes includes one or more thermoplastic polymers.

Clause 126. The cushioning element of Clause 124, wherein the elastomeric material of the plurality of hollow tubes is polyurethane, EVOH copolymers, poly(vinyl chloride), polyvinylidene polymers and copolymers, polyamides, amide-based copolymers, acrylonitrile polymers, polyethylene terephthalate, polyether imides, or polyacrylic imides.

Clause 127. The cushioning element of Clause 124, wherein the interior void is initially inflated with a mixture of gas and air.

Clause 128. The cushioning element of Clause 124, wherein the interior void is initially inflated with a mixture of gas and nitrogen.

Clause 129. The cushioning element of Clause 124, wherein the interior void is initially inflated with a mixture of gas and oxygen.

Clause 130. The cushioning element of Clause 124, the elastomeric material forming the interior void expanding, due to tensile relaxation of said material, at a rate commensurate with a diffusion of air into the interior void to provide a greater interior void volume which prevents the total pressure in the interior void from increasing excessively.

Clause 131. The cushioning element of Clause 124, wherein the plurality of hollow tubes are in gaseous medium communication with each other.

Clause 132. The cushioning element of Clause 131, wherein one or more of the plurality of hollow tubes are of such size and shape as to expand upon substantial increase in the gaseous medium pressure above the desired initial value, one or more other of the plurality of hollow tubes being of such size and shape as to resist further expansion upon such substantial increase in the gaseous medium gas pressure above a desired initial pressure.

Clause 133. The cushioning element of Clause 131, wherein the gas is one of: air, oxygen, or nitrogen.

Clause 134. The cushioning element of Clause 131, wherein the plurality of hollow tubes comprises two layers of elastomeric material sealed to one another at spaced intervals to define a plurality of intercommunicating hollow tubes.

Clause 135. The cushioning element of Clause 131, wherein the plurality of hollow tubes comprises two layers of elastomeric material sealed to one another along a peripheral seam to define a plurality of generally longitudinally extending tubular chambers.

Clause 136. A cushioning element for an article of footwear, the cushioning element comprising: a plurality of hollow tubes of permeable elastomeric material providing a plurality of chambers, the chambers being inflated with a gaseous medium under pressure to a desired initial value, the gaseous medium in the chambers comprising a gas other than air oxygen or nitrogen, said elastomeric material having characteristics of low gas transmission with respect to the gas to resist diffusion of the gas therethrough from the chambers and of high gas transmission with respect to the ambient air surrounding the insert to permit diffusion of the ambient air through the elastomeric material into each of the chambers to provide a total pressure in each of the plurality of chamber which is the sum of the partial pressure of the gas in each chamber and the partial pressure of the air in each chamber, the gas being one of: air, nitrogen, or oxygen.

Clause 137. The cushioning element of Clause 136, wherein the elastomeric material of the plurality of hollow tubes being one or more of: a vinyl polymer, an acrylic polymer, a polyamide, an epoxy polymers, an amine polymers, a polyolefin, or a copolymers.

Clause 138. An article of footwear comprising: a heel region including a posterior end of the article of footwear, a mid-foot region, and a forefoot region including an anterior end of the article of footwear; a lateral side, and a medial side opposite the lateral side; an upper; and a sole structure coupled to the upper, wherein the sole structure includes: a first cushioning element, comprising a plurality of first tubes and a plurality of first web areas, wherein adjacent first tubes are connected to one another by a respective first web area of the plurality of first web areas; and a second cushioning element, comprising a plurality of second tubes and a plurality of second web areas, wherein adjacent tubes are connected to one another by a respective web area of the second plurality of web areas.

Clause 139. The article of footwear of clause 138, wherein one or more of the plurality of first tubes is a fluid-filled bladder, and wherein one or more of the plurality of second tubes is a fluid-filled bladder.

Clause 140. The article of footwear of clause 139, wherein at least some of the plurality of second tubes are fluidly separated from at least some other tubes of the plurality of second tubes.

Clause 141. The article of footwear of clause 139, wherein each of the plurality of second tubes is fluidly separated from each of the other plurality of second tubes.

Clause 142. The article of footwear of clause 138, wherein the plurality of second tubes are in fluid communication with one another.

Clause 143. The article of footwear of clause 138, wherein the plurality of second tubes further includes five or more tubes.

Clause 144. The article of footwear of clause 138, further including: a first support element coupled to a top surface of one or more of the plurality of second tubes; a second support element coupled to a bottom surface of one or more of the plurality of first tubes; and a third support element coupled to a bottom surface of one or more of the plurality of second tubes, wherein the first cushioning element is disposed between the first support element and the second support element, and wherein the second cushioning element is disposed between the first support element and the third support element.

Clause 145. The article of footwear of clause 144, wherein the third support element includes a plurality of cut-outs extending into a top surface of the third support element.

Clause 146. The article of footwear of clause 145, further including an outsole layer extending from the heel region to the forefoot region, the outsole layer coupled to the third support element and forming at least part of a ground-engaging surface of the article of footwear.

Clause 147. The article of footwear of clause 144, wherein the first support element extends from the heel region to the forefoot region, the first support element including a first set of recesses and a second set of recesses, wherein the second support element extends from the heel region to the mid-foot region, the second support element including a third set of recesses, and wherein the second support element includes an opening extending therethrough, wherein the third support element extends from the mid-foot region to the forefoot region, the third support element including a fifth set of recesses, wherein the first cushioning element is disposed between the first support element and the second support element, in the heel region, and wherein the second cushioning element is disposed between the first support element and the third support element, in the forefoot region.

Clause 148. The article of footwear of clause 147, further comprising: a coupling portion extending from the heel region to the mid-foot region, the coupling portion including a fourth set of recesses, and wherein the coupling portion is disposed within the opening of the second support element Clause 149. The article of footwear of clause 147, wherein the second set of recesses and the fifth set of recesses form a continuous receiving area.

Clause 150. The article of footwear of clause 149, wherein the second cushioning element is disposed within the continuous receiving area.

Clause 151. The article of footwear of clause 147, wherein the plurality of second tubes includes five or more tubes.

Clause 152. The article of footwear of clause 151, wherein two tubes of the plurality of second tubes are exposed to an external environment on the medial side of the article of footwear, and wherein three tubes of the second plurality of tubes are exposed to an external environment on the lateral side of the article of footwear.

Clause 153. The article of footwear of clause 138, wherein the first cushioning element is a foam.

Clause 154. The article of footwear of clause 138, wherein the second cushioning element is a foam.

Clause 155. The article of footwear of clause 138, wherein the plurality of first tubes includes a first tube with a first pressure, a second tube with a second pressure, a third tube with a third pressure, a fourth tube with a fourth pressure, and a fifth tube with a fifth pressure.

Clause 156. The article of footwear of clause 155, wherein the first pressure, the third pressure, and the fifth pressure are the same pressure, and wherein second pressure and the fourth pressure are the same pressure different from the pressure of the first pressure, the third pressure, and the fifth pressure.

Clause 157. A cushioning element for an article of footwear, the cushioning element comprising: a plurality of hollow tubes, wherein the plurality of hollow tubes includes a first tube extending from an outermost end in a lateral portion of the cushioning element to an innermost end in a medial portion of the cushioning element, and wherein the plurality of hollow tubes includes a second tube extending from an outermost end in the medial portion of the cushioning element to an innermost end in the lateral portion of the cushioning element, the first tube including a first width at its outermost end and a second width at its innermost end, the first width of the first tube larger than the second width of the first tube, and the second tube including a first width at its outermost end and a second width at its innermost end, the first width of the second tube larger than the second width of the second tube; and a plurality of web areas, wherein adjacent tubes of the plurality of hollow tubes are connected to one another by one of the plurality of web areas.

Clause 158. The cushioning element of clause 157, wherein the first tube is a first lateral tube, the second tube is a first medial tube, and wherein the plurality of hollow tubes further includes a second lateral tube, a second medial tube, and a third lateral tube.

Clause 159. The cushioning element of clause 158, wherein the first lateral tube, the second lateral tube, and the third lateral tube are disposed on a lateral side of the article of footwear.

Clause 160. The cushioning element of clause 159, wherein the first medial tube and the second medial tube are disposed on a medial side of the article of footwear.

Clause 161. The cushioning element of clause 158, wherein the first lateral tube is a posterior most tube of the plurality of hollow tubes, the first medial tube is disposed anterior the first lateral tube, the second lateral tube is a central most tube of the plurality of tubes, the second medial tube is disposed anterior the second lateral tube, and the third lateral tube is an anterior most tube of the plurality of hollow tubes.

Clause 162. A sole structure comprising the cushioning element according to any one of clauses 157-161.

Clause 163. An article of footwear comprising the sole structure of clause 162.

Clause 164. An article of footwear comprising: a heel region including a posterior end of the article of footwear, a mid-foot region, and a forefoot region including an anterior end of the article of footwear; a lateral side, and a medial side opposite the lateral side; a medial-lateral axis, wherein the medial-lateral axis extends from the medial side to the lateral side; an upper; a sole structure, the sole structure coupled to the upper, and wherein the sole structure further comprises; a cushioning element disposed in the forefoot region, the cushioning element including a first tube and a second tube, wherein each of the first tube and the second tube extend from the lateral side of the article of footwear to the medial side of the article of footwear, wherein each of the first tube and the second tube include a width extending substantially parallel to the medial-lateral axis.

Clause 165. The article of footwear of clause 164, wherein the first tube includes a medial face and a lateral face and the second tube includes a medial face and a lateral face, wherein each of the medial face and the lateral face of the first tube include a center point, and each of the medial face and the lateral face of the second tube include a center point, and wherein a first width of the first tube is measured between the center point of the medial face and the center point of the lateral face, and wherein a second width of the second tube is measured between the center point of the medial face and the center point of the lateral face.

Clause 166. The article of footwear of clause 165, wherein the cushioning element further comprises a third tube having a third width, and a fourth tube having a fourth width, wherein the third tube and the fourth tube are each disposed anterior the first tube and the second tube, wherein the second tube is disposed adjacent and anterior the first tube, the third tube is disposed adjacent and anterior the second, and the fourth tube is disposed adjacent and anterior the third tube.

Clause 167. The article of footwear of clause 166, wherein the third tube includes a medial face and a lateral face, and the fourth tube includes a medial face and a lateral face, wherein each of the medial face and the lateral face of the third tube include a center point, and each of the medial face and the lateral face of the fourth tube include a center point, and wherein a third width of the third tube is measured between the center point of the medial face and the center point of the lateral face, and a fourth width of the fourth tube is measured between the center point of the medial face and the center point of the lateral face.

Clause 168. An article of footwear comprising: a heel region including a posterior end of the article of footwear, a mid-foot region, and a forefoot region including an anterior end of the article of footwear; a lateral side, and a medial side opposite the lateral side; an upper; a sole structure, the sole structure coupled to the upper, and wherein the sole structure further comprises; a cushioning element disposed in the forefoot region, the cushioning element including a first tube and a second tube, wherein each of the first tube and the second tube extend from the lateral side of the article of footwear to the medial side of the article of footwear, wherein the first tube includes a contained fluid volume at a first pressure, and the second tube includes a contained fluid volume at a second pressure, wherein the first pressure and the second pressure are different than one another.

Clause 169. The article of footwear of clause 168, wherein the first pressure is 15 PSI and the second pressure is 7 PSI.

Clause 170. The article of footwear of clause 168, wherein the cushioning element further comprises a third tube, and a fourth tube, the third tube including a contained fluid volume at a third pressure and the fourth tube including a contained fluid volume at a fourth pressure, and wherein the first tube is disposed nearest to the posterior end, the fourth tube is disposed nearest the anterior end, the second tube is disposed adjacent to and anterior to the first tube, the third tube is disposed adjacent to and anterior to the second tube, the fourth tube is disposed adjacent to and anterior to the third tube.

Clause 171. The article of footwear of clause 170, wherein the third pressure and the fifth pressure are the same as the first pressure, and wherein the fourth pressure is the same as the second pressure.

Clause 172. The article of footwear of clause 171, wherein the third pressure is 7 PSI and the fourth pressure is 15 PSI.

Clause 173. The article of footwear of clause 170, wherein the first tube has a medial-lateral width less than a medial-lateral width of the second tube, wherein the medial-lateral width of the second tube is greater than a medial-lateral width of the third tube, and wherein the medial-lateral width of the third tube is greater than a medial-lateral width of the fourth tube.

Clause 174. An article of footwear comprising: a heel region including a posterior end of the article of footwear, a mid-foot region, and a forefoot region including an anterior end of the article of footwear; an upper extending from the heel region to the forefoot region; a sole structure, the sole structure coupled to the upper, and wherein the sole structure further comprises; a first cushioning element, the first cushioning element including a first tube, a second tube, a third tube, and a fourth tube; and an outsole layer extending from the posterior end to the anterior end, the outsole layer configured to directly receive a portion of the first cushioning element, wherein the outsole layer forms a ground-contacting surface of the article of footwear.

Clause 175. The article of footwear of clause 174, wherein the first cushioning element is adhesively coupled to the outsole layer.

Clause 176. The article of footwear of clause 174, wherein the sole structure further includes: a second cushioning element, the second cushioning element including a first tube, a second tube, a third tube, and a fourth tube.

Clause 177. The article of footwear of clause 176, wherein the first cushioning element is disposed in the forefoot region, and wherein the second cushioning element is disposed in the heel region.

Clause 178. The article of footwear of clause 177, wherein the outsole layer includes a first engagement area disposed at an anterior portion of the outsole layer adjacent the anterior end, and wherein the outsole layer includes a second engagement area at a posterior portion of the outsole layer adjacent the posterior end.

Clause 179. The article of footwear of clause 178, wherein the first engagement area includes one or more depressions.

Clause 180. The article of footwear of clause 179, wherein the one or more depressions include a first depression, a second depression, a third depression, and a fourth depression.

Clause 181. The article of footwear of clause 180, wherein the first tube of the first cushioning element is directly coupled to the first depression, wherein the second tube of the first cushioning element is directly coupled to the second depression, wherein the third tube of the first cushioning element is directly coupled to the third depression, and wherein the fourth tube of the first cushioning element is directly coupled to the fourth depression.

Clause 182. The article of footwear of clause 181, wherein each of the first tube, the second tube, the third tube, and the fourth tube of the first cushioning element are directly coupled to the first depression, the second depression, the third depression, and the fourth depression of the first engagement area such that no space is disposed between the first cushioning element and the first engagement area.

Clause 183. The article of footwear of clause 178, wherein the second engagement area includes one or more ridges and one or more depressions, the one or more depressions is disposed between adjacent ridges of the one or more ridges.

Clause 184. The article of footwear of clause 183, wherein the sole structure further includes: a support element coupled to the second engagement area, wherein the second support element includes one or more recess that rest flush with the one or more depressions to form a receiving area.

Clause 185. The article of footwear of clause 184, wherein the one or more ridges include a first ridge, a second ridge, and a third ridge, and wherein the one or more depressions includes a first depression and a second depression.

Clause 186. The article of footwear of clause 185, wherein the first tube of the second cushioning element is directly coupled to the first depression, wherein the second tube of the second cushioning element is directly coupled to the second depression, wherein the third tube of the second cushioning element is directly coupled to the third depression, and wherein the fourth tube of the second cushioning element is directly coupled to the fourth depression.

Clause 187. The article of footwear of clause 178, wherein the first engagement area includes a first set of one or more depressions, and wherein the second engagement area includes a second set of one or more depressions.

Clause 188. The article of footwear of clause 187, wherein the first set of one or more depressions include a first depression, a second depression, a third depression, and a fourth depression, and wherein the second set of one or more depressions include a fifth depression, a sixth depression, a seventh depression, and an eighth depression.

Clause 189. The article of footwear of clause 188, wherein the first tube of the first cushioning element is directly coupled to the first depression, wherein the second tube of the first cushioning element is directly coupled to the second depression, wherein the third tube of the first cushioning element is directly coupled to the third depression, wherein the fourth tube of the first cushioning element is directly coupled to the fourth depression, wherein the first tube of the second cushioning element is directly coupled to the fifth depression, wherein the second tube of the second cushioning element is directly coupled to the sixth depression, wherein the third tube of the second cushioning element is directly coupled to the seventh depression, and wherein the fourth tube of the second cushioning element is directly coupled to the eighth depression.

Clause 190. The article of footwear of clause 176, wherein the first cushioning element is a fluid-filled bladder, and wherein the second cushioning element is a foam material.

Clause 191. The article of footwear of clause 176, wherein the first cushioning element is a fluid-filled bladder, and wherein the second cushioning element is a fluid-filled bladder.

Clause 192. The article of footwear of clause 176, wherein the first cushioning element is a foam material, and wherein the second cushioning element is a foam material.

Clause 193. The article of footwear of clause 174, wherein the outsole layer is of a unitary construction.

Clause 194. The article of footwear of clause 174, further comprising: a midsole extending from the posterior end to the anterior end, wherein the midsole includes a plurality of recesses configured to receive an upper facing surface of the first cushioning element.

Clause 195. The article of footwear of clause 194, wherein an anterior portion of the midsole is configured to couple with an anterior end of the outsole layer.

Clause 196. The article of footwear of clause 194, wherein the outsole layer directly contacts the midsole at a posterior most portion of the midsole.

Clause 197. The article of footwear of clause 194, wherein the outsole layer directly contacts the midsole in the midfoot region.

Clause 198. The article of footwear of clause 194, wherein the outsole layer directly contacts the midsole at an anterior most portion of the midsole.

Clause 199. The article of footwear of clause 174, wherein each of the first tube, the second tube, the third tube, and the fourth tube of the first cushioning element are exposed at an outermost side surface of each of the respective tubes.

Clause 200. An article of footwear comprising: a heel region including a posterior end of the article of footwear, a mid-foot region, and a forefoot region including an anterior end of the article of footwear; a sole structure, the sole structure coupled to the upper, and wherein the sole structure further comprises; a first cushioning element disposed in the heel region, the first cushioning element including a first tube, a second tube, a third tube, and a fourth tube; a second cushioning element disposed in the forefoot region, the second cushioning element including a first tube, a second tube, a third tube, and a fourth tube; and an outsole layer, the outsole layer configured to receive the first cushioning element and the second cushioning element, wherein the first cushioning element and the second cushioning element are directly coupled to the outsole layer.

We claim:

1. An article of footwear comprising:

a heel region including a posterior end of the article of footwear, a mid-foot region, and a forefoot region including an anterior end of the article of footwear;

a lateral side, and a medial side opposite the lateral side;

an upper; and a sole structure, the sole structure coupled to the upper, and wherein the sole structure further comprises;

a cushioning element disposed in the heel region, the cushioning element including a plurality of tubes including at least a first tube and a second tube, the cushioning element further including a plurality of webs including at least a first web, the first web extending between the first tube and at least one other tube of the plurality of tubes, wherein each of the first tube and the second tube extends between the lateral side of the article of footwear and the medial side of the article of footwear along a medial-lateral direction, wherein the first tube includes a contained fluid volume at a first pressure, and the second tube includes a contained fluid volume at a second pressure, wherein the first pressure and the second pressure are equal to one another and greater than atmospheric pressure, and wherein the first tube and second tube are fluidly isolated from each other, and wherein the plurality of webs are formed by a first barrier film of the cushioning element and a second barrier film of the cushioning element being bonded to one another, and the plurality of webs cooperating with a peripheral seam to bound and extend around each of the plurality of tubes, wherein the peripheral seam is disposed on a bottom surface of the cushioning element.

2. The article of footwear of claim 1, wherein the first pressure and the second pressure are less than 40 PSI.

3. The article of footwear of claim 2, wherein the first pressure and the second pressure are 15 PSI.

4. The article of footwear of claim 1, wherein the plurality of tubes further comprises a third tube and a fourth tube, the third tube including a contained fluid volume at a third pressure and the fourth tube including a contained fluid volume at a fourth pressure, and wherein the first tube is disposed nearest to the anterior end, the fourth tube is disposed nearest the posterior end, the second tube is disposed adjacent to the first tube, the third tube is disposed adjacent to the second tube, and wherein the second tube is disposed nearer the first tube than is the third tube.

5. The article of footwear of claim 4, wherein the first pressure, the second pressure, the third pressure, and the fourth pressure are all equal.

6. The article of footwear of claim 4, wherein the first tube and the second tube are forward most tubes of the cushioning element, and wherein the third tube, and the fourth tube are rear most tubes of the cushioning element.

7. The article of footwear of claim 6, wherein the first pressure and the second pressure of the forward most tubes are the same, and the third pressure and the fourth pressure of the rear most tubes are the same.

8. The article of footwear of claim 7, wherein the pressures of the forward most tubes are greater than the pressures of the rear most tubes.

9. The article of footwear of claim 7, wherein the pressures of the forward most tubes are less than the pressures of the rear most tubes.

10. An article of footwear comprising:

a heel region including a posterior end of the article of footwear, a mid-foot region, and a forefoot region including an anterior end of the article of footwear;

a lateral side, and a medial side opposite the lateral side;

a longitudinal axis extending from the posterior end to the anterior end;

an upper; and a sole structure, the sole structure coupled to the upper, and wherein the sole structure further comprises;

a cushioning element disposed in the heel region, the cushioning element including a first tube, a second tube, a third tube, and a fourth tube, wherein each of the first tube, the second tube, the third tube, and the fourth tube extend from the lateral side of the article of footwear to the medial side of the article of footwear, and the cushioning element including a peripheral seam disposed on a bottom surface of the cushioning element, wherein each of the first tube, the second tube, the third tube, and the fourth tube comprises a generally cylindrical shape providing a closed volume separate from the other tubes, and each of the first tube, the second tube, the third tube, and the fourth tube has a convex medial face and a convex lateral face, wherein at least two of the first, second, third, or fourth tubes are connected to each other by a web extending from the peripheral seam and between the at least two tubes, wherein an end of the web is positioned closer to a center of at least one of the tubes than an end of the tube.

11. The article of footwear of claim 10, wherein none of the first tube, the second tube, the third tube, nor the fourth tube are directly in contact with one another.

12. The article of footwear of claim 10, wherein the sole structure further comprises:

a first foam element extending from the heel region to the forefoot region, the first foam element including a first set of recesses;

a second foam element extending from the heel region to the mid-foot region, the second foam element including a second set of recesses, and wherein the second foam element includes an opening extending therethrough; and a coupling portion extending from the heel region to the mid-foot region, the coupling portion including a third set of recesses, and wherein the coupling portion is disposed within the opening of the second foam element, wherein the first set of recesses, the second set of recesses, and the third set of recesses form a continuous receiving area, wherein each of the first tube, the second tube, the third tube, and the fourth tube are disposed within the continuous receiving area, and wherein each of the first tube, the second tube, the third tube, and the fourth tube are directly connected to only the first foam element, the second foam element, and the coupling portion.

13. The article of footwear of claim 12, wherein the respective first tube, second tube, third tube, and fourth tube of the cushioning element rest flush within the continuous receiving area.

* * * * *